United States Patent
Sato

(10) Patent No.: US 10,812,826 B2
(45) Date of Patent: Oct. 20, 2020

(54) IMAGE PROCESSING APPARATUS AND IMAGE PROCESSING METHOD

(71) Applicant: SONY CORPORATION, Tokyo (JP)

(72) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 128 days.

(21) Appl. No.: 14/441,907

(22) PCT Filed: Nov. 21, 2013

(86) PCT No.: PCT/JP2013/081342
§ 371 (c)(1),
(2) Date: May 11, 2015

(87) PCT Pub. No.: WO2014/084106
PCT Pub. Date: Jun. 5, 2014

(65) Prior Publication Data
US 2015/0288963 A1    Oct. 8, 2015

(30) Foreign Application Priority Data

Nov. 30, 2012    (JP) .................. 2012-263810

(51) Int. Cl.
*H04N 19/11* (2014.01)
*G06K 9/62* (2006.01)
(Continued)

(52) U.S. Cl.
CPC ......... *H04N 19/593* (2014.11); *G06K 9/6202* (2013.01); *H04N 19/11* (2014.11);
(Continued)

(58) Field of Classification Search
CPC ..... H04N 19/593; H04N 19/184; H04N 19/11
(Continued)

(56) References Cited

U.S. PATENT DOCUMENTS 6,011,873 A * 1/2000 Desai ............... G06T 9/005
382/119
2005/0244063 A1* 11/2005 Kwon ............... H04N 19/139
382/233

(Continued)

FOREIGN PATENT DOCUMENTS

EP          1315367 A2    5/2003
JP        2012-510760 A    5/2012
WO    WO2011/125445 A1   10/2011

OTHER PUBLICATIONS

JCTVC-JJ1003_d7 (JCT-VC, 10th Meeting: Stockholm, SE, Jul. 2012.*

(Continued)

*Primary Examiner* — Hee-Yong Kim
(74) *Attorney, Agent, or Firm* — Paratus Law Group, PLLC

(57) ABSTRACT

The present disclosure relates to an image processing apparatus and an image processing method capable of suppressing a deterioration in image quality. The image processing apparatus includes a threshold value setting unit which sets a threshold value for identifying a feature of neighboring pixels of a current block in an intra prediction process in decoding of encoded data where image data are encoded according to a bit depth of the image data and a filtering processing unit which performs a filtering process on the neighboring pixels by using a filter according to the feature of the neighboring pixels identified by using the threshold value set by the threshold value setting unit. The present disclosure may be applied to, for example, an image processing apparatus.

12 Claims, 63 Drawing Sheets

(51) Int. Cl.
| | |
|---|---|
| H04N 19/184 | (2014.01) |
| H04N 19/593 | (2014.01) |
| H04N 19/86 | (2014.01) |
| H04N 19/182 | (2014.01) |
| H04N 19/117 | (2014.01) |
| H04N 19/159 | (2014.01) |
| H04N 19/82 | (2014.01) |
| H04N 19/136 | (2014.01) |
| H04N 19/597 | (2014.01) |
| H04N 19/30 | (2014.01) |

(52) U.S. Cl.
CPC ......... *H04N 19/117* (2014.11); *H04N 19/159* (2014.11); *H04N 19/182* (2014.11); *H04N 19/184* (2014.11); *H04N 19/82* (2014.11); *H04N 19/86* (2014.11); *H04N 19/136* (2014.11); *H04N 19/30* (2014.11); *H04N 19/597* (2014.11)

(58) Field of Classification Search
USPC .................................................. 375/240.13
See application file for complete search history.

(56) References Cited

U.S. PATENT DOCUMENTS

| | | | |
|---|---|---|---|
| 2007/0147505 A1* | 6/2007 | Bock | H04N 19/134 375/240.16 |
| 2010/0134496 A1 | 6/2010 | Bhaskaran et al. | |
| 2012/0237124 A1 | 9/2012 | Bosco et al. | |

OTHER PUBLICATIONS

Apr. 8, 2016, European Search Report for related EP Application No. 13858063.4.
Sullivan, et al., "Meeting report of the 11$^{th}$ meeting of the Joint Collaborative Team on Video Coding (JCT-VC), Shanghai, CN, Oct. 10-19, 2012", Joint Collaborative Team on Video Coding (JCT-VC) of ITU-T SG16 WP3 and ISO/IEC JTC1/SC29/WG11, Oct. 10-19, 2012, pp. 1-150, 11$^{th}$ Meeting: Shanghai, CN.
Sugio, et al., "AHG6: A threshold for SAO edge offset", Joint Collaborative Team on Video Coding (JCT-VC) of ITU-T SG16 WP3 and ISO/IEC JTC1/SC29/WG11, Jul. 11-20, 2012, pp. 1-8, 10$^{th}$ Meeting: Stockholm, SE.
Seo, et al., "Bi-Intra Prediction using slope information", Joint Collaborative Team on Video Coding (JCT-VC) of ITU-T SG16 WP3 and ISO/IEC JTC1/SC29/WG11, Jan. 20-28, 2011, pp. 1-6, 4$^{th}$ Meeting: Daegu, KR.
Apr. 29, 2016, European Search Report for related EP Application No. 13858999.9.
Bross, et al., High Efficiency Video Coding (HEVC) text specification draft 6, Joint Collaborative Team on Video Coding (JCT-VC) of ITU-T SG16 WP3 and ISO/IEC JTC1/SC29/WG11, Nov. 21-30, 2011, p. i-225, 7$^{th}$ Meeting, Geneva, Switzerland.
Tan, et al., Contouring artefact and solution, Joint Collaborative Team on Video Coding (JCT-VC) of ITU-T SG16 WP3 and ISO/IEC JTC1/SC29/WG11, Oct. 10-19, 2012, p. 1-8 and supplement, 11$^{th}$ Meeting, Shanghai, China.
Lu, et al., CE1: On deblocking filter, Joint Collaborative Team on Video Coding (JCT-VC) of ITU-T SG16 WP3 and ISO/IEC JTC1/SC29/WG11, Oct. 10-19, 2012, p. 1-14, 11$^{th}$ Meeting, Shanghai, China.
Lu, et al., NonCE1: Simple improvement of Deblocking filter, Joint Collaborative Team on Video Coding (JCT-VC) of ITU-T SG16 WP3 and ISO/IEC JTC1/SC29/WG11, Oct. 10-19, 2012, p. 1-23, 11$^{th}$ Meeting, Shanghai, China.
Ikeda, et al., Non-CE1: Simplification of strong filter decisions in CE1 deblocking, Joint Collaborative Team on Video Coding (JCT-VC) of ITU-T SG16 WP3 and ISO/IEC JTC1/SC29/WG11, Oct. 10-19, 2012, p. 1-12, 11$^{th}$ Meeting, Shanghai, China.
Jul. 11, 2017, JP communication issued for related JP application No. 2014-550146.
Jul. 11, 2017, JP communication issued for related JP application No. 2014-550147.
Sep. 20, 2017, Chinese Office Action issued for related CN application No. 201380061145.6.
Sep. 20, 2017, Chinese Office Action issued for related CN application No. 201380061202.0.
Oct. 26, 2017, EU Office Action issued for related EU application No. 13 858 063.4.
Oct. 26, 2017, EU Office Action issued for related EU application No. 13 858 999.9.
Mar. 8, 2018, Japanese Office Action issued for related JP application No. 2014-550146.
Sullivan et al., Meeting report of the 11$^{th}$ meeting of the Joint Collaborative Team on Video Coding (JCT-VC), Shanghai, CN, Oct. 10-19, 2012, Joint Collaborative Team on Video Coding (JCT-VC) of ITU-T SG16 WP3 and ISO/IEC JTC1/SC29/WG11, Oct. 10-19, 2012, pp. 1 and 79, 11$^{th}$ Meeting, Shanghai, China.
Mar. 8, 2018, Japanese Office Action issued for related JP application No. 2014-550147.
Sep. 4, 2018, Japanese Office Action issued for related JP application No. 2014-550146.
Sep. 4, 2018, Japanese communication issued for related JP application No. 2014-550146.
Sep. 4, 2018, Japanese Office Action issued for related JP application No. 2014-550147.
Sep. 4, 2018, Japanese communication issued for related JP application No. 2014-550147.
Nov. 28, 2018, European Communication issued for related EP application No. 13858063.4.
Nov. 28, 2018, European Communication issued for related EP application No. 13858999.9.
Bross et al., High Efficiency Video Coding (HEVC) text specification draft 9, Joint Collaborative Team on Video Coding (JCT-VC) of ITU-T SG16 WP3 and ISO/IEC JTC1/SC29/WG11, Oct. 10-19, 2012, pp. 1-258, 11$^{th}$ Meeting: Shanghai, China.

* cited by examiner

FIG. 59

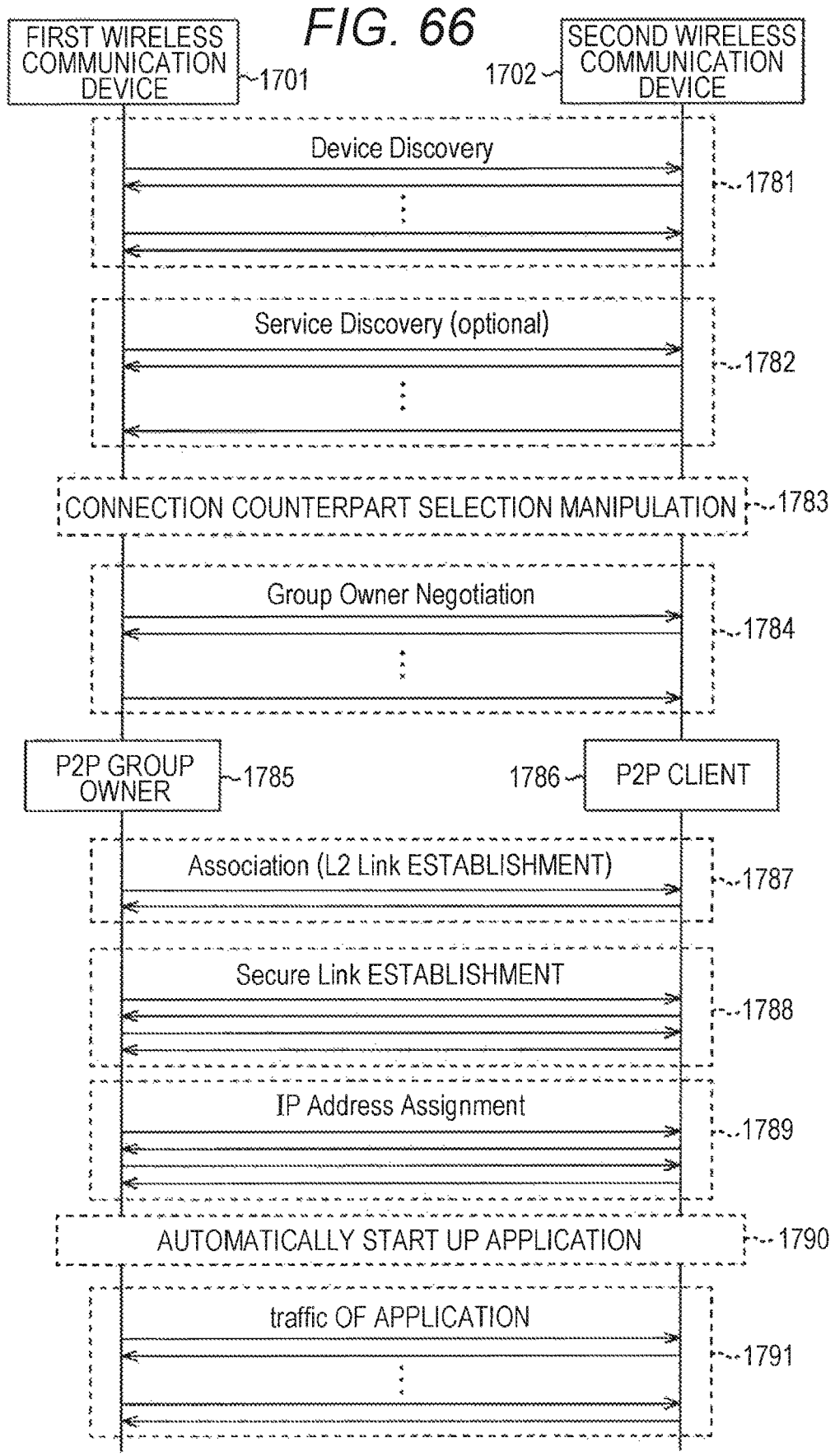

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2013/081342 (filed on Nov. 21, 2013) under 35 U.S.C. § 371, which claims priority to Japanese Patent Application No. 2012-263810 (filed on Nov. 30, 2012), which are all hereby incorporated by reference in their entirety.

TECHNICAL FIELD

The present disclosure relates to an image processing apparatus and an image processing method and, more particularly, to an image processing apparatus and an image processing method capable of suppressing a deterioration in image quality.

BACKGROUND ART

In recent years, apparatuses for compressing and encoding an image by employing an encoding scheme in which image in is treated as digital data and, at this time, for the purpose of high-efficiency information transmission and accumulation, compression is performed through orthogonal, transform such as discrete cosine transform and motion compensation by using redundancy unique to the image information have been widely used. The encoding scheme includes, for example, an MPEG (Moving Picture Experts Group) or the like.

Particularly, the MPEG-2 (ISO/IEC 13818-2) scheme is defined as a general-purpose image encoding scheme and is a standard covering both of interlaced scanning images and sequential scanning images and covering standard resolution images and high-accuracy images. For example, the MPEG-2 scheme is widely used for a wide range of applications of professional uses and consumer uses. By using the MPEG2 compression scheme, for example, a code amount (bit rate) of 4 to 8 Mbps is allocated to an interlaced scanning image having a standard resolution of 720×480 pixels. In addition, by using the MPEG2 compression scheme, for example, a code amount (bit rate) of 18 to 22 Mbps is allocated to an interlaced scanning image having a high resolution of 1920×1088 pixels. Therefore, a high compression rate and a good image quality may be implemented.

The MPEG-2 is mainly applied to high image quality encoding which is suitable for broadcasting, but it does not correspond to an encoding scheme having a code amount (bit rate) lower than that of the MPEG1, that is, an encoding scheme having a higher compression rate. With the spread of mobile phones, needs for the encoding scheme are expected to be increased, and accordingly, the MPEG-4 encoding scheme is standardized. With respect to the image encoding scheme, the ISO/IEC 14496-2 standard was approved as an international standard in December, 1998.

In addition, in recent years, for the purpose of image encoding for TV conference, standardization called H.26L (ITU-T (International Telecommunication Union Telecommunication Standardization Sector) Q6/16 VCEG (Video Coding Expert Group)) has been promoted. It is known that, in comparison with the encoding schemes such as the MPEG-2 or the MPEG-4 in the related art, in the H.26L, although a large calculation amount is needed for encoding and decoding, a higher encoding efficiency is implemented. In addition, at present, as a part of activities of the MPEG-4, standardization which is based on the H.26L and incorporates functions which are not supported in the H.26L to implement a higher encoding efficiency is performed as Joint Model of Enhanced-Compression Video Coding.

As the schedule of the standardization, the standard was approved as an international standard on the basis named H.264 and MPEG-4 Part 10 (Advanced Video Coding, hereinafter referred to as AVC)) in March, 2003.

In addition, as extension of the H.264/AVC, standardization of Fidelity Range Extension (FRExt) including RGB, encoding tools necessary for business such as 4:2:2 or 4:4:4, 8×8 DCT defined by the MPEG-2, and quantization matrices was completed in February, 2005. Accordingly, the H.264 AVC became an encoding scheme capable of representing film noise included in a movie with a good quality. Therefore, the H.264/AVC has been used for a wide range of applications such as Btu-Ray disc (trade mark).

However, recently, needs for high compression rate encoding, for example, a need to compress images of about 400×2000 pixels which is four times of a high-vision image or a need to distribute a high-vision image in a limited-transmission-rate environment such as the Internet have been further increased. Therefore, in the VCEG under the ITU-T, improvement of an encoding efficiency continues to be studied.

Therefore, at present, for the purpose of further improvement of the encoding efficiency in comparison with the AVC, standardization of an encoding scheme called high efficiency video coding (HEVC) has been promoted by the joint collaboration team-video coding (JCTVC) as a joint standardization body of the ITU-T and the ISO/IEC. With respect to the HEVC standard, Committee Draft as a first draft specification was issued in February, 2012 (for example, refer to Non-Patent Document 1).

However, in an intra 8×8 prediction mode of the AVC encoding scheme, a [121]/4 filtering process is performed on neighboring pixels of a current block which is a processing target. In the HEVC, on/off of the filtering process is determined according to a block size and a prediction mode.

In addition, in the HEVC, for the purpose of reducing block distortion of the case where the prediction mode is a DC mode, a horizontal mode, or a vertical mode, a boundary value smoothing process is defined.

In addition, in order to reduce a phenomenon that a contour is seen at a flat portion of an image, a contour noise countermeasure process was proposed (for example, refer to Non-Patent Document 2).

In the method disclosed in Non-Patent Document 2, features of the neighboring pixels of the current block which is a processing target is identified by performing a threshold value determining process. In the case where a result of the threshold value determining process is true, namely, in the case where the neighboring pixels have predetermined features, instead of the above-described [121]/4 filtering process, a bi-linear interpolation process (referred to as a hi-linear filtering process) is performed.

CITATION LIST

Non-Patent Document

Non-Patent Document 1: Benjamin Bross, Woo-Jin Han, Jens-Rainer Ohm, Gary J. Sullivan, Thomas Wiegand, "High efficiency video coding (HEVC) text specification draft 8", JCTVC-H1003_d7, Joint Collaborative Team on Video Coding (SOT-VC) of ITU-T SG16WP3 and ISO/IEC JTC1/SC29/WG11, 10th Meeting: Stockholm, SE, 11-20 Jul. 2012

Non-Patent Document 2: T K Tan, Y. Suzuki, "Contouring artefact and solution", JCTVC-K0139, Joint Collaborative Team on Video Coding (JCT-VC) of ITU-T SG 16WP3 and ISO/IEC JTC 1/SC 29/WG 1111th Meeting: Shanghai, Conn., 10-19 Oct. 2012

SUMMARY OF THE INVENTION

Problems to be Solved by the Invention

However, in the method of disclosed in Non-Patent Document 2, the threshold value is fixed. Namely, irrespective of the feature, for example, the bit depth or the like of the image data which is a target of the encoding/decoding process, the same value is set as the threshold value. Therefore, there is a problem in that, in the selection of the filtering process on the neighboring pixels in the intra prediction, an appropriate filter is not selected, so that image quality is unnecessarily deteriorated.

The present disclosure has been made in the light of such situation and is capable of suppressing a deterioration in image quality.

Solutions to Problems

According to an aspect of the present technique, there is provided an image processing apparatus including a threshold value setting unit which sets a threshold value which is compared with a value calculated by using a sample of neighboring pixels in order to identify a feature of the neighboring pixels of a current block in an intra prediction process in decoding of encoded data where image data are encoded according to a bit depth of the image data and a filtering processing unit which performs a filtering process on the neighboring pixels by using a bi-linear interpolation filter in the case where the value calculated by using the sample of the neighboring pixels is lower than the threshold value set by the threshold value setting unit.

The threshold value setting unit may bit-shift the threshold value which is determined as an initial value in advance according to the bit depth.

The threshold value setting unit may set the threshold value to 8 in the case where the bit depth of the image data is 3 bits.

The image processing apparatus may further include a determining unit which determines the bit depth of the image data, and the threshold value setting unit may set the threshold value according to the bit depth determined by the determining unit.

The image processing apparatus may further include a receiving unit which receives the bit depth of the image data, and the threshold value setting unit may set the threshold value according to the bit depth received by the receiving unit.

The image processing apparatus may further include a receiving unit which receives the transmitted threshold value set according to the bit depth of the image data, and the filtering processing unit performs a filtering process on the neighboring pixels by using a filter according to the feature of the neighboring pixels identified by using the threshold value received by the receiving unit.

The filtering processing unit may perform a low pass filtering process on the neighboring pixels in the case where the value calculated by using the sample of the neighboring pixels exceeds the threshold value set by the threshold value setting unit.

Further, according to an aspect of the present technique, there is provided an image processing method including: setting a threshold value which is compared with a value calculated by using a sample of neighboring pixels in order to identify a feature of the neighboring pixels of a current block in an intra prediction process in decoding of encoded data where image data is encoded according to a bit depth of the image data; and performing a filtering process on the neighboring pixels by using a bi-linear interpolation filter in the case where the value calculated by using the sample of the neighboring pixels is lower than the set threshold value.

According to an aspect of the present technique, a threshold value is set, which is compared with a value calculated by using a sample of neighboring pixels in order to identify a feature of the neighboring pixels of a current block in an intra prediction process in decoding of encoded data where image data are encoded is set according to a bit depth of the image data, and a filtering process is performed on the neighboring pixels by using a bi-linear interpolation filter in the case where the value calculated by using the sample of the neighboring pixels is lower than the set threshold value.

Effects of the Invention

According to the present disclosure it is possible to encode and decode an image. Particularly, it is possible to suppress a deterioration in image quality.

BRIEF DESCRIPTION OF DRAWINGS

FIG. 23 is a flowchart illustrating an example of a flow of an intra prediction process.

FIG. 59 is a description diagram illustrating a specific example of an MPD.

FIG. 66 is a sequence chart illustrating an example of a communication process of each apparatus in a wireless communication system.

MODE FOR CARRYING OUT THE INVENTION

Hereinafter, embodiments for implementing the present disclosure (hereinafter, referred to as embodiments) will be described. In addition, the description is performed in the following order.

0. Overview
1. First Embodiment (Image Encoding Device)
2. Second Embodiment (Image Decoding Device)
3. Third Embodiment (Multi-Viewpoint Image Encoding/Multi-Viewpoint Image Decoding Device)

4. Fourth Embodiment (Hierarchical Image Encoding Hierarchical Image Decoding Device)
5. Fifth Embodiment (Computer)
6. Example of Application
7. Example of Application of Scalable Encoding.
8. Sixth Embodiment (Set/Unit/Module/Processor)
9. Seventh Embodiment (Example of Application of Content Reproducing System of MPEG-DASH)
10. Eighth Embodiment (Example of Application of Wireless Communication System of Wi-Fi Standard)

0. Overview

Encoding Scheme

Hereinafter, the present technique will be described in an example where the present technique is applied to image encoding/decoding in an HEVC (High Efficiency Video Coding) scheme.

<Coding Unit>

In the AVC (Advanced Video Coding) scheme, a hierarchical structure having macroblocks and submacroblocks are defined. However, the macroblock of 16×16 pixels is not optimal to a large image frame called UHD (Ultra High Definition, 4000×2000 pixels), which is to be an object of a next-generation encoding scheme.

Figure 1:
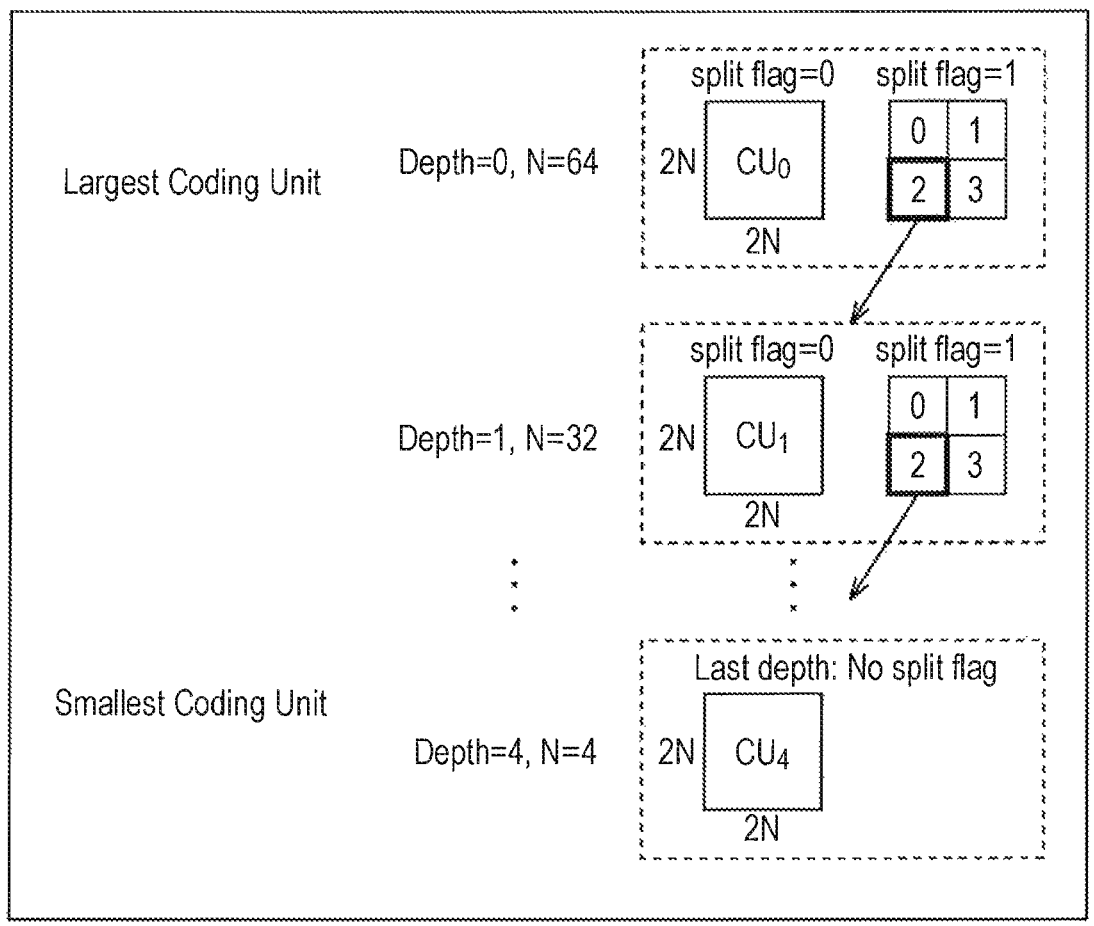
FIG. 1 is a diagram illustrating a configuration example of a coding unit.

On the other hand, in the HEVC scheme, as illustrated in FIG. 1, a coding unit (CU) is defined.

The CU is also called a coding tree block (CTB) and is a partial region of an image in units of a picture which has the same functions as that of the macroblock in the AVC scheme. The latter is fixed in size of 16×16 pixels, but the former is not fixed in size but it is designated in image compression information in each sequence.

For example, in a sequence parameter set (SPS) included in output encoded data, a maximum size (LCU (Largest Coding Unit)) of the CU and a minimum size (SCU (Smallest Coding Unit)) of the CU are defined.

In each LCU, the CU can be split into CUs having a smaller size by setting split-flag=1 within a range where the size of CU is not smaller than the size of SCU. In the example of FIG. 1, the size of LCU is 128, and the maximum hierarchical depth is 5. When the value of split flag is "1", the CU having a size of 2N×2N is split into the CUs having a size of N×N which are disposed in the one lower layer.

In addition, the CU is split into prediction units (PUs) as the regions (partial regions of an image in units of a picture) which become a processing unit of intra or inter prediction, or the CU is split into transform units (TUs) as the regions (partial regions of an image in units of a picture) which become a processing unit of orthogonal transform. At present, in the HEVC scheme, in addition to 4×4 orthogonal transform and 8×8 orthogonal transform, 16×16 orthogonal transform and 32×32 orthogonal transform can be used.

Like the above-described HEVC scheme, it is considered that, in the encoding scheme where the CU is defined and various processes are performed in units of the CU, a macroblock in the AVC scheme corresponds to the LCU and a block (subblock) corresponds to the CU. In addition, it is considered that a motion compensation block in the AVC scheme corresponds to the PU. However, since the CU has a hierarchical structure, a size (for example, 128×128 pixels) of the LCU of the uppermost layer is generally set to be larger than the size of the macroblock of the AVC scheme.

Therefore, hereinafter, the LCU is assumed to include the macroblock in the AVC scheme, and the CU is assumed to include the block (subblock) of the AVC scheme. Namely, the "block" used for the following description denotes an arbitrary partial area within a picture, and a size, a shape, a feature, and the like thereof are not limited. Namely, the "block" includes, for example, the TU, the PU, the SCU, the CU, the LCU, the subblock, the macroblock, or an arbitrary area (process unit) such as a slice. In addition, other partial areas (process unit) are also included. In the case where the size, the process unit, or the like needs to be limited, appropriate description thereof will be made.

<Mode Selection>

However, in order to achieve a higher encoding efficiency in the AVC or HEVC encoding scheme, it is important to select an appropriate prediction mode.

As an example of the associated selection scheme, there is a method incorporated in reference software (disclosed in http://iphome.hhi.de/suehring/tml/index.htm) of H.264/MPEG-4AVC, which is called JM (Joint Model).

In the JM, two mode determining methods of high complexity mode and low complexity mode described below can be selected. In both of the methods, cost function values with respect to the respective prediction mode modes are calculated, and the prediction mode where the cost function value is minimized is selected as an optimal mode for an associated block or macroblock.

The cost function in the high complexity mode is expressed by the following Formula (1).

[Mathematical Formula 1]

$$\text{Cost}(\text{Mode} \in \Omega) = D + \lambda * R \quad (1)$$

Here, Ω denotes a total set of candidate modes for encoding the associated block or macroblock, and D denotes difference energy between a decoded image and an input image in the case of encoding the associated prediction mode. λ denotes a Lagrange multiplier given as a function of a quantization parameter. R denotes a total code amount including an orthogonal transform coefficient in the case of encoding the associated mode.

Namely, when encoding in a High complexity mode is intended to be performed, in order to calculate the above-described parameters D and R, a preliminary encoding process needs to be performed once in every candidate mode, so that a higher calculation amount is required.

The cost function in the low complexity mode is expressed by the following Formula (2).

[Mathematical Formula 2]

$$\text{Cost}(\text{Mode} \in \Omega) = D + QP2\text{Quant}(QP) * \text{HeaderBit} \quad (2)$$

Here, unlike the case of the high complexity mode, D becomes difference energy between a predicted image and an input image. QP2Quant (QP) is given as a function of a quantization parameter QP, HeaderBit is a code amount with respect to information included in Header, which does not include the orthogonal transform coefficient and is called a motion vector or a mode.

Namely, in the low complexity mode, although the prediction process in each candidate mode needs to be performed, since a decoded image is not needed, the encoding process needs not be performed. Therefore, it is possible to implement with a lower calculation amount than that in the high complexity mode.

<Intra Prediction>

In the AVC, intra 4×4 prediction, intra 8×8 prediction, and intra 16×16 prediction exist. In the HEVC, as illustrated in FIG. 2, angular prediction is applied to 4×4 to 64×64 pixel blocks.

Figure 2:
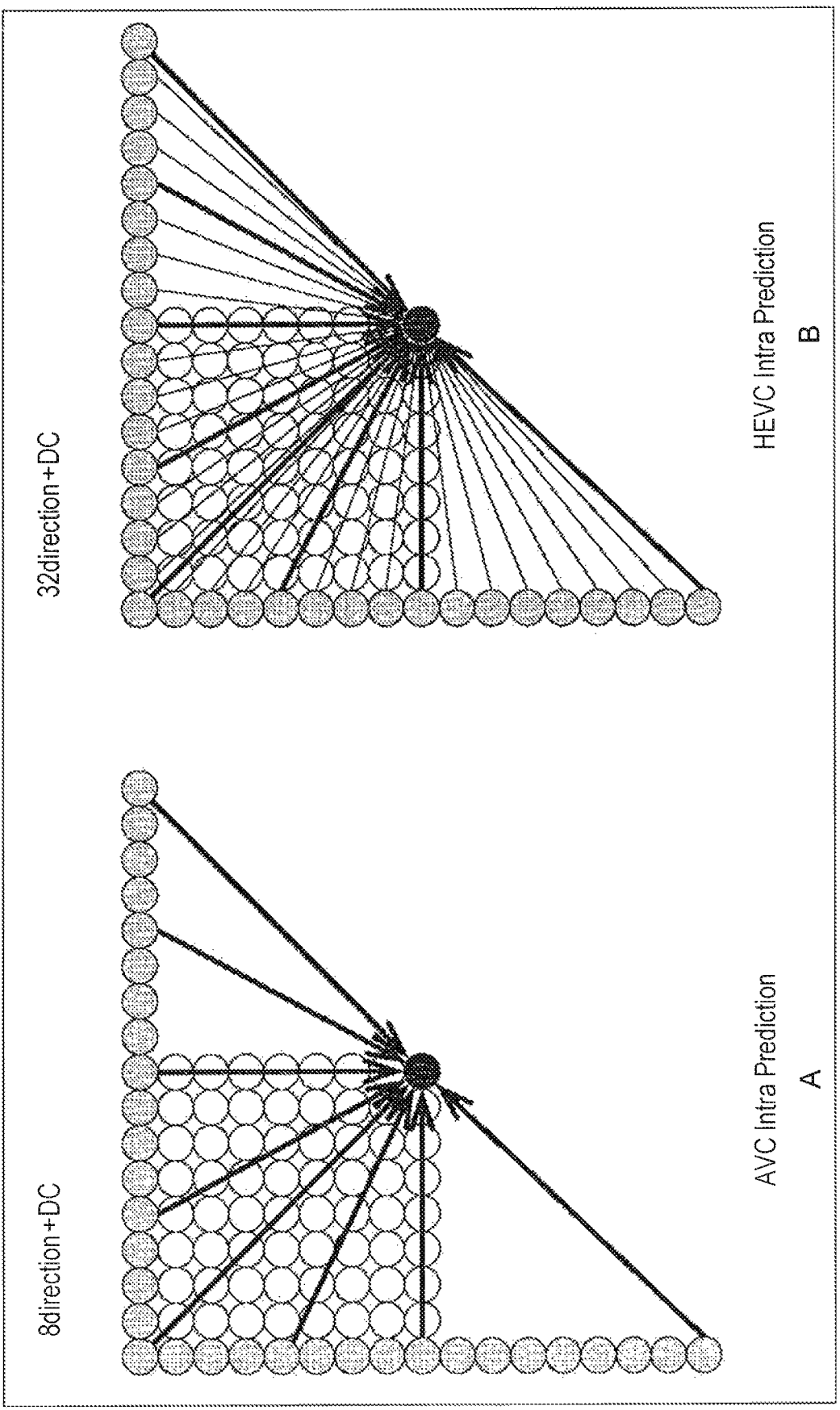
FIG. 2 is a diagram illustrating an example of angular prediction.

Namely, in the AVC, as illustrated in A of FIG. 2, the intra prediction process is performed by 8-direction+DC prediction. In contrast, in the HEVC, as illustrated in B of FIG. 2, the intra prediction process is performed by 32-direction+DC prediction. Accordingly, the prediction accuracy is improved.

Figure 3:
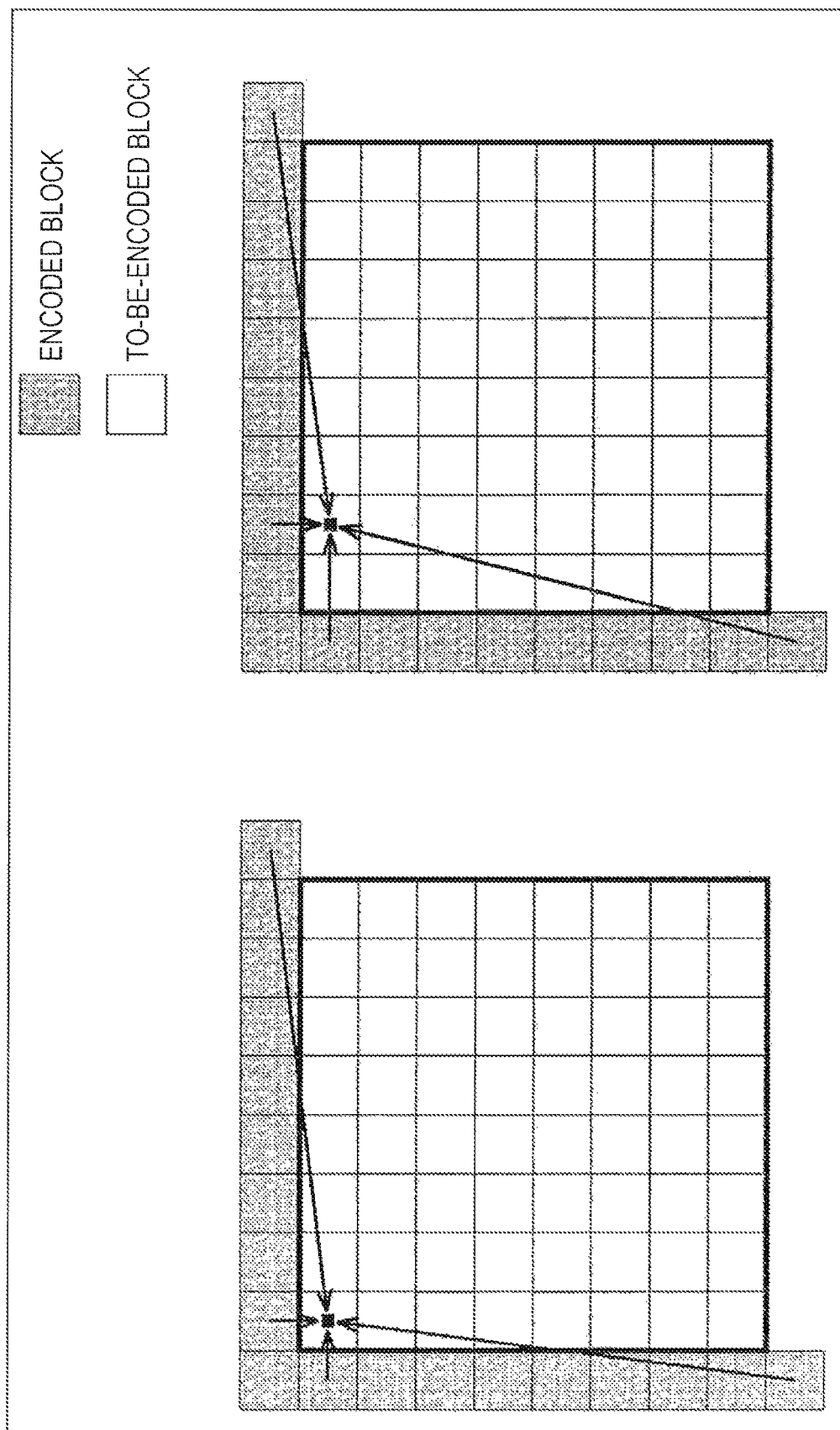
FIG. 3 is a diagram illustrating an example of planar prediction.

In addition, in the HEVC, as illustrated in FIG. 3, planar prediction is defined.

In the planar prediction process, prediction pixels included in the current block are generated from neighboring pixels (pixels that are already encoded) of a current block which is a target of the process by bi-linear interpolation. The planar prediction process can improve encoding efficiency for an area where there is gradation.

Figure 4:
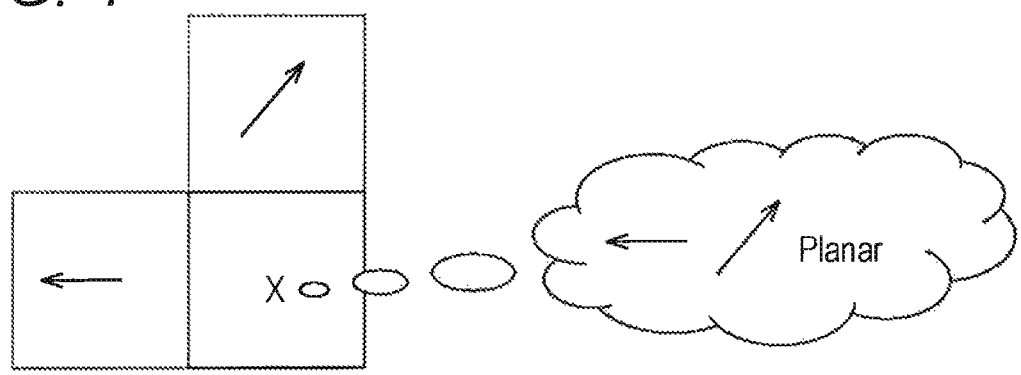
FIG. 4 is a diagram illustrating an example of a most probable mode.

In the HEVC, as illustrated in FIG. 4, the encoding process is performed in the intra prediction mode using three most probable modes. Namely, an intra prediction mode (Above) of a neighboring block which is above the current block to be adjacent to the current block, an intra prediction mode (Left) of a neighboring block which is in the left of the current block to be adjacent to the current block, and a combination of the intra prediction modes of the neighboring blocks (Above and Left) are used as candidates (sometimes, referred to as candidate modes) of the intra prediction mode, and among the three candidates modes, the optimal mode is employed as the intra prediction mode for the current block.

If the prediction mode for the current block is equal to any of the most probable modes, the index number is transmitted. If not, the mode information of the prediction block is transmitted by a fixed length of 5 bits.

<Filtering Process in Intra Prediction>

Figure 5:
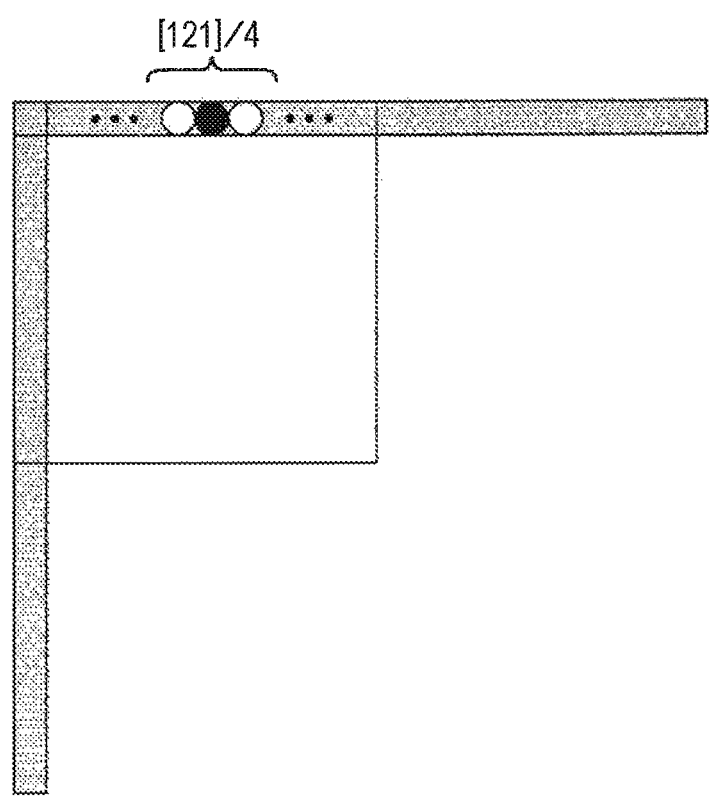
FIG. 5 is a diagram illustrating an example of MDIS (Mode Dependent Intra Smoothing).

FIG. 5 is a diagram describing MDIS (Mode Dependent Intra Smoothing) regulated in the HEVC.

In the case of the AVC, as illustrated in FIG. 5, a [121]/4 filtering process is performed on neighboring pixels of a current block in an intra 3×8 prediction mode. On the other hand, in the HEVC, on/off of the filtering process (namely, whether or not to apply the filtering process) is decided according to the block size and the prediction mode.

More specifically, in the case where the block size of the current block is 4×4, the filtering process is not applied. In the case where the block size of the current block is 8×8, in a prediction mode of the 45-degree direction, the filtering process is applied. In the case where the block size of the current block is 16×16, in a prediction mode of a direction other than 3 directions close to the horizontal direction and 3 directions close to the vertical direction, the filtering process is applied. In the case where the block size of the current block is 32×32, in a prediction mode of a direction other than the horizontal directions and the vertical direction, the filtering process is applied.

Figure 6:
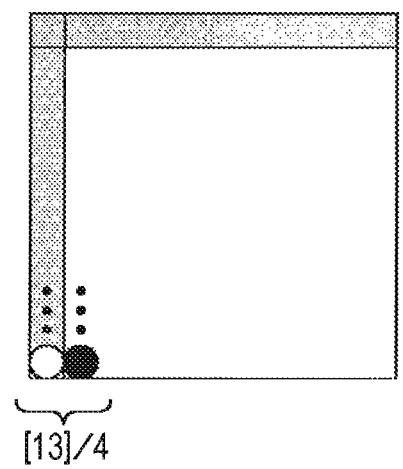
FIG. 6 is a diagram illustrating an example of a boundary value smoothing process.

Furthermore, in the HEVC, for the purpose of reducing block distortion in the case where the prediction mode is the DC mode, the horizontal mode, or the vertical mode, a boundary value smoothing process illustrated in FIG. 6 is regulated.

For example, in the case of the prediction (DC prediction) where the prediction mode is the DC mode, the filtering process (smoothing process) illustrated in FIG. 6 is performed on both of the neighboring pixels adjacent to the upper side (Top) of the current block which is a target of the process and the neighboring pixels adjacent to the left side (Left) of the current block. In addition, in the case of the prediction (horizontal prediction) where the prediction mode is the horizontal mode, the filtering process (smoothing process) illustrated in FIG. 6 is performed on the neighboring pixels adjacent to the upper side (Top) of the current block. In the case of the prediction (vertical prediction) where the prediction mode is the vertical mode, the filtering process (smoothing process) illustrated in FIG. 6 is performed on the neighboring pixels adjacent to the left side (Left) of the current block.

Figure 7:
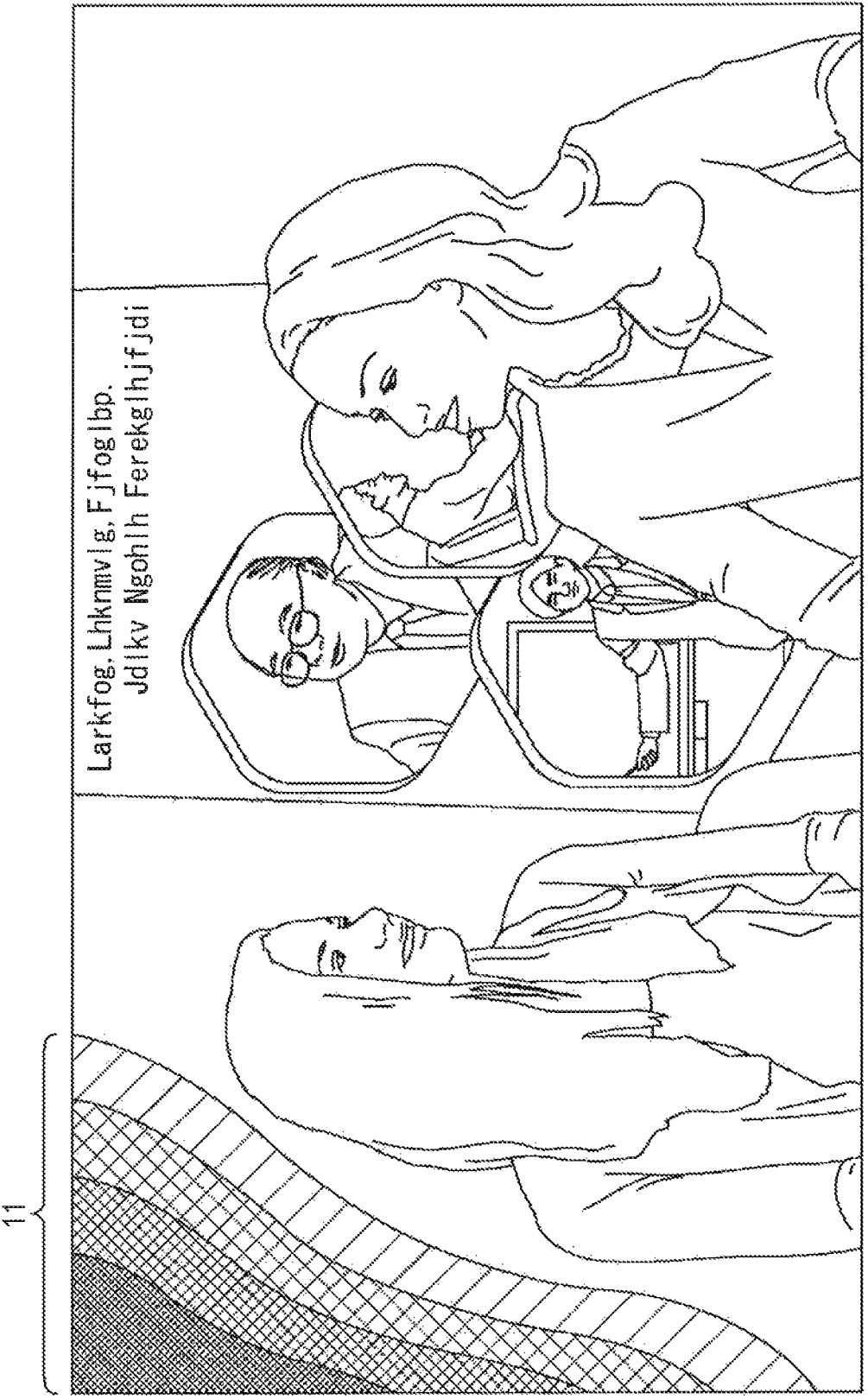
FIG. 7 is a diagram illustrating an example of a decoded image.

In the case where the image is encoded/decoded by the above-described inter prediction, in the obtained decoded image, there is a portion where the change of luminosity, color, density or the like is planar as illustrated in the area 11 of FIG. 7, and a strip shape of density irregularity (so-called bending) occurs, so that the phenomenon where contour is seen may occur.

Figure 8:
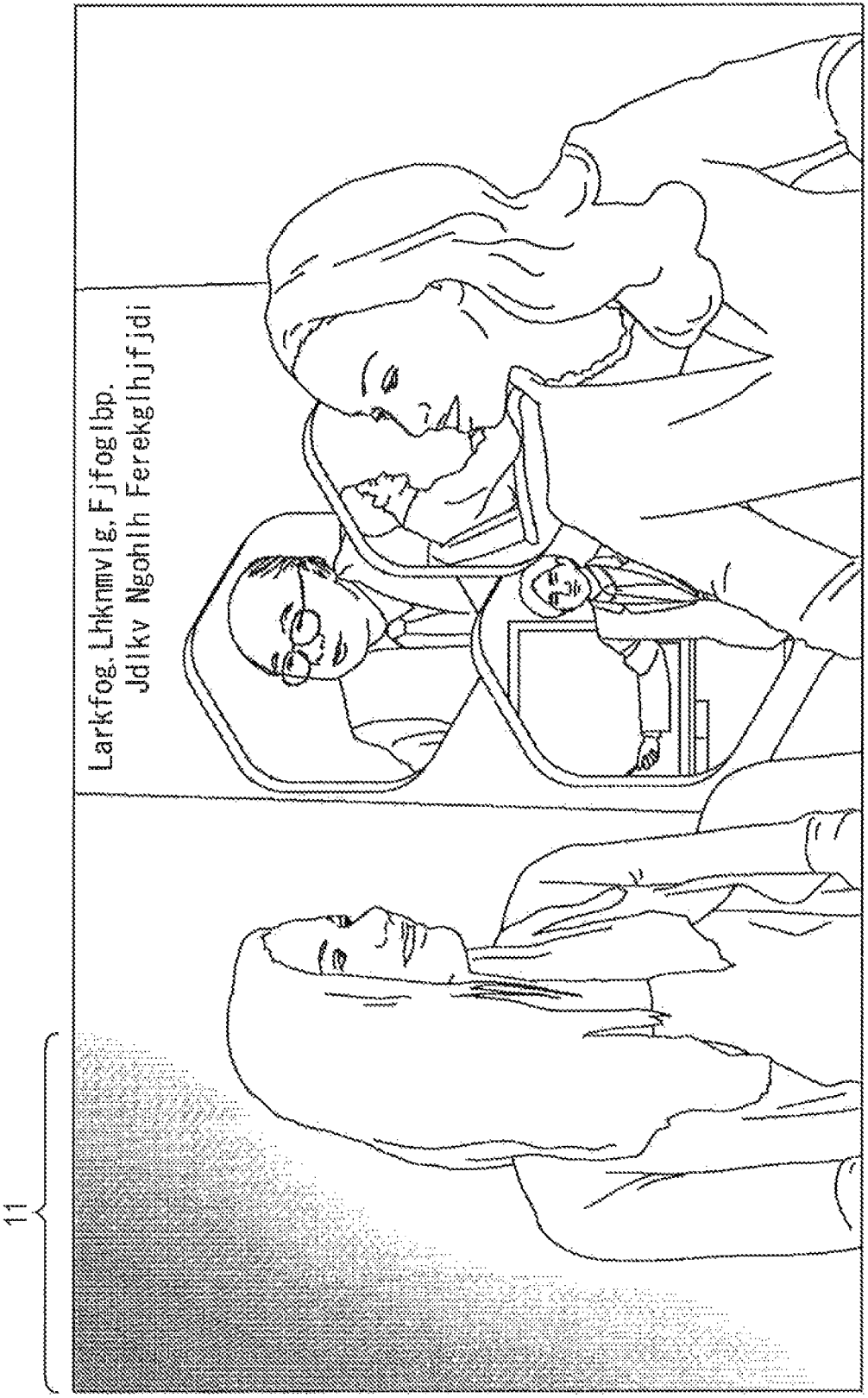
FIG. 8 is a diagram illustrating another example of a decoded image.

Therefore, a contour noise countermeasure process disclosed in Non-Patent Document 2 was proposed. By performing the contour noise countermeasure process disclosed in Non-Patent Document 2, the bending occurring in the area 11 of the decoded image is suppressed as illustrated in FIG. 8, so that smooth gradation can be obtained.

Figure 9:
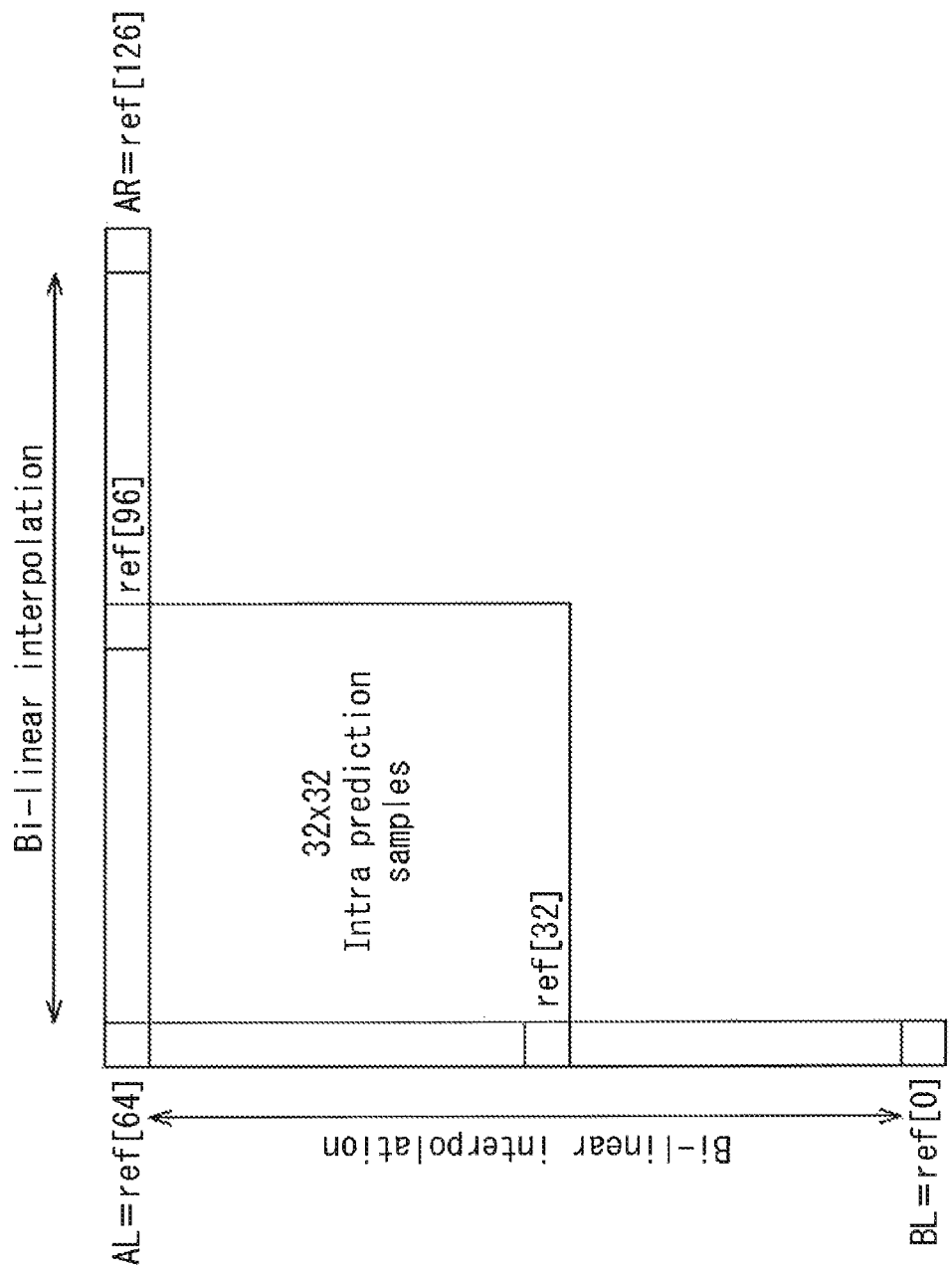
FIG. 9 is a diagram illustrating an example of a behavior of a threshold value determining process.

The contour noise countermeasure process disclosed in Non-Patent Document 2 is described more in detail. FIG. 9 is a diagram illustrating an example of a behavior of the contour noise countermeasure process. In the contour noise countermeasure process, firstly, a threshold value determining process expressed by the following Formulas (3) and (4) is performed by using neighboring pixels of a current block illustrated in FIG. 9.

[Mathematical Formula 3]

$$\text{Interpolate\_Above}=\text{abs}(AL+AR-2*\text{ref}[3N])<\text{THRESHOLD\_ABOVE} \quad (3)$$

$$\text{Interpolate\_Left}=\text{abs}(BL+AL-2*\text{ref}[N])<\text{THRESHOLD\_LEFT} \quad (4)$$

In Formula (3), the value of the threshold value THRESHOLD is set to be fixed to 8. By the threshold value determining process, features of the neighboring pixels of the current block is determined. Namely, it is determined whether or not the periphery of the current block is a portion where the change of luminosity, color, density, or the like is planar so that the bending can occur. In the case where the result of the threshold value determining process is true, that is, in the case where it is determined that the periphery of the current block is a portion where the change of luminosity, color, density, or the like is planar so that the bending can occur, instead of the filtering process described with reference to FIG. 5, a bi-linear interpolation process expressed by the following Formulas (5) to (9) is performed on the neighboring pixels of the current block illustrated in FIG. 9.

[Mathematical Formula 4]

$$\text{ref}'[0]=\text{ref}[0] \quad (5)$$

$$\text{ref}'[i]=BL+i*(AL-BL+N)/2N \; (i=1 \text{ to } 2N-1) \quad (6)$$

$$\text{ref}'[2N]=\text{ref}[2N] \quad (7)$$

$$\text{ref}'[2N+i]=AL+i*(AR-AL+N)/2N \; (i=1 \text{ to } 2N-1) \quad (8)$$

$$\text{ref}'[4N]=\text{ref}[4N] \quad (9)$$

The process is applied to only the 32×32 block, and a flag representing whether or not to apply the process (on/off) is regulated in a sequence parameter set (SPS).

However, in the method disclosed in Non-Patent Document 2, the threshold value was set to be fixed. Therefore, there was a problem in that, in the selection of the filtering process on the neighboring pixels in the intra prediction, appropriate selection is not performed, so that image quality is unnecessarily deteriorated.

In the threshold value determining process, as expressed in Formulas (3) and (4), a values calculated from pixels value of the neighboring pixels of the current block and the threshold value are compared with each other. However, if the threshold value is set to be fixed, in some cases, it is considered that, the value is not appropriate to, for example, the bit depth of the image data is considered. In this case, there is a problem in that, as a result of the above-described threshold value determining process, a proper determination result is not obtained, and an appropriate filter is not selected, so image quality of the decoded image is unnecessarily deteriorated.

In addition, it is considered that, for example, the bit depth of the image data is changed in internal calculation at the time of encoding/decoding. In this case, similarly, there is a problem in that a fixed threshold value is not appropriate to the bit depth in the internal calculation, and an improper result of the threshold value determining process is obtained, so that image quality of the decoded image is unnecessarily deteriorated.

In addition, the image quality of the decoded image cannot be adjusted, for example, by the user or the like adjusting the threshold value.

Therefore, in the present technique, the threshold value is set to be variable. For example, the threshold value is allowed to be set according to the bit depth of the image data. By doing so, it is possible to suppress a deterioration in image quality. In addition, by setting the threshold value to be variable, it is possible to adjust the image quality of the decoded image.

Next, with respect to the above-described present technique, examples of application to specific devices will be described.

1. First Embodiment

Image Encoding Device

Figure 10:
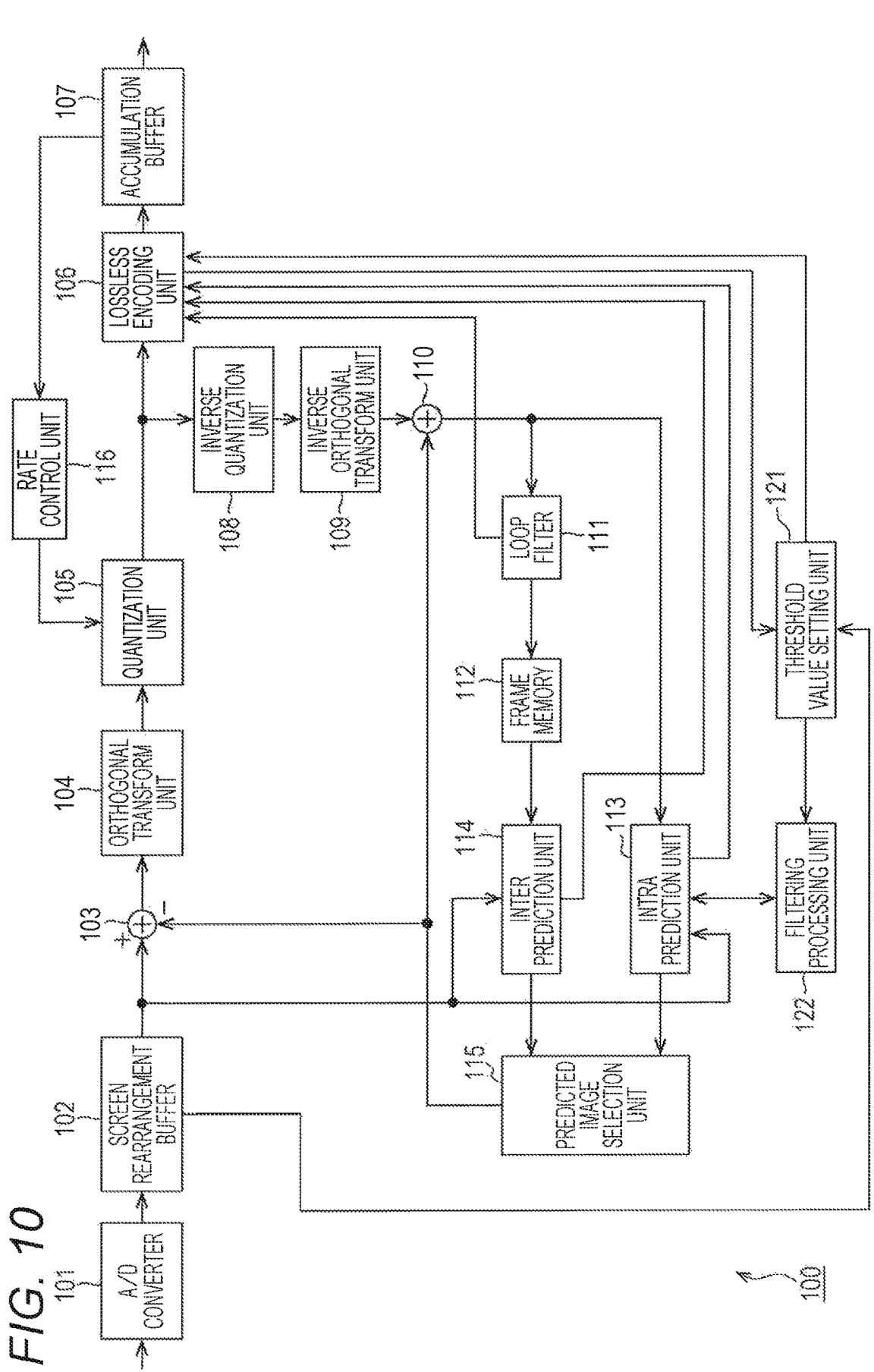
FIG. 10 is a block diagram illustrating a main configuration example of an image encoding device.

FIG. 10 is a block diagram illustrating a configuration example of an image encoding device as a kind of an image processing apparatus to which the present technique is applied. The image encoding device 100 illustrated in FIG. 10 encodes image data of a moving image by using, for example, a prediction process of the HEVC or a prediction process in a scheme equivalent to the HEVC.

As illustrated in FIG. 10, the image encoding device 100 is configured to include an A/D converter 101, a screen rearrangement buffer 102, an arithmetic unit 103, an orthogonal transform unit 104, a quantization unit 105, a lossless encoding unit 106, an accumulation buffer 107, an inverse quantization unit 108, and an inverse orthogonal transform unit 109. In addition, the image encoding device 100 is configured to include an arithmetic unit 110, a loop filter 111, a frame memory 112, an intra prediction unit 113, an inter prediction unit 114, a predicted image selection unit 115, and a rate control unit 116.

The A/D converter 101 A/D-converts input image data and supplies the converted image data (digital data) to the screen rearrangement buffer 102 to store the converted image data. The screen rearrangement buffer rearranges the images which are in the stored frame order for display by using the frame order for encoding according to a GOP (Group of Picture) and supplies the images of which frame order is rearranged to the arithmetic unit 103. In addition, the screen rearrangement buffer 102 also supplies the images of which frame order is rearranged to the intra prediction unit 113 and the inter prediction unit 114.

The arithmetic unit 103 subtracts the predicted image supplied from the intra prediction unit 113 or the inter prediction unit 114 through the predicted image selection unit 115 from the image read from the screen rearrangement buffer 102 and outputs difference information thereof to the orthogonal transform unit 104. For example, in the case of an image on which intra encoding is performed, the arithmetic unit 103 subtracts the predicted image supplied from the intra prediction unit 113 from the image read from the screen rearrangement buffer 102. In addition, for example, in the case of an image on which inter encoding is performed, the arithmetic unit 103 subtracts the predicted image supplied from the inter prediction unit 114 from the image read from the screen rearrangement buffer 102.

The orthogonal transform unit 104 performs orthogonal transform such as discrete cosine transform or Karhunen-Loeve on the difference information supplied from the arithmetic unit 103. The orthogonal transform unit 104 supplies a transform coefficient thereof to the quantization unit 105.

The quantization unit 105 performs quantization on the transform coefficient supplied from the orthogonal transform unit 104. The quantization unit 105 sets a quantization parameter based on information on a target value of the code amount supplied from the rate control unit 116 and performs quantization thereof. The quantization unit 105 supplied the quantized transform coefficient to the lossless encoding unit 106.

The lossless encoding unit 106 encodes the transform coefficient quantized in the quantization unit 105 in an arbitrary encoding scheme. Since the coefficient data are quantized under the control of the rate control unit 116, the code amount becomes the target value set by the rate control unit 116 (or the code amount is approximate to the target value).

In addition, the lossless encoding unit 106 acquires the information representing the intra prediction mode or the like from the intra prediction unit 113 and acquires information representing an inter prediction mode, the difference motion vector information, or the like from the inter prediction unit 114.

The lossless encoding unit 106 encodes the various kinds of information in an arbitrary encoding scheme to be used as a portion of header information of the encoded data (sometimes, referred to as an encoded stream). The lossless encoding unit 106 supplies the encoded data obtained through the encoding to the accumulation buffer to accumulate the encoded data.

The encoding scheme of the lossless encoding unit 106 includes, for example, variable length encoding, arithmetic encoding, and the like. The variable length encode includes, for example, CAVLC (Context-Adaptive Variable Length Coding) defined in the H.264/AVC scheme and the like. The arithmetic encode includes, for example, CABAC (Context-Adaptive Binary Arithmetic Coding) and the like.

The accumulation buffer 107 temporarily stores the encoded data supplied from the lossless encoding unit 106. The accumulation buffer 107 outputs the stored encoded data to an outside of the image encoding device 100 at a predetermined timing. Namely, the accumulation buffer is also a transmitting unit which transmits the encoded data.

In addition, the transform coefficient quantized in the quantization unit 105 is also supplied to the inverse quantization unit 108. The inverse quantization unit 108 performs inverse quantization on the quantized transform coefficient in a method corresponding to the quantization of the quantization unit 105. The inverse quantization unit 108 supplies the obtained transform coefficient to the inverse orthogonal transform unit 109.

The inverse orthogonal transform unit 109 performs inverse orthogonal transform on the transform coefficient supplied from the inverse quantization unit 108 in a method corresponding to the orthogonal transform process of the orthogonal transform unit 104. The inverse-orthogonal-transformed output (restored difference information) is supplied to the arithmetic unit 110.

The arithmetic unit 110 adds the predicted image supplied from the intra prediction unit 113 or the inter prediction unit 114 through the predicted image selection unit 115 to the recovered difference information which is the inverse orthogonal transform result supplied from the inverse orthogonal transform unit 109 to obtain a locally recovered image (hereinafter, referred to as a reconstructed image). The reconstructed image is supplied to the loop filter 111 or the intra prediction unit 113.

The loop filter 111 appropriately performs a filtering process including a deblocking filter, an adaptive loop filter, or the like on the reconstructed image supplied from the arithmetic unit 110. For example, the loop filter 111 removes block distortion of the reconstructed image by performing the deblocking filtering process on the reconstructed image. In addition, for example, the loop filter 111 improves the image quality by performing the loop filtering process on the deblocking filtering process result (the reconstructed image from which the block distortion is removed) by using a Wiener Filter.

In addition, the loop filter 111 may further perform any other arbitrary filtering process on the reconstructed image. In addition, if necessary, the loop filter 111 may supply information such as a filter coefficient which is used for the filtering process to the lossless encoding unit 106, so that the information may be encoded.

The loop filter 111 supplies the filtering process result (hereinafter, referred to as a decoded image) to the frame memory 112.

The frame memory 112 stores the supplied decoded image, and at a predetermined timing, the frame memory supplies the stored decoded image as a reference image to the inter prediction unit 114.

The intra prediction unit 113 performs intra prediction (prediction within a screen) of generating the predicted image by using pixel values in the process target picture which is the reconstructed image supplied as the reference image from the arithmetic unit 110. The intra prediction unit 113 performs the intra prediction in a plurality of predetermined intra prediction modes.

The intra prediction unit 113 generates the predicted images in all the intra prediction modes which are candidates and evaluates the cost function values of the respective predicted images by using the input image supplied from the screen rearrangement buffer 102 to select the optimal mode. Once the intra prediction unit 113 selects the optimal intra prediction mode, the intra prediction unit supplies the predicted image generated in the optimal mode to the predicted image selection unit 115.

In addition, as described above, the intra prediction unit 113 appropriately supplies intra prediction mode information representing the selected intra prediction mode or the like to the lossless encoding unit 106, so that encoding is performed.

The inter prediction unit 114 performs an inter prediction process (motion prediction process and motion compensation process) by using the input image supplied from the screen rearrangement buffer 102 and the reference image supplied from the frame memory 112. More specifically, the inter prediction unit 114 performs the motion compensation process according to the motion vector detected by performing the motion prediction as the inter prediction process to generate the predicted image (Inter predicted image information). The inter prediction unit 114 performs the inter prediction in a plurality of predetermined inter prediction modes.

The inter prediction unit 114 generates the predicted images in all the inter prediction modes which are candidates. The inter prediction unit 114 evaluates the cost function value of each predicted image by using the input image supplied from the screen rearrangement buffer 102, the information of the generated difference motion vector, and the like to select the optimal mode. Once the inter prediction unit 114 selects the optimal inter prediction mode, the inter prediction unit supplies the predicted image generated in the optimal mode to the predicted image selection unit 115.

The inter prediction unit 114 supplies the information representing the selected inter prediction mode or the information necessary for performing the process in the inter prediction mode at the time of decoding the encoded data to the lossless encoding unit 106, so that the encoding is performed. The necessary information includes, for example, the information of the generated difference motion vector, a flag representing an index of as the prediction motion vector as the prediction motion vector information, and the like.

The predicted image selection unit 115 selects the supply source of the predicted image which is to be supplied to the arithmetic unit 103 or the arithmetic unit 110. For example, in the case of the intra encoding, the predicted image selection unit 115 selects the intra prediction unit 113 as the supplying source of the predicted image and supplies the predicted image supplied from the intra prediction unit 113 to the arithmetic unit 103 or the arithmetic unit 110. In addition, for example, in the case of the inter encoding, the predicted image selection unit 115 selects the inter prediction unit 114 as the supplying source of the predicted image and supplies the predicted image supplied from the inter prediction unit 114 to the arithmetic unit 103 or the arithmetic unit 110.

The rate control unit 116 controls a rate of quantization operation of the quantization unit 105 based on the code amount of the encoded data accumulated in the accumulation buffer 107 so that overflow or underflow does not occur.

The image encoding device 100 is configured to further include a threshold value setting unit 121 and a filtering processing unit 122.

The threshold value setting unit 121 sets the threshold value which is used for the filtering process on the neighboring pixels of the current block of the intra prediction performed in the filtering processing unit 122 and supplies the threshold value information representing the set threshold value (after-updating threshold value) to the filtering processing unit 122.

For example, the threshold value setting unit 121 may set the threshold value according to the bit depth of the image data which are the encoding target.

In this case, for example, the threshold value setting unit 121 may acquire the information on the bit depth of the image data which are parameters transmitted as the sequence parameter set (SPS) or the like from the lossless encoding unit 106 to the decoding side, determine the bit depth of the image data based on the information on the bit depth, and set the threshold value according to the bit depth. In addition, for example, the threshold value setting unit 121 may acquire the image information (image data or information on the image data) from the screen rearrangement buffer 102, determine the bit depth of the image data based on the image information (by analyzing the image information), and set the threshold value according to the bit depth.

In addition, in this case, for example, the threshold value setting unit 121 may update the threshold value by bit-shifting the initial value (for example, 8) of a predetermined threshold value according to the determined bit depth. At this time, for example, a value appropriate for the case where the bit depth is 8 bits may be predetermined as the initial value in advance, and the threshold value setting unit 121 may bit-shift the initial value according to a difference in the number of bits between an actual bit depth of the image data and the 8 bits.

In addition, in this case, for example, the threshold value setting unit 121 may supply the threshold value information representing the after-updating threshold value to the lossless encoding unit 106, so that the sequence parameter set (SPS), the picture parameter set (PPS) or the like may be transmitted to the decoding side. At this time, for example, the threshold value setting unit 121 may encode (for example, golomb-encode) the threshold value information and supply as the threshold value encoding information. In addition, for example, in the case where the threshold value setting unit 121 determines the bit depth of the image data based on the image information, and the threshold value setting unit supplies the information on the bit depth to the lossless encoding unit 106, so that the sequence parameter set (SPS), the picture parameter set (PPS), or the like may be transmitted to the decoding side. At this time, for example, the threshold value setting unit 121 may encode (for example, golomb-encode) the information on the bit depth and supply as the bit depth encoding information.

In addition, in this case, for example, the threshold value setting unit 121 may generate flag information (threshold value change flag) representing whether or not the threshold value is updated (changed) and supply a threshold value change flag to the lossless encoding unit 106 to transmit the threshold value change flag to the decoding side. By doing so, in the decoding side (for example, the image decoding device), it is possible to easily identify based on the value of the threshold value change flag whether or not the threshold value is updated (changed). Namely, in the decoding side (for example, the image decoding device), it is possible to easily control whether or not to perform the process of updating (changing) the threshold value similarly to the encoding side (for example, the image encoding device 100).

In addition, for example, the threshold value setting unit 121 may set the threshold value according to external designation such as user's designation. In this case, the value designated by the user or the like corresponds to the above-described after-updating value. Namely, the threshold value corresponding to the value is supplied to the filtering processing unit 122.

In this case, for example, the threshold value setting unit 121 may supply the threshold value information representing the set threshold value to the lossless encoding unit 106, so that the sequence parameter set (SPS), the picture parameter set (PPS), or the like may be transmitted to the decoding side. At this time, for example, the threshold value setting unit may encode (for example, golomb-encode) the threshold value information and supply as the threshold value encoding information.

In addition, in this case, for example, the threshold value setting unit 121 may generate a threshold value change flag and supply the threshold value change flag to the lossless encoding unit 106 to transmit the threshold value change flag to the decoding side.

In addition, for example, the threshold value setting unit 121 may update (change) the threshold value externally designated by a user or the like according to the bit depth of the image data which is the encoding target.

In this case, for example, the threshold value setting unit 121 may acquire the information on the bit depth of the image data from the lossless encoding unit and determine the bit depth of the image data based on the information on the bit depth. In addition, for example, the threshold value setting unit 121 may acquire the image information from the screen rearrangement buffer 102 and determine the bit depth of the image data based on the image information.

In addition, in this case, for example, the threshold value setting unit 121 may update the threshold value by bit-shifting the threshold value externally designated by a user or the like according to the determined bit depth. At this time, for example, the threshold value appropriate to the case where the bit depth is 8 bits may be designated, and the threshold value setting unit 121 may bit-shift the designated threshold value according to a difference in the number of bits between an actual bit depth of the image data and 8 bits.

For example, the threshold value externally designated by a user or the like is defined as contouring_artefact_threshold. The contouring_artefact_threshold is designated as the value corresponding to the case where the bit depth of the image data which is the encoding target is 8 bits. In the case where the actual bit depth of the image data is n bits (n≥8), the threshold value setting unit 121 bit-shifts the contouring_artefact_threshold by using the following Formula (10).

[Mathematical Formula 5]

$$\text{contouring\_artefact\_threshold} << (n-8) \quad (10)$$

In addition, in this case, for example, the threshold value setting unit 121 may supply the threshold value information representing the after-updating threshold value to the lossless encoding unit 106, so that the sequence parameter set (SPS), the picture parameter set (PPS), or the like may be transmitted to the decoding side. At this time, for example, the threshold value setting unit 121 may encode (for example, golomb-encode) the threshold value information and supply as the threshold value encoding information.

In addition, in this case, for example, the threshold value setting unit 121 may supply the threshold value information representing the before-updating threshold value (the threshold value designated by an external side such as a user) to the lossless encoding unit 106, so that the sequence parameter set (SPS), the picture parameter set (PPS), or the like may be transmitted to the decoding side. At this time, for example, the threshold value setting unit 121 may encode (for example, golomb-encode) the threshold value information and supply as the threshold value encoding information.

At this time, in addition, the threshold value setting unit 121 may supply the information on the bit depth to the lossless encoding unit 106, so that the sequence parameter set (SPS), the picture parameter set (PPS), or the like may be transmitted to the decoding side. At this time, for example, the threshold value setting unit 121 may encode (for example, golomb-encode) the information on the bit depth and supply as the bit depth encoding information.

In addition, in this case, for example, the threshold value setting unit 121 generates the threshold value change flag and supplies the threshold value change flag to the lossless encoding unit 106, so that the sequence parameter set (SPS), the picture parameter set (PPS), or the like may be transmitted to the decoding side.

In addition, the threshold value setting unit 121 may perform the setting (updating) of the threshold value based on arbitrary parameters other than the bit depth. In addition, although the according to initial value of the threshold value is arbitrary, the initial value may be, for example, "8". In addition, by setting "0" as the threshold value, the threshold value setting unit 121 prohibits the bi-linear interpolation process from being applied, so that the filtering process described with reference to FIG. 5 can be applied. Namely, in the case where the threshold value is "0", the method disclosed in Non-Patent Document 2 is disabled.

The filtering processing unit 122 acquires the threshold value information from the threshold value setting unit 121 and performs the filtering process on the neighboring pixels of the current block which is a target of the intra prediction process by using the threshold value. For example, the filtering processing unit 122 may perform the threshold value determining process expressed by Formulas (3) and (4) by using the threshold value acquired from the threshold value setting unit 121 to identify features of the neighboring pixels of the current block.

In addition, for example, in the case where the determination result is false, that is, in the case where the periphery of the current block is determined not to be a portion where the change of luminosity, color, density, or the like is planar, the filtering processing unit 122 may perform the filtering process (sometimes, referred to a low pass filtering process) described with reference to FIG. 5 on the neighboring pixels.

In addition, for example, in the case where the determination result is true, that is, in the case where the periphery of the current block is determined to be a portion where luminosity, color, density, and the like are planar, the filtering processing unit 122 may perform a bi-linear interpolation process (sometimes, referred to as a bi-linear filtering process) as expressed in Formulas (5) to (9) instead of the low pass filtering process.

Once the filtering processing unit 122 acquires the neighboring pixels of the current block which is a target of the process from the intra prediction unit 113, the filtering processing unit performs the above-described filtering process on the neighboring pixels. Next, the filtering processing unit 122 supplies the after-filtering-process neighboring pixels to the intra prediction unit 113. The intra prediction unit 113 performs intra prediction by using the after-filtering-process neighboring pixels. By doing so, the intra prediction unit 113 may generate a predicted image reflecting a result of the filtering process.

Namely, as described above, since the threshold value setting unit 121 can set the threshold value for identifying the features of the neighboring pixels of the current block in the intra prediction process at the time of encoding the image data according to the bit depth of the image data or the like, the intra prediction unit 113 can generate the predicted image reflecting the result of the filtering process appropriate to the image data. Namely, the image encoding device 100 can suppress occurrence of noise such as bending in the decoded image and can suppress a deterioration in image quality of the decoded image.

In addition, as described above, since the threshold value setting unit 121 can set the threshold value according to external designation such as user's designation, the intra prediction unit 113 can reflect the external designation such as the user's designation of the image quality on the predicted image. Namely, the image encoding device 100 can control the image quality of the decoded image.

In addition, as described with reference to FIG. 5, Formulas (5) to (9), and the like, the method where the filtering processing unit 322 applies the filtering process to the neighboring pixels of the current block may be controlled according to the intra prediction mode (namely, the block size of the current block).

In addition, in the case where the bit depth of the image data is as small as, for example, 8 bits, the bending (contour distortion) illustrated in FIG. 7 is remarkably observed. However, in the case where the bit depth is as large as, for example, 10 bits, the bending is suppressed (is not visually conspicuous). Therefore, an upper limit of the bit depth with which the bi-linear filtering process disclosed in Non-Patent Document 2 is applied may be provided. For example, the bi-linear filtering process disclosed in Non-Patent Document 2 may be applied to only the case where the bit depth is 8 bits, and the bi-linear filtering process may not be applied to the other cases.

In addition, the bi-linear filtering process disclosed in Non-Patent Document 2 may be applied to only the processing of brightness signals. However, the bi-linear filtering process may be applied to the process of color difference signals. Namely, the present technique may be applied to color difference signals as well as brightness signals.

In addition, in the case where the input signal is 4:4:4 or RGB and each color component channel is independently processed, the present technique may be independently applied to each channel.

In addition, in the case of performing hierarchical image encoding (scalable encoding)/hierarchical image decoding (scalable decoding), for example, a threshold value, parameters such as a bit depth, a flag and the like may be allowed to be transmitted to only the base layer, and in the non-base layer (enhancement layer), the parameters, the flag, and the like transmitted to the base layer may be allowed to be referred to.

<Threshold Value Setting Unit/Filtering Process Unit>

Figure 11:
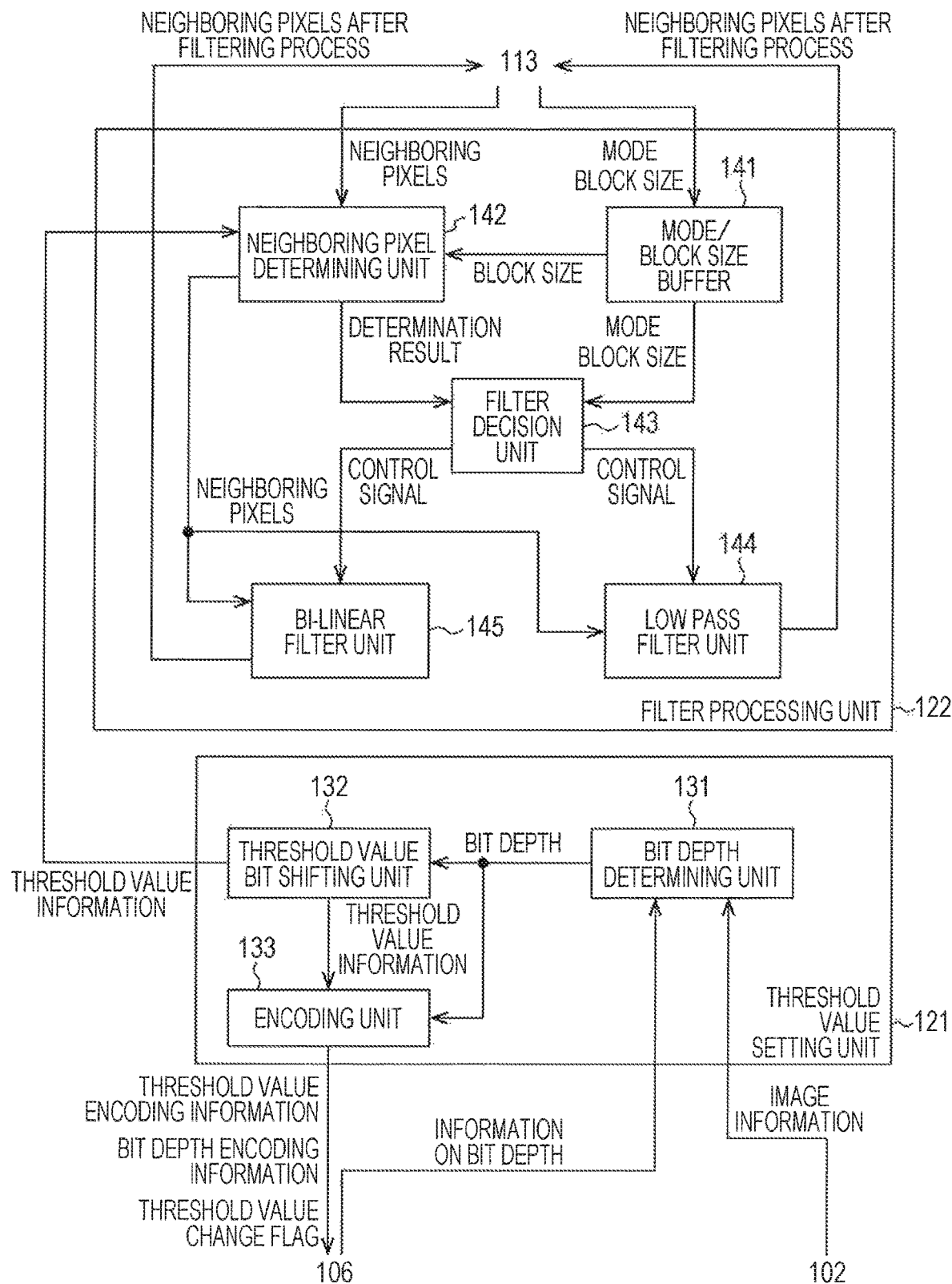
FIG. 11 is a block diagram illustrating a main configuration example of a threshold value setting unit and filtering processing unit.

FIG. 11 is a block diagram illustrating a main configuration example of the threshold value setting unit 121 and the filtering processing unit 122 in the case where the threshold value setting unit 121 of FIG. 10 sets the threshold value according to the bit depth of the image data which is a target of the encoding.

In the example of FIG. 11, the threshold value setting unit 121 is configured to include a bit depth determining unit 131, a threshold value bit shifting unit 132, and an encoding unit 133.

The bit depth determining unit 131 determines the bit depth of the image data as the encoding target and supplies the information representing the bit depth to the threshold value bit shifting unit 132.

For example, the bit depth determining unit 131 acquires the information on the bit depth of the image data from the lossless encoding unit 106 and determines the bit depth of the image data based on the information on the bit depth. In addition, for example, the bit depth determining unit 131 acquires image information from the screen rearrangement buffer 102 and determines the bit depth of the image data based on the image information.

In addition, in the case of transmitting the information representing the determined bit depth to the decoding side, the bit depth determining unit 131 also supplies the information representing the bit depth to the encoding unit 133.

The threshold value bit shifting unit 132 updates (changes) the threshold value by bit-shifting a predetermined threshold value (initial value) which is defined in advance according to the information representing the bit depth supplied from the bit depth determining unit 131.

For example, in the threshold value bit shifting unit 132, the value appropriate to the case where the bit depth is 8 bits is set as the initial value of the threshold value in advance. Once the threshold value bit shifting unit 132 acquires the information representing the bit depth from the bit depth determining unit 131, the threshold value bit shifting unit bit-shifts the initial value by a difference in the number of bits between the bit depth of the image data represented by the information and the 8 bits.

The threshold value bit shifting unit 132 supplies the information (threshold value information) representing the after-updating (changing) threshold value to the neighboring pixel determining unit 142 of the filtering processing unit 122.

In addition, in the case of transmitting the threshold value information representing the after-updating (changing) threshold value to the decoding side, the threshold value bit shifting unit 132 also supplies the threshold value information to the encoding unit 133.

The encoding unit 133 golomb-encodes the supplied information and supplies the obtained golomb code to the lossless encoding unit 106 to transmit the golomb code to the decoding side. For example, in the case of transmitting the information representing the bit depth to the decoding side, the encoding unit 133 acquires the information representing bit depth from the bit depth determining unit 131 and performs golomb encoding on the information representing the bit depth. The encoding unit 133 supplies the obtained golomb code of the information representing the bit depth (sometimes, referred to as bit depth encoding information) to the lossless encoding unit 106 to transmit the golomb code to the decoding side.

In addition, for example, in the case of transmitting the threshold value information representing the after-updating (changing) threshold value to the decoding side, the encoding unit 133 acquires the threshold value information representing the after-updating (changing) threshold value from the threshold value bit shifting unit 132 and golomb-encodes the threshold value information. The encoding unit 133 supplies the obtained golomb code of the threshold value information (sometimes, referred to as threshold value encoding information) to the lossless encoding unit 106 to transmit the golomb code to the decoding side.

In addition, the encoding unit 133 may generate a threshold value change flag representing whether or not the threshold value is updated (changed) and supply the threshold value change flag to the lossless encoding unit to transmit the threshold value change flag to the decoding side.

In addition, as illustrated in FIG. 11, the filtering processing unit 122 is configured to include a mode/block size buffer 141, a neighboring pixel determining unit 142, a filter decision unit 143, a low pass filter unit 144, and a bi-linear filter unit 145.

The mode/block size buffer 141 acquires the information (mode/block size) on the block size and the mode of the current block with respect to the prediction modes which are candidates from the intra prediction unit and stores the information.

At a predetermined timing or based on an external request, the mode/block size buffer 141 supplies the stored information (block size) on the block size to the neighboring pixel determining unit 142. In addition, at a predetermined timing or based on an external request, the mode/block size buffer 141 supplies the stored information (mode) on the mode and the stored information (block size) on the block size to the filter decision unit 143.

The neighboring pixel determining unit 142 acquires the neighboring pixels adjacent to the upper side and the left side of the current block with respect to the prediction modes which are candidates from the intra prediction unit 113. In addition, the neighboring pixel determining unit 142 acquires the threshold value information from the threshold value bit shifting unit 132. In addition, the neighboring pixel determining unit 142 acquires the information (block size) on the block size from the mode/block size buffer 141.

In the case of the mode where the current block has a predetermined size (for example, 32×32) (or a size within a predetermined range), the neighboring pixel determining unit 142 performs the threshold value determining process for selecting the filter which is to be used for the filtering process on the neighboring pixels acquired from the intra prediction unit 113 based on the information on the block size acquired from the mode/block size buffer 141 by using the threshold value information acquired from the threshold value bit shifting unit 132. Namely, the neighboring pixel determining unit 142 determines features of the neighboring pixels (for example, determines whether or not to be pixels of a portion where the change of luminosity, color, density, or the like is planar).

The neighboring pixel determining unit 142 supplies the determination result to the filter decision unit 143. In addition, the neighboring pixel determining unit 142 supplies the neighboring pixels of the current block acquired from the intra prediction unit 113 to the low pass filter unit 144 and the bi-linear filter unit 145.

The filter decision unit 143 acquires the information (mode) on the mode and the information (block size) on the block size from the mode/block size buffer 141. In addition, the filter decision unit 143 acquires the determination result of the threshold value determining process from the neighboring pixel determining unit 142. The filter decision unit 143 decides the type of the to-be-executed filtering process and the application method thereof by using the acquired information and result. For example, the filter decision unit 143 determine whether or not any of the low pass filtering process and the bi-linear filtering process is applied to the neighboring pixels of the current block, how to perform the filtering process, and the like.

The filter decision unit 143 supplies the control information which controls execution of the filtering process to the low pass filter unit 144 and the bi-linear filter unit 145 according to the decision. Namely, the filter decision unit 143 supplies control information indicating how to perform the filtering process to the processing unit selected between the low pass filter unit 144 and the bi-linear filter unit 145 and supplies control information indicating to stop the filtering process (that is, control information indicating not to perform the filtering process) to the non-selected processing unit.

The low pass filter unit 144 performs the low pass filtering process described with reference to FIG. 5 on the neighboring pixels of the current block supplied from the neighboring pixel determining unit 142 according to the control information supplied from the filter decision unit 143. The low pass filter unit 144 supplies the neighboring pixels (after-filtering-process neighboring pixels) which are applied with the low pass filtering process to the intra prediction unit 113.

The bi-linear filter unit 145 performs the bi-linear filtering process described with reference to Formulas (5) to (9) on the neighboring pixels of the current block supplied from the neighboring pixel determining unit 142 according to the control information supplied from the filter decision unit 143. The bi-linear filter unit 145 supplies the neighboring pixels (after-filtering-process neighboring pixels) which are applied with the bi-linear filtering process to the intra prediction unit 113.

By doing so, the threshold value setting unit 121 can set the threshold value according to the bit depth of the image data (appropriate to the bit depth), the filtering processing unit 122 can select the filter appropriate to the bit depth of the image data and perform the filtering process on the neighboring pixels by using the filter, and the intra prediction unit 113 can generate the predicted image by using the neighboring pixels applied with the filtering process appropriate to the bit depth of the image data. Namely, by doing so, the image encoding device 100 can suppress a deterioration in image quality of the decoded image.

<Flow of Encoding Process>

Next, an example of a flow of the encoding process performed by the image encoding device 100 illustrated in FIG. 10 will be described with reference to a flowchart of FIG. 12.

In step S101, the A/D converter 101 A/D-converts an input image. In step S102, the screen rearrangement buffer 102 stores the A/D-converted image and performs rearrangement from the display order of each picture to the encoding order.

In step S103, the threshold value setting unit 121 sets the threshold value for identifying the features of the neighboring pixels of the current block in the intra prediction process at the time of encoding the image data.

In step S104, the intra prediction unit 113 performs the intra prediction process in the intra prediction mode. Here, in some cases, the filtering processing unit 122 performs the filtering process on the neighboring pixels of the current block by using the threshold value set in step S103. In the case where the filtering process is performed, the intra prediction unit performs the intra prediction by using the neighboring pixels which are applied with the filtering process.

In step S105, the inter prediction unit 114 performs the inter prediction process for performing the motion prediction or the motion compensation in the inter prediction mode.

In step S106, the predicted image selection unit 115 decides the optimal mode based on the cost function values output from the intra prediction unit 113 and the inter prediction unit 114. Namely, the predicted image selection unit 115 selects any one of the predicted image generated by the intra prediction unit 113 and the predicted image generated by the inter prediction unit 114.

In step S107, the arithmetic unit 103 calculates a difference between the image rearranged by the process of step S102 and the predicted image selected by the process of step S106. The data amount of the difference data is decreased in comparison with the data amount of the original image data. Therefore, in comparison with the case where the image is encoded in the state where the image is not processed, the data amount can be compressed.

In step S108, the orthogonal transform unit 104 performs orthogonal transform on the difference information generated by the process of step S106. In step S109, the quantization unit 105 performs quantization on the orthogonal transform coefficient obtained by the process of step S108 by using the quantization parameter calculated by the rate control unit 116.

In step S110, the inverse quantization unit 108 performs inverse quantization on the quantized coefficient (sometimes, referred to as quantization coefficient) generated by the process of step S109 by using characteristics corresponding to the characteristics of the quantization unit 105. In step S111, the inverse orthogonal transform unit 109 performs inverse orthogonal transform on the orthogonal transform coefficient obtained by the process of step S110.

In step S112, the arithmetic unit 110 adds the predicted image to locally decoded difference information to generate a locally decoded image (image corresponding to an input to arithmetic unit 103).

In step S113, the loop filter 111 performs a filtering process on the image generated by the process of step S112. Accordingly, the block distortion or the like is removed.

In step S114, the frame memory 112 stores the decoded image which is applied with a loop filtering process by the process of step S113.

In step S115, the lossless encoding unit 106 encodes the coefficient quantized by the process of step S109. Namely, lossless encoding such as variable length encoding or arithmetic encoding is performed on the data corresponding to the difference image.

In addition, at this time, the lossless encoding unit 106 encodes the information on the prediction mode of the predicted image selected by the process of step S106 and adds the information to the encoded data obtained by encoding the difference image. Namely, the lossless encoding unit 106 encodes the optimal intra prediction mode information supplied from the intra prediction unit 113 or encodes the information according to the optical inter prediction mode supplied from the inter prediction unit 114 to add the formation to the encoded data.

In step S116, the accumulation buffer 107 accumulates the encoded data obtained by the process of step S115. The encoded data accumulated in the accumulation buffer 107 are appropriately read out and transmitted through a transmission line or a recording medium to the decoding side.

In step S117, the rate control unit 116 controls the rate of quantization operations of the quantization unit 105 based on the code amount (occurring code amount) of the encoded data accumulated in the accumulation buffer 107 by the process of step S116, so that overflow or underflow does not occur. In addition, the rate control unit 116 supplies the information representing the quantization parameter to the quantization unit 105.

Once the process of step S117 is ended, the encoding process is ended.

<Flow of Threshold Value Setting Process>

Next, an example of a flow of the threshold value setting process performed in step S103 of FIG. 12 in an example where the threshold value setting unit 121 of the example of FIG. 11 determines the bit depth of the image data based on the information on the bit depth will be described with reference to a flowchart of FIG. 13. In addition, in FIG. 13, the case where the threshold value encoding information representing the after-updating threshold value and the threshold value change flag are transmitted to the decoding side will be described.

Once the threshold value setting process is started, in step S131, the threshold value bit shifting unit 132 determines whether or not a predetermined initial value is set as the threshold value. In the case where it is determined that the threshold value is updated, the procedure proceeds to step S132.

In step S132, the bit depth determining unit 131 acquires information on the bit depth from the lossless encoding unit 106.

In step S133, the bit depth determining unit 131 determines the bit depth of the image data which is a target of the encoding based on the information on the bit depth acquired in step S132.

In step S134, the threshold value bit shifting unit bit-shifts the threshold value (initial value) according to the determination result (determined bit depth) of step S133. The threshold value bit shifting unit 132 supplies the after-updating threshold value to the neighboring pixel determining unit 142 of the filtering processing unit 122.

In step S135, the encoding unit 133 encodes the threshold value information representing the after-bit-shifting (after-updating) threshold value generated in step S134.

In step S136, the encoding unit 133 supplies the threshold value encoding information representing the after-updating threshold value obtained by the process of step S135 to the lossless encoding unit 106 to transmit the threshold value encoding information to the decoding side.

Once the process of step S136 is ended, the procedure proceeds to step S137. In addition, in the case where it is determined in step S131 that the initial value is set as the threshold value, the procedure proceeds to step S137.

In step S137, the encoding unit 133 sets the threshold value change flag representing as to whether or not the threshold value is updated (changed). Namely, for example, in the case of performing the processes of steps S131 to S136, the encoding unit 133 sets the threshold value change flag of the value representing that the threshold value is updated (changed). In addition, for example, in the case where it is determined in step S131 that the initial value is set as the threshold value, the encoding unit 133 sets the threshold value change flag of the value representing that the threshold value is not updated (changed).

In step S138, the encoding unit 133 supplies the threshold value change flag set in step S137 to the lossless encoding unit 106 to transmit the threshold value change flag to the decoding side.

Figure 12:
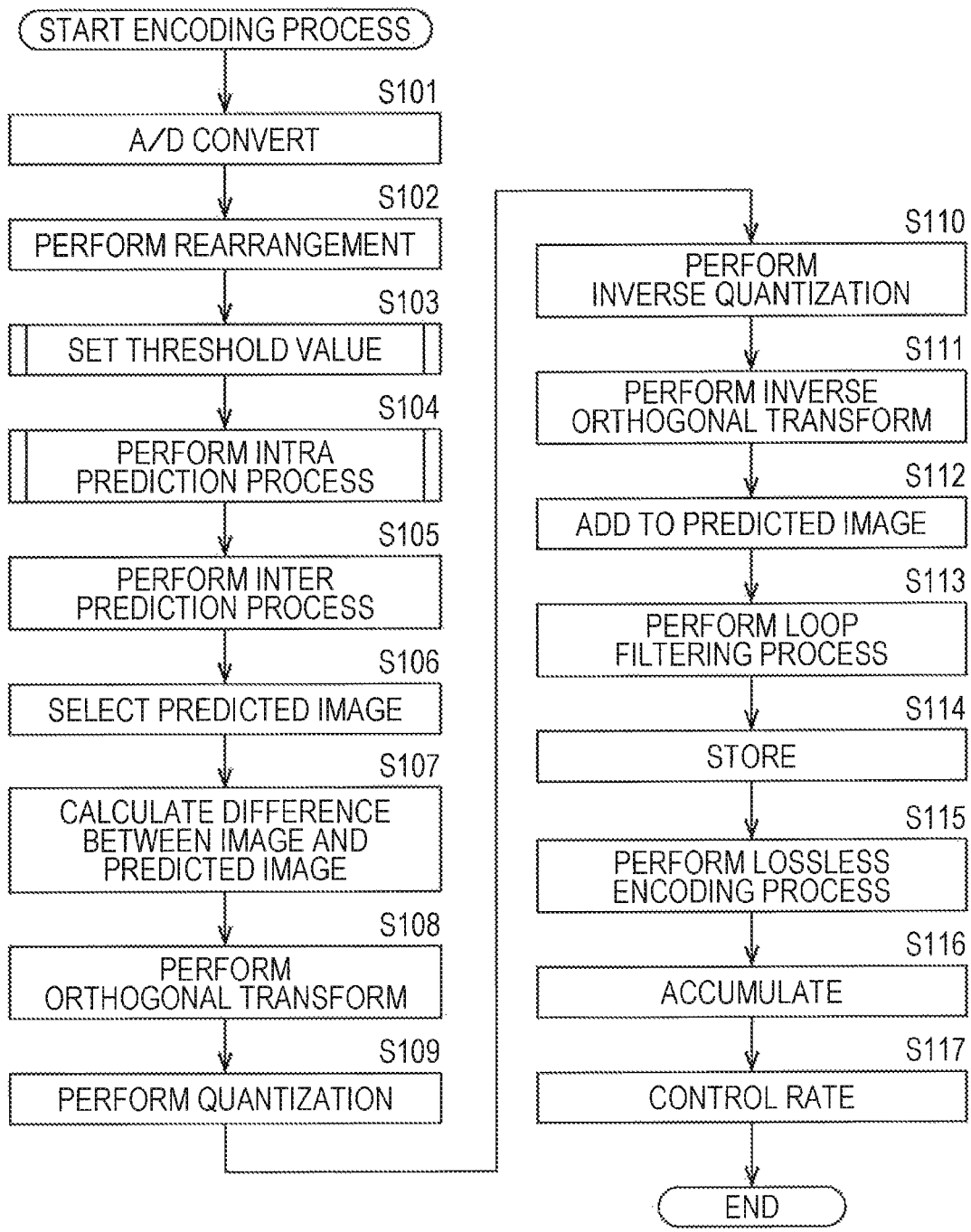
FIG. 12 is a flowchart illustrating an example of a flow of an encoding process.

Once the process of step S138 is ended, the threshold value setting process is ended, and the procedure returns to FIG. 12.

By performing the threshold value setting process as described above, the threshold value setting unit 121 can set the threshold value according to the bit depth of the image data (appropriate to the bit depth).

In addition, in the case where the threshold value change flag is not transmitted to the decoding side (that is, in the case where the threshold value change flag is not generated), the above-described processes of steps S137 and S138 may be omitted.

In addition, in the case where the threshold value encoding information representing the after-updating threshold value is not transmitted to the decoding side (that is, in the case where the threshold value encoding information is not generated), the above-described processes of steps S135 and S136 may be omitted.

<Flow of Intra Prediction Process>

Figure 14:
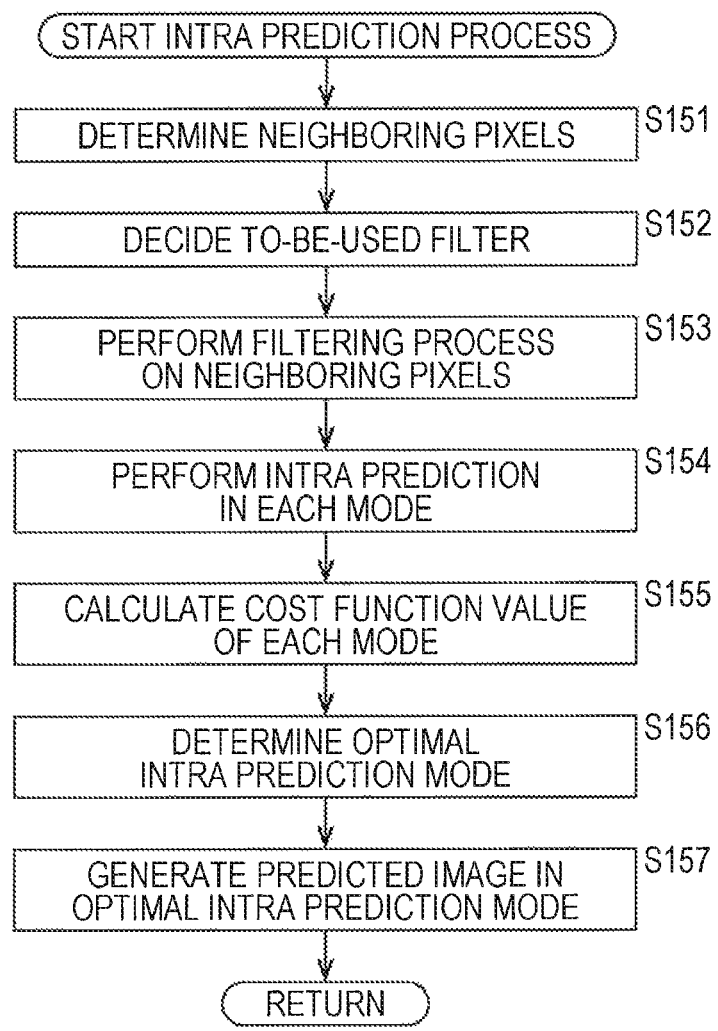
FIG. 14 is a flowchart illustrating an example of a flow of an intra prediction process.

Next, an example of a flow of the intra prediction process performed in step S104 of FIG. 12 will be described with reference to a flowchart of FIG. 14.

Once the intra prediction process is started, in step S151, the neighboring pixel determining unit 142 determines the features of the neighboring pixels of the current block acquired from the intra prediction unit 113 (for example, features as to whether or not the periphery of the current block is a portion where luminosity, color, density, or the like is planar) based on the block size of the mode/block size buffer 141 and the threshold value information acquired from the threshold value bit shifting unit 132.

In step S152, the filter decision unit 143 determines the filter which is to be used for the neighboring pixels of the current block based on the mode and block size acquired from the mode/block size buffer and the determination result of step S151.

In step S153, the filter unit selected among the low pass filter unit 144 and the bi-linear filter unit by the process of step S152 performs the filtering process on the neighboring pixels of the current block. For example, in the case where the low pass filter is selected in step S152, in step S153, the low pass filter unit 144 performs the low pass filtering process on the neighboring pixels in the method decided by the filter decision unit 143. In addition, for example, in the case where the bi-linear filter is selected in step S152, in step S153, the bi-linear filter unit 145 performs the bi-linear filtering process on the neighboring pixels in the method decided by the filter decision unit 143.

In addition, the filtering process may be omitted in some modes.

In step S154, the intra prediction unit 113 performs the intra prediction in the modes by using the neighboring pixels applied with the filtering process in step S153 (in the case where the filtering process is omitted, the neighboring pixels which is not applied with the filtering process).

In step S155, the intra prediction unit 113 calculates the cost function values with respect to the results of the intra prediction of the modes performed in step S154.

In step S156, the intra prediction unit 113 determines the optimal intra prediction mode based on the cost function values of the modes calculated in step S155.

In step S157, the intra prediction unit 113 generates the predicted image in the optimal intra prediction mode determined in step S156.

Once the process of step S157 is ended, the intra prediction process is ended, and the procedure returns to FIG. 12.

By performing the above-described intra prediction process, the filtering processing unit 122 can select the filter appropriate to the bit depth of the image data and perform the filtering process on the neighboring pixels by using the filter, and the intra prediction unit 113 can generate the predicted image by using the neighboring pixels which are applied with the filtering process appropriate to the bit depth of the image data.

Namely, by performing the above-described processes, the image encoding device 100 can suppress a deterioration in image quality of the decoded image.

<Flow of Threshold Value Setting Process>

Next, an example of a flow of the threshold value setting process performed in step S103 of FIG. 12 in an example where the threshold value setting unit 121 of the example of FIG. 11 determines the bit depth of the image data based on the image information will be described with reference to a flowchart of FIG. 15. In addition, in FIG. 15, the case where the threshold value encoding information representing the after-updating threshold value and the threshold value change flag are transmitted to the decoding side will be described.

Figure 13:
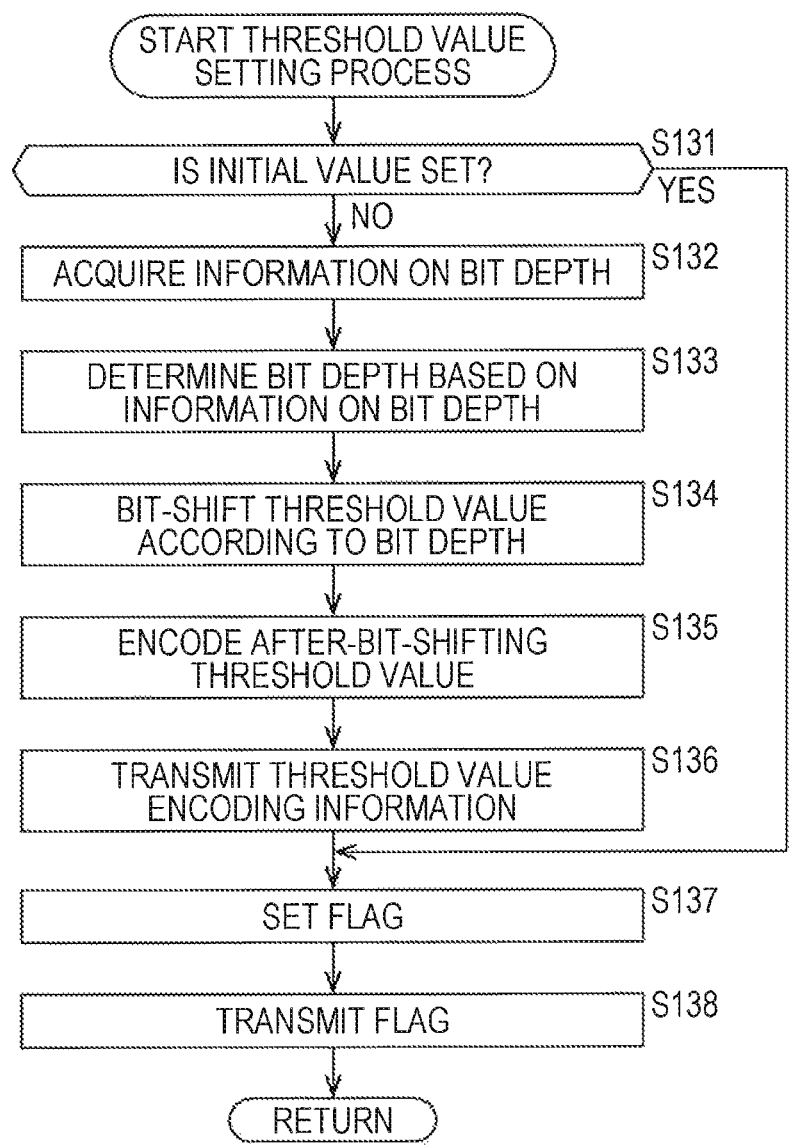
FIG. 13 is a flowchart illustrating an example of a flow of a threshold value setting process.
Figure 15:
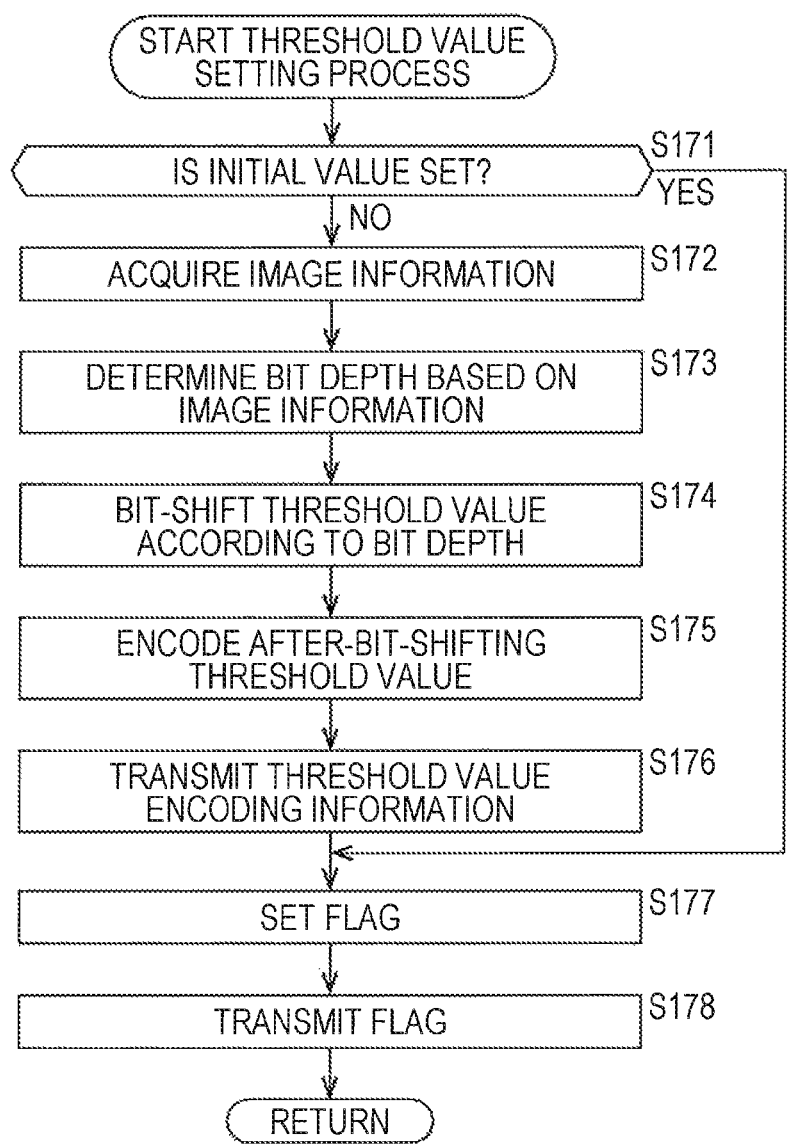
FIG. 15 is a flowchart illustrating another example of a flow of a threshold value setting process.

In the case of the example of FIG. 15, processes of steps S171, S174 to S178 are performed similarly to the processes of steps S131, S134 to S138 of the example of FIG. 13.

In the case where it is determined in step S171 of FIG. 15 that the threshold value is updated, the procedure proceeds to step S172.

In step S172, the bit depth determining unit 131 acquires the image information from the screen rearrangement buffer 102.

In step S173, the bit depth determining unit 131 determines the bit depth of the image data which is the encoding target based on the image information acquired in step S172. Once the process of step S173 is ended, the procedure proceeds to step S174.

Once the process of step S178 is ended, the threshold value setting process is ended, and the procedure returns to FIG. 12.

By doing so, the threshold value setting unit 121 can also set the threshold value according to the bit depth of the image data (appropriate to the bit depth). Therefore, in this case, the image encoding device 100 can also suppress a deterioration in image quality of the decoded image.

In addition, in the case where the threshold value change flag is not transmitted to the decoding side (namely, the threshold value change flag is not generated), the processes of steps S177 and S178 may be omitted.

In addition, in the case where the threshold value encoding information representing the after-updating threshold value is not transmitted to the decoding side (namely, the threshold value encoding information is not generated), the processes of steps S175 and S176 may be omitted.

<Flow of Threshold Value Setting Process>

Next, an example of a flow of the threshold value setting process performed in step S103 of FIG. 12 in an example where the threshold value setting unit 121 of the example of FIG. 11 determines the bit depth of the image data based on the image information and transmits the determined bit depth to the decoding side will be described with reference to a flowchart of FIG. 16. In addition, in FIG. 16, the case where the threshold value change flag is also transmitted to the decoding side will be described.

Figure 16:
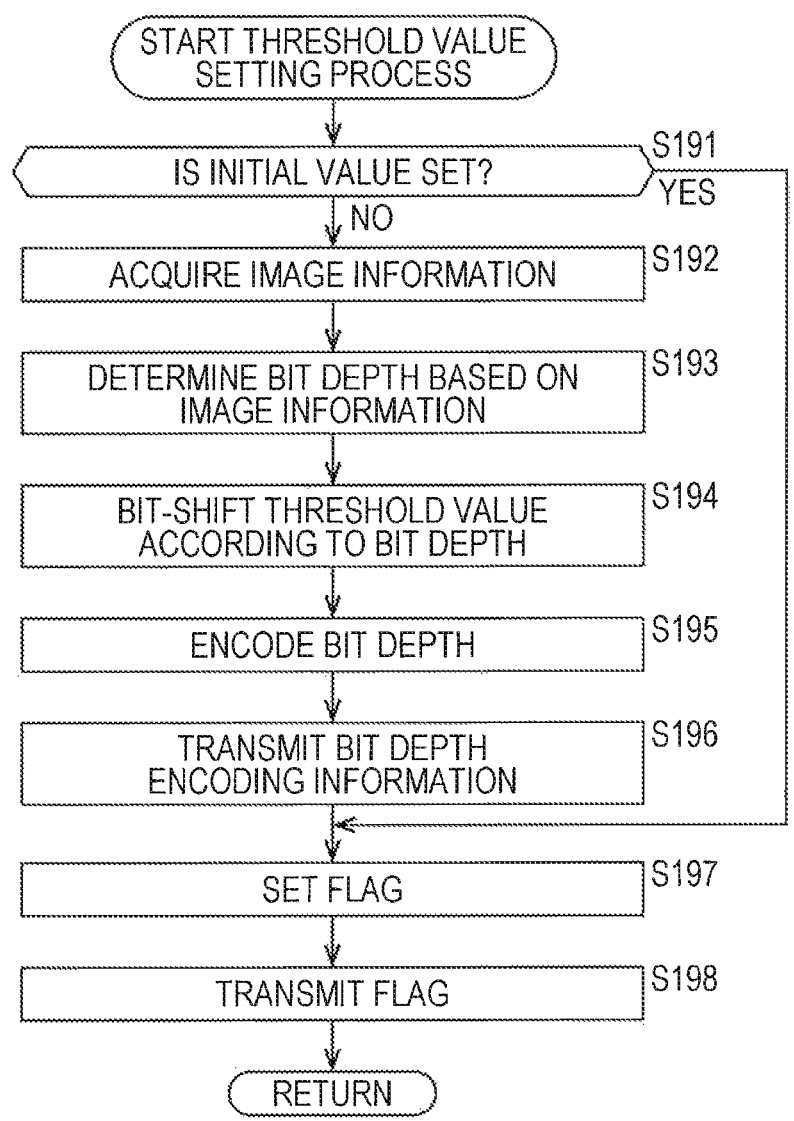
FIG. 16 is a flowchart illustrating still another example of a flow of a threshold value setting process.

In the case of the example of FIG. 16, processes of steps S191 to S194, S197, and S198 are performed similarly to the processes of steps S171 to S174, S177, and S178 of the example of FIG. 15.

Once the process of step S194 of FIG. 16 is ended, the procedure proceeds to step S395.

In step S195, the encoding unit 133 encodes the information representing the bit depth determined in step S193.

In step S196, the encoding unit 133 supplies the bit depth encoding information obtained by the process of step S195 to the lossless encoding unit 106 to transmit the bit depth encoding information to the decoding side.

Once the process of step S196 is ended, the procedure proceeds to step S197.

By doing so, the threshold value setting unit 121 can also set the threshold value according to the bit depth of the image data (appropriate to the bit depth). Therefore, in this case, the image encoding device 100 can also suppress a deterioration in image quality of the decoded image.

In addition, in the case where the threshold value change flag is not transmitted to the decoding side (namely, the threshold value change flag is not generated), the processes of steps 3197 and S198 may be omitted.

In addition, in the case where the bit depth encoding information is not transmitted to the decoding side (namely, the bit depth encoding information is not generated), the processes of steps S195 and S196 may be omitted.

<Threshold Value Setting Unit/Filtering Process Unit>

Figure 17:
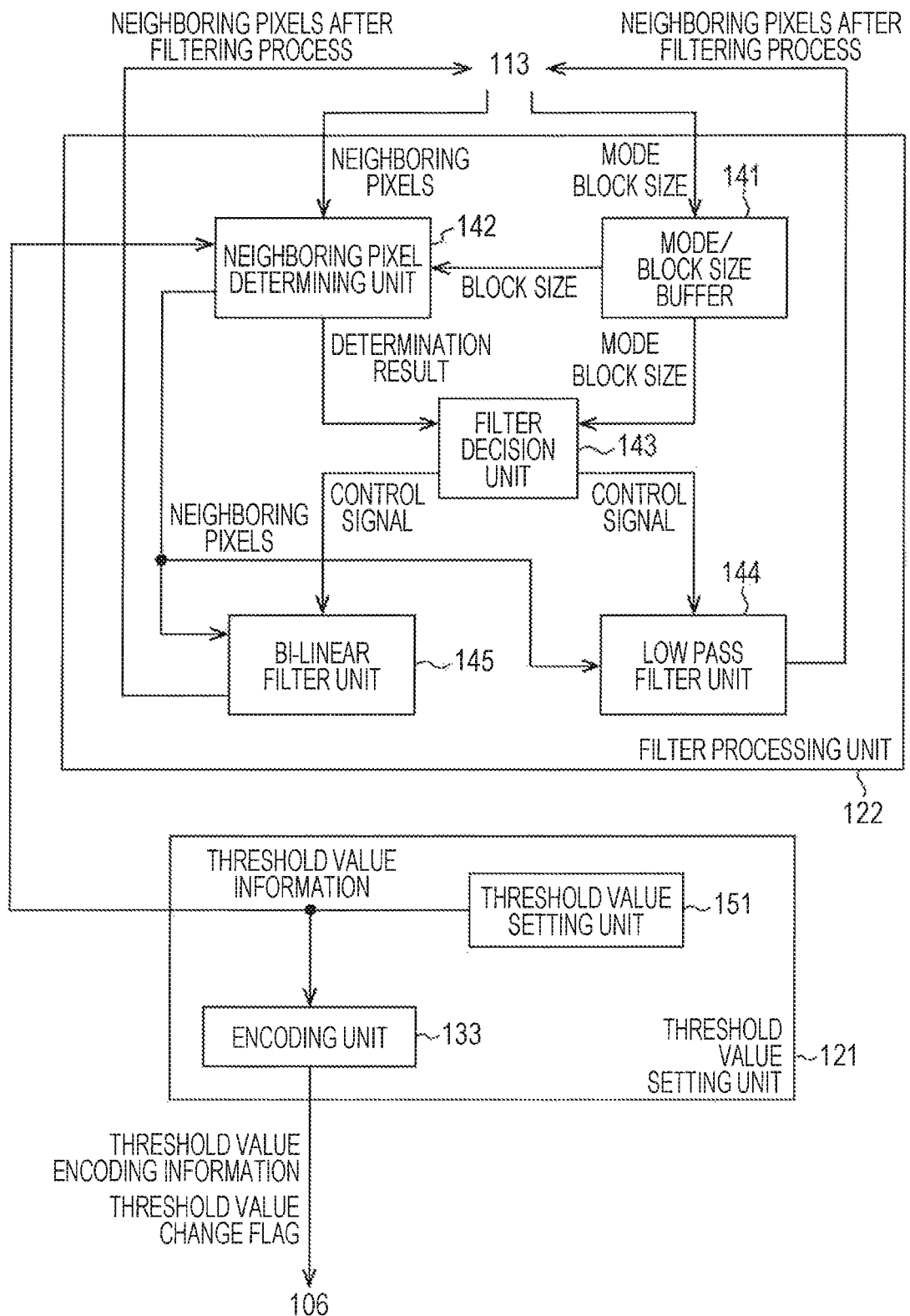
FIG. 17 is a block diagram illustrating another configuration example of a threshold value setting unit and a filtering processing unit.

FIG. 17 is a block diagram illustrating a main configuration example of the threshold value setting unit and the filtering processing unit 122 in the case where the threshold value setting unit 121 of FIG. 10 sets the threshold value according to external designation such as user's designation.

In the example of FIG. 17, the threshold value setting unit 121 is configured to include a threshold value setting unit 151 and an encoding unit 133.

The threshold value setting unit 151 receives external designation of the threshold value, for example, user's designation and sets the threshold value according to the designation. The threshold value setting unit 151 supplies the information (threshold value information) representing the set threshold value to the neighboring pixel determining unit 142 of the filtering processing unit 122.

In addition, in the case of transmitting the threshold value information to the decoding side, the threshold value bit shifting unit 132 also supplies the threshold value information to the encoding unit 133.

Similarly to the case of FIG. 11, the encoding unit 133 golomb-encodes the supplied information and supplies the obtained golomb code to the lossless encoding unit 106 to transmit the golomb code to the decoding side. For example, in the case of transmitting the threshold value information representing the set threshold value to the decoding side, the encoding unit 133 acquires the supplied threshold value information from the threshold value setting unit 151 and golomb-encodes the threshold value information. The encoding unit 133 supplies the obtained threshold value encoding information to the lossless encoding unit 106 to transmit the threshold value information to the decoding side.

In addition, similarly to the case of FIG. 11, the encoding unit 133 may generate a threshold value change flag representing whether or not the threshold value is updated (changed) and supply the threshold value change flag to the lossless encoding unit 106 to transmit the threshold value change flag to the decoding side.

In addition, the filtering processing unit 122 has the same configuration as that of the case of FIG. 11 and performs the same processes as those of the case of FIG. 11.

By doing so, the threshold value setting unit 121 can set the threshold value according to the bit depth of the image data (appropriate to the bit depth), the filtering processing unit 122 can select the filter appropriate to the bit depth of the image data and perform the filtering process on the neighboring pixels by using the filter, and the intra prediction unit 113 can generate the predicted image by using the neighboring pixels which are applied with the filtering process appropriate to the bit depth of the image data. Namely, by doing so, image encoding device 100 can suppress a deterioration in image quality of the decoded image.

In addition, in the case of the example of FIG. 17, since the threshold value setting unit 121 can set the threshold value according to external designation such as user's designation, the intra prediction unit 113 can reflect external designation such as user's designation of the image quality on the predicted image. Namely, the image encoding device 100 can control the image quality of the decoded image.

<Flow of Threshold Value Setting Process>

Next, an example of a flow of the threshold value setting process performed in step S103 of FIG. 12 in the threshold value setting unit 121 of the example of FIG. 17 will be described with reference to a flowchart of FIG. 18. In addition, in FIG. 18, the case where the threshold value encoding information representing the set threshold value and the threshold value change flag are transmitted to the decoding side will be described.

Figure 18:
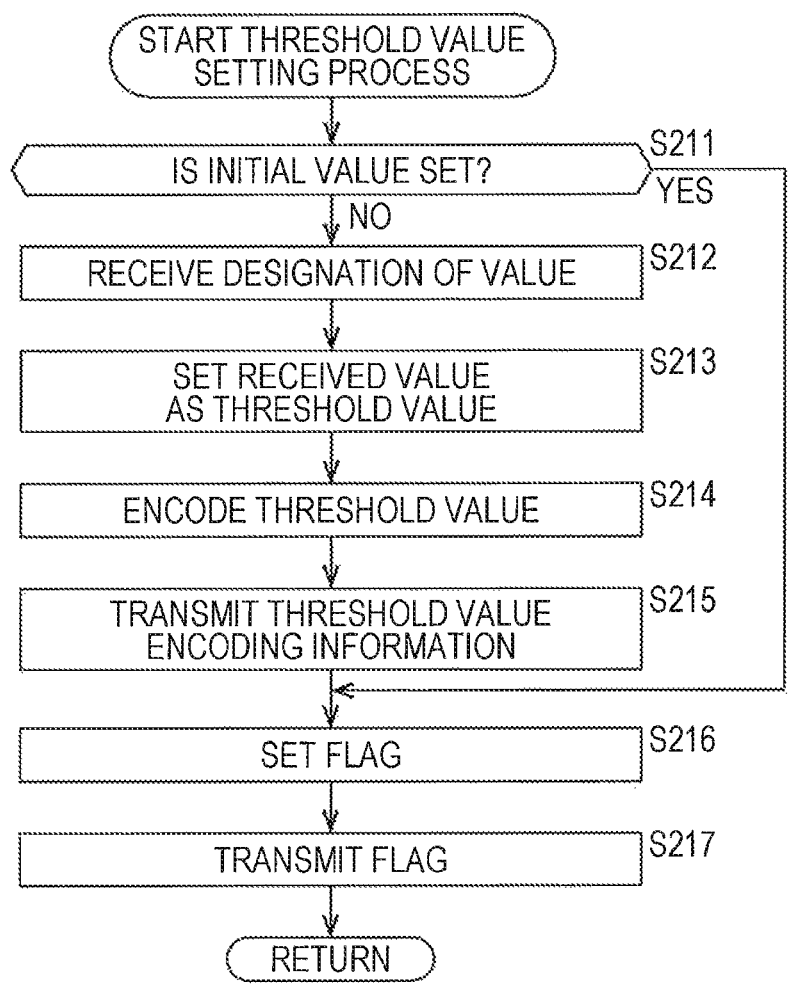
FIG. 18 is a flowchart illustrating still another example of a flow of a threshold value setting process.

In the case of the example of FIG. 18, processes of steps S211, S216, and S217 are performed similarly to the process of steps 3131, S137, and S138 of the example of FIG. 13.

In the case where it is determined in step S211 of FIG. 18 that the threshold value is updated, the procedure proceeds to step S212.

In step S212, the threshold value setting unit 151 receives external designation of the value, for example, user's designation or the like.

In step S213, the threshold value setting unit 151 sets the value designated by the designation received in step S212 as the threshold value.

In step S214, the encoding unit 133 encodes the threshold value set in step S213.

In step S215, the encoding unit 133 supplies the threshold value encoding information obtained by the process of step S214 to the lossless encoding unit 106 to transmit the threshold value encoding information to the decoding side.

Once the process of step S215 is ended, the procedure proceeds to step S216. In addition, in the case where it is determined in step S211 that the initial value is set as the threshold value, the procedure proceeds to step S216.

Next, once the process of step S217 is ended, the threshold value setting process is ended, and the procedure returns to FIG. 12.

By performing the above-described threshold value setting process, the threshold value setting unit 121 can set the threshold value according to the bit depth of the image data (appropriate to the bit depth). Therefore, the image encoding device 100 can suppress a deterioration in image quality of the decoded image.

In addition, in the case of the example of FIG. 18, the threshold value setting unit 121 can set the threshold value according to external designation such as user's designation. Namely, the image encoding device can control the image quality of the decoded image.

<Threshold Value Setting Unit/Filtering Process Unit>

Figure 19:
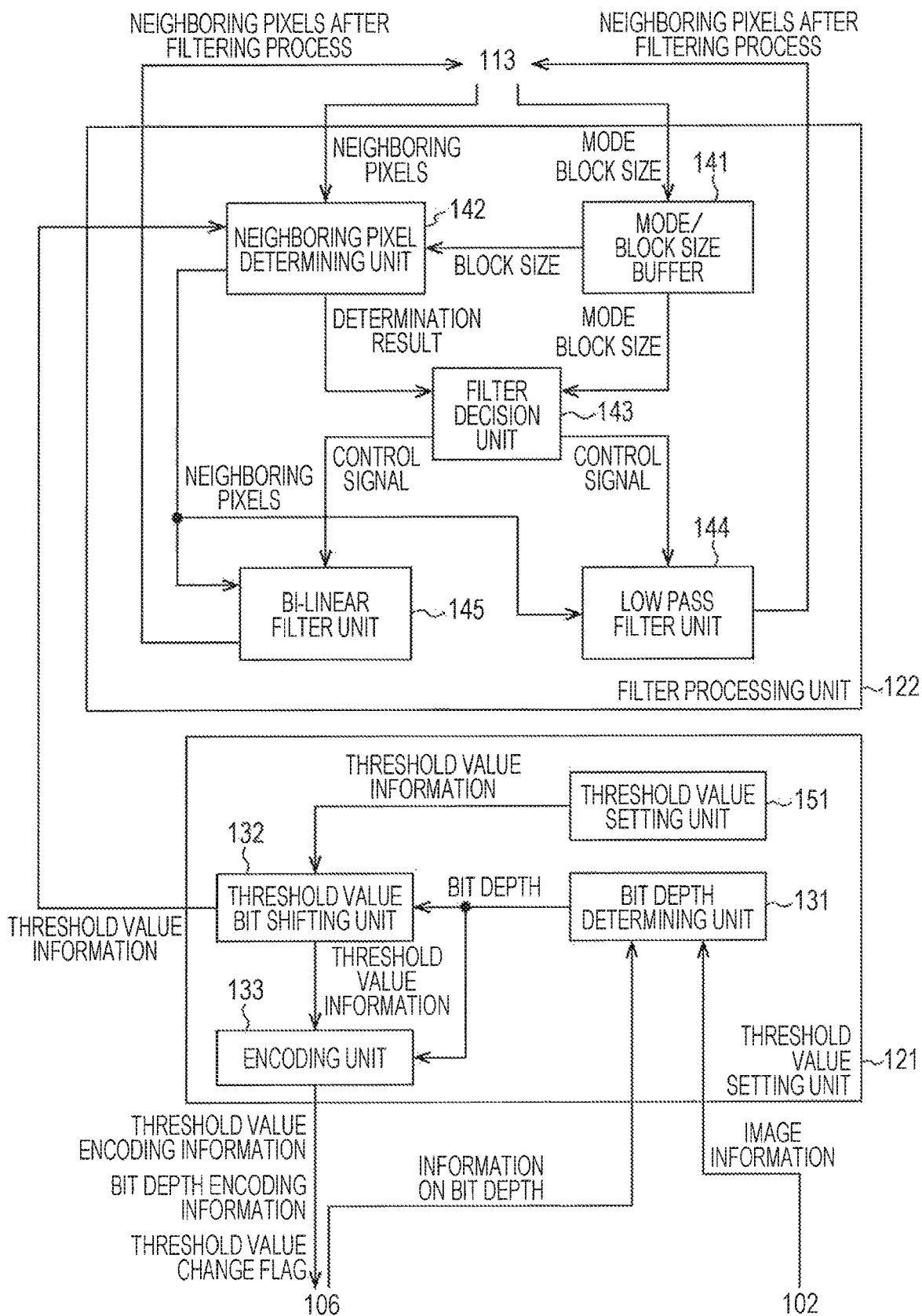
FIG. 19 is a block diagram illustrating still another configuration example of a threshold value setting unit and a filtering processing unit.

FIG. 19 is a block diagram illustrating a main configuration example of the threshold value setting unit 121 and the filtering processing unit 122 in the case where the threshold value setting unit 121 of FIG. 10 updates (changes) the threshold value designated by an external side such as a user according to the bit depth of the image data which is a target of the encoding.

In the example of FIG. 19, the threshold value setting unit 121 is configured to include a bit depth determining unit 131, a threshold value bit shifting unit 132, an encoding unit 133, and a threshold value setting unit 151.

In this case, the bit depth determining unit 131 and the encoding unit 133 perform the same processes as those of the case of FIG. 11. In addition, in this case, the threshold value setting unit 151 performs the same processes as those of the case of FIG. 17. However, the threshold value setting unit 151 supplies the set threshold value to the threshold value bit shifting unit 132.

In this case, similarly to the case of FIG. 11, the threshold value bit shifting unit 132 performs the updating (changing) of the threshold value by bit-shifting the threshold value according to the information representing the bit depth supplied from the bit depth determining unit 131. However, in this case, the threshold value bit shifting unit 132 bit-shifts the threshold value supplied from the threshold value setting unit 151, that is, the threshold value set based on, for example, external designation such as user's designation.

The threshold value bit shifting unit 132 supplies the information (threshold value information) representing the after-updating (changing) threshold value to the neighboring pixel determining unit 142 of the filtering processing unit 122.

In addition, in the case of transmitting the threshold value information representing the after-updating (changing) threshold value (that is, the threshold value after being bit-shifted by the threshold value bit shifting unit 132) to the decoding side, the threshold value bit shifting unit 132 also supplies the threshold value information to the encoding unit 133.

In addition, the threshold value bit shifting unit may also supply the threshold value information representing the before-updating (changing) threshold value (that is, the threshold value set by the threshold value setting unit 151) to the decoding side. In this case, the threshold value bit shifting unit 132 supplies the threshold value information representing the before-updating (changing) threshold value (that is, the threshold value set by the threshold value setting unit 151) to the encoding unit 133. In this case, the encoding unit 133 encodes the threshold value information representing the before-updating (changing) threshold value (that is, the threshold value set by the threshold value setting unit 151) and transmits the obtained threshold value encoding information to the lossless encoding unit 106.

In addition, the filtering processing unit 122 has the same configuration as that of the case of FIG. 11 and performs the same processes as those of the case of FIG. 11.

By doing so, the threshold value setting unit 121 can set the threshold value according to external designation such as user's designation and can update the threshold value to the value according to the bit depth of the image data (appropriate to the bit depth). Namely, the filtering processing unit 122 can select the filter appropriate to the bit depth of the image data and perform the filtering process on the neighboring pixels by using the filter, and the intra prediction unit 113 can generate the predicted image by using the neighboring pixels which are applied with the filtering process appropriate to the bit depth of the image data. Namely, the image encoding device 100 can control the image quality of the decoded image and also suppress a deterioration in image quality of the decoded image.

<Flow of Threshold Value Setting Process>

Next, an example of a flow of the threshold value setting process performed in step S103 of FIG. 12 in an example where the threshold value setting unit 121 of the example of FIG. 19 determines the bit depth of the image data based on the information on the bit depth and transmits the threshold value encoding information representing the before-updating threshold value to the decoding side will be described with reference to a flowchart of FIG. 20. In addition, in FIG. 20, the case where the threshold value change flag is also transmitted to the decoding side will be described.

Figure 20:
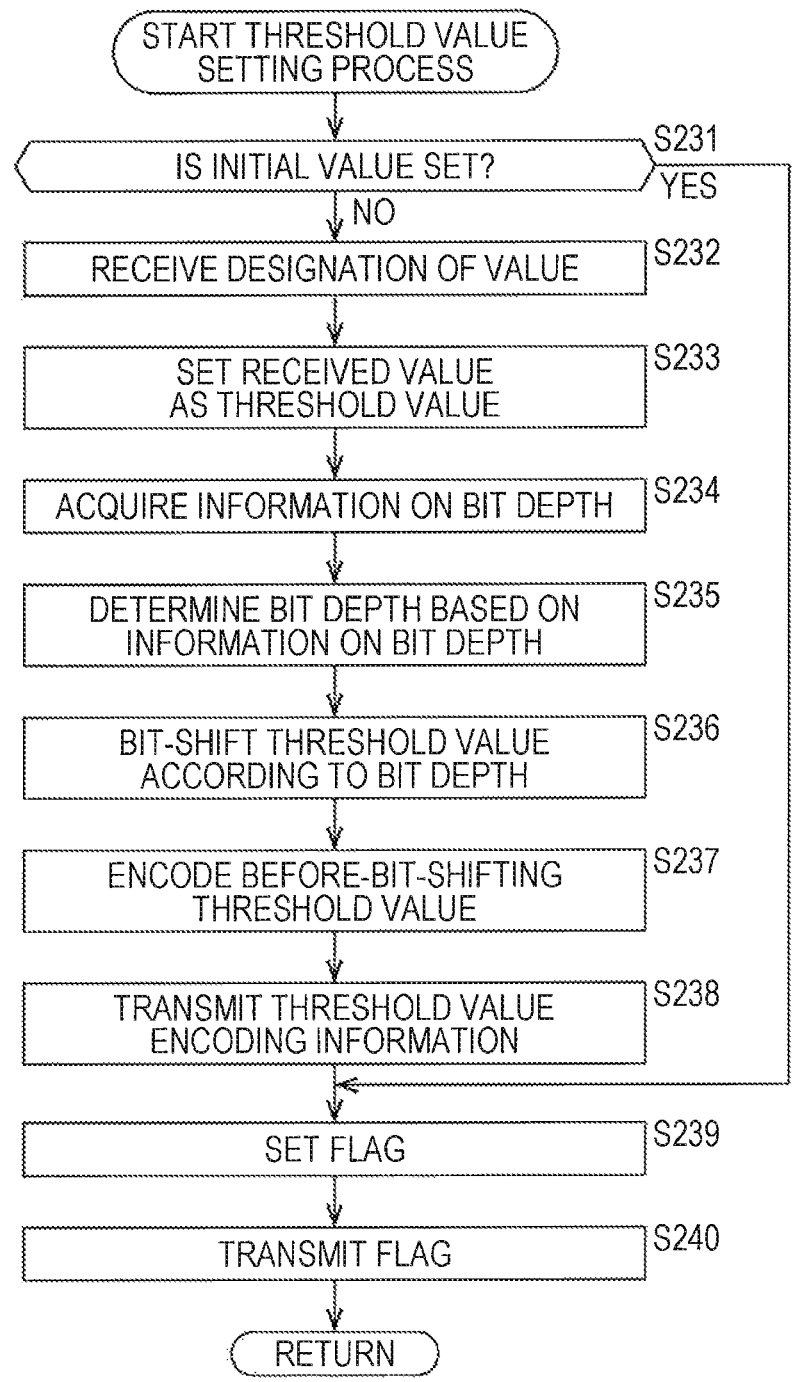
FIG. 20 is a flowchart illustrating still another example of a flow of a threshold value setting process.

In the case of the example of FIG. 20, processes of steps S231 to S233 are performed similarly to the processes of steps S211 to S213 of the example of FIG. 18.

In addition, in the case of the example of FIG. 20, processes of steps S234 and 3235 are performed similarly to the processes of steps S132 and S133 of FIG. 13.

In step S236, the threshold value bit shifting unit 132 bit-shifts the threshold value set in step S233 according to the determination result (determined bit depth) of step S133. The threshold value bit shifting unit 132 supplies the after-updating threshold value to the neighboring pixel determining unit 142 of the filtering processing unit 122.

In step S237, the encoding unit 133 encodes the threshold value information representing the threshold value information set in step S233, that is, the before-bit-shifting (before-updating) threshold value.

In step S238, the encoding unit 133 supplies the threshold value encoding information representing the before-updating threshold value obtained in step S237 to the lossless encoding unit 106 to transmit the information to the decoding side.

Once the process of step S238 is ended, the procedure proceeds to step S239. In addition, in the case where it is determined in step S231 that the initial value is set as the threshold value, the procedure proceeds to step S239.

In the case of the example of FIG. 20, processes of steps S239 and S240 are performed similarly to the processes of steps S137 and S138 of the example of FIG. 13.

Once the process of step S240 is ended, the threshold value setting process is ended, and the procedure returns to FIG. 12.

By doing the above-described threshold value setting process, the threshold value setting unit 121 can set the threshold value according to the bit depth of the image data (appropriate to the bit depth). In addition, the threshold value setting unit 121 can set the threshold value according to external designation such as user's designation.

In addition, in the case where the threshold value change flag is not transmitted to the decoding side (namely, the threshold value change flag is not generated), the above-described processes of steps S239 and S240 may be omitted.

In addition, in the case where the threshold value setting unit 121 determines the bit depth of the image data based on the image information instead of the information on the bit depth, the processes of steps S234 and S235 of FIG. 20 may be replaced with the processes of steps S172 and S173 of FIG. 15.

<Flow of Threshold Value Setting Process>

Next, an example of a flow of the threshold value setting process performed in step S103 of FIG. 12 in an example where the threshold value setting unit 121 of the example of FIG. 19 determines the bit depth of the image data based on the image information and transmits the threshold value encoding information representing the before-updating threshold value and the information representing the bit depth to the decoding side will be described with reference to a flowchart of FIG. 21. In addition, in FIG. 21, the case where the threshold value change flag is also transmitted to the decoding side will be described.

Figure 21:
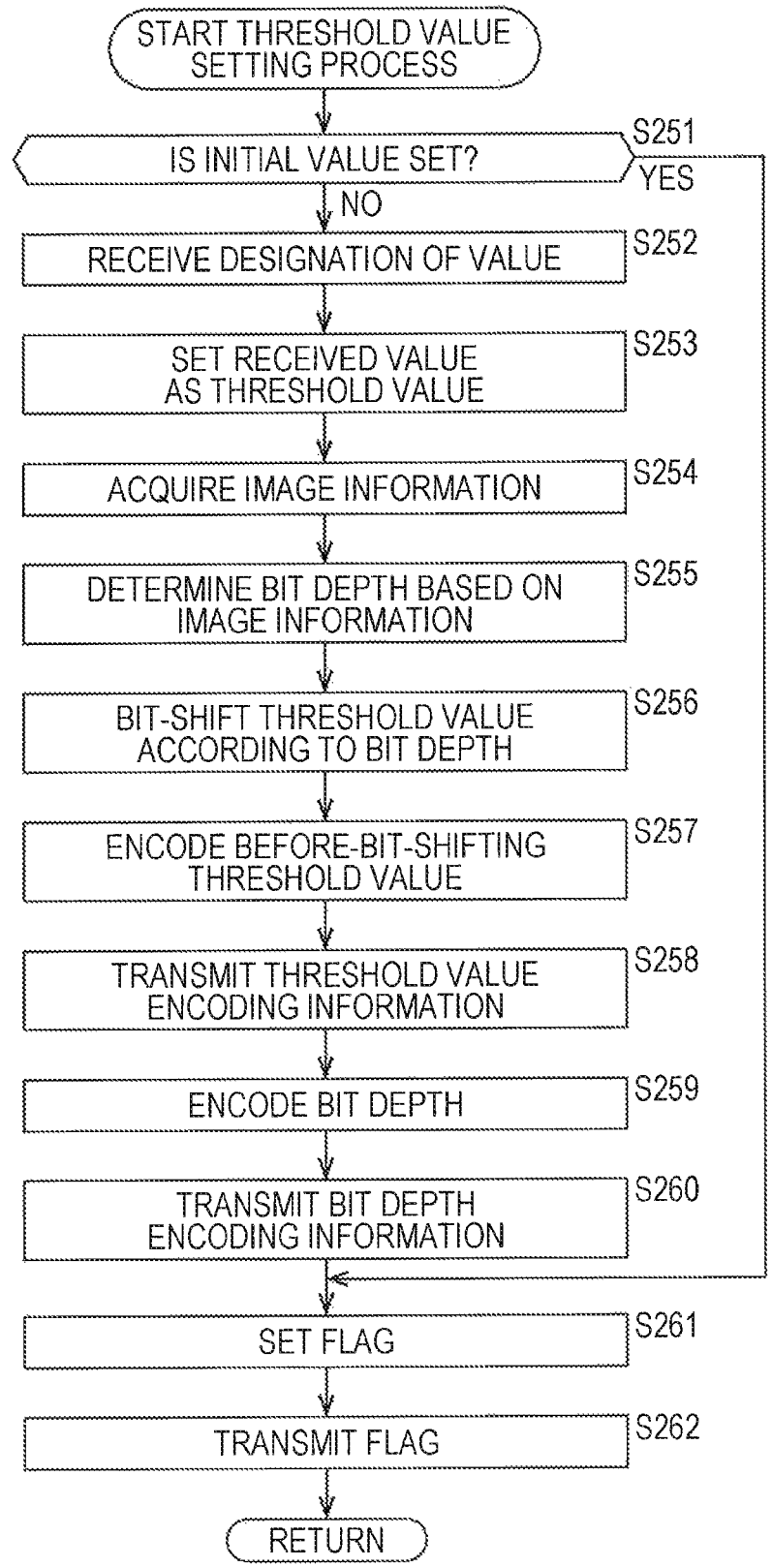
FIG. 21 is a flowchart illustrating still another example of a flow of a threshold value setting process.

In the case of the example of FIG. 21, processes of steps S251 to S253 are performed similarly to the processes of steps S231 to S233 of the example of FIG. 20.

In addition, in the case of the example of FIG. 21, processes of steps S254 and S255 are performed similarly to the processes of steps S172 and 3173 of FIG. 15.

In addition, in the case of the example of FIG. 21, processes of steps S256 to S258 are performed similarly to the processes of steps S236 to S238 of the example of FIG. 21.

In addition, in the case of the example of FIG. 21, processes of steps S259 and S260 are performed similarly to the processes of steps S195 and S196 of FIG. 16.

Once the process of step S260 is ended, the procedure proceeds to step S261. In addition, in the case where it is determined in step S251 that the initial value is set as the threshold value, the procedure proceeds to step S261.

In addition, in the case of the example of FIG. 20, processes of steps S261 and 3262 are performed similarly to the processes of steps S239 and S240 of the example of FIG. 20.

Once the process of step S262 is ended, the threshold value setting process is ended, and the procedure returns to FIG. 12.

By performing the above-described threshold value setting process, the threshold value setting unit 121 can set the threshold value according to the bit depth of the image data (appropriate to the bit depth). In addition, the threshold value setting unit 121 can set the threshold value according to external designation such as user's designation.

In addition, in the case where the threshold value change flag is not transmitted to the decoding side (namely, the threshold value change flag is not generated), the above-described processes of steps S261 and S262 may be omitted.

<Flow of Threshold Value Setting Process>

Next, an example of a flow of the threshold value setting process performed in step S103 of FIG. 12 in an example where the threshold value setting unit 121 of the example of FIG. 19 determines the bit depth of the image data based on the information on the bit depth and transmits the threshold value encoding information representing the after-updating threshold value to the decoding side will be described with reference to a flowchart of FIG. 22. In addition, in FIG. 22, the case where the threshold value change flag is also transmitted to the decoding side will be described.

Figure 22:
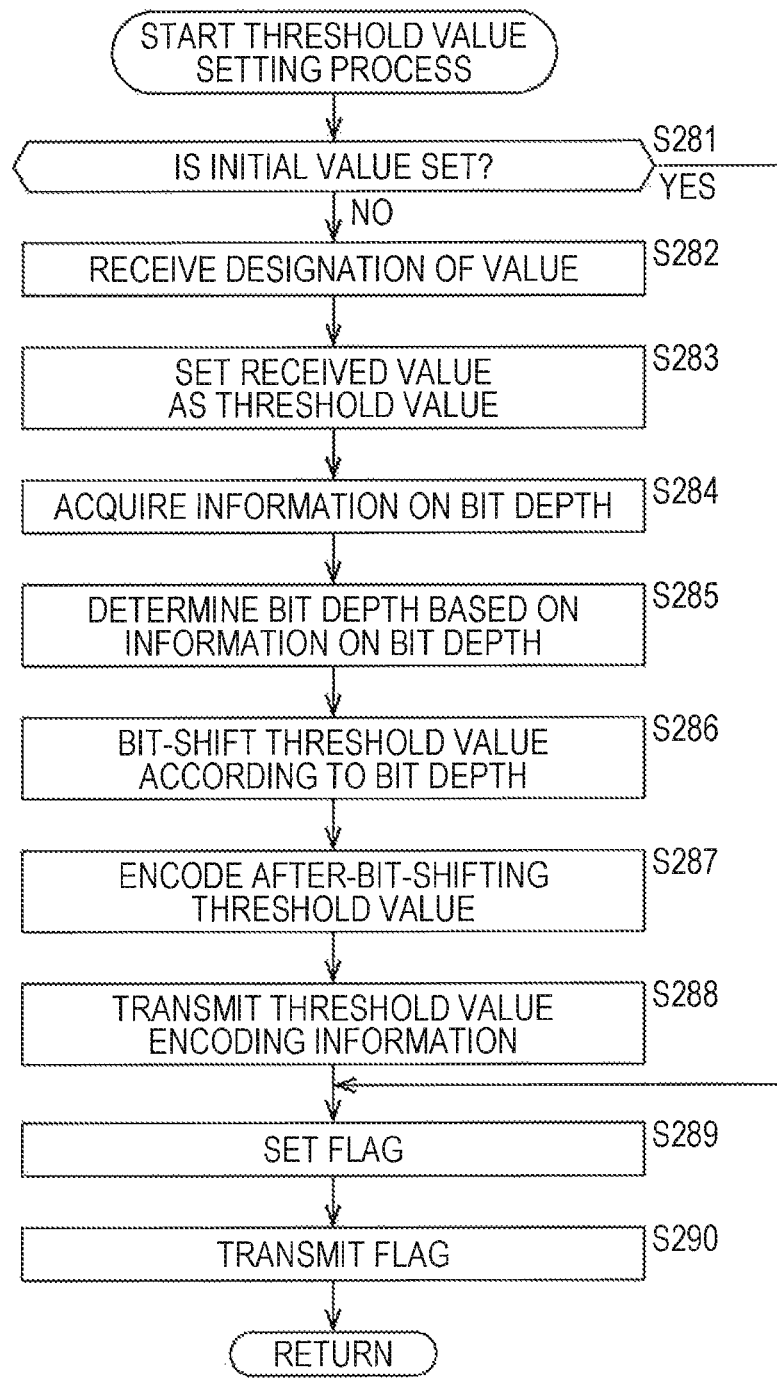
FIG. 22 is a flowchart illustrating still another example of a flow of a threshold value setting process.

In the case of the example of FIG. 22, processes of steps S281 to 3286 are performed similarly to the processes of steps S231 to 3236 of the example of FIG. 20.

In step S287, the threshold value bit shifting unit 132 encodes the threshold value information representing the after-bit-shifting (after-updating) threshold value obtained in step S286.

In the step S288, the encoding unit 133 supplies the threshold value encoding information representing the after-updating threshold value obtained in step S287 to the lossless encoding unit 106 to transmit the information to the decoding side.

Once the process of step S288 is ended, the procedure proceeds to step S289. In addition, in the case where it is determined in step S281 that the initial value is set as the threshold value, the procedure proceeds to step S289.

In the case of the example of FIG. 22, processes of steps S289 and S290 are performed similarly to the processes of steps S239 and S240 of the example of FIG. 20.

Once the process of step S290 is ended, the threshold value setting process is ended, and the procedure returns to FIG. 12.

By performing the above-described threshold value setting process, the threshold value setting unit 121 can set the threshold value according to the bit depth of the image data (appropriate to the bit depth). In addition, the threshold value setting unit 121 can set the threshold value according to external designation such as user's designation.

In addition, in the case where the threshold value change flag is not transmitted to the decoding side (namely, the threshold value change flag is not generated), the above-described processes of steps S289 and S290 may be omitted.

In addition, in the case where the threshold value setting unit 121 determines the bit depth of the image data based on the image information instead of the information on the bit depth, the processes of steps S284 and S285 of FIG. 22 may be replaced with the processes of steps S172 and S173 of FIG. 15.

2. Second Embodiment

Image Decoding Device

Figure 23:
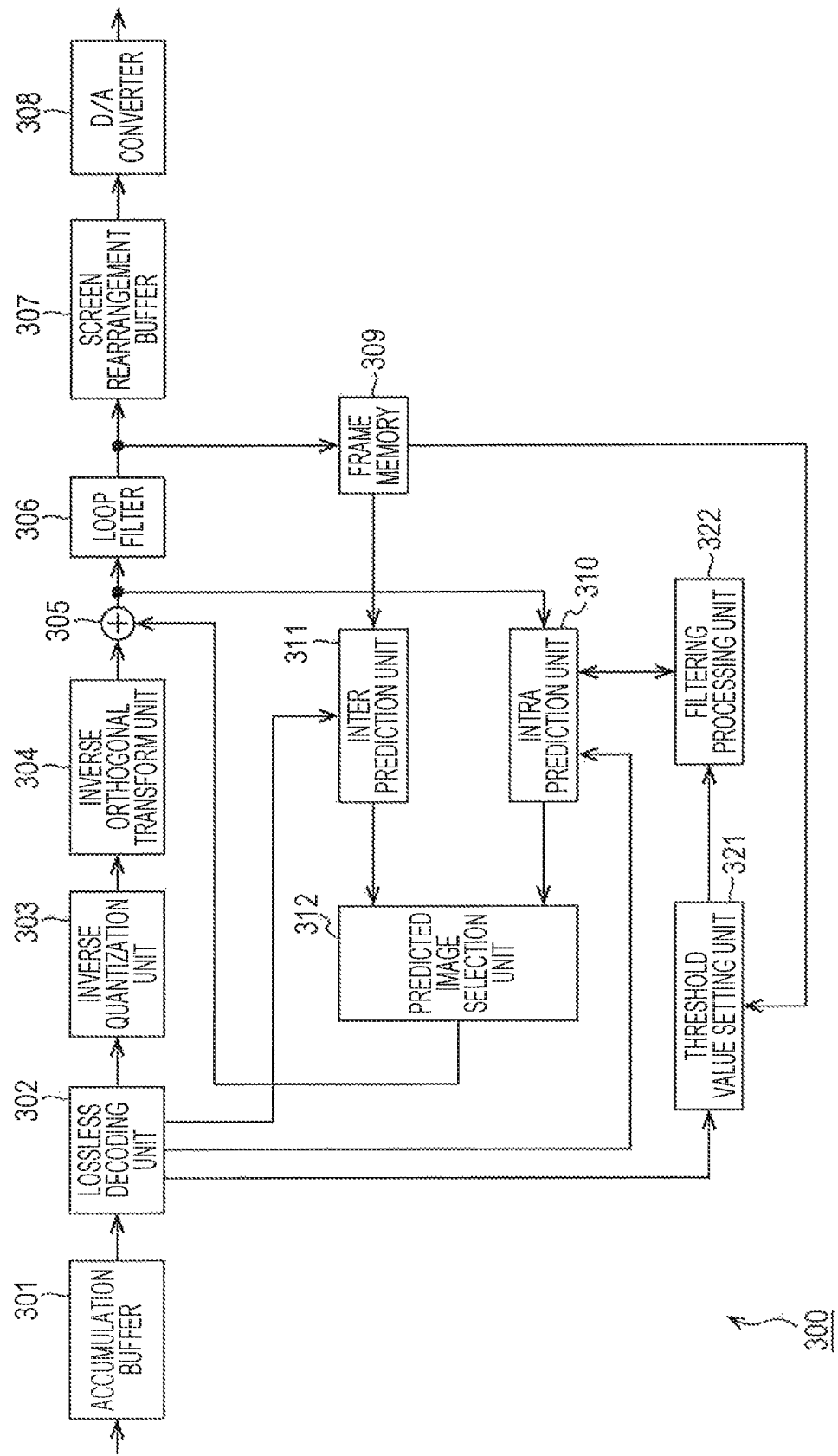
FIG. 23 is a block diagram illustrating a main configuration example of an image decoding device.

Next, the decoding of the encoded data (encoded stream encoded as described above will be described. FIG. 23 is a block diagram illustrating a main configuration example of the image decoding device corresponding to the image encoding device 100 of FIG. 10 which is a kind of image processing apparatuses to which the present technique is applied.

The image decoding device 300 illustrated in FIG. 23 decodes the encoded data generated by the image encoding device 100 in a decoding method corresponding to the encoding method.

As illustrated in FIG. 23, the image decoding device 300 is configured to include an accumulation buffer 301, a lossless decoding unit 302, an inverse quantization unit 303, an inverse orthogonal transform unit 304, an arithmetic unit 305, a loop filter 306, a screen rearrangement buffer 307, and a D/A converter 308. In addition, the image decoding device 300 is configured to include a frame memory 309, an intra prediction unit 310, an inter prediction unit 311, and a predicted image selection unit 312.

The accumulation buffer 301 is a receiving unit which receives the transmitted encoded data. The accumulation buffer 301 receives the transmitted encoded data and stores the encoded data, and at a predetermined timing, the accumulation buffer supplies the encoded data to the lossless decoding unit 302. The encoded data are added with information necessary for the decoding of the prediction mode information or the like. The lossless decoding unit 302 decodes the information encoded by the lossless encoding unit 106 of FIG. 10 supplied from the accumulation buffer 301 in a decoding scheme corresponding to the encoding scheme. The lossless decoding unit 302 supplies quantized coefficient data of the difference image obtained through the decoding to the inverse quantization unit 303.

In addition, the lossless decoding unit 302 determines which one of the intra prediction mode and the inter prediction mode is selected as the optimal prediction mode and supplies the information on the optimal prediction mode to the prediction unit corresponding to the mode which is determined to be selected among the intra prediction unit 310 and the inter prediction unit 311. Namely, for example, in the case where the intra prediction mode is selected as the optimal prediction mode which is optimal to the image encoding device 100, the information on the optimal prediction mode is supplied to the intra prediction unit 310. In addition, for example, in the case where the inter prediction mode is selected as the optimal prediction mode which is optimal to the image encoding device 100, the information on the optimal prediction mode is supplied to the inter prediction unit 311.

In addition, the lossless decoding unit 302 supplies the information required for inverse quantization, for example, a quantization matrix, a quantization parameter, or the like to the inverse quantization unit 303.

The inverse quantization unit 303 performs inverse quantization on the quantized coefficient data obtained by decoding in the lossless decoding unit 302 in the scheme corresponding to the quantization scheme of the quantization unit 105 of FIG. 10. In addition, the inverse quantization unit 303 is the same processing unit as the inverse quantization unit 108 of the image encoding device 100 of FIG. 10. Namely, the description of the inverse quantization unit 303 may be used for the inverse quantization unit 108. However, data input/output destination or the like needs to be changed appropriately according to an apparatus.

The inverse quantization unit 303 supplies the obtained coefficient data to the inverse orthogonal transform unit 304.

The inverse orthogonal transform unit 304 performs inverse orthogonal transform on the orthogonal transform coefficient supplied from the inverse quantization unit in the scheme corresponding to the orthogonal transform scheme of orthogonal transform unit 104 of FIG. 10, if necessary. In addition, the inverse orthogonal transform unit 304 is the same processing unit as the inverse orthogonal transform unit 109 of the image encoding device 100 of FIG. 10. Namely, the description of the inverse orthogonal transform unit 304 may be used for the inverse orthogonal transform unit 109. However, data input/output destination or the like needs to be changed appropriately according to an apparatus.

The inverse orthogonal transform unit 304 obtains the decoding residual data corresponding to the residual data before the orthogonal transform in the image encoding device 100 by the inverse orthogonal transform process. The decoding residual data obtained through the inverse orthogonal transform are supplied to the arithmetic unit 305. In addition, the predicted image is supplied from the intra prediction unit 310 or the inter prediction unit 311 to the arithmetic unit 305 through the predicted image selection unit 312.

The arithmetic unit 305 adds the difference image and the predicted image to obtain the reconstructed image corresponding to the image before the subtraction of the predicted image by the arithmetic unit 103 of the image encoding device 100. The arithmetic unit 305 supplies the reconstructed image to the loop filter 306 and the intra prediction unit 310.

The loop filter 306 appropriately performs a loop filtering process including a deblocking filtering process, an adaptive loop filtering process, or the like on the supplied reconstructed image to generate a decoded image. For example, the loop filter 306 removes block distortion by performing the deblocking filtering process on the reconstructed image. In addition, for example, the loop filter 306 improves the image quality by performing the loop filtering process on the deblocking filtering process result (the reconstructed image from which the block distortion is removed) by using a Wiener Filter.

In addition, the type of the filtering process performed by the loop filter 306 is arbitrary, and any filtering process other than the above-described filtering process may be performed. In addition, the loop filter 306 may perform the filtering process by using a filter coefficient supplied from the image encoding device 100 of FIG. 10.

The loop filter 306 supplies the decoded image which is the filtering process result to the screen rearrangement buffer 307 and the frame memory 309.

The screen rearrangement buffer 307 performs rearrangement of the image. Namely, the frame order which is rearranged for the encoding order is rearranged to an original display order by the screen rearrangement buffer 102 of FIG. 10. The D/A converter 308 D/A-converts the image supplied from the screen rearrangement buffer 307 and outputs the image to a display (not shown) so that the image is displayed.

The frame memory 309 stores the supplied decoded image, and at a predetermined timing or based on an external request from the inter prediction unit 311 or the like, the frame memory supplies the stored decoded image as a reference image to the inter prediction unit 311.

The Intra prediction unit 310 is appropriately supplied with the information or the like representing the intra prediction mode obtained by decoding the header information from the lossless decoding unit 302. The intra prediction unit 310 performs the intra prediction by using the reference image acquired from the frame memory 309 in the intra prediction mode used in the intra prediction unit 113 of FIG. 10 to generate the predicted image. The intra prediction unit 310 supplies the generated predicted image to the predicted image selection unit 312.

The inter prediction unit 311 acquires the information (optimal prediction mode information, reference image information, or the like) obtained by decoding the header information from the lossless decoding unit 302.

The inter prediction unit 311 performs the inter prediction by using the reference image acquired from the frame memory 309 in the inter prediction mode represented by the optimal prediction mode information acquired from the lossless decoding unit 302 to generate the predicted image.

The predicted image selection unit 312 supplies the predicted image supplied by the intra prediction unit 310 or the predicted image supplied by the inter prediction unit 311 to the arithmetic unit 305. Next, in the arithmetic unit 305, the predicted image generated by using the motion vector and the decoding residual data (difference image information) supplied from the inverse orthogonal transform unit 304 are added, so that the original image is decoded. Namely, the inter prediction unit 311, the lossless decoding unit 302, the inverse quantization unit 303, the inverse orthogonal transform unit 304, and the arithmetic unit 305 are also a decoding unit which decodes the encoded data by using the motion vector and generates an original image.

The image decoding device 300 is configured to further include a threshold value setting unit 321 and a filtering processing unit 322.

The threshold value setting unit 321 performs basically the same process as that of the threshold value setting unit 121. Namely, the threshold value setting unit 321 sets the threshold value for identifying the features of the neighboring pixels of the current block in the intra prediction process at the time of decoding the encoded data where the image data are encoded, that is, the threshold value used for the filtering process on the neighboring pixels of the current block of the intra prediction which is performed by the filtering processing unit 322 according to the bit depth of the image data.

However, the threshold value setting unit 321 may set the threshold value by using the information transmitted from the encoding side supplied from the lossless decoding unit 302. The threshold value setting unit 321 supplies the threshold value information representing the set threshold value (after-updating threshold value) to the filtering processing unit 322.

For example, the threshold value setting unit 321 may set the threshold value according to the bit depth of the image data which is a target of the encoding.

In this case, for example, the threshold value setting unit 321 may acquire the information on the bit depth of the image data which are parameters transmitted as the sequence parameter set (SPS) or the like from the encoding side from the lossless decoding unit 302, determine the bit depth of the image data based on the information on the bit depth, and set the threshold value according to the bit depth. In addition, for example, the threshold value setting unit 321 may acquire the image information of the decoded image (including the image data or the information on the image data) from the frame memory 309 or the like, determine the bit depth of the image data based on the image information (by analyzing the image information), and set the threshold value according to the bit depth.

In addition, in this case, for example, the threshold value setting unit 321 may update the threshold value by bit-shifting the initial value (for example, 8) of the threshold value which is defined in advance according to the determined bit depth. At this time, for example, a value appropriate for the case where the bit depth is 8 bits may be set as the initial value in advance, and the threshold value setting unit 321 may bit-shift the initial value according to a difference in the number of bits between an actual bit depth of the image data and the 8 bits.

In addition, in this case, for example, the threshold value setting unit 321 may acquire a threshold value change flag transmitted from the encoding side and determine based on the value of the threshold value change flag whether or not the threshold value is updated. By doing so, the image decoding device 300 can easily recognize based on the value of the threshold value change flag whether or not the threshold value is updated (changed). Namely, similarly to the encoding side (for example, the image encoding device 100), the image decoding device 300 can easily control whether or not to perform the process of updating (changing) the threshold value.

In addition, for example, the threshold value setting unit 321 may set the threshold value according to the information transmitted from the encoding side.

In this case, for example, the threshold value setting unit 321 may acquire the bit depth encoding information supplied from the encoding side from the lossless decoding unit 302 and update the threshold value according to the bit depth obtained by decoding the bit depth encoding information. At this time, for example, the threshold value setting unit 321 may update the threshold value by bit-shifting the initial value (for example, 8) of a predetermined threshold value according to the bit depth represented by the information transmitted from the encoding side.

In addition, in this case, for example, the threshold value setting unit 321 may further acquire the threshold value encoding information representing the before-updating threshold value supplied from the encoding side from the lossless decoding unit 302 and update the threshold value obtained by decoding the threshold value encoding information according to the bit depth obtained in the same manner. At this time, similarly, the updating of the threshold value may be performed by the bit-shifting.

In addition, in this case, the threshold value setting unit 321 may determine based on the value of the threshold value change flag transmitted from the encoding side whether or not the threshold value is updated.

In addition, in this case, for example, the threshold value setting unit 321 may acquire the threshold value encoding information representing the after-updating threshold value supplied from the encoding side from the lossless decoding unit 302 and set the threshold value which is obtained by decoding the threshold value encoding information.

In addition, in this case, the threshold value setting unit 321 may determine based on the value of the threshold value change flag transmitted from the encoding side whether or not the threshold value is updated.

In addition, for example, the threshold value setting unit 321 may determine the bit depth of the image data which is the encoding target and update (change) the threshold value transmitted from the encoding side according to the bit depth.

In this case, for example, the threshold value setting unit 321 may acquire the threshold value encoding information representing the before-updating threshold value supplied from the encoding side from the lossless decoding unit 302, acquire the threshold value information representing the before-updating threshold value by decoding the threshold value encoding information, determine the bit depth based on the information on the bit depth transmitted from the encoding side, the image information of the decoded image obtained from the frame memory 309, or the like as described above, and update the threshold value according to the bit depth. At this time, similarly, the updating of the threshold value may be performed by the bit-shifting.

In addition, in this case, the threshold value setting unit 321 may determine based on the value of the threshold value change flag transmitted from the encoding side whether or not the threshold value is updated.

Similarly to the case of the threshold value setting unit 121, the bit-shifting of the threshold value may be performed, for example, by the above-described Formula (10).

In addition, the threshold value setting unit 321 may golomb-decode the parameters or the flag transmitted as the golomb code.

In addition, the threshold value setting unit 321 may perform the setting (updating) of the threshold value based on arbitrary parameters other than the bit depth. In addition, although the initial value of the above-described threshold value is arbitrary, the initial value may be set to, for example, "8". In addition, in the case where "0" is set as the threshold value, the threshold value setting unit 321 prohibits the bi-linear interpolation process from being applied, so that the filtering process described with reference to FIG. 5 can be applied. Namely, in the case where the threshold value is "0", the method disclosed in Non-Patent Document may be disabled.

The filtering processing unit 322 performs intra prediction by the intra prediction unit 310, namely, performs the same process as that of the filtering processing unit 122 with respect to the intra prediction process at the time of decoding the encoded data where the image data are encoded. Namely, the filtering processing unit 322 acquires the threshold value information from the threshold value setting unit 321 and performs the filtering process on the neighboring pixels of the current block which is a target of the intra prediction process by the intra prediction unit 310 by using the threshold value. For example, the filtering processing unit 322 may perform the threshold value determining process expressed by Formulas (3) and (4) by using the threshold value acquired from the threshold value setting unit 321 to identify the features of the neighboring pixels of the current block.

In addition, for example, in the case where the determination result is false, that is, in the case where it is determined that the periphery of the current block is not a portion where the change of luminosity, color, density, or the like is planar, the filtering processing unit 322 may perform the filtering process (sometimes, referred to as a low pass filtering process) described with reference to FIG. 5 on the neighboring pixels.

In addition, for example, in the case where the determination result is true, that is, in the case where it is determined that the periphery of the current block is a portion where the change of luminosity, color, density, or the like is planar, the filtering processing unit 322 may perform the bi-linear interpolation process (sometimes, referred to as a bi-linear filtering process) expressed by Formulas (5) to (9) instead of the low pass filtering process.

Once the filtering processing unit 322 acquires the neighboring pixels of the current block which is a target of the intra prediction process from the intra prediction unit 310, the filtering processing unit performs the above-described filtering process on the neighboring pixels. Next, the filtering processing unit 322 supplies the after-filtering-process neighboring pixels to the intra prediction unit 310. In this case, the intra prediction unit 310 performs intra prediction by using the after-filtering-process neighboring pixels. By doing so, the intra prediction unit 310 can generate the predicted image which reflects the filtering process result.

Namely, as described above, since the threshold value setting unit. 321 can set the threshold value for identifying the features of the neighboring pixels of the current block in the intra prediction process at the time of decoding the image data according to the bit depth of the image data or the like, the intra prediction unit 310 can generate the predicted image reflecting the result of the filtering process appropriate to the image data. Namely, the image decoding device 300 can suppress occurrence of noise such as bending in the decoded image and can suppress a deterioration in image quality of the decoded image.

In addition, as described with reference to FIG. 5, Formulas (5) to (9), and the like, the method where the filtering processing unit 322 applies the filtering process to the neighboring pixels of the current block may be controlled according to the intra prediction mode (that is, the block size of the current block).

In addition, in the image decoding device 300, the upper limit of the bit depth with which the bi-linear filtering process disclosed in Non-Patent Document 2 is applied may also be provided. For example, it is possible that the bi-linear filtering process disclosed in Non-Patent Document 2 is applied only in the case where the bit depth is 8 bits, and is not applied in other cases.

Similarly, in the image decoding device 300, although the bi-linear filtering process disclosed in Non-Patent Document 2 may be applied to only the process for a brightness signal, the bi-linear filtering process may be applied to the process for a color difference signal. Namely, the present technique can be applied to the color difference signal as well as the brightness signal.

In addition, in the image decoding device 300, in the case where an input signal is 4:4:4 or RGB and each color component channel is independently process, the present technique may also be independently applied to each channel.

Furthermore, in addition, in the image decoding device 300, in the case of performing hierarchical image encoding (scalable encoding)/hierarchical image decoding (scalable decoding), for example, a threshold value or parameters such as a bit depth, a flag, or the like may be transmitted to only the base layer, and with respect to the non-base layer (enhancement layer), the parameter or the flag transmitted to the base layer may be referred to.

<Threshold Value Setting Unit/Filtering Process Unit>

Figure 24:
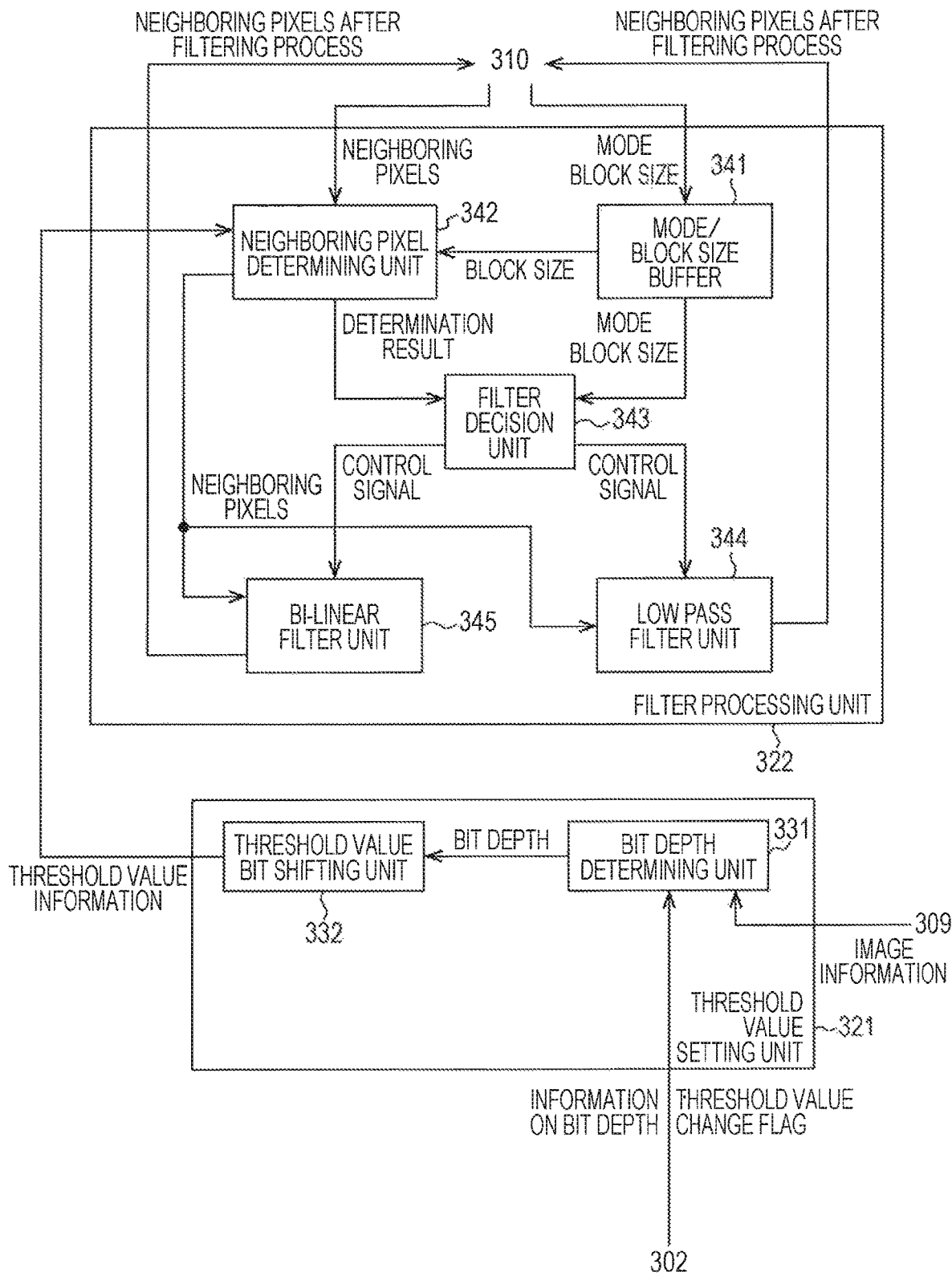
FIG. 24 is a block diagram illustrating a main configuration example of a threshold value setting unit and a filtering processing unit.

FIG. 24 is a block diagram illustrating a main configuration example of the threshold value setting unit 321 and the filtering processing unit 322 in the case where the threshold value setting unit 321 of FIG. 23 sets the threshold value according to the bit depth of the decoded image data.

In the example of FIG. 24, the threshold value setting unit 321 is configured to include a bit depth determining unit 331 and a threshold value bit shifting unit 332.

The bit depth determining unit 331 determines the bit depth of the image data and supplies the information representing the bit depth to the threshold value bit shifting unit 332.

For example, the bit depth determining unit 331 acquires the information on the bit depth of the image data transmitted, for example, as the sequence parameter set or the like from the encoding side (for example, the image encoding device 100) from the lossless decoding unit 302 and determines the bit depth of the image data based on the information on the bit depth. In addition, for example, the bit depth determining unit 331 acquires the image information of the decoded image from the frame memory 309 and determines the bit depth of the image data based on the image information.

The threshold value bit shifting unit 332 updates (changes) the threshold value by bit-shifting a predetermined threshold value (initial value) which is defined in advance according to the information representing the bit depth supplied from the bit depth determining unit 331.

For example, in the threshold value bit shifting unit 332, the value (the same value as the initial value set by the encoding side (for example, the image encoding device 100)) appropriate to the case where the bit depth is 8 bits is set as the initial value of the threshold value in advance. Once the threshold value bit shifting unit 332 acquires the information representing the bit depth from the bit depth determining unit 331, the threshold value bit shifting unit bit-shifts the initial value by a difference in the number of bits between the bit depth of the image data represented by the information and the 8 bits.

The threshold value bit shifting unit 332 supplies the information (threshold value information) representing the after-updating (changing) threshold value to the neighboring pixel determining unit 342 of the filtering processing unit 322.

In addition, as illustrated in FIG. 11, the filtering processing unit 322 is configured to include a mode/block size buffer 341, a neighboring pixel determining unit 342, a filter decision unit 343, a low pass filter unit 344, and a bi-linear filter unit 345.

The filtering processing unit 322 is the same processing unit as the filtering processing unit 122 and performs the same process. Namely, the mode/block size buffer 341, the neighboring pixel determining unit 342, the filter decision unit 343, the low pass filter unit 344, and the bi-linear filter unit 345 are the same processing units as the neighboring pixel determining unit 142, the filter decision unit 143, the low pass filter unit 144, and the bi-linear filter unit 145, respectively.

The mode/block size buffer 341 acquires the information (mode/block size) on the block size and the mode of the current block with respect to the prediction modes which are candidates from the intra prediction unit and stores the information.

At a predetermined timing or based on an external request, the mode/block size buffer 341 supplies the stored information (block size) on the block size to the neighboring pixel determining unit 342. In addition, at a predetermined timing or based on an external request, the mode/block size buffer 341 supplies the stored information (mode) on the mode and the stored information (block size) on the block size to the filter decision unit 343.

The neighboring pixel determining unit 342 acquires the neighboring pixels adjacent to the upper side and the left side of the current block with respect to the prediction modes which are candidates from the intra prediction unit 310. In addition, the neighboring pixel determining unit 342 acquires the threshold value information from the threshold value bit shifting unit 332. In addition, the neighboring pixel determining unit 342 acquires the information (block size) on the block size from the mode/block size buffer 341.

In the case of the mode where the current block has a predetermined size (for example, 32×32) (or a size within a predetermined range), the neighboring pixel determining unit 342 performs the threshold value determining process for selecting the filter which is to be used for the filtering process on the neighboring pixels acquired from the intra prediction unit 310 based on the information on the block size acquired from the mode/block size buffer 341 by using the threshold value information acquired from the threshold value bit shifting unit 332. Namely, the neighboring pixel determining unit 342 determines features of the neighboring pixels (for example, determines whether or not to be pixels of a portion where the change of luminosity, color, density, or the like is planar).

The neighboring pixel determining unit 342 supplies the determination result to the filter decision unit 343. In addition, the neighboring pixel determining unit 342 supplies the neighboring pixels of the current block acquired from the intra prediction unit 310 to the low pass filter unit 344 and the bi-linear filter unit 345.

The filter decision unit 343 acquires the information (mode) on the mode and the information (block size) on the block size from the mode/block size buffer 341. In addition, the filter decision unit 343 acquires the determination result of the threshold value determining process from the neighboring pixel determining unit 342. The filter decision unit 343 decides the type of the to-be-executed filtering process and the application method thereof by using the acquired information and result. For example, the filter decision unit 343 determines whether or not any of the low pass filtering process and the bi-linear filtering process is applied to the neighboring pixels of the current block, how to perform the filtering process, and the like.

The filter decision unit 343 supplies the control information which controls execution of the filtering process to the low pass filter unit 344 and the bi-linear filter unit 345 according to the decision. Namely, the filter decision unit 343 supplies control information indicating how to perform the filtering process to the processing unit selected between the low pass filter unit and the bi-linear filter unit 345 and supplies control information indicating to stop the filtering process (that is, control information indicating not to perform the filtering process) to the non-selected processing unit.

The low pass filter unit 344 performs the low pass filtering process described with reference to FIG. 5 on the neighboring pixels of the current block supplied from the neighboring pixel determining unit 342 according to the control information supplied from the filter decision unit 343. The low pass filter unit 344 supplies neighboring pixels (after-filtering-process neighboring pixels) which are applied with the low pass filtering process to the intra prediction unit 310.

The bi-linear filter unit 345 performs the bi-linear filtering process described with reference to Formulas (5) to (9) on the neighboring pixels of the current block supplied from the neighboring pixel determining unit 342 according to the control information supplied from the filter decision unit 343. The bi-linear filter unit 345 supplies the neighboring pixels (after-filtering-process neighboring pixels) which are applied with the bi-linear filtering process to the intra prediction unit 310.

By doing so, the threshold value setting unit 321 can set the threshold value according to the bit depth of the image data (appropriate to the bit depth), the filtering processing unit 322 can select the filter appropriate to the bit depth of the image data and perform the filtering process on the neighboring pixels by using the filter, and the intra prediction unit 310 can generate the predicted image by using the neighboring pixels applied with the filtering process appropriate to the bit depth of the image data. Namely, by doing so, the image decoding device 300 can suppress a deterioration in image quality of the decoded image.

<Flow of Decoding Process>

Next, an example of a flow of the decoding process performed by the image decoding device 300 described above will be described with reference to a flowchart of FIG. 25.

Once the decoding process is started, in step S301, the accumulation buffer 301 accumulates the transmitted bitstream. In step S302, the lossless decoding unit 302 decodes the bitstream (encoded difference image information) supplied from the accumulation buffer 301. Namely, the I pictures, the P pictures, and the B pictures which are encoded by the lossless encoding unit 106 of FIG. 10 are decoded. At this time, various types of information other than the difference image information included in the bitstream such as the header information are also decoded.

In step S303, the threshold value setting unit 321 sets the threshold value for identifying the features of the neighboring pixels of the current block in the intra prediction process at the time of decoding the encoded data where the image data are encoded.

In step S304, the inverse quantization unit 303 performs inverse quantization on the quantized coefficient obtained by the process of step S302.

In step S305, the inverse orthogonal transform unit 304 performs inverse orthogonal transform on the coefficient inversely quantized in step S304.

In step S306, the intra prediction unit 310 or the inter prediction unit 311 performs the prediction process and generates the predicted image. Namely, the prediction process is performed in the prediction mode which is determined in the lossless decoding unit 302 and applied at the time of encoding. More specifically, for example, in the case where the intra prediction is applied at the time of encoding, the intra prediction unit 310 generates the predicted image in the intra prediction mode which is considered to be optimal at the time of encoding. In addition, for example, in the case where the inter prediction is applied at the time of encoding, the inter prediction unit 311 generates the predicted image in the inter prediction mode which is considered to be optimal at the time of encoding.

Here, in the case where the intra prediction unit 310 performs the intra prediction, the filtering processing unit 322 may perform the filtering process on the neighboring pixels of the current block by using the threshold value set in step S303. In the case where the filtering process is performed, the intra prediction unit performs the intra prediction by using the neighboring pixels which are applied to the filtering process.

In step S307, the arithmetic unit 305 adds the predicted image generated in step S306 to the difference image information obtained by performing inverse orthogonal transform in step S305. Therefore, the original image is decoded.

In step S308, the loop filter 306 appropriately performs the loop filtering process including a deblocking filtering process, an adaptive loop filtering process, and the like on the reconstructed image obtained by the process of step S307.

In step S309, the screen rearrangement buffer 307 performs rearrangement on the image which is applied with the filtering process in step S308. Namely, the frame order rearranged for encoding is rearranged to the original display order by the screen rearrangement buffer of the image encoding device 100.

In step S310, the D/A converter 308 D/A-converts the image of which frame order is rearranged in step S309. The image is output to a display (not shown), so that the image is displayed.

In step S311, the frame memory 309 stores the image which is applied with the filtering process in step S308.

Once the process of step S311 is ended, the decoding process is ended.

<Flow of Threshold Value Setting Process>

Next, an example of a flow of the threshold value setting process performed in step S303 of FIG. 25 in an example where the threshold value setting unit 321 of the example of FIG. 24 determines the bit depth of the image data based on the information on the bit depth transmitted as the sequence parameter set or the like from the encoding side will be described with reference to a flowchart of FIG. 26. In addition, in FIG. 26, the case where the threshold value change flag is transmitted to the encoding side will be described.

Once the threshold value setting process is started, in step S331, the bit depth determining unit 331 acquires the threshold value change flag transmitted from the encoding side (for example, image encoding device 100) from the lossless decoding unit 302.

In step S332, the bit depth determining unit 331 determines based on the value of the threshold value change flag acquired in step S331 whether or not to set the initial value which is prepared in advance as the threshold value. In the case where it is determined that the threshold value is updated, the procedure proceeds to step S333.

In step S333, the bit depth determining unit 331 acquires the information on the bit depth transmitted as, for example, a sequence parameter set (SPS) or the like from the encoding side from the lossless decoding unit 302.

In step S334, the bit depth determining unit 331 determines the bit depth of the image data based on the information on the bit depth acquired in step S333.

In step S335, the threshold value bit shifting unit bit-shifts the threshold value (initial value) according to the determination result (determined bit depth) of step S334. The threshold value bit shifting unit 332 supplies the after-updating threshold value to the neighboring pixel determining unit 342 of the filtering processing unit 322.

Figure 25:
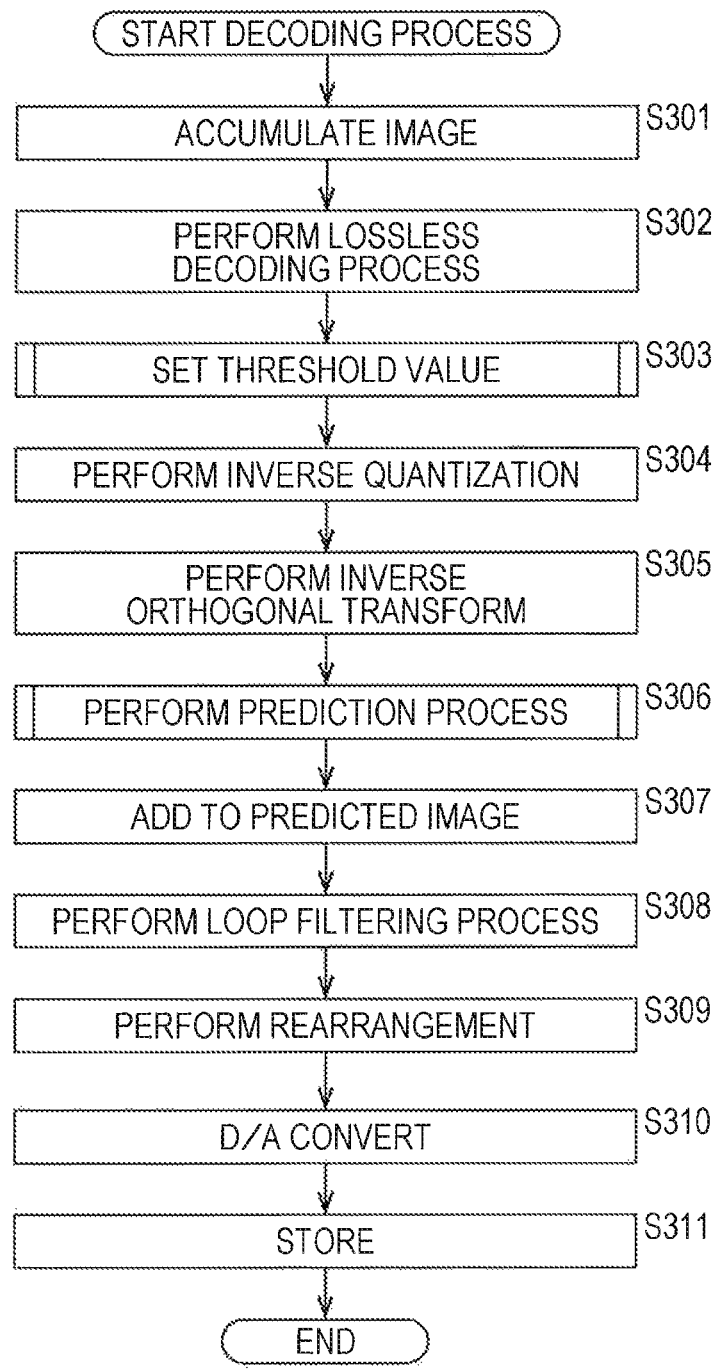
FIG. 25 is a flowchart illustrating an example of a flow of a decoding process.

Once the process of step S335 is ended, the threshold value setting process is ended, and the procedure returns to FIG. 25. In addition, in the case where it is determined in step S331 that the initial value is set as the threshold value, the threshold value setting process is ended, and the procedure returns to FIG. 25.

By performing the above-described threshold value setting process, the threshold value setting unit 321 can set the threshold value according to the bit depth of the image data (appropriate to the bit depth).

In addition, in the case where the threshold value change flag is not transmitted to the encoding side, the above-described processes of step S331 may be omitted. In this case, the determination of step S332 is performed based on the information other than the threshold value change flag, for example, the information on the bit depth or the like.

<Flow of Prediction Process>

Next, an example of a flow of the prediction process performed in step S306 of FIG. 25 will be described with reference to a flowchart of FIG. 27.

Once the prediction process is started, in step S351, the lossless decoding unit 302 determines based on the optimal prediction mode information or the like transmitted from the encoding side whether or not the optimal prediction mode is the intra prediction mode. In the case where it is determined that the optimal prediction mode is the intra prediction, the procedure proceeds to step S352.

In step S352, the intra prediction unit 310 performs the intra prediction to generate the predicted image. At this time, in some cases, the filtering processing unit 322 may perform the filtering process on the neighboring pixels of the current block by using the threshold value set in step S303 of FIG. 25. In the case where the filtering process is performed, the intra prediction unit 310 performs the intra prediction by using the neighboring pixels which are applied with the filtering process. Once the process of step S352 is ended, the prediction process is ended, and the procedure returns to FIG. 25.

In addition, in the case where it is determined in step S351 that the optimal prediction mode is the inter prediction, the procedure proceeds to step S353.

In step S353, the inter prediction unit 311 performs the inter prediction to generate the predicted image. Namely, the inter prediction unit 311 performs the compensation process or the like by using the motion vector information or the like transmitted from the encoding side to generate the predicted image. Once the process of step S353 is ended, the prediction process is ended, and the procedure returns to FIG. 25.

<Flow of Intra Prediction Process>

Next, an example of a flow of the intra prediction process performed in step S352 of FIG. 27 will be described with reference to a flowchart of FIG. 28.

Once the intra prediction process is started, in step S371, the intra prediction unit 310 acquires the intra mode information representing the optimal intra prediction mode (the employed intra prediction mode) transmitted as the optimal prediction mode information from the encoding side from the lossless decoding unit 302.

In step S372, the neighboring pixel determining unit 342 determines features (for example, whether or not a periphery of the current block is a portion where luminosity, color, density, or the like is planar) of the neighboring pixels of the current block acquired from the intra prediction unit 310 based on the block size acquired from the mode/block size buffer 341 and the threshold value information acquired from the threshold value bit shifting unit 332.

In step S373, the filter decision unit 343 decides the filter which is to be used for the neighboring pixels of the current block based on the mode and the block size acquired from the mode/block size buffer 341 and the determination result of step S372.

In step S374, the filter unit selected among the low pass filter unit 344 and the bi-linear filter unit by the process of step S373 performs the filtering process on the neighboring pixels of the current block. For example, in the case where the low pass filter is selected in step S373, in step S374, the low pass filter unit 344 performs the low pass filtering process on the neighboring pixels in the method decided by the filter decision unit 343. In addition, for example, in the case where the bi-linear filter is selected in step S373, in step S374, the bi-linear filter unit 345 performs the bi-linear filtering process on the neighboring pixels in the method decided by the filter decision unit 343.

In addition, these filtering processes may be omitted in some modes.

In step S375, the intra prediction unit 310 performs the intra prediction in the optimal intra prediction mode designated in the intra mode information acquired in step S351 by using the neighboring pixels which are applied with the filtering process in step S374 (in the case where the filtering process is omitted, the neighboring pixels which are not applied with the filtering process) to generate the predicted image.

Figure 27:
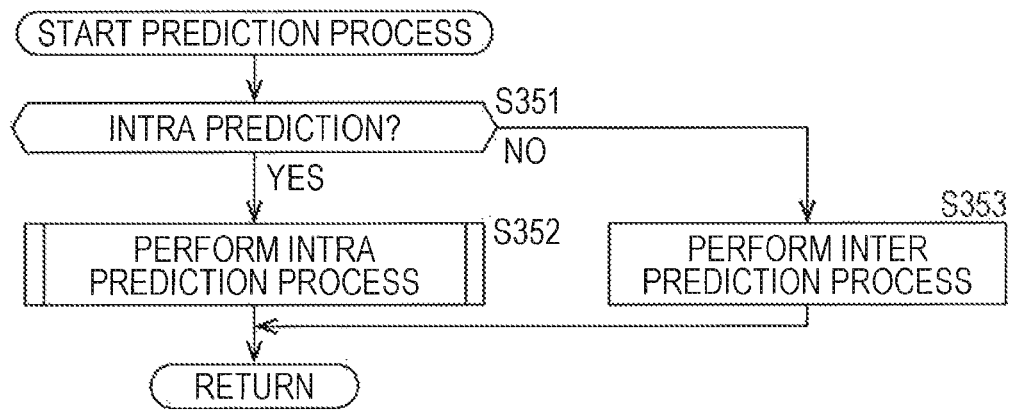
FIG. 27 is a flowchart illustrating an example of a flow of a prediction process.
Figure 28:
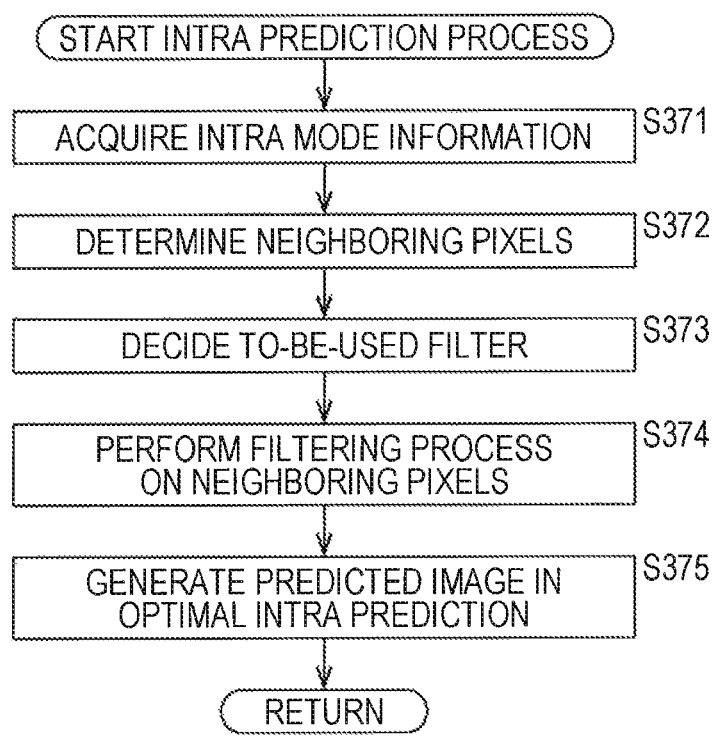

Once the process of step S375 is ended, the intra prediction process is ended, and the procedure returns to FIG. 27.

By performing the above-described intra prediction process, the filtering processing unit 322 can select the filter appropriate to the bit depth of the image data and perform the filtering process on the neighboring pixels by using the filter, and the intra prediction unit 310 can generate the predicted image by using the neighboring pixels which are applied with the filtering process appropriate to the bit depth of the image data.

Namely, by performing the above-described processes, the image decoding device 300 can suppress a deterioration in image quality of the decoded image.

<Flow of Threshold Value Setting Process>

Next, an example of a flow of the threshold value setting process performed in step S303 of FIG. 25 in an example where the threshold value setting unit 321 of the example of FIG. 24 determines the bit depth of the image data based on the image information will be described with reference to a flowchart of FIG. 29. In addition, in FIG. 29, the case where the threshold value change flag is transmitted to the encoding side will be described.

Figure 26:
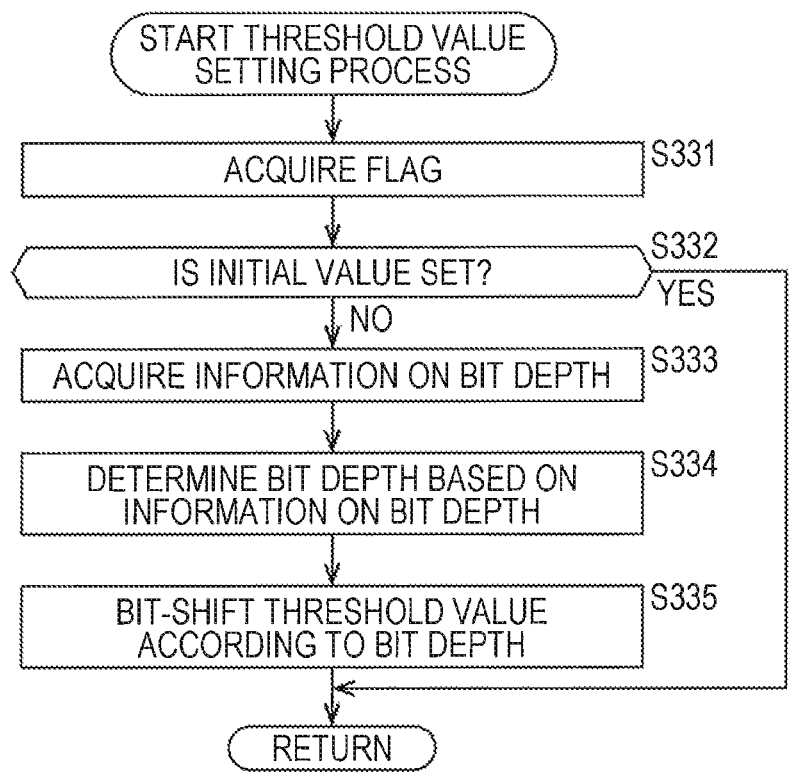
FIG. 26 is a flowchart illustrating an example of a flow of a threshold value setting process.
Figure 29:
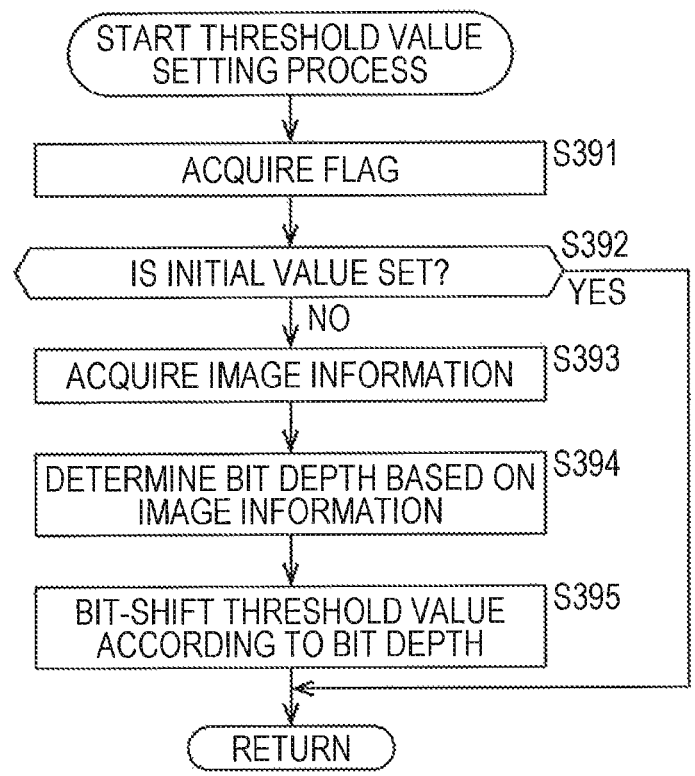
FIG. 29 is a flowchart illustrating another example of a flow of a threshold value setting process.

In the case of the example of FIG. 29, processes of steps S391, S392, and S395 are performed similarly to the processes of steps S331, S332, and S335 of the example of FIG. 26.

In the case where it is determined in step S392 of FIG. 29 that the threshold value is updated, the procedure proceeds to step S393.

In step S393, the bit depth determining unit 331 acquires the image information of the decoded image from the frame memory 309.

In step S394, the bit depth determining unit 331 determines bit depth of the image data based on the image information acquired in step S393. Once the process of step S394 is ended, the procedure proceeds to step S395.

Once the process of step S395 is ended, the threshold value setting process is ended, and the procedure returns to FIG. 25. In addition, in the case where it is determined in step S392 that the initial value is set as the threshold value, the threshold value setting process is ended, and the procedure returns to FIG. 25.

By doing so, the threshold value setting unit 321 can set the threshold value according to the bit depth of the image data (appropriate to the bit depth). Therefore, in this case, the image decoding device 300 can also suppress a deterioration in image quality of the decoded image.

In addition, in the case where the threshold value change flag is not transmitted to the encoding side, the above-described processes of step S391 may be omitted. In this case, the determination of step S392 is performed based on the information other than the threshold value change flag, for example, the image information or the like.

<Threshold Value Setting Unit/Filtering Process Unit>

Figure 30:
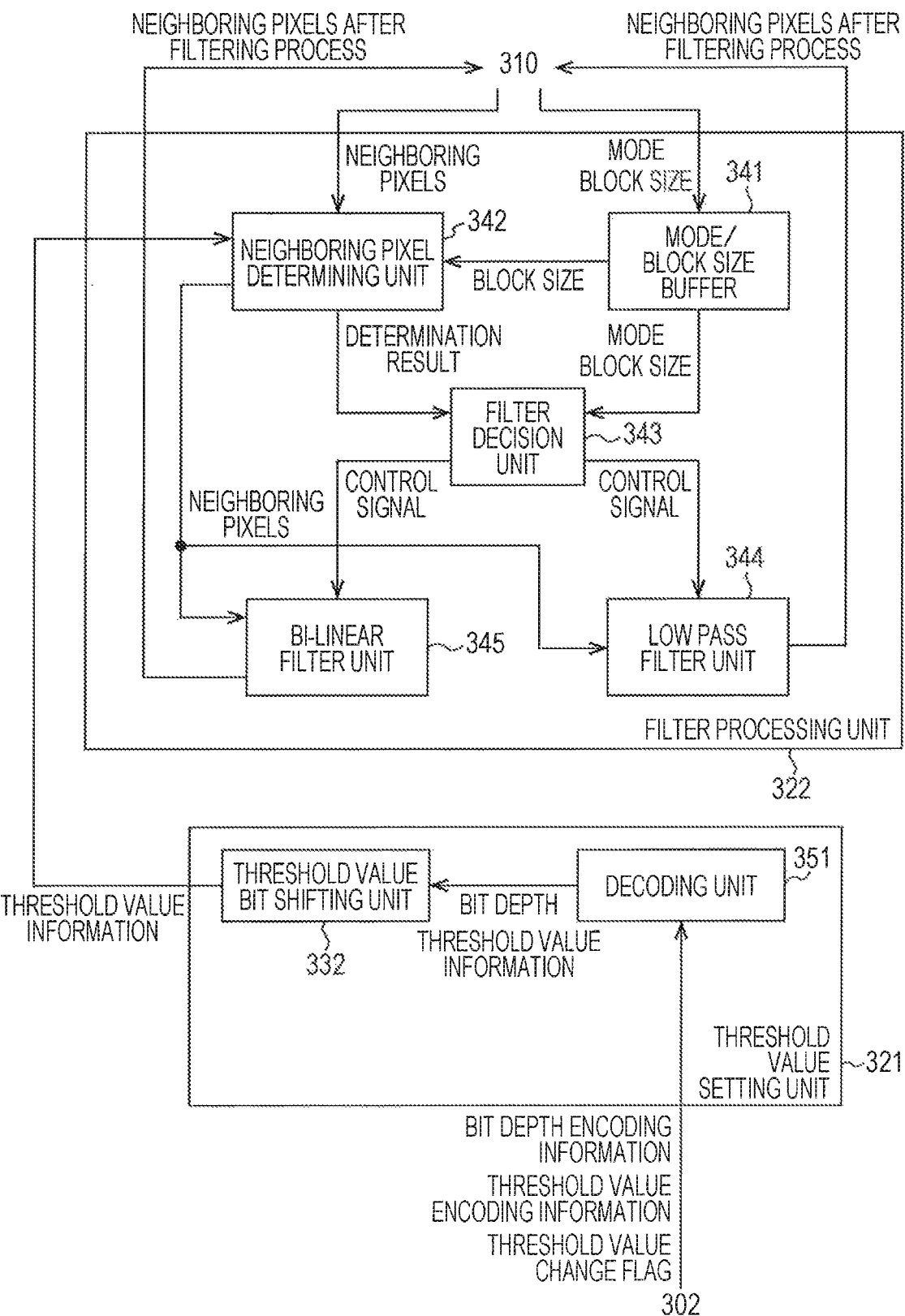
FIG. 30 is a block diagram illustrating another configuration example of a threshold value setting unit and a filtering processing unit.

FIG. 30 is a block diagram illustrating a main configuration example of the threshold value setting unit and the filtering processing unit 322 in the case where the threshold value setting unit 321 of FIG. 23 sets the threshold value based on the bit depth transmitted from the encoding side.

In the example of FIG. 30, the threshold value setting unit 321 is configured to include a decoding unit and a threshold value bit shifting unit 332.

The decoding unit 351 acquires the bit depth encoding information transmitted from the encoding side and decodes the bit depth encoding information to obtain information representing the bit depth. For example, the decoding unit 351 golomb-decodes the bit depth encoding information which is a golomb code to obtain the information representing the bit depth. The decoding unit 351 supplies the information representing the obtained bit depth to the threshold value bit shifting unit 332.

The threshold value bit shifting unit 332 bit-shifts a predetermined threshold value (initial value) according to the information representing the bit depth supplied from the decoding unit 351. The threshold value bit shifting unit 332 supplies the threshold value information representing the after-bit-shifting threshold value (after-updating threshold value) to the neighboring pixel determining unit 342.

In addition, the decoding unit 351 may further acquire the threshold value change flag transmitted from the encoding side from the lossless decoding unit 302 and determine whether or not to update the threshold value according to the value.

In addition, the decoding unit 351 may further acquire the threshold value encoding information transmitted from the encoding side and decode the threshold value encoding information to obtain the threshold value information representing the before-updating threshold value. For example, the decoding unit may golomb-decode the threshold value encoding information which is a golomb code to obtain the threshold value information representing the before-updating threshold value set in the encoding side. In this case, the decoding unit 351 supplies the obtained threshold value information to the threshold value bit shifting unit 332.

In this case, the threshold value bit shifting unit bit-shifts the before-updating threshold value representing the threshold value information supplied from the decoding unit 351 according to the information representing the bit depth supplied from the decoding unit 351. The threshold value bit shifting unit 332 supplies the threshold value information representing the after-bit-shifting threshold value (after-updating threshold value) to the neighboring pixel determining unit 342.

In addition, the filtering processing unit 322 has the same configuration as that of the case of FIG. 24 and performs the same processes as those of the case of FIG. 24.

By doing so, the threshold value setting unit 321 can set the threshold value according to the bit depth of the image data (appropriate to the bit depth), the filtering processing unit 122 can select the filter appropriate to the bit depth of the image data and perform the filtering process on the neighboring pixels by using the filter, and the intra prediction unit 310 can generate the predicted image by using the neighboring pixels which are applied with the filtering process appropriate to the bit depth of the image data. Namely, by doing so, the image decoding device 300 can suppress a deterioration in image quality of the decoded image.

In addition, in the case of the example of FIG. 30, since the threshold value setting unit 321 can use the threshold value set in the encoding side, the intra prediction unit 310 can reflect designation of the image quality by the encoding side on the predicted image. Namely, the image decoding device 300 can reflect control of the image quality by the encoding side on the decoded image.

<Flow of Threshold Value Setting Process>

Next, an example of a flow of the threshold value setting process performed in step S303 of FIG. 25 in an example where the threshold value setting unit 321 of the example of FIG. 30 updates the threshold value based on the bit depth designated in the encoding side will be described with reference to a flowchart of FIG. 31. In addition, in FIG. 31, the case where the threshold value change flag is transmitted to the encoding side will be described.

Figure 31:
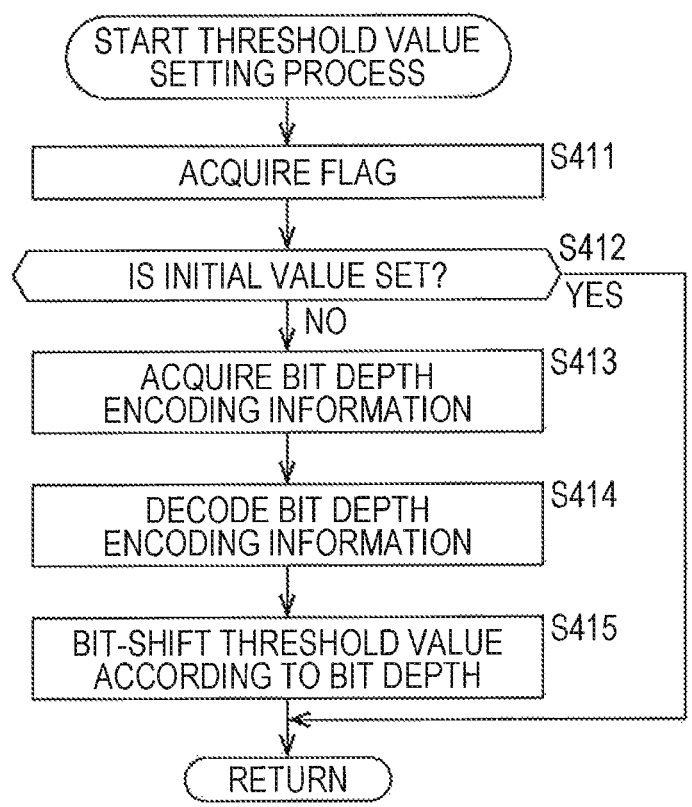
FIG. 31 is a flowchart illustrating still another example of a flow of a threshold value setting process.

In the case of the example of FIG. 31, processes of steps S411 and 3412 are performed similarly to the processes of steps S331 and S332 of the example of FIG. 26.

In the case where it is determined in step S412 of FIG. 31 that the threshold value is updated, the procedure proceeds to step S413.

In step S413, the decoding unit 351 acquires the bit depth encoding information from the lossless decoding unit 302.

In step S414, the decoding unit 351 decodes the bit depth encoding information acquired in step S413.

In step S415, the threshold value bit shifting unit 332 bit-shifts the threshold value (initial value) which is prepared in advance according to the bit depth obtained in step S414.

Once the process of step S415 is ended, the threshold value setting process is ended, and the procedure returns to FIG. 25. In addition, in the case where it is determined in step S412 that the initial value is set as the threshold value, the threshold value setting process is ended, and the procedure returns to FIG. 25.

By doing so, the threshold value setting unit 321 can set the threshold value according to the bit depth of the image data (appropriate to the bit depth). Therefore, in this case, the image decoding device 300 can also suppress a deterioration in image quality of the decoded image.

In addition, in the case where the threshold value change flag is transmitted to the encoding side, the above-described processes of step S411 may be omitted. In this case, the determination of step S412 is performed based on the information other than the threshold value change flag such as the bit depth encoding information.

<Flow of Threshold Value Setting Process>

Next, an example of a flow of the threshold value setting process performed in step S303 of FIG. 25 in an example where the threshold value setting unit 321 of the example of FIG. 30 updates the threshold value designated in the encoding side based on the bit depth designated in the encoding side will be described with reference to a flowchart of FIG. 32. In addition, in FIG. 32, the case where the threshold value change flag is transmitted to the encoding side will be described.

Figure 32:
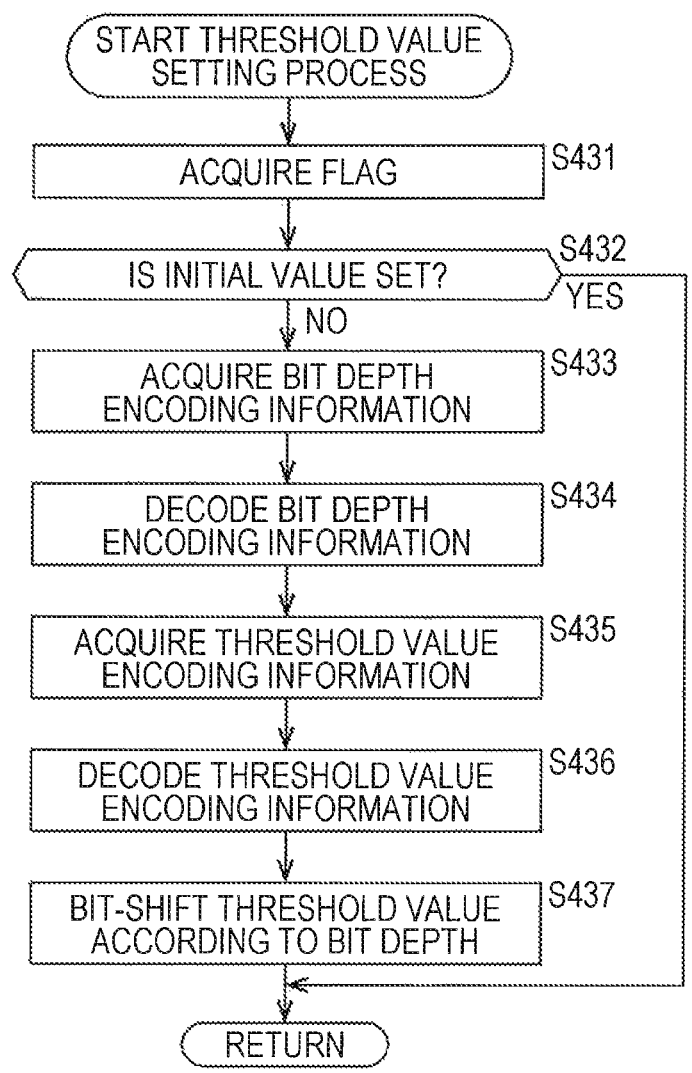
FIG. 32 is a flowchart illustrating still another example of a flow of a threshold value setting process.

In the case of the example of FIG. 32, processes of steps S431 to S434 are performed similarly to the processes of steps S411 to S414 of the example of FIG. 31.

Once the process of step S434 of FIG. 32 is ended, the procedure proceeds to step S435.

In step S435, the decoding unit 351 acquires the threshold value encoding information from the lossless decoding unit 302.

In step S436, the decoding unit 351 decodes the threshold value encoding information acquired in step S435 to the threshold value information representing the before-updating threshold value.

In step S437, the threshold value bit shifting unit 332 bit-shifts the before-updating threshold value obtained in step S436 according to the bit depth obtained in step S434.

Once the process of step S437 is ended, the threshold value setting process is ended, and the procedure returns to FIG. 25. In addition, in the case where it is determined in step S432 that the initial value is set as the threshold value, the threshold value setting process is ended, and the procedure returns to FIG. 25.

By doing so, the threshold value setting unit 321 can set the threshold value according to the bit depth of the image data (appropriate to the bit depth). Therefore, in this case, the image decoding device 300 can suppress a deterioration in image quality of the decoded image.

In addition, the threshold value setting unit 321 can use the threshold value set in the encoding side. Therefore, the image decoding device 300 can reflect the control of the image quality by the encoding side on the decoded image.

In addition, in the case where the threshold value change flag is not transmitted from the encoding side, the above-described process of step S431 may be omitted. In this case, the determination of step S432 is performed based on the information other than the threshold value change flag, for example, bit depth encoding information, threshold value encoding information, or the like.

<Threshold Value Setting Unit/Filtering Process Unit>

Figure 33:
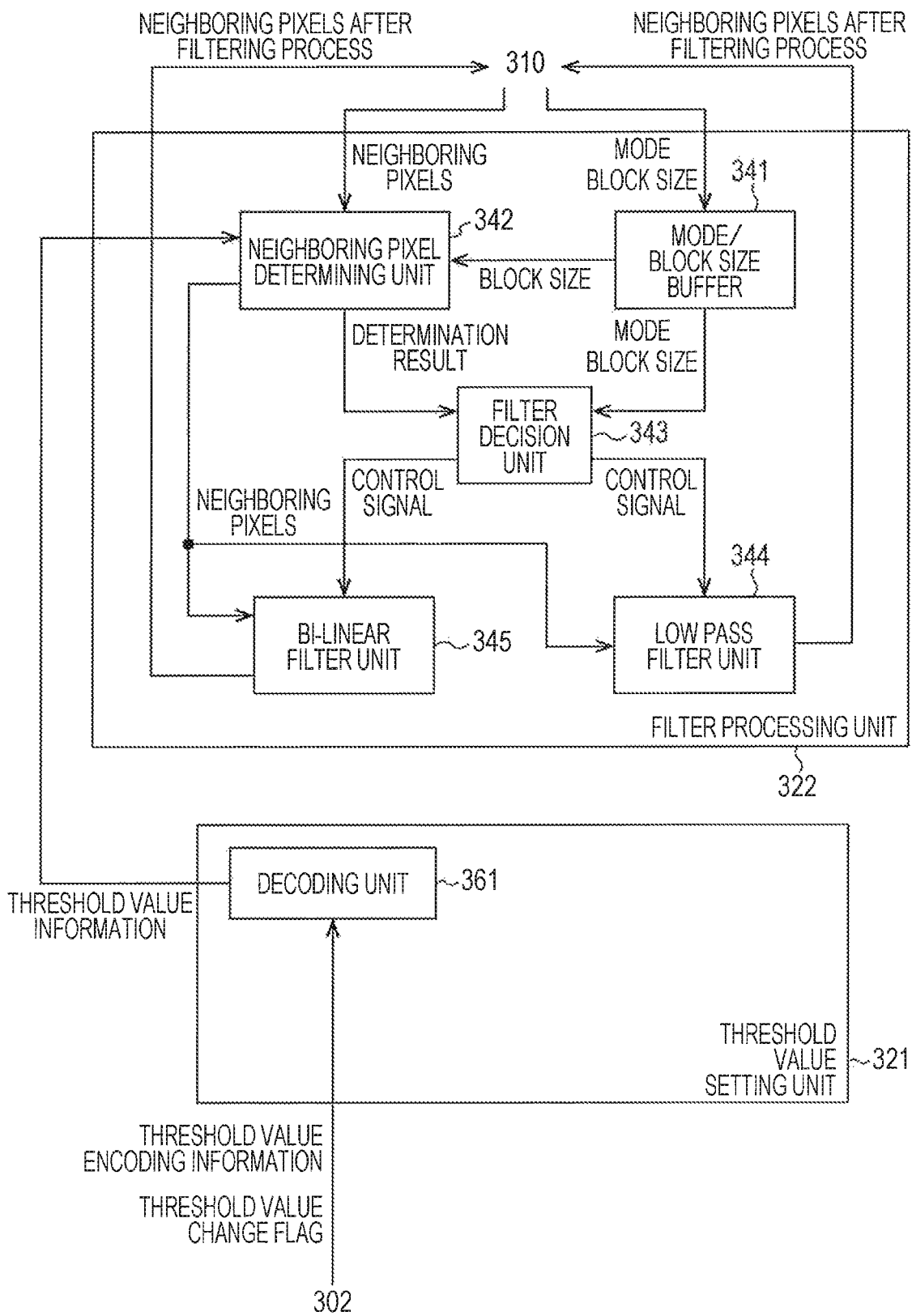
FIG. 33 is a block diagram illustrating still another configuration example of a threshold value setting unit and a filtering processing unit.

FIG. 33 is a block diagram illustrating a main configuration example of the threshold value setting unit 321 and the filtering processing unit 322 in the case where the threshold value setting unit 321 of FIG. 23 sets the after-updating threshold value transmitted from the encoding side as the threshold value which is to be used in the filtering processing unit 322.

In the example of FIG. 33, the threshold value setting unit 321 is configured to include a decoding unit 361.

The decoding unit 361 acquires the threshold value encoding information transmitted from the encoding side and decodes the threshold value encoding information to obtain the threshold value information representing the after-updating threshold value. For example, the decoding unit 361 golomb-decodes the threshold value encoding information which is a golomb code to obtain the threshold value information. The decoding unit 361 supplies the threshold value information representing the after-updating threshold value which is obtained in this manner to the neighboring pixel determining unit 342.

In addition, the decoding unit 361 may further acquire the threshold value change flag transmitted from the encoding side from the lossless decoding unit 302 and determine whether or not to update the threshold value according to the value.

In addition, the filtering processing unit 322 has the same configuration as that of the case of FIG. 24 and performs the same processes as those of the case of FIG. 24.

By doing so, since the threshold value setting unit 321 can set the threshold value set in the encoding side as the threshold value which is to be used by the filtering processing unit 322, the intra prediction unit 310 can reflect the designation of the image quality by the encoding side on the predicted image. Namely, the image decoding device 300 can reflect the control of the image quality by the encoding side on the decoded image.

<Flow of Threshold Value Setting Process>

Next, an example of a flow of the threshold value setting process performed in step S303 of FIG. 25 in an example where the threshold value setting unit 321 of the example of FIG. 30 sets the threshold value updated in the encoding side as the threshold value which is to be used by the filtering processing unit 322 will be described with reference to a flowchart of FIG. 34. In addition, in FIG. 34, the case where the threshold value change flag is transmitted to the encoding side will be described.

Figure 34:
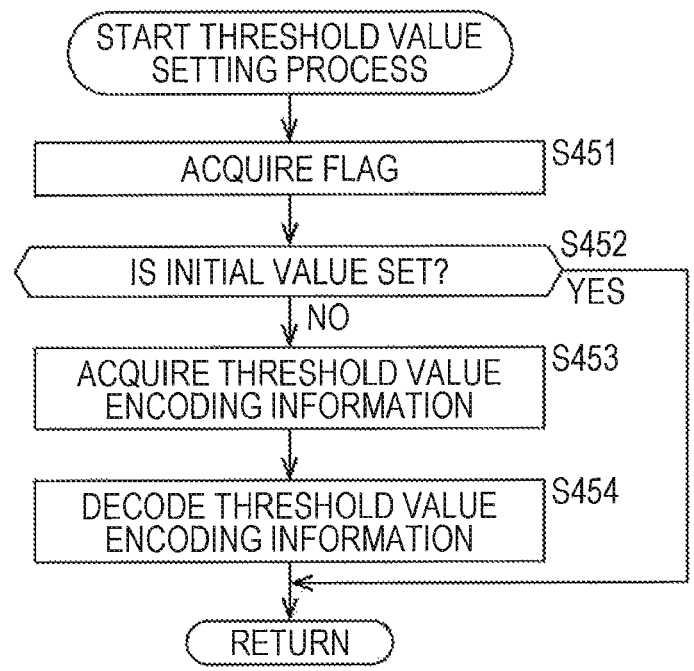
FIG. 34 is a flowchart illustrating still another example of a flow of a threshold value setting process.

In the case of the example of FIG. 34, processes of steps S451 and S452 are performed similarly to the processes of steps S431 and S432 of the example of FIG. 32.

In the case where it is determined in step S452 of FIG. 34 that the after-updating threshold value is updated, the procedure proceeds to step S453.

In step S453, the decoding unit 361 acquires the threshold value encoding information from the lossless decoding unit 302.

In step S454, the decoding unit 361 decodes the threshold value encoding information acquired in step S453 and acquires the threshold value information representing the threshold value updated in the encoding side.

Once the process of step S454 is ended, the threshold value setting process is ended, and the procedure returns to FIG. 25. In addition, in the case where it is determined in step S452 that the initial value is set as the threshold value, the threshold value setting process is ended, and the procedure returns to FIG. 25.

By doing so, the threshold value setting unit 321 can also use the threshold value set in the encoding side. Therefore, the image decoding device 300 can reflect the control of the image quality by the encoding side on the decoded image.

In addition, in the case where the threshold value change flag is not transmitted to the encoding side, the above-described processes of step S451 may be omitted. In this case, the determination of step S452 is performed based on the information other than the threshold value change flag, for example, the threshold value encoding information or the like.

<Threshold Value Setting Unit/Filtering Process Unit>

Figure 35:
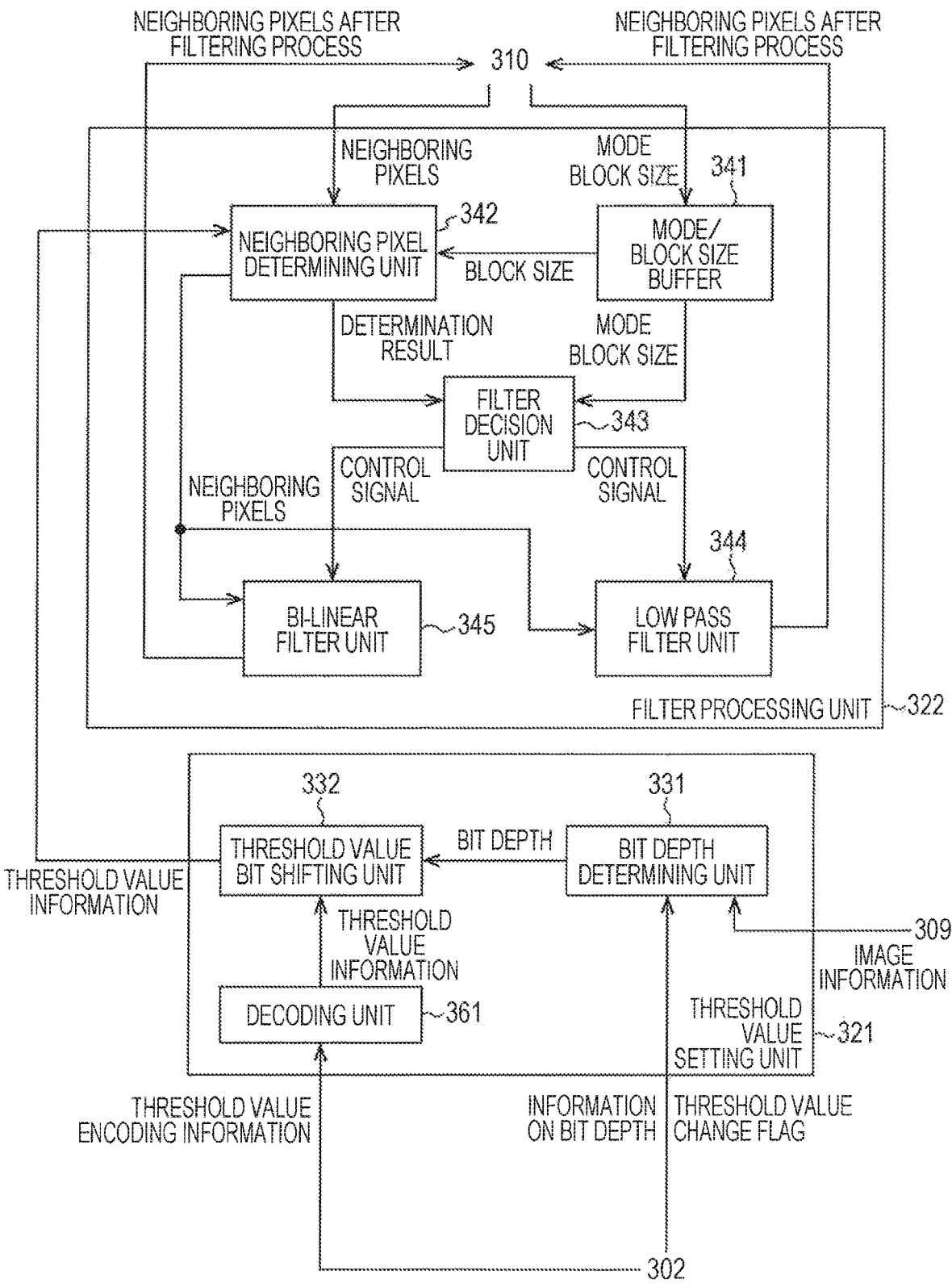
FIG. 35 is a block diagram illustrating still another configuration example of a threshold value setting unit and a filtering processing unit.

FIG. 35 is a block diagram illustrating a main configuration example of the threshold value setting unit 321 and the filtering processing unit 322 in the case where the threshold value setting unit 321 of FIG. 23 updates the before-updating threshold value transmitted from the encoding side bit depth of the decoded image data.

In the case of the example of FIG. 35, the threshold value setting unit 321 is configured to include a bit depth determining unit 331, a threshold value bit shifting unit 332, and a decoding unit 351.

The bit depth determining unit 331 acquires the information on the bit depth of the image data transmitted, for example, as the sequence parameter set or the like from the encoding side (for example, the image encoding device 100) from the lossless decoding unit 302 and determines the bit depth of the image data based on the information on the bit depth. In addition, for example, bit depth determining unit 331 acquires the image information of the decoded image from the frame memory 309 and determines the bit depth of the image data based on the image information. The bit depth determining unit 331 supplies the information representing the bit depth which is determined in this manner to the threshold value bit shifting unit 332.

The decoding unit 351 acquires the threshold value encoding information transmitted from the encoding side and decodes the threshold value encoding information to obtain the threshold value information representing the before-updating threshold value. For example, the decoding unit 351 golomb-decodes the threshold value encoding information which is a golomb code to obtain the threshold value information. The decoding unit 351 supplies the threshold value information representing the before-updating threshold value which is obtained in this manner to the threshold value bit shifting unit 332.

The threshold value bit shifting unit 332 updates (changes) the threshold value set in the encoding side by bit-shifting the before-updating threshold value supplied from the decoding unit 351 according to the information representing the bit depth supplied from the bit depth determining unit 331.

For example, the threshold value having the value appropriate to the case where the bit depth is 8 bits is supplied as the before-updating threshold value set in the encoding side from the decoding unit 351 to the threshold value bit shifting unit 332. Once the threshold value bit shifting unit 332 acquires the information representing the bit depth from the bit depth determining unit 331, the threshold value bit shifting unit bit-shifts the before-updating threshold value by a difference in the number of bits between the bit depth of the image data represented by the information and the 8 bits.

The threshold value bit shifting unit 332 supplies the information (threshold value information) representing the after-updating (changing) threshold value to the neighboring pixel determining unit 342 of the filtering processing unit 322.

In addition, the bit depth determining unit 331 may further acquire the threshold value change flag transmitted from the encoding side from the lossless decoding unit 302 and determine whether or not to update the threshold value according to the value.

In addition, the filtering processing unit 322 has the same configuration as that of the case of FIG. 24 and performs the same processes as those of the case of FIG. 24.

By doing so, the threshold value setting unit 321 can update the threshold value set in the encoding side according to the bit depth of the image data, the filtering processing unit 122 can select the filter appropriate to the bit depth of the image data and perform the filtering process on the neighboring pixels by using the filter, and the intra prediction unit 310 can generate the predicted image by using the neighboring pixels which are applied with the filtering process appropriate to the bit depth of the image data. Namely, by doing so, the image decoding device 300 can suppress a deterioration in image quality of the decoded image.

<Flow of Threshold Value Setting Process>

Next, an example of a flow of the threshold value setting process performed in step S303 of FIG. 25 in an example where the threshold value setting unit 321 of the example of FIG. 35 updates the threshold value set in the encoding side based on the bit depth of the image data will be described with reference to a flowchart of FIG. 36. In addition, in FIG. 36, the case where the threshold value change flag is transmitted to the encoding side will be described.

Figure 36:
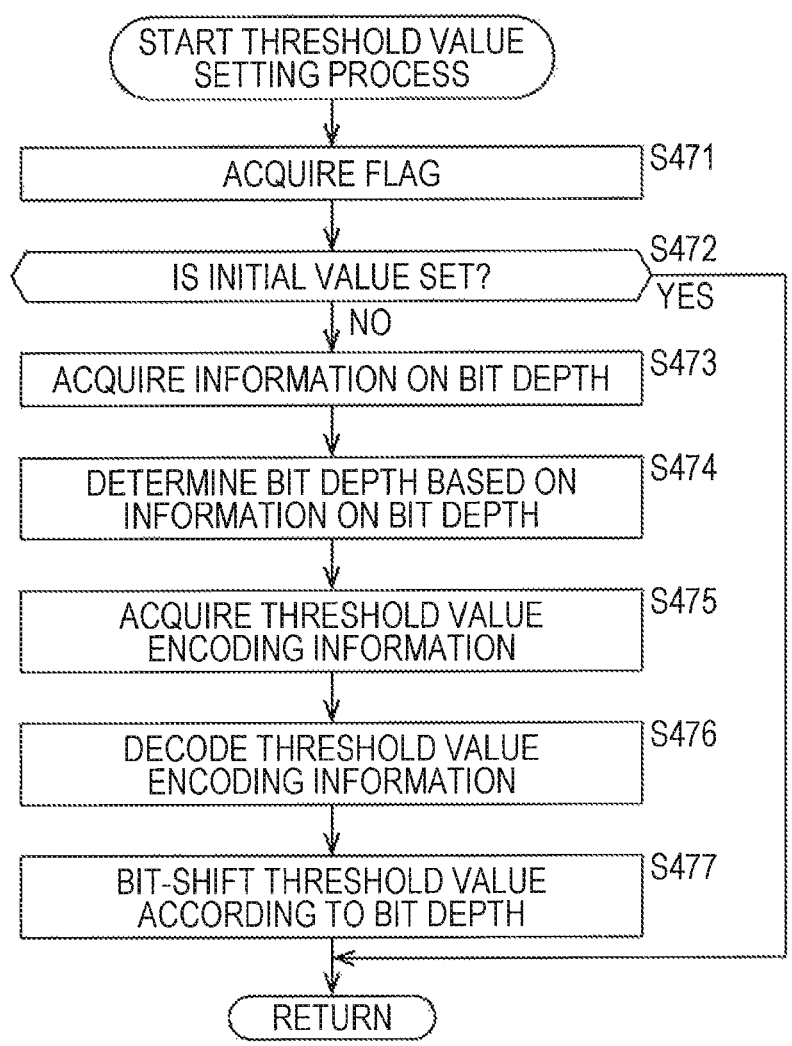
FIG. 36 is a flowchart illustrating still another example of a flow of a threshold value setting process.

In the case of the example of FIG. 36, processes of steps S471 to S474 are performed similarly to the processes of steps S331 to S334 of the example of FIG. 26.

In addition, in the case of the example of FIG. 36, processes of steps S475 and S476 are performed similarly to the processes of steps S435 and S436 of the example of FIG. 32.

Once the process of step S476 of FIG. 36 is ended, the procedure proceeds to step S477.

In step S477, the threshold value bit shifting unit 332 bit-shifts the before-updating threshold value obtained in step S476 according to the bit depth obtained in step S474.

Once the process of step S477 is ended, the threshold value setting process is ended, and the procedure returns to FIG. 25. In addition, in the case where it is determined in step S472 that the initial value is set as the threshold value, the threshold value setting process is ended, and the procedure returns to FIG. 25.

By doing so, the threshold value setting unit 321 can set the threshold value according to the bit depth of the image data (appropriate to the bit depth). Therefore, in this case, the image decoding device 300 can also suppress a deterioration in image quality of the decoded image.

In addition, the threshold value setting unit 321 can use the threshold value set in the encoding side. Therefore, the image decoding device 300 can reflect the control of the image quality by the encoding side on the decoded image.

In addition, in the case where the threshold value change flag is not transmitted to the encoding side, the above-described process of step S471 may be omitted. In this case, the determination of step S472 is performed based on the information other than the threshold value change flag, for example, the information on the bit depth, the threshold value encoding information, or the like.

In addition, in the case where the bit depth determining unit 331 determines the bit depth based on the image information, instead of the processes of steps S473 and S474, the processes of steps S393 and S394 of FIG. 29 may be performed.

As described above, the present technique can be applied to all image encoding devices and all image decoding devices that encode/decode an image by using the intra prediction.

In addition, the present technique can be applied to image encoding devices and image decoding devices that are used at the time of receiving image information (bitstream) compressed by orthogonal transform such as discrete cosine transform and motion compensation through a network medium such as satellite broadcasting, cable television, the Internet, or mobile phones for example, like MPEG, H.26x, or the like. In addition, the present technique can be applied to image encoding devices and image decoding devices that are used at the time of performing processes on a storage medium such as an optical disk, a magnetic disk, and a flash memory. In addition, the present technique can be applied to intra prediction apparatuses included in the image encoding devices, the image decoding devices, or the like.

3. Third Embodiment

Application to Multi-Viewpoint Image Encoding/Multi-Viewpoint Image Decoding

Figure 37:
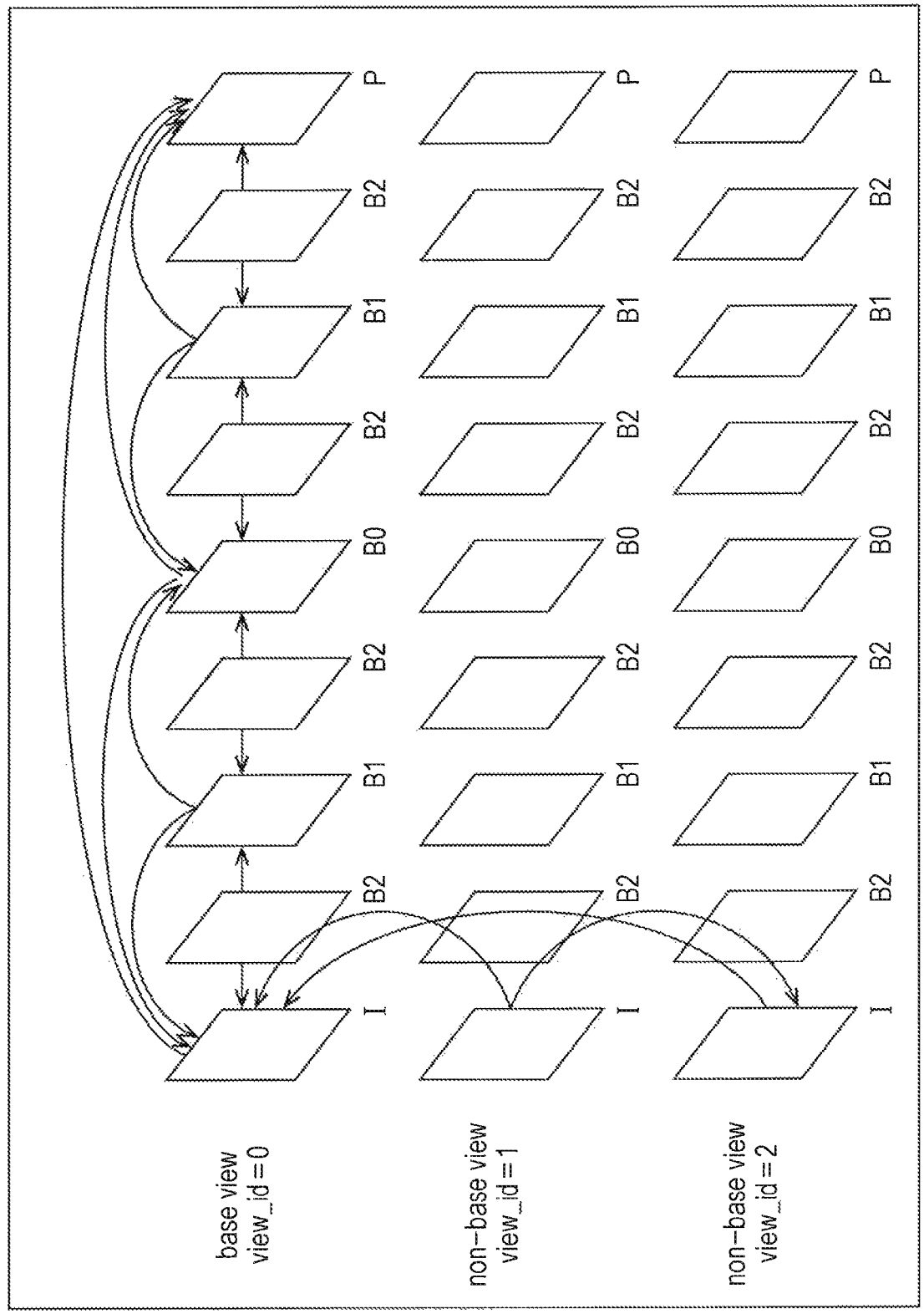
FIG. 37 is a diagram illustrating an example of a multi-viewpoint image encoding scheme.

A series of the above-described processes can be applied to multi-viewpoint image encoding/multi-viewpoint image decoding. FIG. 37 illustrates an example of a multi-viewpoint image encoding scheme.

As illustrated in FIG. 37, a multi-viewpoint image includes images of multiple viewpoints (views). The multiple views of the multi-viewpoint image include a base view where encoding/decoding is performed by using only the image of its own view without using the images of other views and non-base views where encoding/decoding is performed by using the images of other views. The non-base view may be defined to use the image of the base view or may be defined to use images of other non-base views.

In the case of encoding/decoding the multi-viewpoint image as illustrated in FIG. 37, the image of each view is encoded/decoded. However, in the encoding/decoding of each view, the above-described methods of the first and second embodiments may be applied. By doing so, it is possible to suppress a deterioration in image quality of each view.

In addition, in the encoding/decoding of each view, the flags or parameters used in the above-described methods of the first and second embodiment may be shared. By doing so, transmission of redundant information is suppressed, so that it is possible to reduce a transmitting information amount (code amount) (namely, it is possible to suppress a decrease in encoding efficiency).

More specifically, for example, the threshold value which is to be used for selecting the filtering process on the neighboring pixels of the current block in the intra prediction, the bit depth of the image data, the threshold value change flag representing the change of the threshold value, or the like may be shared in the encoding/decoding of each view.

Necessary information other than the above-described information may also be shared in the encoding/decoding of each view.

<Multi-Viewpoint Image Encoding Device>

Figure 38:
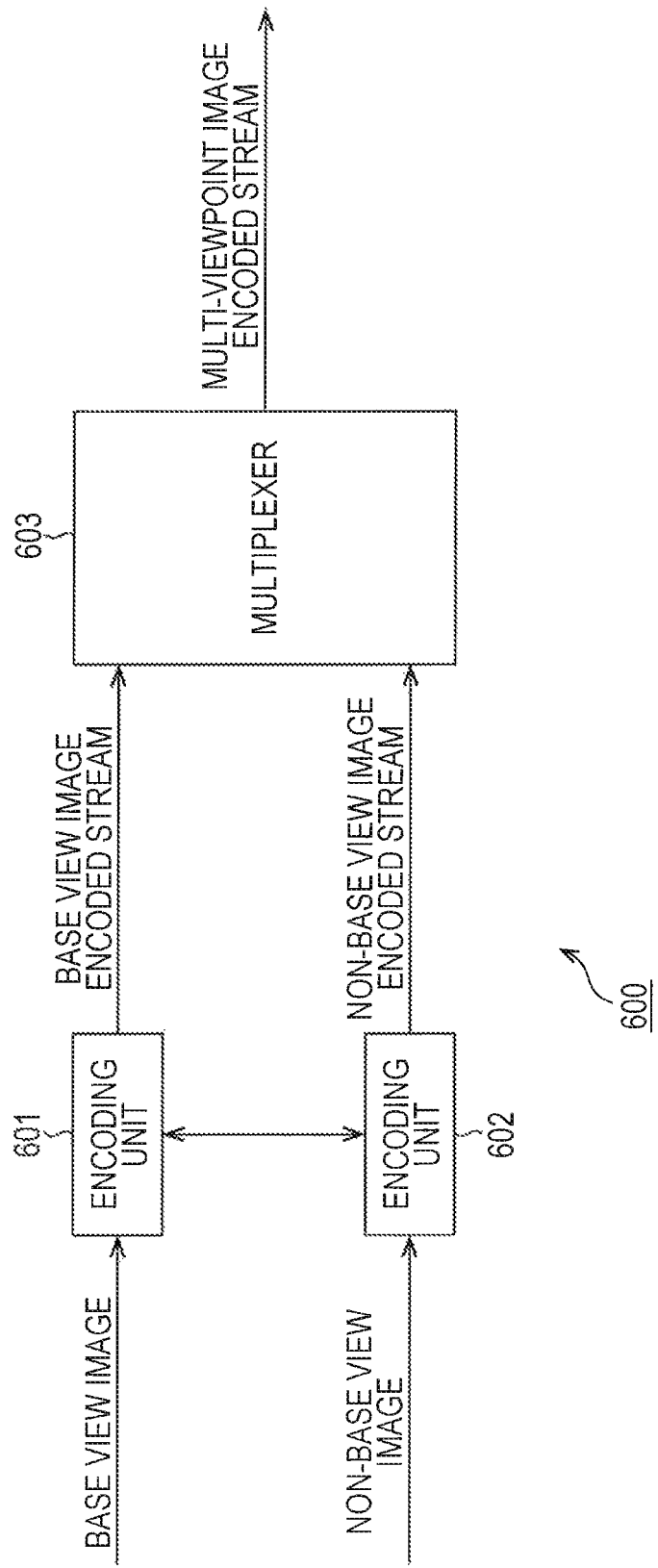
FIG. 38 is a diagram illustrating a main configuration example of a multi-viewpoint image encoding device to which the present technique is applied.

FIG. 38 is a diagram illustrating a multi-viewpoint image encoding device which performs the above-described multi-viewpoint image encoding. As illustrated in FIG. 38, the multi-viewpoint image encoding device 600 is configured to include an encoding unit 601, an encoding unit 602, and a multiplexer 603.

The encoding unit 601 encodes a base view image to generate a base view image encoded stream. The encoding unit 602 encodes a non-base view image to generate a non-base view image encoded stream. The multiplexer 603 multiplexes the base view image encoded stream generated by the encoding unit 601 and the non-base view image encoded stream generated by the encoding unit 602 to generate a multi-viewpoint image encoded stream.

The image encoding device 100 (FIG. 10) can be applied to the encoding unit 601 and the encoding unit 602 of the multi-viewpoint image encoding device 600. Namely, in the encoding of each view, the threshold value which is to be used for selecting the filtering process of the intra prediction can be controlled, so that it is possible to suppress a deterioration in image quality of each view. In addition, the encoding unit 601 and the encoding unit 602 can perform the controlling or the like of the filtering process of the intra prediction (namely, can share the flag or the parameter) by using the same flag or parameter (for example, the threshold value, the bit depth, or the like), so that it is possible to suppress a decrease in encoding efficiency.

<Multi-Viewpoint Image Decoding Device>

Figure 39:
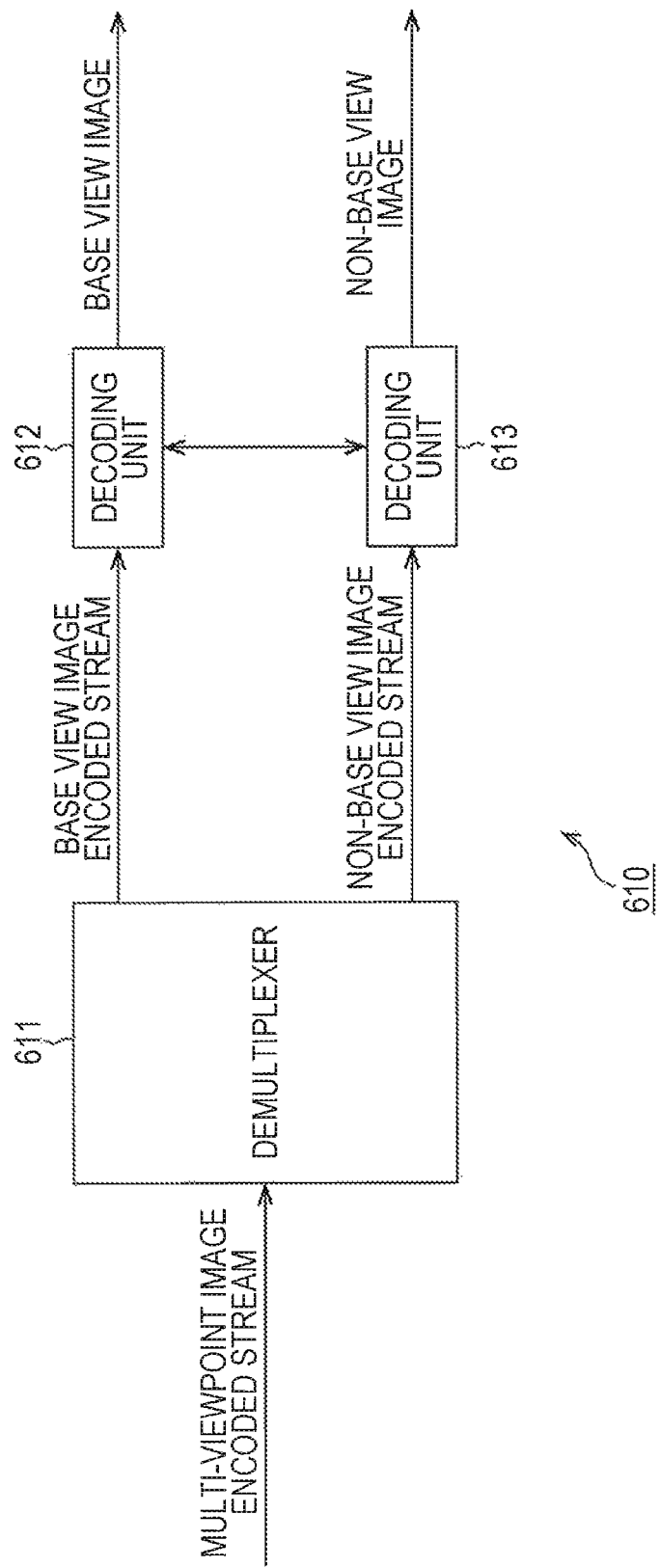
FIG. 39 is a diagram illustrating a main configuration example of a multi-viewpoint image decoding device to which the present technique is applied.

FIG. 39 is a diagram illustrating a multi-viewpoint image decoding device which performs the above-described multi-viewpoint image decoding. As illustrated in FIG. 39, the multi-viewpoint image decoding device 610 is configured to include a demultiplexer 611, a decoding unit 612, and a decoding unit 613.

The demultiplexer 611 demultipiexes a multi-viewpoint image encoded stream where a base view image encoded stream and a non-base view image encoded stream are multiplexed to extract the base view image encoded stream and the non-base view image encoded stream. The decoding unit 612 decodes the base view image encoded stream extracted by the demultiplexer 611 to obtain a base view image. The decoding unit 613 decodes the non-base view image encoded stream extracted by the demultiplexer 611 to obtain a non-base view image.

The image decoding device 300 (FIG. 23) can be applied to the decoding unit 612 and the decoding unit 613 of the multi-viewpoint image decoding device 610. Namely, in the decoding of each view, the threshold value which is to be used for the filtering process of the intra prediction can be controlled, so that it is possible to suppress a deterioration in image quality of each view. In addition, the decoding unit 612 and the decoding unit 613 can perform the controlling or the like of the filtering process of the intra prediction (namely, can share the flag or the parameter) by using the same flag or parameter (for example, the threshold value, the bit depth, or the like), so that it is possible to suppress a decrease in encoding efficiency.

4. Fourth Embodiment

Application to Hierarchical Image Encoding/Hierarchical Image Decoding

Figure 40:
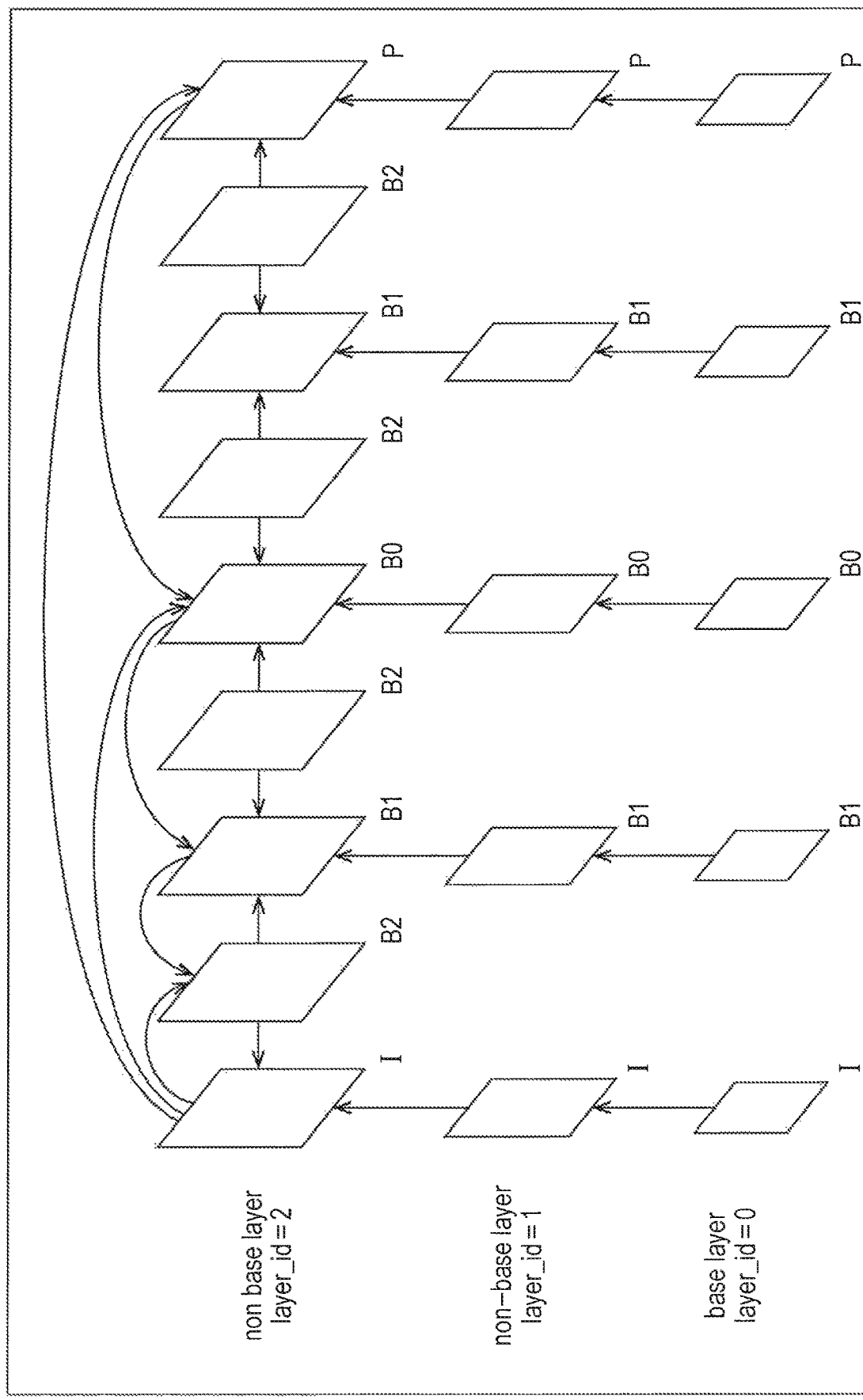
FIG. 40 is a diagram illustrating an example of a hierarchical image encoding scheme.

A series of the above-described processes can be applied to hierarchical image encoding/hierarchical image decoding (scalable encoding/scalable decoding). FIG. 40 illustrates an example of a hierarchical image encoding scheme.

The hierarchical image encoding (scalable encoding) configures an image with multiple layers (hierarchizes the image) so as to have a scalability function with respect to a predetermined parameter and encodes image data for every layer. The hierarchical image decoding is decoding (scalable decoding) corresponding to the hierarchical image encoding.

As illustrated in FIG. 40, in the image hierarchizing, one image is divided into multiple images (layers) by using a predetermined parameter having the scalability function as a reference. Namely, the hierarchized image (hierarchical image) includes images of multiple hierarchies (layers) of which the values of the predetermined parameter are different. The multiple layers of the hierarchical image include a base layer where encoding/decoding is performed by using only the image of its own layer without using the images of other layers and non-base layers (sometimes, referred to as enhancement layers) where encoding/decoding is performed by using the image of other layers. The non-base layer may use the image of the base layer or may use the images of other non-base layers.

In general, the non-base layer is configured with data (difference data) of a difference image between its own image and the image of other layer so that redundancy is decreased. For example, in the case where one image is hierarchized into two layers of a base layer and a non-base layer (sometimes, referred to as an enhancement layer), an image having an image quality lower than that of the original image is obtained by using only the data of the base layer, and the original image (namely, a high quality image) is obtained by combining the data of the base layer and the data of the non-base layer.

In this manner, by hierarchizing an image, it is possible to easily obtain an image having various qualities according to situations. For example, with respect to a terminal having a low process ability such as a mobile phone, image compression information of only the base layer is transmitted and a moving image having a low spatial temporal resolution or having a bad image quality is reproduced, and with respect to a terminal having a high process ability such as a television or a personal computer, image compression information of the enhancement layer in addition to the base layer is transmitted, and a moving image having a high spatial temporal resolution or having a good image quality is reproduced. Therefore, without performing a transcode process, image compression information can be transmitted from a server according to an ability of the terminal or the network.

In the case of encoding/decoding the hierarchical image as illustrated in the example of FIG. 40, the image of each layer is encoded/decoded. However, in the encoding/decoding of each layer, the above-described methods of the first and second embodiments may be applied. By doing so, it is possible to a deterioration in image quality of each layer.

In addition, in the encoding/decoding of each layer, the flags or parameters used in the above-described methods of the first and second embodiments may be shared. By doing so, transmission of redundant information is suppressed, so that it is possible to reduce a transmitting information amount (code amount) (namely, it is possible to suppress a decrease in encoding efficiency).

More specifically, for example, the threshold value which is to be used for selecting the filtering process on the neighboring pixels of the current block in the intra prediction, the bit depth of the image data, the threshold value change flag representing the change of the threshold value, or the like may be shared in encoding/decoding of each layer.

Necessary information other than the above-described information may also be shared in the encoding/decoding of each layer.

<Scalable Parameter>

Figure 41:
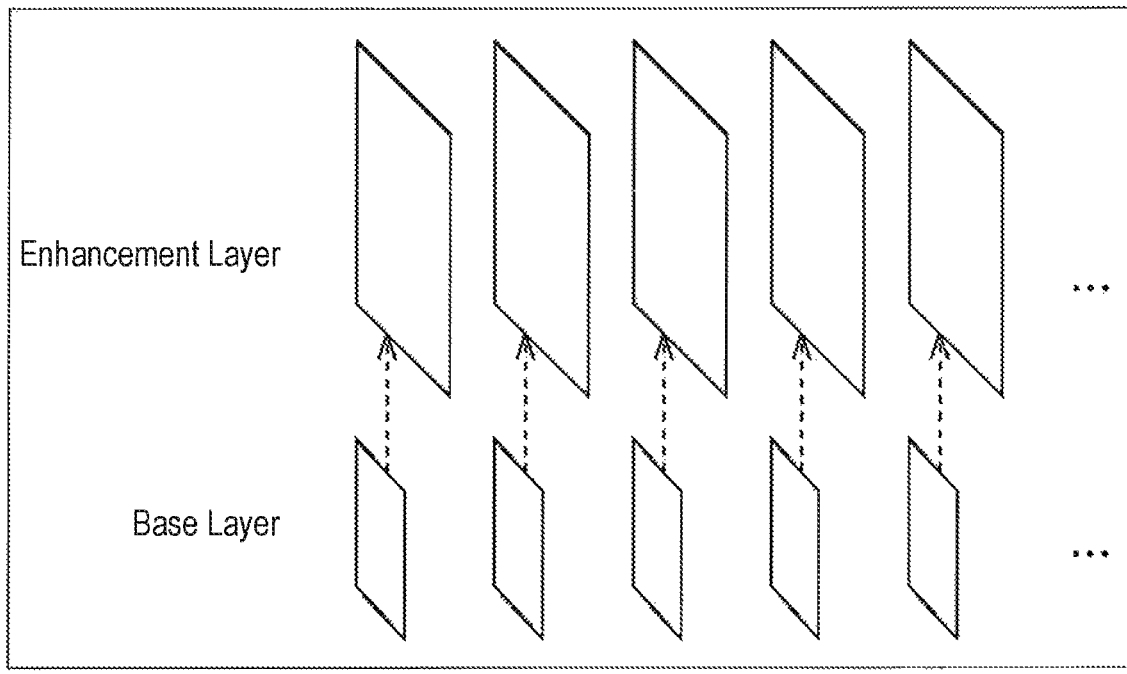
FIG. 41 is a diagram illustrating an example of spatial scalable encoding.

In the hierarchical image encoding/hierarchical image decoding (scalable encoding/scalable decoding), a parameter having a scalability function is arbitrary. For example, a spatial resolution illustrated in FIG. 41 may be treated as the parameter (spatial scalability). In the case of the spatial scalability, the resolutions of the images of layers are different. Namely, as illustrated in FIG. 41, each picture is hierarchized into two layers of a base layer having a spatial resolution lower than that of an original image and an enhancement layer which is combined with the image of the base layer to obtain the original image (original spatial resolution). The number of layers is exemplary, and each picture may be hierarchized into an arbitrary number of layers.

Figure 42:
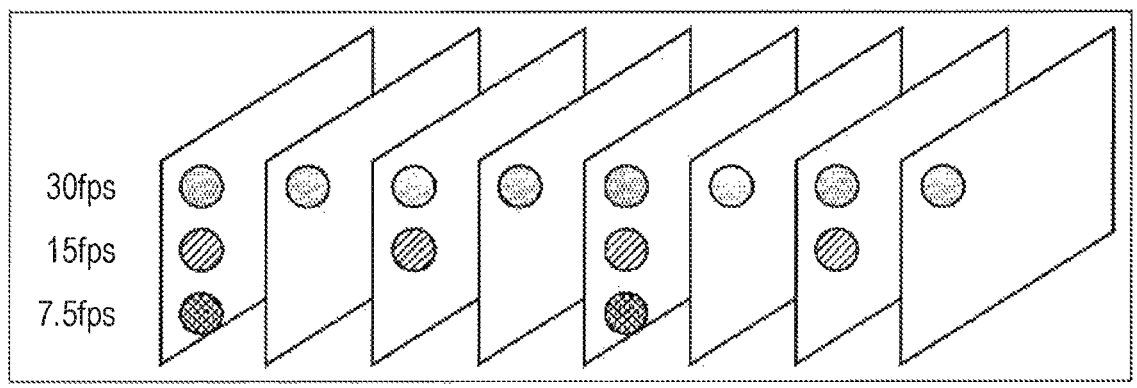
FIG. 42 is a diagram illustrating an example of temporal scalable encoding.

In addition, besides, as the parameters providing the scalability, for example, a temporal resolution illustrated in FIG. 42 may be applied (temporal scalability). In case of the temporal scalability, the frame rate is different among the layers. Namely, in this case, as illustrated in FIG. 42, the layers having different frame rates are obtained by hierarchizing, and a moving image having a higher frame rate is obtained by adding the layer having a high frame rate to the layer having a low frame rate, so that the original moving image (original frame rate) can be obtained by adding all the layers. The number of layers is exemplary, and each picture may be hierarchized into an arbitrary number of layers.

Figure 43:
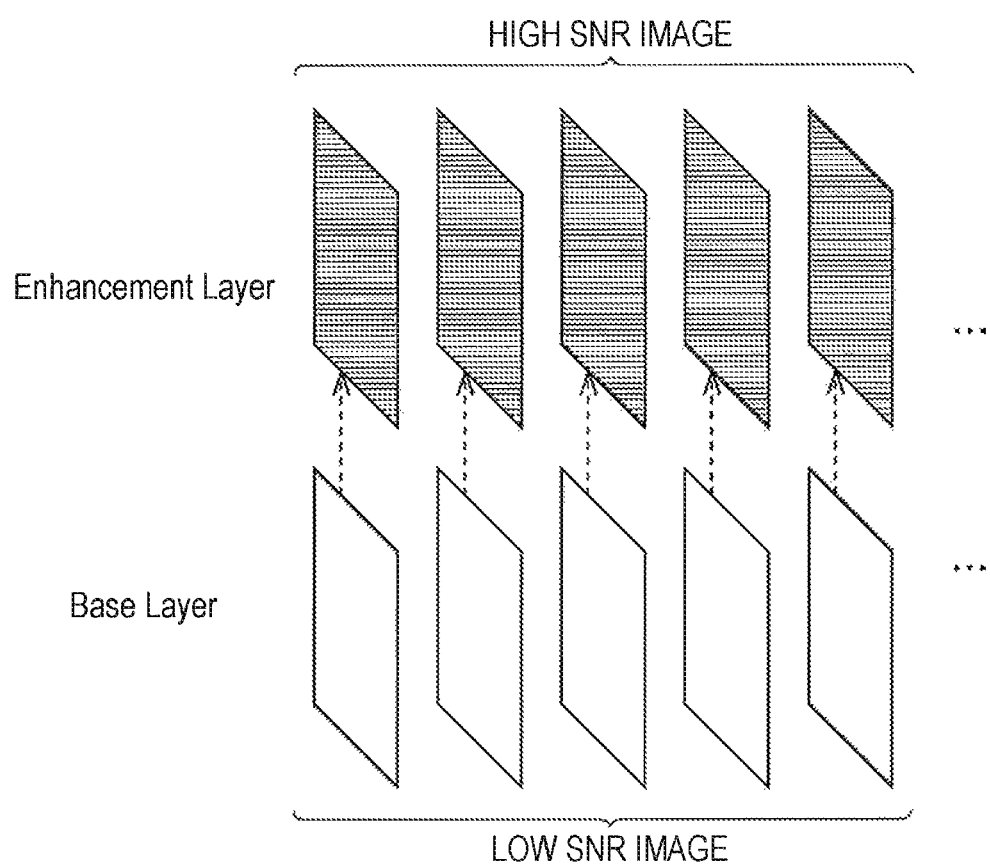
FIG. 43 is a diagram illustrating an example of signal-to-noise ratio scalable encoding.

In addition, as the parameters providing the scalability, for example, a signal-to-noise ratio (SNR) may be applied (SNR scalability). In case of the SNR scalability, the SN ratio is different among the layers. Namely, in this case, as illustrated in FIG. 43, each picture is hierarchized into two layers of a base layer having an SNR lower than that of an original image and an enhancement layer having the original image (original SNR) obtained by combining with the base layer. Namely, with respect to the base layer image compression information, the information on a low-PSNR image is transmitted, and by adding the enhancement layer image compression information to the above-described information, a high-PSNR image can be reconstructed. The number of layers is exemplary, and each picture may be hierarchized into an arbitrary number of layers.

The parameter providing the scalability may be a parameter other than the above-described example. For example, there is bit-depth scalability where the base layer is configured with an 8-bit image and, by adding the enhancement layer to the base layer, a 10-bit image is obtained.

In addition, there is chroma scalability where the base layer is configured with a 4:2:0-format component image and, by adding the enhancement layer to the base layer, a 4:2:2-format component image is obtained.

<Hierarchical Image Encoding Device>

Figure 44:
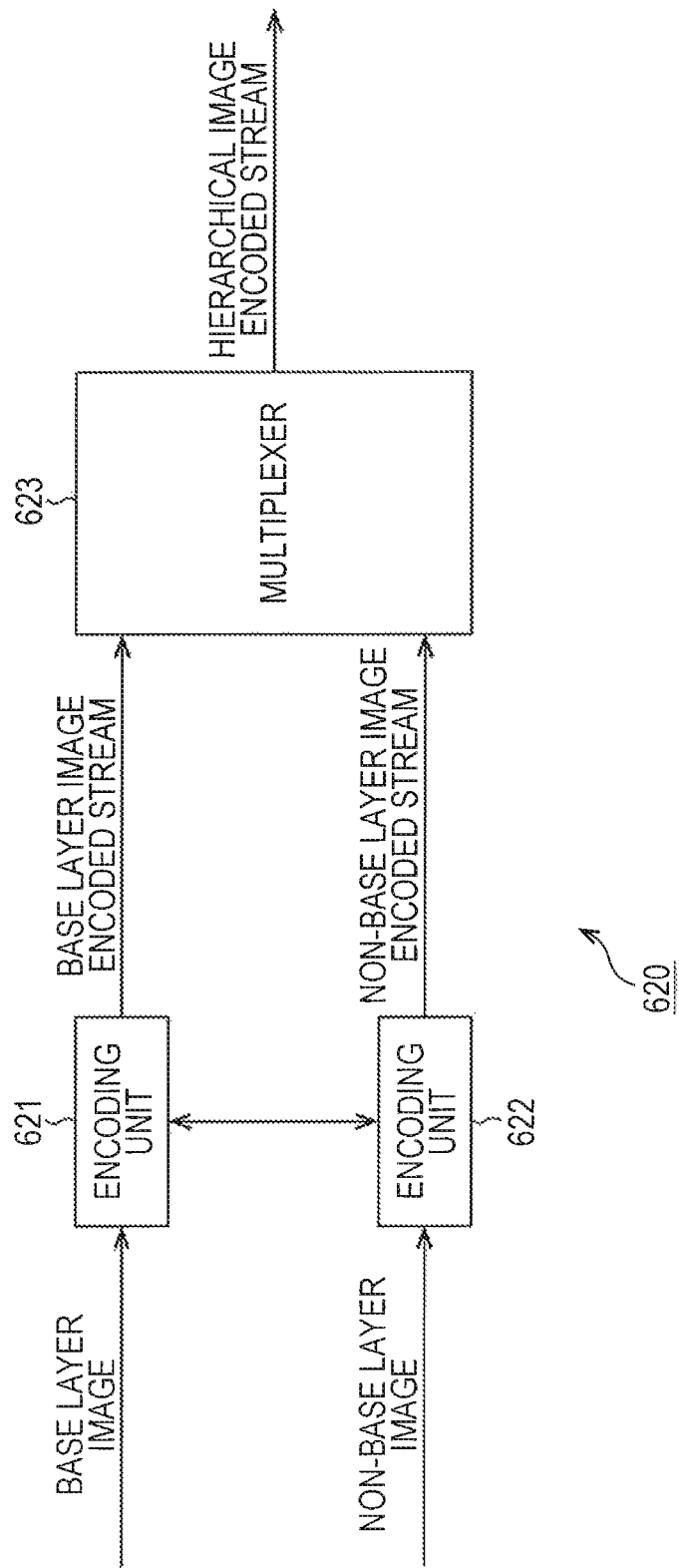
FIG. 44 is a diagram illustrating a main configuration example of a hierarchical image encoding device to which the present technique is applied.

FIG. 44 is a diagram illustrating a hierarchical image encoding device which performs the above-described hierarchical image encoding. As illustrated in FIG. 44, the hierarchical image encoding device 620 is configured to include an encoding unit 621, an encoding unit 622, and a multiplexer 623.

The encoding unit 621 encodes a base layer image to generate a base layer image encoded stream. The encoding unit 622 encodes a non-base layer image to generate a non-base layer image encoded stream. The multiplexer 623 multiplexes the base layer image encoded stream generated by the encoding unit 621 and the non-base layer image encoded stream generated by the encoding unit 622 to generate a hierarchical image encoded stream.

The image encoding device 100 (FIG. 10) can be applied to the encoding unit 621 and the encoding unit of the hierarchical image encoding device 620. Namely, in the encoding of each layer, the threshold value which is to be used for selecting the filtering process of the intra prediction can be controlled, so that it is possible to suppress a deterioration in image quality of each layer. In addition, the encoding unit and the encoding unit 622 can perform the controlling or the like of the filtering process of the intra prediction (namely, can share the flag or the parameter) by using the same flag or parameter (for example, the threshold value, the bit depth, or the like), so that it is possible to suppress a decrease in encoding efficiency.

<Hierarchical Image Decoding Device>

Figure 45:
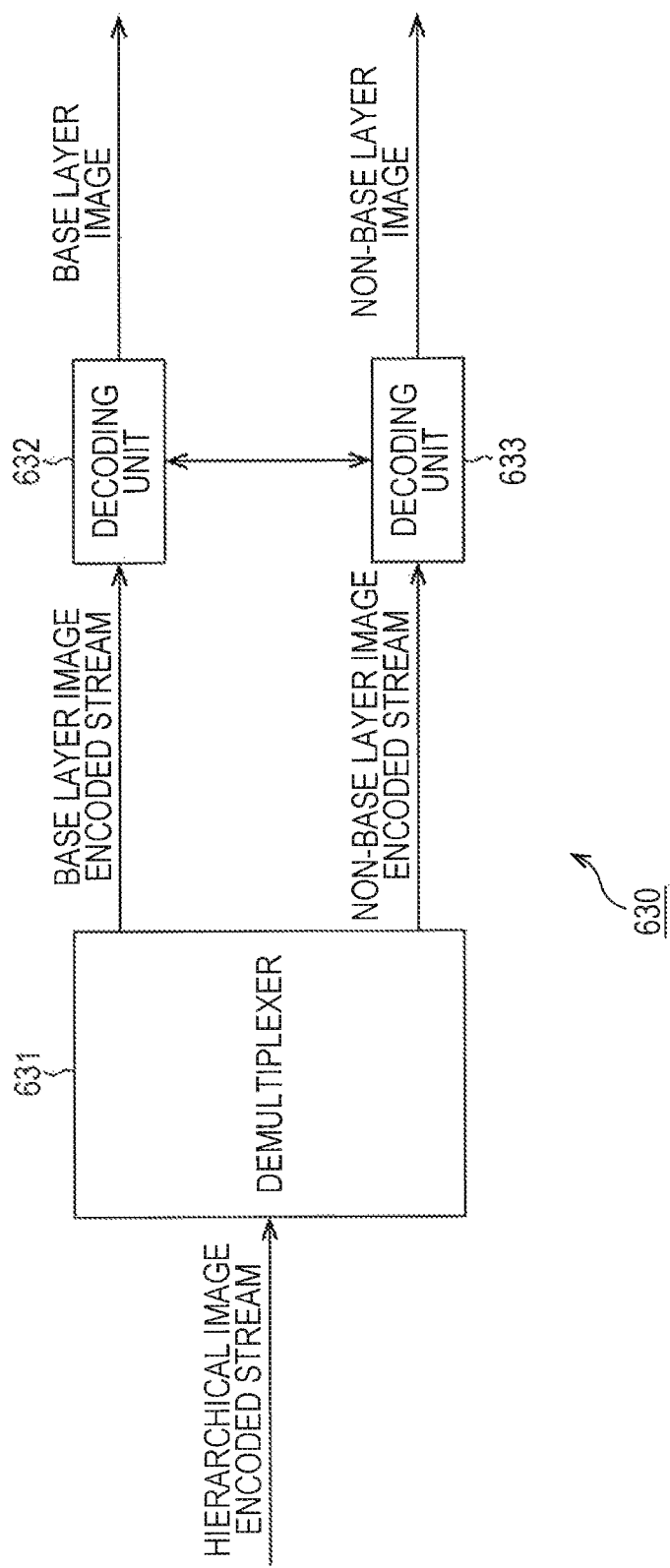
FIG. 45 is a diagram illustrating a main configuration example of a hierarchical image decoding device to which the present technique is applied.

FIG. 45 is a diagram illustrating a hierarchical image decoding device which performs the above-described hierarchical image decoding. As illustrated in FIG. 45, the hierarchical image decoding device 630 is configured to include a demultiplexer 631, a decoding unit 632, and a decoding unit 633.

The demultiplexer 631 demultiplexes the hierarchical image encoded stream where the base layer image encoded stream and the non-base layer image encoded stream are multiplexed to extract the base layer image encoded stream and the non-base layer image encoded stream. The decoding unit 632 decodes the base layer image encoded stream extracted by the demultiplexer 631 to obtain the base layer image. The decoding unit 633 decodes the non-base layer image encoded stream extracted by the demultiplexer 631 to obtain the non-base layer image.

The image decoding device 300 (FIG. 23) can be applied to the decoding unit 632 and the decoding unit of the hierarchical image decoding device 630. Namely, in the decoding of each layer, the threshold value which is to be used for selecting the filtering process of the intra prediction can be controlled, so that it is possible to suppress a deterioration in image quality of each layer. In addition, the decoding unit and the decoding unit 613 can perform the controlling or the like of the filtering process of the intra prediction (namely, can share the flag or the parameter) by using the same flag or parameter (for example, the threshold value, the bit depth, or the like), so that it is possible to suppress a decrease in encoding efficiency.

In addition, the present technique can be applied to image encoding devices and image decoding devices that are used at the time of receiving image information (bitstream) compressed by orthogonal transform such as discrete cosine transform and motion compensation through a network medium such as satellite broadcasting, cable television, the Internet, or mobile phones for example, like MPEG, H.26x, or the like. In addition, the present technique can be applied to image encoding devices and image decoding devices that are used at the time of performing processes on a storage medium such as an optical disk, a magnetic disk, and a flash memory. In addition, the present technique can be applied to quantization apparatuses or inverse quantization apparatuses included in the image encoding devices, image decoding devices, and the like.

5. Fifth Embodiment

Computer

A series of the above-described processes can be performed by hardware or can be performed by software. In the case where a series of the processes are performed by software, a program constituting the software is installed in a computer. Here, the computer includes a computer which is assembled in dedicated hardware, a general-purpose personal computer where various programs are installed to execute various functions, and the like.

Figure 46:
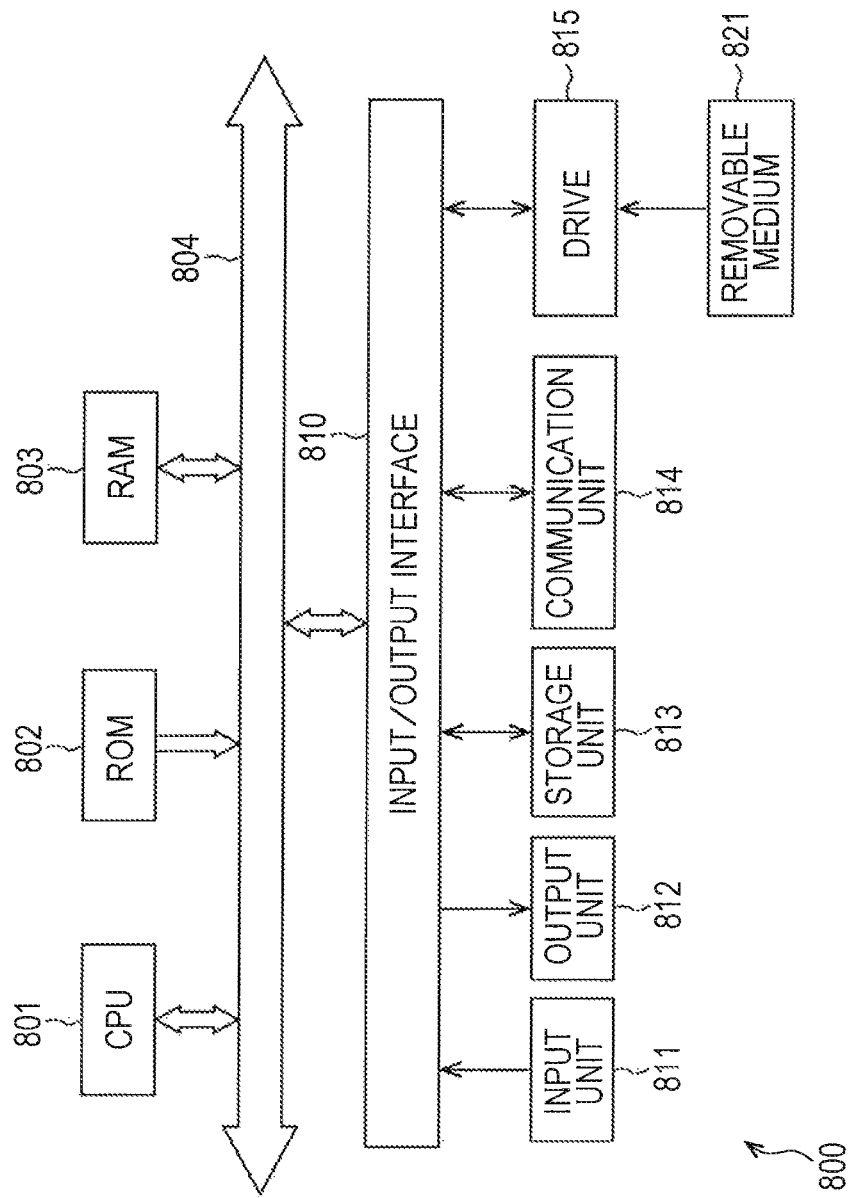
FIG. 46 is a block diagram illustrating a main configuration example of a computer.

FIG. 46 is a block diagram illustrating a main configuration example of hardware of the computer which executes a series of the above-described processes by the program.

In a computer 800 illustrated in FIG. 46, a CPU (Central Processing Unit) 801, a ROM (Read Only Memory) 802, and a RAM (Random Access Memory) 803 are connected to each other via a bus 804.

An input/output interface 810 is also connected to the bus 804. An input unit 811, an output unit 812, a storage unit 813, a communication unit 814, and a drive 815 are connected to the input/output interface 810.

The input unit 811 is configured with, for example, a keyboard, a mouse, a microphone, a touch panel, an input port, and the like. The output unit 812 is configured with, for example, a display, a speaker, an output port, and the like. The storage unit 813 is configured with, for example, a hard disk, a RAM disk, a non-volatile memory, and the like. The communication unit 814 is configured with, for example, a network interface. The drive 815 drives a removable medium 821 such as a magnetic disk, an optical disk, an optical magnetic disk, or a semiconductor memory.

In the computer having the above-described configuration, for example, the CPU 801 loads a program stored in the storage unit 813 on the RAM 803 through the input/output interface 810 and the bus 804 and executes the program, so that a series of the above-described processes are performed. The RAM 803 appropriately stores data or the like necessary for the CPU 801 to execute various processes.

The program executed by the computer (CPU 801) can be provided in a manner that the program is recorded in the removable medium 821, for example, a package medium, or the like. In addition, the program can be provided through a wired or wireless transmission medium such as a local area network, the Internet, or digital satellite broadcasting.

In the computer, the removable medium 821 is mounted on the drive 815, so that the program may be installed in the storage unit 813 through the input/output interface 810. In addition, the program may be received by the communication unit 814 through the wired or wireless transmission medium to be installed in the storage unit 813. Otherwise, the program may be installed in the ROM 802 or the storage unit 813 in advance.

In addition, the program executed by the computer may be a program which performs processes in time sequence according to a procedure described in the specification, or the program may be a program which performs processes in parallel or at a necessary timing such as a time when a call is made.

In addition, in the specification, steps describing a program recorded in a recording medium include processes which are executed in the written order and processes which are not necessarily executed in time series but executed simultaneously or independently.

In addition, in the specification, a system denotes a set of plural components (devices, modules (parts), and the like) irrespective of whether or not all components are present in the same case. Therefore, both of plural apparatuses which are accommodated in separate cases and are connected to each other via a network and a single apparatus where plural modules are accommodated in one case are the systems.

In addition, a configuration described above as a single apparatus (or processing unit) may be allowed to be divided so as to be configured as plural apparatuses (or processing units). On the other hand, configurations described above as plural apparatuses (or processing units) may be allowed to be collected so as to be configured as a single apparatus (or processing unit). In addition, each apparatus (or each processing unit) may be allowed to be added with configuration(s) other than the above-described configuration(s). In addition, if the configurations or operations in the entire system are substantially the same, a portion of the configuration of an apparatus (or processing unit) may be allowed to be included in the configuration of another apparatus (or processing unit).

While exemplary embodiments disclosed above with reference to the attached drawings are described in detail, the disclosed technical scope is not limited to the example. It is obvious that various changes or modifications can be made within the scope of the technical spirit disclosed in the claims by the ordinarily skilled in the disclosed technical field, and it should be noted that these changes or modifications are included within the disclosed technical scope.

For example, the present technique may take a cloud computing configuration where one function is allowed to be shared and cooperatively executed by plural apparatuses via a network.

In addition, each step described in the above-described flowcharts may be shared and executed by plural apparatuses instead of being executed by a single apparatus.

In addition, in the case where plural processes are included in one step, the plural processes included in the one step may be shared and executed by plural apparatuses instead of being executed by a single apparatus.

The image encoding device and the image decoding device according to above-described embodiments can be applied to various electronic apparatuses, for example, a transmitter or receiver in satellite broadcasting, wired broadcasting such as cable TV, delivery on the Internet, or delivery to a terminal through cellular communication, a recording apparatus which records an image in a medium such as an optical disk, a magnetic disk, a flash memory, or the like, or a reproducing apparatus which reproduces an image from these storage media. Hereinafter, four application examples will be described.

6. Application Example

First Application Example: Television Set

Figure 47:
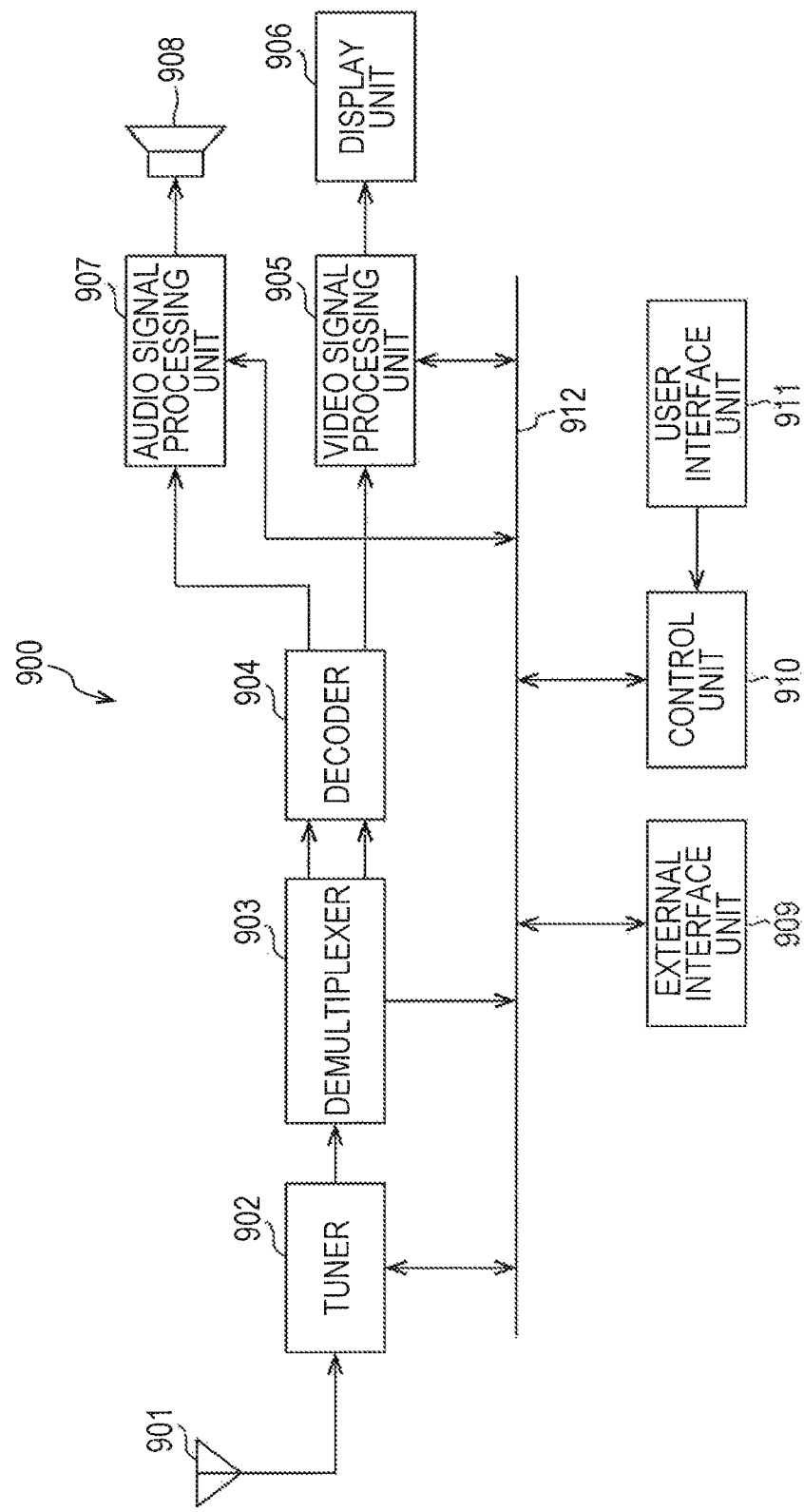
FIG. 47 is a block diagram illustrating an example of a schematic configuration example of a television apparatus.

FIG. 47 illustrates a schematic configuration example of a television apparatus to which the above-described embodiments is applied. The television apparatus 900 is configured to include an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcast signal received through the antenna 901 and demodulates the extracted signal. Next, the tuner 902 outputs encoded bitstream obtained by the demodulation to the demultiplexer 903. Namely, the tuner has a function as a transmission unit in the television apparatus 900 which receives the encoded stream where the image is encoded.

The demultiplexer 903 separates a video stream and an audio stream of a program which is to be viewed from the encoded bitstream and outputs the separated streams to the decoder 904. In addition, the demultiplexer 903 extracts auxiliary data such as EPG (Electronic Program Guide) from the encoded bitstream and supplies the extracted data to the control unit 910. In addition, in the case where the encoded bitstream is scrambled, the demultiplexer 903 may perform descrambling.

The decoder 904 decodes the video stream and the audio stream input from the demultiplexer 903. Next, the decoder 904 outputs video data generated by the decoding process to the video signal processing unit 905. In addition, the decoder 904 outputs audio data generated by the decoding process to the audio signal processing unit 907.

The video signal processing unit 905 reproduces the video data input from the decoder 904 to display video on the display unit 906. In addition, the video signal processing unit 905 may display an application screen supplied via a network on the display unit 906. In addition, the video signal processing unit 905 may perform an additional process such as noise removal on the video data according to settings. In addition, the video signal processing unit 905 may generate an image of a GUI (Graphical User Interface) such as a menu, a button, or a cursor and overlap the generated image with the output image.

The display unit 906 is driven by a drive signal supplied from the video signal processing unit 905 to display a video or an image on a video screen of a display device (for example, a liquid crystal display, a plasma display, an OELD (Organic Electro Luminescence Display) (organic EL display) or the like).

The audio signal processing unit 907 performs a reproducing process such as D/A conversion and amplification on the audio data input from the decoder to allow the speaker 908 to output an audio. In addition, the audio signal processing unit 907 may perform additional processes such as noise removal on the audio data.

The external interface 909 is an interface for connecting the television apparatus 900 to an external device or a network. For example, the video stream and the audio stream received through the external interface may be decoded by the decoder 904. Namely, the external interface 909 also has a function as a transmission unit in the television apparatus 900 which receives the encoded stream where the image is encoded.

The control unit 910 is configured to include processors of the CPU and the like and memories such as the RAM and the ROM. The memory stores programs executed by the CPU, program data, EPG data, data acquired through the network, or the like. The program stored in the memory is read out and executed by the CPU, for example, at the time of starting up the television apparatus 900. The CPU executes the program to control operations of the television apparatus 900, for example, according to a manipulation signal input from the user interface 911.

The user interface 911 is connected to the control unit 910. The user interface 911 is configured to include, for example, buttons and switches for the user to manipulate the television apparatus 900, a receiving unit for a remote control signal, and the like. The user interface 911 detects user's manipulation through these components to generate a manipulation signal and outputs the generated manipulation signal to the control unit 910.

The bus 912 connects the tuner 902, the demultiplexer 903, the decoder 904, the video signal processing unit 905, the audio signal processing unit 907, the external interface 909 and the control unit 910 to each other.

In the television apparatus 900 having the above-described configuration, the decoder 904 has a function of the image decoding device 300 (FIG. 23) according to the above-described embodiments. Therefore, in the decoding of the image in the television apparatus 900, it is possible to suppress a deterioration in image quality.

Second Application Example: Mobile Phone

Figure 48:
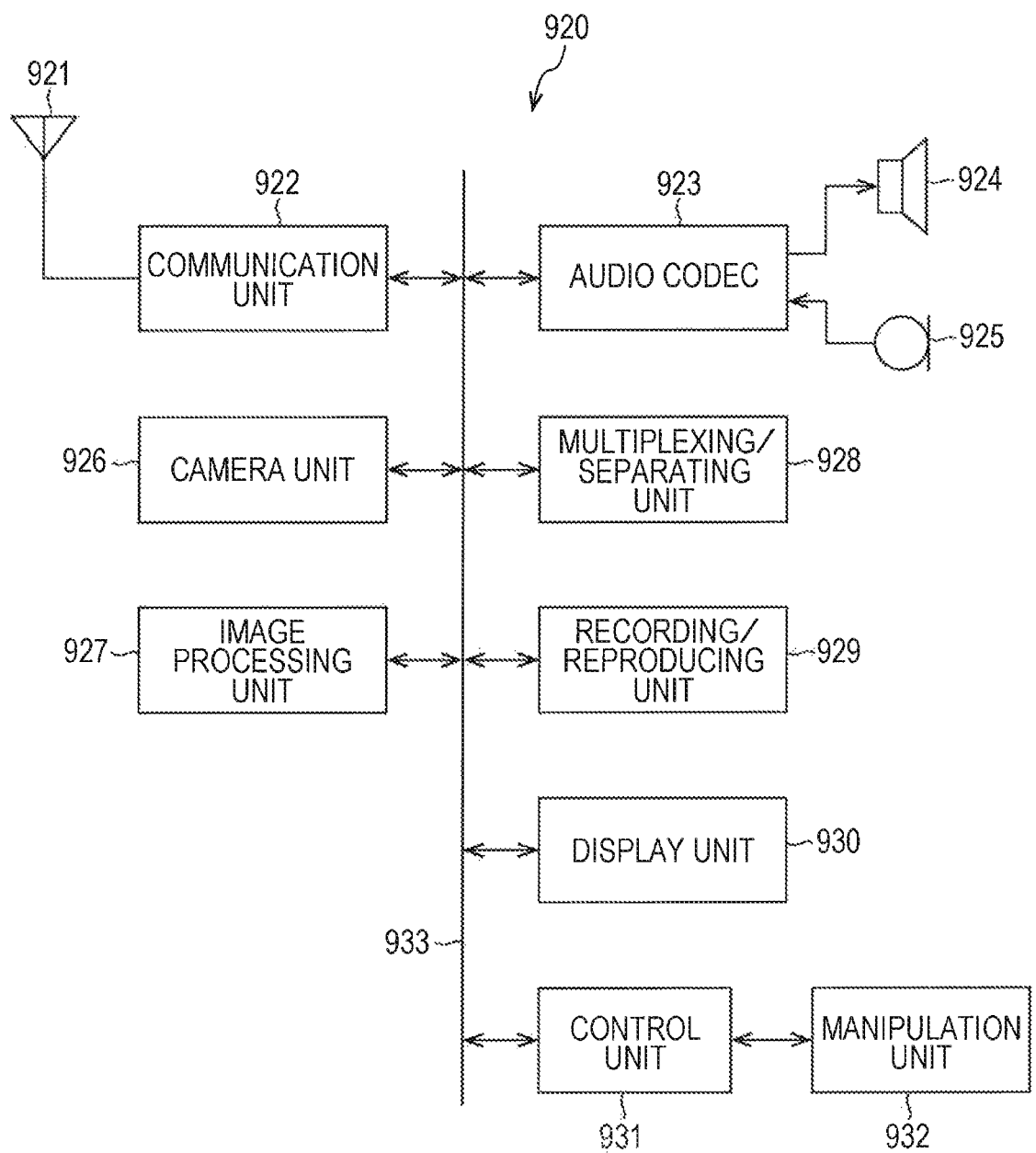
FIG. 48 is a block diagram illustrating a schematic configuration example of a mobile phone.

FIG. 48 illustrates a schematic configuration example of a mobile phone employing the above-described embodiment. The mobile phone 920 is configured to include an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, a manipulation unit 932, and a bus 933.

The antenna 921 is connected to the communication unit 922. The speaker 924 and the microphone 925 are connected to the audio codec 923. The manipulation unit 932 is connected to the control unit 931. The bus 933 connects the communication unit 922, the audio codec 923, the camera unit 926, the image processing unit 927, the multiplexing/separating unit 928, the recording/reproducing unit 929, the display unit 930, and the control unit 931 to each other.

The mobile phone 920 performs operations of transmission and reception of an audio signal, transmission and reception of electronic mails or image data, image capturing, and data recording, and the like in various operation modes including a voice call mode, a data communication mode, an imaging mode, and a TV phone mode.

In the voice call mode, an analog audio signal generated by the microphone 925 is supplied to the audio codec 923. The audio codec 923 converts the analog audio signal to audio data and A/D-converts and compresses the converted audio data. Next, the audio codec 923 outputs the compressed audio data to the communication unit 922. The communication unit 922 encodes and modulates the audio data to generate a transmission signal. Next, the communication unit 922 transmits the generated transmission signal to a base station (not shown) through the antenna 921. In addition, the communication unit 922 amplifies and frequency-converts the wireless signal received through the antenna 921 to acquire a reception signal. Next, the communication unit 922 demodulates and decodes the reception signal to generate audio data and outputs the generated audio data to the audio codec 923. The audio codec 923 decompresses and D/A-converts the audio data to generate an analog audio signal. Next, the audio codec 923 supplies the generated audio signal to the speaker 924, so that the audio is output.

In addition, in the data communication mode, for example, the control unit 931 generates character data constituting an electronic mail according to user's manipulation through the manipulation unit 932. In addition, the control unit 931 displays characters on the display unit 930. In addition, the control unit 931 generates electronic mail data according to a transmission command from the user through the manipulation unit 932 and outputs the generated electronic mail data to the communication unit 922. The communication unit 922 encodes and modulates the electronic mail data to generate a transmission signal. Next, the communication unit 922 transmits the generated transmission signal through the antenna 921 to a base station (not shown). In addition, the communication unit 922 amplifies and frequency-converts a wireless signal received through the antenna 921 to acquire a reception signal. Next, the communication unit 922 demodulates and decodes the reception signal to recover the electronic mail data and outputs the received electronic mail data to the control unit 931. The control unit 931 allows the display unit 930 to display a content of the electronic mail and stores the electronic mail data in a storage medium of the recording/reproducing unit 929.

The recording/reproducing unit 929 is configured with an arbitrary readable/writable storage medium. For example, the storage medium may be a built-in type storage medium such as a RAM or a flash memory and may be an external attached type storage medium such as a hard disk, a magnetic disk, an optical magnetic disk, an optical disk, a USB (Universal Serial Bus) memory, or a memory card.

In addition, in an imaging mode, for example, the camera unit 926 captures an image of an object to generate image data and outputs the generated image data to the image processing unit 927. The image processing unit 927 encodes the image data input from the camera unit 926 and stores the encoded stream in the storage medium of the storing/reproducing unit 929.

In addition, in a TV phone mode, the multiplexing/separating unit 928 multiplexes the video stream which is encoded by the image processing unit 927 and the audio stream which is input from the audio codec 923 and outputs the multiplexed stream to the communication unit 922. The communication unit 922 encodes and modulates the stream to generate a transmission signal. Next, the communication unit 922 transmits the generated transmission signal through the antenna 921 to a base station (not shown). In addition, the communication unit 922 amplifies and frequency-converts a wireless signal received through the antenna 921 to acquire a reception signal. The transmission signal and the reception signal are included in the encoded bitstream. Next, the communication unit 922 decodes and demodulates the reception signal to recover the stream and outputs the recovered stream to the multiplexing/separating unit 928. The multiplexing/separating unit 928 separates the video stream and the audio stream from the input stream and outputs the video stream and the audio stream to the image processing unit 927 and the audio codec 923, respectively. The image processing unit 927 decodes the video stream to generate video data. The video data are supplied to the display unit 930, so that a series of images are displayed by the display unit 930. The audio codec 923 decompresses and D/A-converts the audio stream to generate an analog audio signal. Next, the audio codec 923 supplies the generated audio signal to the speaker 924, so that the audio is output.

In the mobile phone 920 having the above-described configuration, the image processing unit 927 has the functions of the image encoding device 100 (FIG. 10) and the image decoding device 300 (FIG. 23) according to the above-described embodiments. Therefore, in the encoding and decoding of the image in the mobile phone 920, it is possible to suppress a deterioration in the image quality.

Third Application Example: Recording/Reproducing Apparatus

Figure 49:
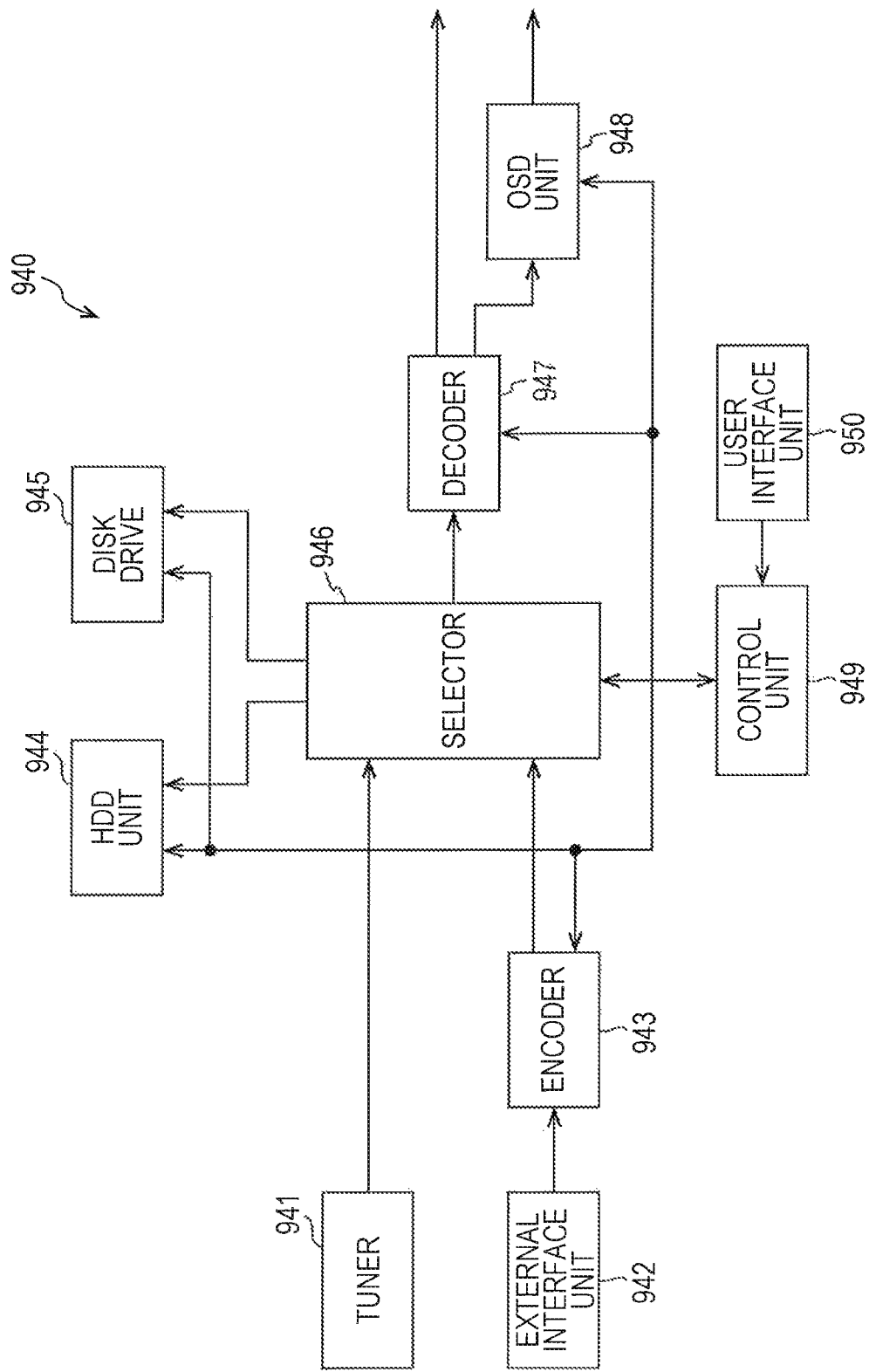
FIG. 49 is a block diagram illustrating a schematic configuration example of a recording/reproducing apparatus.

FIG. 49 illustrates a schematic configuration example of the recording/reproducing apparatus employing the above-described embodiment. The recording/reproducing apparatus 940 encodes audio data and video data of, for example, a received broadcast program to record the encoded data in a recording medium. In addition, the recording/reproducing apparatus 940 may encode audio data and video data, the for example, acquired from other apparatuses to record the encoded data in the recording medium. In addition, the recording/reproducing apparatus 940 reproduces the data recorded in the recording medium on a monitor or a speaker, the for example, according to user's command. At this time, the recording/reproducing apparatus 940 decodes the audio data and the video data.

The recording/reproducing apparatus 940 is configured to include a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcast signal received through an antenna (not shown) and demodulates the extracted the signal. Next, the tuner 941 outputs encoded bitstream obtained by the demodulation the to the selector 946. Namely, the tuner 941 has a function as a transmission unit in the recording/reproducing apparatus 940.

The external interface 942 is an interface for connecting the recording/reproducing apparatus 940 to an external device or a network. The external interface 942 may be, for example, an IEEE 1394 interface, a network interface, a USB interface, a flash memory interface, or the like. For example, the video data and the audio data received through the external interface 942 are input to the encoder 943. Namely, the external interface 942 has a function as a transmission unit in the recording/reproducing apparatus 940.

In the case where the video data and the audio data are input from the external interface 942 are not encoded, the encoder 943 encodes the video data and the audio data. Next, the encoder 943 outputs the encoded bitstream to the selector 946.

The HDD 944 records the encoded bitstream where content data of video, audio, and the like are compressed, various programs, and other data the in a built-in hard disk. In addition, at the time of reproducing the video and the audio, the HDD 944 reads out these data from the hard disk.

The disk drive 945 performs data recording and data reading on a mounted the recording medium. The recording medium mounted on the disk drive 945 may be, for example, a DVD disk (DVD-Video, DVD-RAM, DVD-R, DVD-RW, DVD+R, DVD+RW, or the like), a Blu-ray (registered trade mark) disk, or the like.

At the time of recording the video and the audio, the selector 946 selects the encoded bitstream input from the tuner 941 or the encoder 943 and outputs the selected the encoded bitstream to the HDD 944 or the disk drive 945. In addition, at the time of reproducing the video and the audio, the selector 946 outputs the encoded bitstream input from the HDD 944 or the disk drive 945 to the decoder 947.

The decoder 947 decodes the encoded bitstream to generate video data and audio data. Next, the decoder 947 outputs the generated video data to the OSD 948. In addition, the decoder 947 outputs the generated audio data to an external speaker.

The OSD 948 reproduces the video data input from the decoder 947 to display video. In addition, the OSD 948 may overlap an image of a GUI such as a menu, a button, or a cursor with the displayed video.

The control unit 949 is configured to include processors of the CPU and the like and memories such as the RAM and the ROM. The memory stores programs executed by the CPU, program data, and the like. The program stored in the memory is read out and executed by the CPU, for example, at the time of starting up the recording/reproducing apparatus 940. The CPU executes the program to control operations of the recording/reproducing apparatus 940, for example, according to a manipulation signal input from the user interface 950.

The user interface 950 is connected to the control unit 949. The user interface 950 is configured to include, for example, buttons and switches for the user to manipulate the recording/reproducing apparatus 940 and a receiving unit for a remote control signal, and the like. The user interface 950 detects user's manipulation through these components to generate a manipulation signal and outputs the generated manipulation signal to the control unit 949.

In the recording/reproducing apparatus 940 having the above-described configuration, the encoder 943 has a function of the image encoding device 100 (FIG. 10) according to the above-described embodiments. In addition, the decoder 947 has a function of the image decoding device 300 (FIG. 23) according to the above-described embodiments. Therefore, in the encoding and decoding of the image in the recording/reproducing apparatus 940, it is possible to suppress a deterioration in the image quality.

Fourth Application Example: Imaging Apparatus

Figure 50:
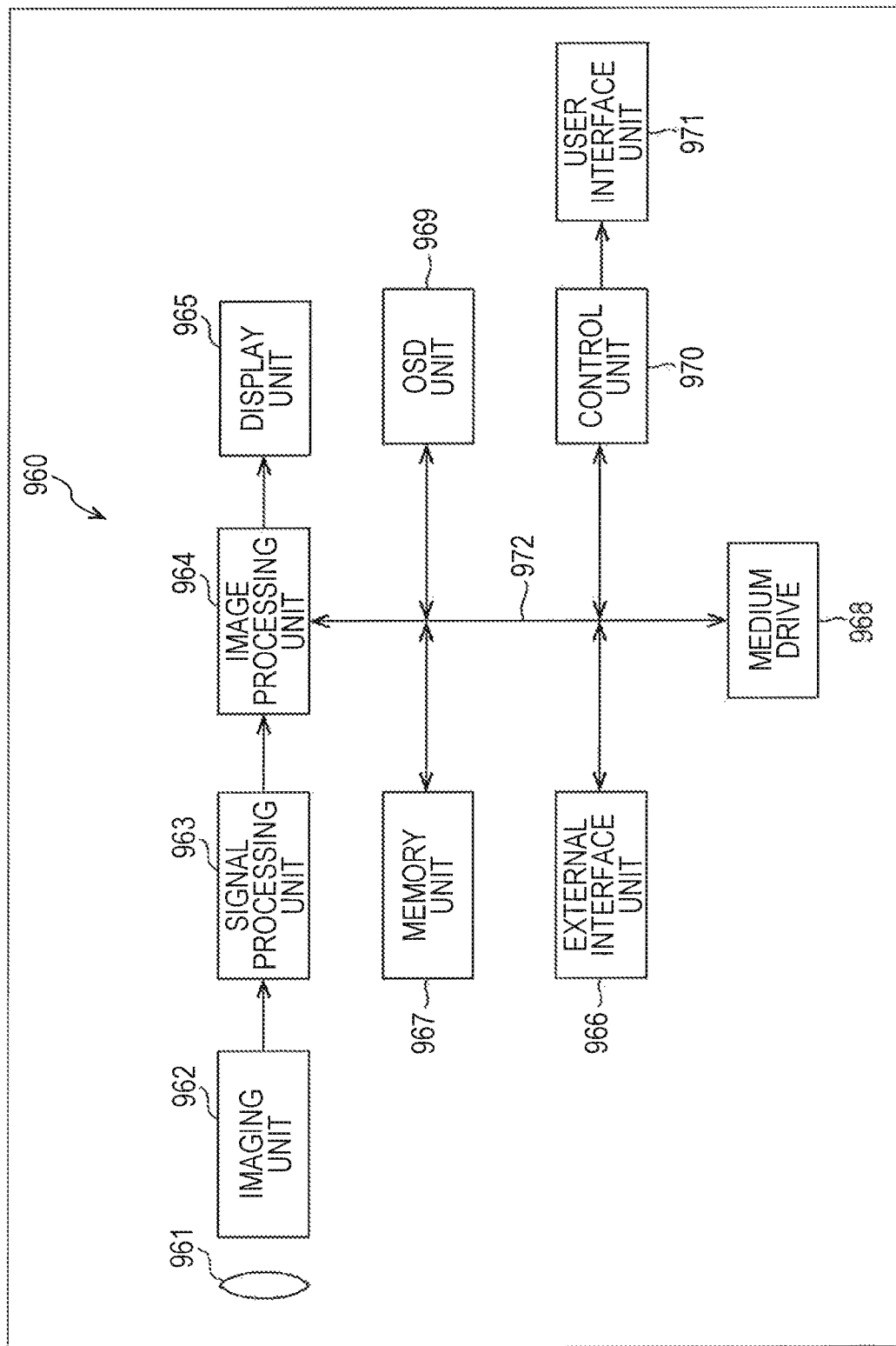
FIG. 50 is a block diagram illustrating a schematic configuration example of an imaging apparatus.

FIG. 50 illustrates a schematic configuration example of an imaging apparatus employing the above-described embodiment. The imaging apparatus 960 captures an image of an object to generate image, encodes the image data, and records the image data in the recording medium.

The imaging apparatus 960 is configured to include an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 connects the image processing unit 964, the external interface 966, the memory 967, the media drive 968, the OSD 969, and the control unit 970 to each other.

The optical block 961 is configured to include a focus lens, a diaphragm mechanism, and the like. The optical block 961 focuses an optical image of the object on an image plane of the imaging unit 962. The imaging unit 962 is configured with an image sensor such as a CCD (Charge Coupled Device) or a CMOS (Complementary Metal Oxide Semiconductor) and converts an optical image focused on an imaging plane to an image signal as an electric signal through photoelectric conversion. Next, the imaging unit 962 outputs the image signal to the signal processing unit 963.

The signal processing unit 963 performs various camera signal processes such as knee correction, gamma correction, color correction on the image signal input from the imaging unit 962. The signal processing unit outputs the image data applied with the camera signal process to the image processing unit 964.

The image processing unit 964 encodes the image data input from the signal processing unit 963 to generate encoded data. Next, the image processing unit 964 outputs the generated encoded data to the external interface 966 or the media drive 968. In addition, the image processing unit 964 decodes the encoded data input from the external interface 966 or the media drive 968 to generate image data. Next, the image processing unit 964 outputs the generated image data to the display unit 965. In addition, the image processing unit 964 outputs the image data input from the signal processing unit 963 to the display unit 965 so that the image is displayed. In addition, the image processing unit 964 may overlap data for display acquired from the OSD 969 with the image output to the display unit 965.

The OSD 969 generates an image of a GUI such as a menu, a button, or a cursor and outputs the generated image to the image processing unit 964.

The external interface 966 is configured with, for example, a USB input/output port. For example, at the time of printing image, the external interface 966 is connected to the imaging apparatus 960 to a printer. In addition, if necessary, a drive is connected to the external interface 966. For example, a removable medium such as a magnetic disk or an optical disk is mounted on the drive, and programs read out from the removable medium are installed in the imaging apparatus 960. In addition, the external interface 966 may be configured with a network interface connected to a network such as a LAN or the Internet. Namely, the external interface 966 has a function as a transmission unit in the imaging apparatus 960.

The recording medium mounted on the media drive 968 may be, for example, an arbitrary readable/writable removable medium such as a magnetic disk; an optical magnetic disk, an optical disk, or a semiconductor memory. In addition, the recording medium is fixedly mounted on the media drive 968, and the recording medium may be configured with, for example, a non-portable storage medium such as a built-in hard disk drive or a solid state drive (SSD).

The control unit 970 is configured to include processors of the CPU and the like and memories such as the RAM and the ROM. The memory stores programs executed by the CPU, program data, or the like. The program stored in the memory is read out and executed by the CPU, for example, at the time of starting up the imaging apparatus 960. The CPU executes the program to control operations of the imaging apparatus 960, for example, according to a manipulation signal input from the user interface 971.

The user interface 971 is connected to the control unit 970. The user interface 971 is configured to include, for example, buttons and switches for the user to manipulate the imaging apparatus 960. The user interface 971 detects user's manipulation through these components to generate a manipulation signal and outputs the generated manipulation signal to the control unit 970.

In the imaging apparatus 960 having the above-described configuration, the image processing unit 964 has functions of the image encoding device 100 (FIG. 10) and the image decoding device 300 (FIG. 23) according to the above-described embodiments. Therefore, in the encoding and the decoding of the image in the imaging apparatus 960, it is possible to suppress a deterioration in the image quality.

7. Application Example of Scalable Encoding

First System

Next, a specific use example of scalable encoded data which are scalable-encoded (hierarchical (image) encoded) will be described. For example, like an example illustrated in FIG. 51, scalable encoding is used for selecting data which are to be transmitted.

Figure 51:
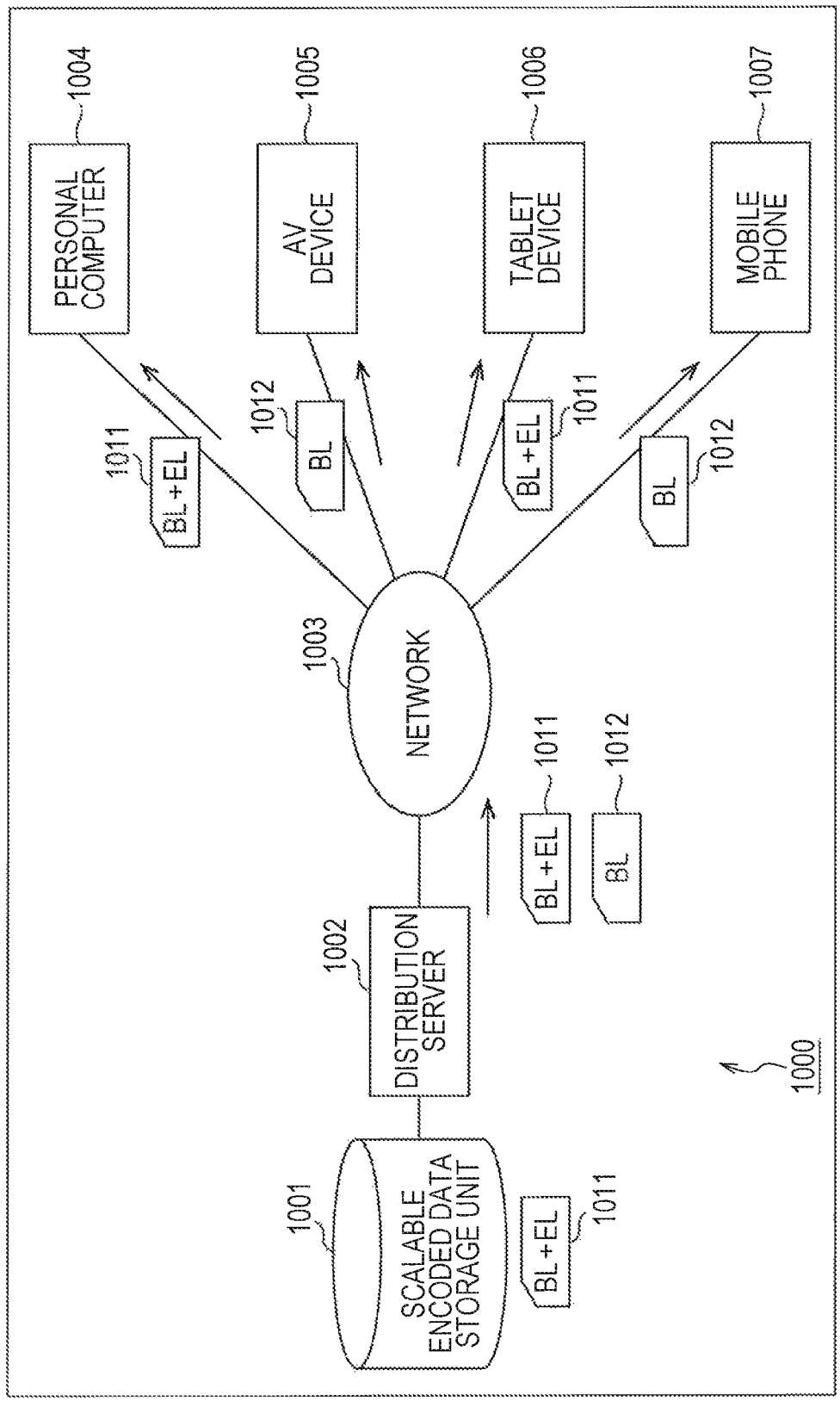
FIG. 51 is a block diagram illustrating an example of use of scalable encoding.

In a data transmission system 1000 illustrated in FIG. 51, a distribution server 1002 reads out scalable encoding data stored in a scalable encoded data storage unit 1001 and distributes the scalable encoding data to terminal devices such as a personal computer 1004, an AV device 1005, a tablet device 1006, and a mobile phone 1007 via a network 1003.

At this time, the distribution server 1002 selects and transmits encoded data having an appropriate quality according to a capability of the terminal device, a communication environment, or the like. Although the distribution server 1002 unnecessarily transmits data having high quality, an image having a high image quality is not necessarily obtained in the terminal device, and it may be a cause of occurrence of delay or overflow. In addition, a communication band may be unnecessarily occupied, or the load of the terminal device may be unnecessarily increased. On the other hand, although the distribution server 1002 unnecessarily transmits data having low quality, it is possible that an image having a sufficient image quality cannot be obtained in the terminal device. Therefore, the distribution server 1002 appropriately reads out the scalable encoded data stored in the scalable encoded data storage unit 1001 as the encoded data having a quality appropriate to a capability of the terminal device, communication environment, and the like and transmits the encoded data.

For example, the scalable encoded data storage unit stores scalable encoded data (BL+EL) 1011 which are scalable-encoded. The scalable encoded data (BL+EL) 1011 are encoded data including both of the base layer and the enhancement layer and data from which both of the image of the base layer and the image of the enhancement layer are obtained by decoding.

The distribution server 1002 selects an appropriate layer according to the capability of the terminal device which transmits the data, communication environment, and the like and reads out data of the layer. For example, with respect to the personal computer 1004 or the tablet device 1006 having a high processing capability, the distribution server 1002 reads out the scalable encoded data (BL+EL) 1011 having a high quality from the scalable encoded data storage unit 1001 and transmits the scalable encoded data (BL+EL) 1011 without change. On the other hand, for example, with respect to the AV device 1005 or the mobile phone 1007 having a low processing capability, the distribution server 1002 extracts the data of the base layer from the scalable encoded data (BL+EL) 1011 and transmits the scalable encoded data (BL) 1012 having a quality which is lower than that of the scalable encoded data (BL+EL) 1011 although the scalable encoded data (BL) 1012 is of the same content as that of the scalable encoded data (BL+EL) 1011.

Since the scalable encoded data is used in this manner so that it is possible to easily adjust the data amount, it is possible to suppress occurrence of delay or overflow or to suppress unnecessary increase in load of the terminal device or the communication medium. In addition, in the scalable encoded data (BL+EL) 1011, since redundancy between the layers is decreased, it is possible to reduce the data amount in comparison with the case where the encoded data of each layer are treated as individual data. Therefore, it is possible to efficiently use the storage area of the scalable encoded data storage unit 1001.

In addition, similarly to the personal computer or the mobile phone 1007, since various devices may be applied to the terminal device, hardware performance of the terminal device is different among the devices. In addition, since various applications may be executed by the terminal device, software capability is also different. In addition, since any communication network including a wired communication network, a wireless communication network, or both thereof such as the Internet or a local area network (LAN) may be applied to the network 1003 which is a communication medium, the data transmission capability is different. Furthermore, the data transmission capability may be changed according to other communications or the like.

Therefore, before starting the data transmission, the distribution server 1002 may perform communication with the terminal device which is a destination of the data transmission to information on the capabilities of the terminal device such as hardware performance of the terminal device or performance of applications (software) executed by the terminal device and information on the communication environment such as an available bandwidth of the network 1003. Next, the distribution server 1002 may select an appropriate layer based on the information obtained above.

In addition, layer extraction may be performed in the terminal device. For example, the personal computer 1004 may decode the transmitted scalable encoded data (BL+EL) 1011 to display the image of the base layer or to display the image of the enhancement layer. In addition, for example, the personal computer 1004 may extract the scalable encoded data (BL) 1012 of the base layer from the transmitted scalable encoded data (BL+EL) 1011 to store the scalable encoded data (BL) 1012, to transmits the scalable encoded data (BL) 1012 to anther device, or to decode the scalable encoded data (BL) 1012 to display the image of the base layer.

Of course, the number of scalable encoded data storage units 1001, the number of distribution servers 1002, the number of networks 1003, and the number of terminal devices are arbitrary. In addition, although the example where the distribution server 1002 transmits data to the terminal device is described above, the use example is not limited thereto. The data transmission system 1000 may be applied to an arbitrary system which selects an appropriate layer according to the capabilities of the terminal device, the communication environment and the like, and performs transmission when the data transmission system 1000 transmits the scalable-encoded encoded data to the terminal device.

In the above-described data transmission system 1000 illustrated in FIG. 51, by applying the present technique similarly to the application to the hierarchical encoding/hierarchical decoding described above with reference to FIGS. 40 to 45, it is possible to obtain the same effects as the effects described above with reference to FIGS. 40 to 45.

<Second System>

Figure 52:
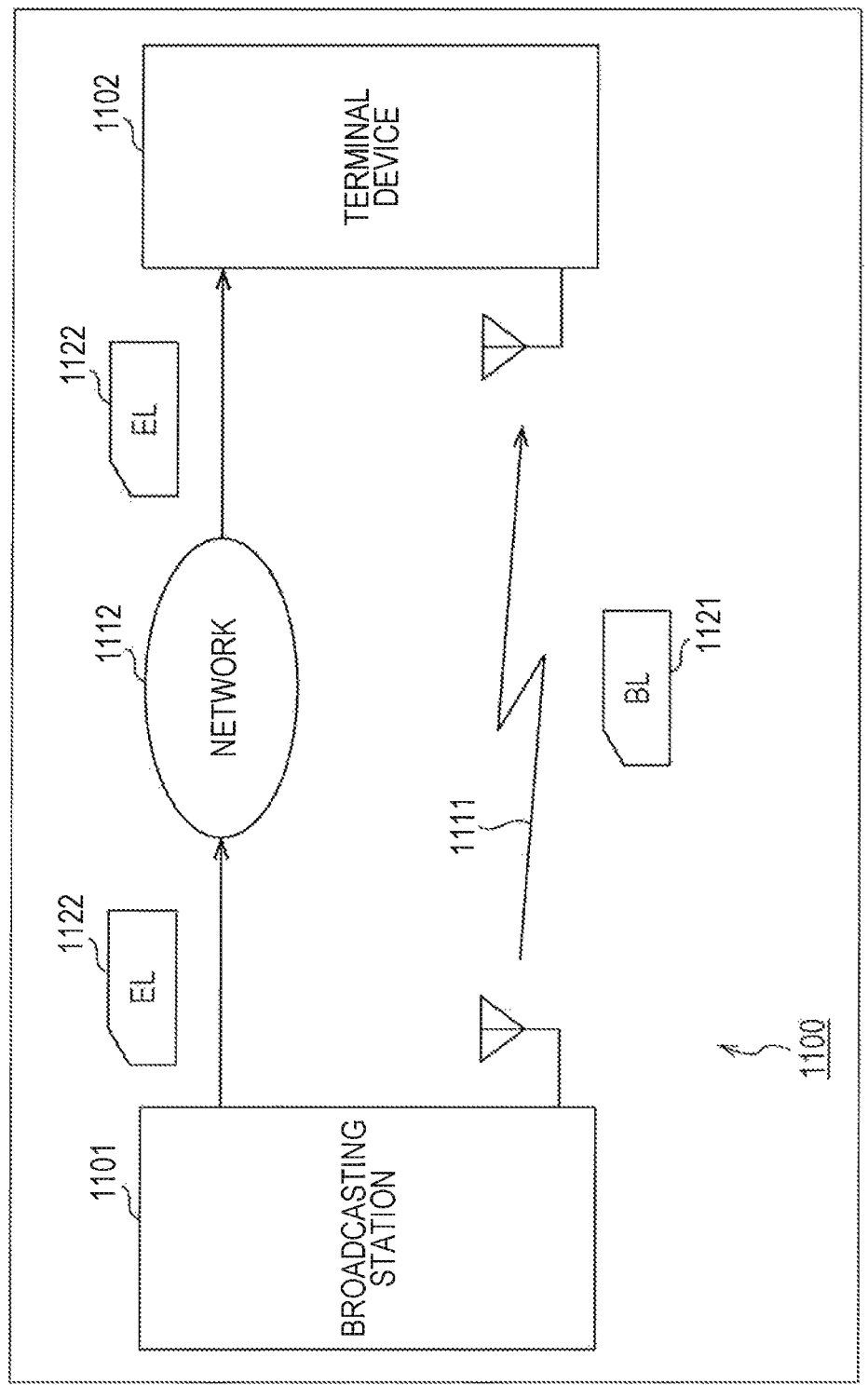
FIG. 52 is a block diagram illustrating another example of use of scalable encoding.

In addition, for example, like an example illustrated in FIG. 52, the scalable encoding is used for transmission via a plurality of communication media.

In a data transmission system 1100 illustrated in FIG. 52, a broadcasting station 1101 transmits scalable encoded data (BL) 1121 of a base layer through terrestrial broadcast 1111. In addition, the broadcasting station 1101 transmits a scalable encoded data (EL) 1122 of an enhancement layer via an arbitrary network 1112 configured with a wired communication network, a wireless communication network, or both thereof (for example, transmits packetized data).

The terminal device 1102 has a reception function of the terrestrial broadcast 1111 broadcast by the broadcasting station 1101 to receive the scalable encoded data (BL) 1121 of the base layer transmitted through the terrestrial broadcast 1111. In addition, the terminal device 1102 further has a communication function of implementing communication via the network 1112 to receive the scalable encoded data (EL) 1122 of the enhancement layer transmitted via the network 1112.

The terminal device 1102 obtains the image of base layer by decoding the scalable encoded data (BL) 1121 of the base layer acquired through the terrestrial broadcast 1111, stores the data, or transmits data, for example, according to user instruction or the like.

In addition, the terminal device 1102 obtains the scalable encoded data (BL+EL) by combining the scalable encoded data (BL) 1121 of the base layer acquired through the terrestrial broadcast 1111 and the scalable encoded data (EL) 1122 of the enhancement layer acquired through the network 1112, obtains the image of the enhancement layer by decoding the data, stores the data, or transmits the data to other devices, for example, according to user instruction or the like.

In this manner, the scalable encoded data may be transmitted, for example, through different communication medium for each layer. Therefore, it is possible to share the load, so that it is possible to suppress occurrence of delay or overflow.

In addition, the communication medium used for transmission may be selected for each layer according to the situation. For example, the scalable encoded data (BL) 1121 of the base layer which has a relatively large data amount may be transmitted through the communication medium having a wide bandwidth, and the scalable encoded data (EL) 1122 of the enhancement layer which has a relatively small data amount may be transmitted through the communication medium having a narrow bandwidth. In addition, for example, the communication medium through which the scalable encoded data (EL) 1122 of the enhancement layer are to be transmitted may be switched between the network 1112 and the terrestrial broadcast 1111 according to the available bandwidth of the network 1112. Of course, the same is applied to data of an arbitrary layer.

By controlling in this manner, it is possible to further suppress increase in load of the data transmission.

Of course, the number of layers is arbitrary, and the number of communication media used for transmission is also arbitrary. In addition, the number of terminal devices 1102 which are destinations of data distribution is also arbitrary. In addition, the sample of broadcasting from the broadcasting station 1101 is described above. However, the use example is not limited thereto. The data transmission system 1100 may be applied to an arbitrary system which separates the scalable-encoded encoded data into multiple data in units of a layer and transmits the data through multiple communication lines.

In the above-described data transmission system 1100 illustrated in FIG. 52, by applying the present technique similarly to the application to the hierarchical encoding/hierarchical decoding described above with reference to FIGS. 40 to 45, it is possible to obtain the same effects as the effects described above with reference to FIGS. 40 to 45.

<Third System>

Figure 53:
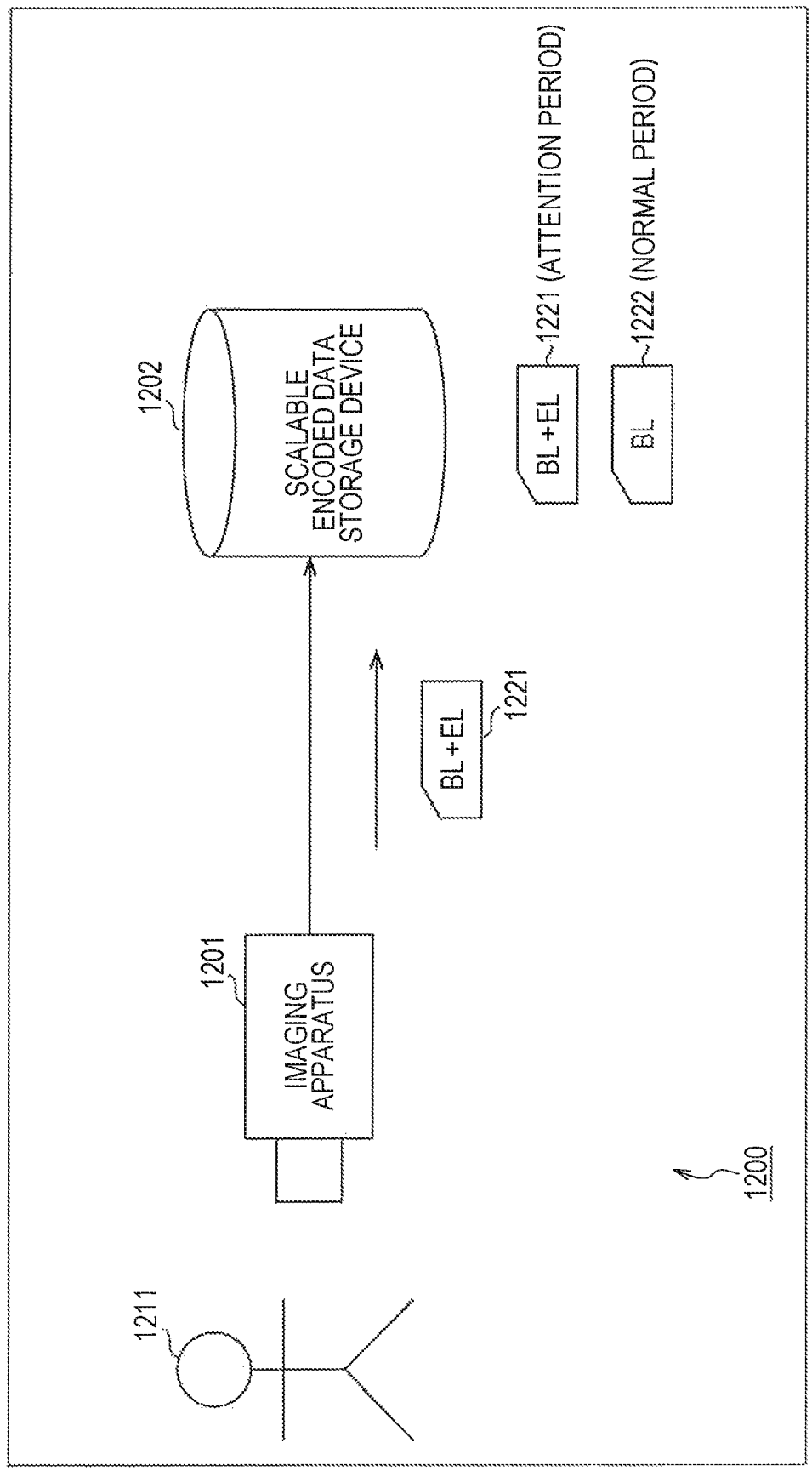
FIG. 53 is a block diagram illustrating still another example of use of scalable encoding.

In addition, for example, like an example illustrated in FIG. 53, the scalable encoding is used for storing the encoded data.

In an imaging system 1200 illustrated in FIG. 53, an imaging apparatus 1201 performs scalable encoding on image data obtained by capturing an image of an object 1211 and supplies the data as scalable encoded data (BL+EL) 1221 to a scalable encoded data storage device 1202.

The scalable encoded data storage device 1202 stores the scalable encoded data (BL+EL) 1221 supplied from the imaging apparatus 1201 with a quality according to a situation. For example, in case of a normal period, the scalable encoded data storage device 1202 extracts data of a base layer from the scalable encoded data (BL+EL) 1221 and stores the data as scalable encoded data (BL) 1222 of the base layer having a small data amount with a low quality. On the other hand, for example, in case of an attention period, the scalable encoded data storage device 1202 stores the scalable encoded data (BL+EL) 1221 having a large data amount with a high quality.

By doing so, the scalable encoded data storage device 1202 may store the image with a high image quality only if necessary. Therefore, it is possible to suppress an increase in data amount while suppressing a decrease in value of the image due to a deterioration in image quality, and it is possible to improve a utilization efficiency of a storage area.

For example, the imaging apparatus 1201 is a surveillance camera. In the case where a surveillance target (for example, an intruder) does not appear on the captured image (in case of a normal period), since the possibility that the content of the captured image is not important is high, decreasing of the data amount is given priority, and the image data (scalable encoded data) are stored with a low quality. On the other hand, in the case where the surveillance target appears as the object 1211 on the captured image (in case of an attention period), since the possibility that the content of the captured image is important is high, the image quality is given priority, and the image data (scalable encoded data) are stored with a high quality.

In addition, the determination as to whether the situation is in a normal period or an attention period may be performed, for example, by the scalable encoded data storage device 1202 analyzing the image. In addition, the determination may be performed by the imaging apparatus 1201, and a result of the determination may be transmitted to the scalable encoded data storage device 1202.

In addition, the criterion of the determination as to whether the situation in a normal period or an attention period is arbitrary, and the content of the image defined as the criterion of the determination is arbitrary. Of course, other conditions other than the content of the image may be defined as the criterion of the determination. For example, the normal and attention periods may be switched according to the magnitude, waveform, or the like of the recorded audio; the normal and attention periods may be switched every a predetermined time; or the normal and attention periods may be switched according to external instruction such as user instruction.

In addition, although the example where the two states of the normal period and the attention period are switched is described above, the number of states is arbitrary. Three or more states of, for example, a normal period, a weak attention period, an attention period, a strong attention period, and the like may be switched. However, the upper limit of the number of switching states depends on the number of layers of the scalable encoded data.

In addition, the imaging apparatus 1201 may determine the number of layers in the scalable encoding according to the state. For example, in case of the normal period, the imaging apparatus 1201 may generate the scalable encoded data (BL) 1222 of the base layer having a small data amount with a low quality and supply the data to the scalable encoded data storage device 1202. In addition, for example, in case of the attention period, the imaging apparatus 1201 may generate the scalable encoded data (BL+EL) 1221 of the base layer having a large data amount with a high quality and supply the data to the scalable encoded data storage device 1202.

Although the example of the surveillance camera is described above, the applications of the imaging system 1200 are arbitrary and are not limited to the surveillance camera.

In the above-described imaging system 1200 illustrated in FIG. 53, by applying the present technique similarly to the application to the hierarchical encoding/hierarchical decoding described above with reference to FIGS. 40 to 45, it is possible to obtain the same effects as the effects described above with reference to FIGS. 40 to 45.

In addition, the present technique can be applied to, for example, HTTP streaming such as MPEG DASH, where appropriate data are selected and used in units of a segment among a plurality of encoded data of which prepared resolutions or the like are different. Namely, the information on the encoding or the decoding can be shared between the plurality of the encoded data.

8. Sixth Embodiment

Other Examples of Embodiment

The examples of the apparatuses or systems to which the present technique is applied are described above. However, the present technique is not limited thereto, and the present technique may be embodied as any constitution in which the technique is mounted in such apparatuses or devices constituting such systems, for example, a processor as a system LSI (Large Scale Integration) or the like, a module using a plurality of processors or the like, a unit using a plurality of modules, a set where other functions are added to a unit (that is, some components of devices).

<Video Set>

Figure 54:
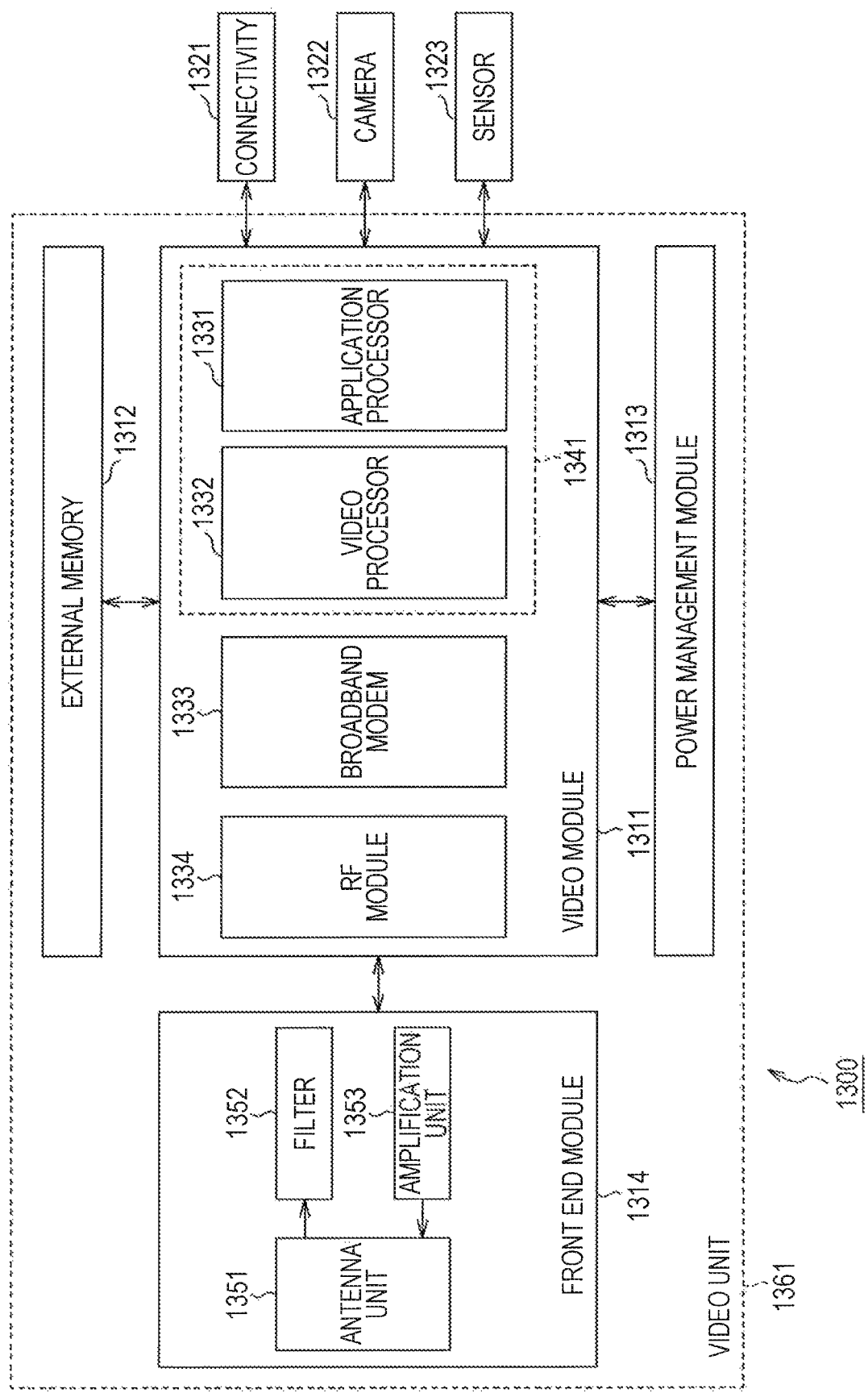
FIG. 54 is a block diagram illustrating a schematic configuration example of a video set.

An example of the case where the present technique is employed as a set will be described with reference to FIG. 54. FIG. 54 illustrates a schematic configuration example of a video set which the present technique is applied to.

Recent years, electronic devices with multiple functions have been increasingly provided. In the development or production thereof, in the case where some components thereof are embodied for sale, distribution, or the like, in addition to the case where a component with one function is embodied, in many cases, a plurality of components with the associated function are combined to be embodied as one set having multiple functions.

A video set 1300 illustrated in FIG. 54 has the above-described multi-functional configuration and is a combination of a device having a function associated with the encoding or decoding (any one or both thereof) of an image and a device having a function other than the above-described function.

As illustrated in FIG. 54, the video set 1300 is configured to include a module group of a video module 1311, an external memory 1312, a power management module 1313, a front end module 1314, and the like and a device having functions associated with a connectivity 1321, a camera 1322, a sensor 1323, and the like.

The module is intended to be a part with multiple functions obtained by collecting some part functions related to each other. A specific physical configuration is arbitrary. However, for example, it is considered that a plurality of processors with respective functions, electronic circuit elements such as resistors or condensers, or other devices are arranged on a wiring substrate to be integrated. In addition, it may be considered that the module is combined with another module, processors, or the like so as to be treated as a new module.

In the case of the example of FIG. 54, the video module 1311 is a combination of configurations having functions associated with the image process and is configured to include an application processor 1331, a video processor 1332, a broadband modem 1333, and an RF module 1334.

The processor is obtained by integrating components with predetermined functions into a semiconductor chip by a SoC (System On a Chip), and there is a processor which is sometimes referred to as, for example, system LSI (Large Scale Integration) or the like. The components with the predetermined function may be logic circuits (hardware components), may be a CPU, a ROM, a RAM, and the like and a program (software components) which is executed by using the CPU, the ROM, the RAM, and the like, and may be a combination of both components. For example, the processor may include logic circuits and the CPU, the ROM, the RAM, and the like, some functions are implemented by the logic circuits (hardware components), and other functions are implemented by the programs (software components) executed in the CPU.

The application processor 1331 of FIG. 54 is a processor that executes applications associated with the image process. The application executed by the application processor 1331 performs an arithmetic process in order to implement a predetermined function, and the application may also control the components such as the video processor 1332 or the like inside and outside the video module 1311 if necessary.

The video processor 1332 is a processor with functions related to image encoding and decoding (one or both thereof).

The broadband modem 1333 digital-modulates data (digital signal) which are to be transmitted through wired or wireless (or both thereof) broadband communication performed through a broadband line such as the Internet or a public telephone network to be converted into an analog signal, or the broadband modem demodulates the analog signal received through the broadband communication to be converted into the data (digital signal). The broadband modem 1333 processes arbitrary information, for example, the image data which is processed by the video processor 1332, the stream where the image data are encoded, the application programs, the setting data, and the like.

The RF module 1334 is a module that performs frequency conversion, modulation/demodulation, amplification, filtering processes, and the like on radio frequency (RF) signals which are transmitted and received via an antenna. For example, the RF module 1334 performs frequency conversion and the like on a baseband signal generated by the broadband modem 1333 to generate an RF signal. In addition, for example, the RF module 1334 performs frequency conversion and the like on the RF signal received through the front end module 1314 to generate a baseband signal.

In addition, as indicated by the broken line 1341 in FIG. 54, the application processor 1331 and the video processor 1332 are integrated to be configured as one processor.

The external memory 1312 is a module including a storage device which is installed outside of the video module 1311 to be used by the video module 1311. The storage device of the external memory 1312 may be implemented by any physical configuration. However, in general, since the storage device is mainly used to store a large volume of data such as image data in a frame unit, it is preferable that the storage device be implemented by a relatively inexpensive, large-capacity semiconductor memory such as DRAM (Dynamic Random Access Memory).

The power management module 1313 manages and controls power supply to the video module 1311 (configurations within the video module 1311).

The front end module 1314 is a module of providing a front end function (a circuit of a transmission/reception end of an antenna side) to the RF module 1334. As illustrated in FIG. 54, the front end module 1314 is configured to include, for example, an antenna unit 1351, a filter 1352, and an amplification unit 1353.

The antenna unit 1351 is configured with an antenna which transmits/receives a wireless signal and peripheral components. The antenna unit 1351 transmits the signal supplied from the amplification unit 1353 as a wireless signal and supplies the received wireless signal as an electric signal (RF signal) to the filter 1352. The filter 1352 performs the filtering process and the like on the RF signal received through the antenna unit 1351 and supplies the after-process RF signal to the RF module 1334. The amplification unit 1353 amplifies the RF signal supplied from the RF module 1334 to the antenna unit 1351.

The connectivity 1321 is a module having a function associated with connection to an external side. A physical configuration of the connectivity 1321 is arbitrary. For example, the connectivity 1321 includes a configuration having a communication function other than the communication standard corresponding to the broadband modem 1333, an external input/output port, and the like.

For example, the connectivity 1321 may include modules having communication functions in accordance with wireless communication standard such as Bluetooth (registered trade mark), IEEE 802.11 (for example, Wi-Fi (Wireless Fidelity, registered trade mark)), NFC (Near Field Communication), and IrDA (Infrared Data Association), an antenna which transmits and receives signals in accordance with the standards, or the like. In addition, for example, the connectivity 1321 may include modules having communication functions in accordance with wired communication standards such as USB (Universal Serial Bus) and HDMI (registered trade mark) (High-Definition Multimedia Interface) and ports in accordance with the standards. In addition, for example, the connectivity 1321 may have other data (signal) transmission functions and the like of an analog input/output port or the like.

In addition, the connectivity 1321 may include a device of a data (signal) transmission destination. For example, the connectivity 1321 may include a drive (including a drive for a removable medium, a hard disk, a solid state drive (SSD), a network attached storage (NAS), and the like) which performs data reading or writing on a recording medium such as a magnetic disk, an optical disk, an optical magnetic disk, or a semiconductor memory. In addition, the connectivity 1321 may include an output device (a monitor, a speaker, or the like) of image or audio.

The camera 1322 is a module having a function of capturing an image of an object and obtaining image data of the object. The image data obtained by imaging of the camera 1322 are supplied, for example, to the video processor 1332 to be encoded.

The sensor 1323 is a module having an arbitrary sensing function of, for example, a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, a tilt sensor, a magnetic pattern recognition sensor, an impact sensor, a temperature sensor, or the like. Data detected by the sensor 1323 are supplied, for example, to the application processor 1331 to be used by an application or the like.

The configuration described above as a module may be implemented as a processor. On the other hand, the configuration described as processor may be implemented as a module.

In the video set 1300 having the above-described configuration, as described later, the present technique can be applied to the video processor 1332. Therefore, the video set 1300 can be embodied as a set to which the present technique is applied.

<Configuration Example of Video Processor>

Figure 55:
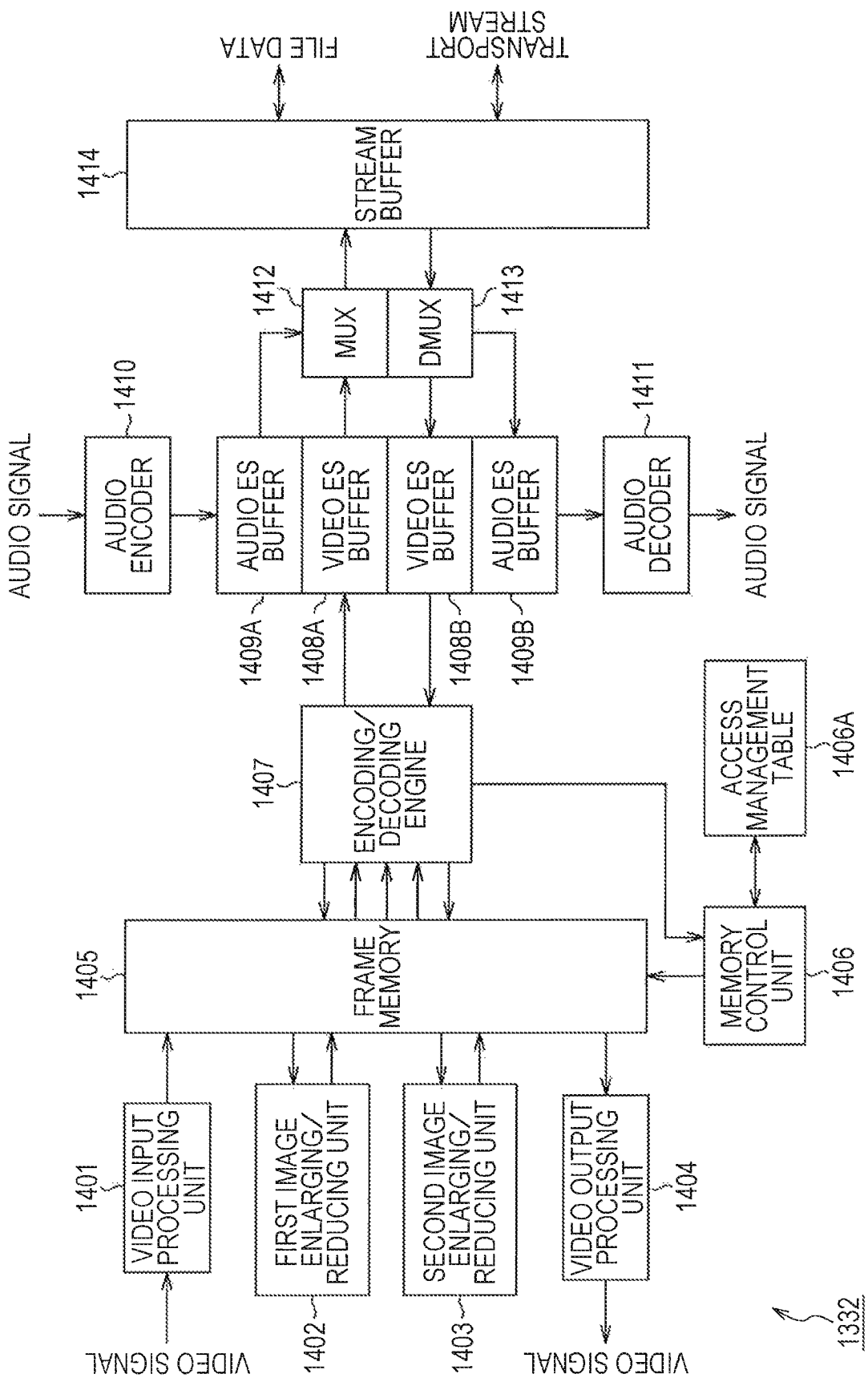
FIG. 55 is a block diagram illustrating a schematic configuration example of a video processor.

FIG. 55 illustrates a schematic configuration example of the video processor 1332 (FIG. 54) to which the present technique is applied.

In the case of the example of FIG. 55, the video processor 1332 has a function of receiving a video signal and an audio signal as an input and encoding the video signal and the audio signal in a predetermined scheme and a function of decoding the encoded video data and the encoded audio data and reproducing and outputting the video signal and the audio signal.

As illustrated in FIG. 55, the video processor 1332 is configured to include a video input processing unit 1401, a first image enlarging/reducing unit 1402, a second image enlarging/reducing unit 1403, a video output processing unit 1404, a frame memory 1405, and a memory control unit 1406. In addition, the video processor 1332 is configured to include an encoding/decoding engine 1407, video ES (Elementary Stream) buffers 1408A and 1408B, and audio ES buffers 1409A and 1409B. In addition, the video processor 1332 is configured to include an audio encoder 1410, an audio decoder 1411, a multiplexer (MUX) 1412, a demultiplexer (DMUX) 1413, and a stream buffer 1414.

The video input processing unit 1401 acquires a video signal input, for example, from the connectivity 1321 (FIG. 54) or the like to be converted into digital image data. The first image enlarging/reducing unit 1402 performs format conversion, an image enlarging/reducing process, or the like on the image data. The second image enlarging/reducing unit 1403 performs an image enlarging/reducing process according to the previous format output through the video output processing unit 1404 on the image data or performs the format conversion, the image enlarging/reducing process, or the like on the image data similarly to the first image enlarging/reducing unit 1402. The video output processing unit 1404 performs the format conversion, the conversion to an analog signal, or the like on the image data and outputs the data as a reproduced video signal, for example, to the connectivity 1321 (FIG. 54) or the like.

The frame memory 1405 is a memory for image data which is commonly used by the video input processing unit 1401, the first image enlarging/reducing unit 1402, the second image enlarging/reducing unit 1403, the video output processing unit 1404, and the encoding/decoding engine 1407. The frame memory 1405 is implemented, for example, as a semiconductor memory such as a DRAM.

The memory control unit 1406 receives a synchronization signal from the encoding/decoding engine 1407 and controls accesses for reading/writing to the frame memory 1405 according to access schedule to the frame memory 1405, which is written in the access management table 1406A. The access management table 1406A is updated by the memory control unit 1406 according to the process performed by the encoding/decoding engine 1407, the first image enlarging/reducing unit 1402, the second image enlarging/reducing unit 1403, or the like.

The encoding/decoding engine 1407 performs an encoding process on the image data and a decoding process on the video stream which is data where the image data are encoded. For example, the encoding/decoding engine 1407 encodes the image data read out from the frame memory 1405 to sequentially write the image data as a video stream in the video ES buffer 1408A. In addition, for example, the encoding/decoding engine sequentially reads out the video stream from the video ES buffer 1408B to decode the video stream, and sequentially writes the video stream as image data in the frame memory 1405. The encoding/decoding engine 1407 utilizes the frame memory 1405 as a work area in the encoding or the decoding. In addition, the encoding/decoding engine 1407 outputs the synchronization signal to the memory control unit 1406, for example, at a timing of starting the process for every macroblock.

The video ES buffer 1408A performs buffering on the video stream generated by the encoding/decoding engine 1407 and supplies the buffered stream to the multiplexer (MUX) 1412. The video ES buffer 1408B performs buffering on the video stream supplied from the demultiplexer (DMUX) 1413 and supplies the buffered stream to the encoding/decoding engine 1407.

The audio ES buffer 1409A performs buffering the audio stream generated by the audio encoder 1410 and supplies the buffered stream to the multiplexer (MUX) 1412. The audio ES buffer 1409B performs buffering on the audio stream supplied from the demultiplexer (DMUX) 1413 and supplies the buffered stream to the audio decoder 1411.

The audio encoder 1410, for example, digital-converts the audio signal input from, for example, the connectivity 1321 (FIG. 54) or the like and performs encoding in a predetermined scheme such as a MPEG audio scheme or an AC3 (Audio Code number 3) scheme. The audio encoder 1410 sequentially writes the audio stream which is data where the audio signal is encoded in the audio ES buffer 1409A. The audio decoder 1411 decodes the audio stream supplied from the audio ES buffer 1409B, performs, for example, conversion to an analog signal, and supplies the signal as the reproduced audio signal to, for example, the connectivity 1321 (FIG. 54) or the like.

The multiplexer (MUX) 3412 multiplexes the video stream and the audio stream. The method of the multiplexing (namely, the format of the bitstream generated by the multiplexing) is arbitrary. In addition, during multiplexing the multiplexer (MUX) 1412 may add predetermined header information or the like to the bitstream. Namely, the multiplexer (MUX) 1412 can convert the format of the stream by the multiplexing. The For example, the multiplexer (MUX) 1412 multiplexes the video stream and the audio stream to convert the video stream and the audio stream into a transport stream which is a bitstream in a format for transmission. In addition, for example, the multiplexer (MUX) 1412 multiplexes the video stream and the audio stream to convert the video stream and the audio stream into data (file data) in a file format for recording.

The demultiplexer (DMUX) 1413 demultiplexes the bitstream where the video stream and the audio stream are multiplexed by the method corresponding to the multiplexing of the multiplexer (MUX) 1412. Namely, the demultiplexer (DMUX) 1413 extracts the video stream and the audio stream from the bitstream read out from the stream buffer 1414 (separates the video stream and the audio stream). Namely, the demultiplexer (DMUX) 1413 can convert the format of the stream by the demultiplexing (can perform inverse conversion corresponding to the conversion of the demultiplexer (MUX) 1412). For example, the demultiplexer (DMUX) 1413 can acquire the transport stream supplied from, for example, the connectivity 1321, the broadband modem 1333 (both being illustrated in FIG. 54), or the like through the stream buffer 1414 and demultiplex the transport stream to convert the transport stream into the video stream and audio stream. In addition, for example, the demultiplexer (DMUX) 1413 can acquire the file data read out from the various recording media, for example, by the connectivity 1321 (FIG. 54) through the stream buffer 1414 and demultiplex the file data to convert the file data into the video stream and the audio stream.

The stream buffer 1414 buffers the bitstream. For example, the stream buffer 1414 performs buffering on the transport stream supplied from the multiplexer (MUX) 1.412, and at a predetermined timing or based on an external request or the like, the stream buffer supplies the buffered stream to, for example, the connectivity 1321, the broadband modem 1333 (both are illustrated in FIG. 54), or the like.

In addition, for example, the stream buffer 1414 buffers the file data supplied from the multiplexer (MUX) 1412 and, at a predetermined timing or based on an external request or the like, supplies the file data to, for example, the connectivity 1321 (FIG. 54) or the like to record the file data in various recording media.

In addition, the stream buffer 1414 performs buffering the transport stream acquired through, for example, the connectivity 1321, the broadband modem 1333, or the like (all are illustrated in FIG. 54), and at a predetermined timing or based on an external request or the like, the stream buffer supplied the buffered stream to the demultiplexer (DMUX) 1413.

In addition, the stream buffer 1414 performs buffering file data read from, for example, various recording media such as a connectivity 1321 (FIG. 54), and at a predetermined timing or based on an external request or the like, the stream buffer supplies the buffered stream to the demultiplexer (DMUX) 1413.

Next, an example of operations of the video processor 1332 having the above-described configuration will be described. For example, the video signals input from the connectivity 1321 (FIG. 54) or the like to the video processor 1332 are converted into digital image data in a predetermined scheme such as a 4:2:2 Y/Cb/Cr scheme in the video input processing unit 1401, and the digital, image data are sequentially written in the frame memory 1405. The digital image data are read out to the first image enlarging/reducing unit 1402 or the second image enlarging/reducing unit 1403, and format conversion and enlarging/reducing process are performed in a predetermined scheme such as a 4:2:0 Y/Cb/Cr scheme, so that the digital image data are written in the frame memory 1405 again. The image data are encoded by the encoding/decoding engine 1407 and written as a video stream in the video ES buffer 1408A.

In addition, the audio signal input from the connectivity 1321 (FIG. 54) or the like to the video processor 1332 is encoded by the audio encoder 1410 and written as an audio stream in the audio ES buffer 1409A.

The video stream of the video ES buffer 1408A and the audio stream of the audio ES buffer 1409A are read out to the multiplexer (MUX) 1412 and multiplexed to be converted into a transport stream, file data, or the like. The transport stream generated by the multiplexer (MUX) is buffered in the stream buffer 1414, and after that, the transport stream is output through, for example, the connectivity 1321, the broadband modem 1333 (both being illustrated in FIG. 54), or the like to an external network. In addition, the file data generated by the multiplexer (MUX) 1412 are buffered in the stream buffer 1414, and after that, the file data are written through, for example, the connectivity 1321 (FIG. 54) or the like in various recording media.

In addition, for example, the transport stream input through, for example, the connectivity 1321, the broadband modem 1333 (both being illustrated in FIG. 54), or the like from the external network to the video processor 1332 is buffered in the stream buffer 1414, and after that, the transport stream is demultiplexed by the demultiplexer (DMUX) 1413. In addition, the file data which are read out from various recording media in, for example, the connectivity 1321 (FIG. 54) or the like and input to the video processor 1332 are buffered in the stream buffer 1414, and after that, the file data are demultiplexed by the demultiplexer (DMUX) 1413. Namely, the transport stream or the file data input to the video processor 1332 are separated into the video stream and the audio stream by the demultiplexer (DMUX) 1413.

The audio stream is supplied through the audio ES buffer 1409B to the audio decoder 1411 and decoded, so that the audio signal is reproduced. In addition, after the video stream is written in the video ES buffer 1408B, the video stream is sequentially read out by the encoding/decoding engine 1407 to be decoded and written in the frame memory 1405. The decoded image data is applied with the enlarging/reducing process by the second image enlarging/reducing unit 1403 and is written in the frame memory 1405. Next, the decoded image data are read out to the video output processing unit 1404 and are applied with the format conversion in a predetermined scheme such as a 4:2:2 Y/Cb/Cr scheme to be further converted into an analog signal, so that a video signal is reproduced and output.

In the case where the present technique is applied to the video processor 1332 having the above-described configuration, the provider terminal according to the above-described embodiments may be applied to the encoding/decoding engine 1407. Namely, for example, the encoding/decoding engine 1407 may be configured to have the same functions as those of the image encoding device or the image decoding device according to the above-described embodiments. By doing so, the video processor can obtain the same effects as the effects described above with reference to FIGS. 1 to 36.

In addition, in the encoding/decoding engine 1407, the present technique (namely, the functions of the image encoding device or the image decoding device according to the above-described embodiments) may be implemented by hardware such as a logic circuit, may be implemented by software such as an embedded program, or may be implemented by both of the hardware and the software.

<Another Configuration Example of Video Processor>

Figure 56:
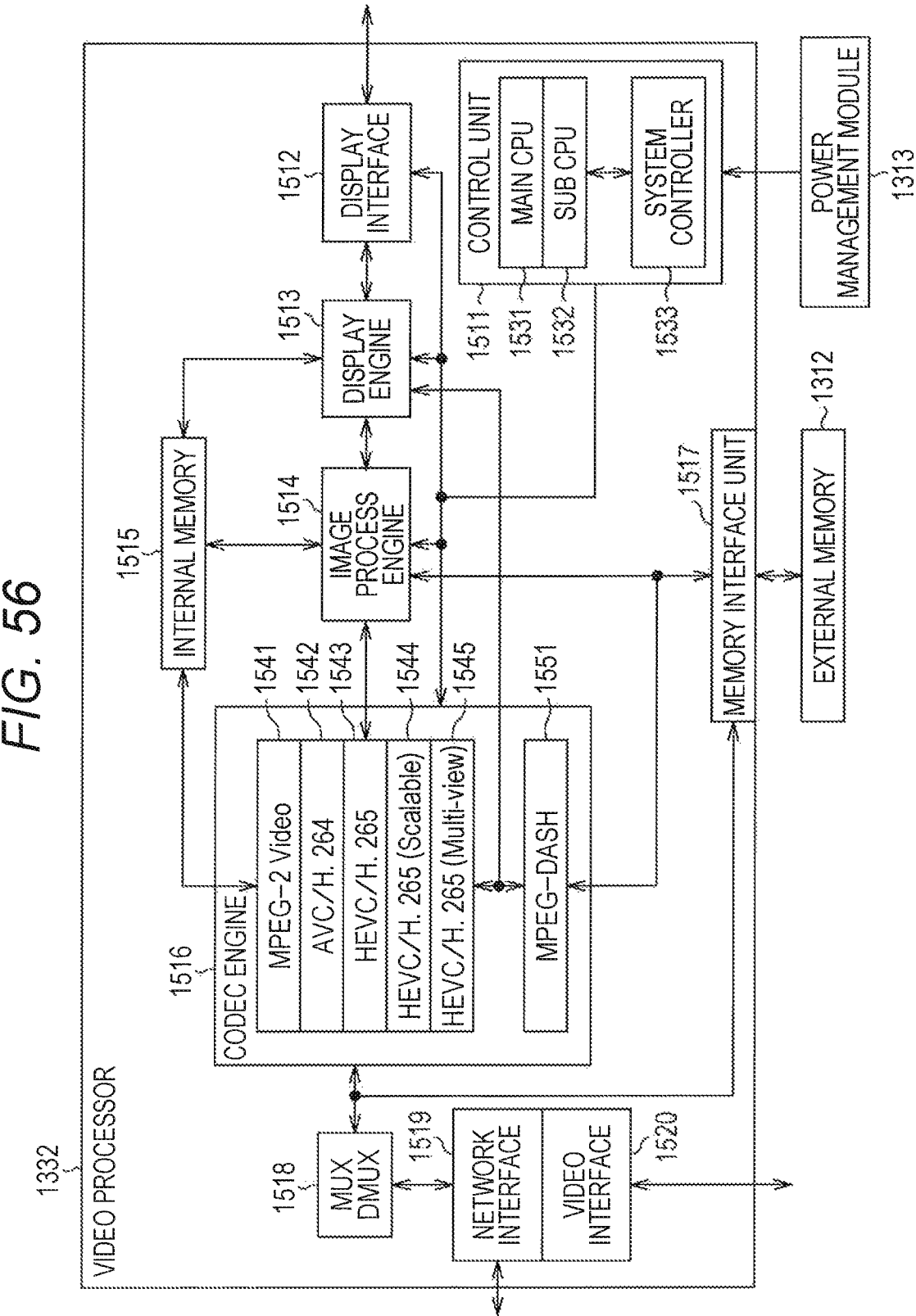
FIG. 56 is a block diagram illustrating another schematic configuration example of a video processor.

FIG. 56 illustrates another schematic configuration example of a video processor 1332 (FIG. 54) to which the present technique is applied. In the case of the example of FIG. 56, the video processor 1332 has a function of encoding/decoding the video data in a predetermined scheme.

More specifically, as illustrated in FIG. 56, the video processor 1332 is configured to include a control unit 1511, a display interface 1512, a display engine 1513, an image process engine 1514, and an internal memory 1515. In addition, the video processor 1332 is configured to include a codec engine 1516, a memory interface 1517, a multiplexer/demultiplexer (MUX/DMUX) 1518, a network interface 1519, and a video interface 1520.

The control unit 1511 controls the operations of the processing units in the video processor 1332 such as the display interface 1512, the display engine 1513, the image process engine 1514, and the codec engine 1516.

As illustrated in FIG. 56, the control unit 1511 is configured to include, for example, a main CPU 1531, a sub CPU 1532, and a system controller 1533. The main CPU 1531 executes a program or the like for controlling the operation of the processing units within the video processor 1332. The main CPU 1531 generates a control signal according to the program or the like and supplies the control signal to each processing unit (namely, controls operations of each processing unit). The sub CPU 1532 performs an auxiliary function of the main CPU 1531. For example, the sub CPU 1532 executes a child process, a subroutine, or the like of the program or the like executed by the main CPU 1531. The system controller 1533 controls the operations of the main CPU 1531 and the sub CPU 1532 such as an operation of designating the programs executed by the main CPU 1531 and the sub CPU 1532.

The display interface 1512 outputs the image data, for example, to the connectivity 1321 (FIG. 54) or the like under the control of the control unit 1511. For example, the display interface 1512 converts digital data of the image data into an analog signal and outputs the image data as a reproduced video signal or the image date in the digital data state to a monitor device or the like of the connectivity 1321 (FIG. 54).

The display engine 1513 performs various conversion processes such as format conversion, size conversion, or color area conversion on the image data in accordance with hardware specifications of the monitor device which displays the image under the control of the control unit 1511.

The image process engine 1514 performs a predetermined image process, for example, a filtering process for improving the image quality on the image data under the control of the control unit 1511.

The internal memory 1515 is a memory which is installed inside the video processor 1332, which is shared by the display engine 1513, the image process engine 1514, and the codec engine 1516. The internal memory 1515 is used, for example, for data transmission/reception performed among the display engine 1513, the image process engine 1514, and the codec engine 1516. For example, the internal memory 1515 stores data supplied from the display engine 1513, the image process engine 1514, or the codec engine 1516 and supplies the data to the display engine 1513, the image process engine 1514, or the codec engine 1516 if necessary (for example, according to a request). Although the internal memory 1515 may be implemented by any storage device, in general, since the internal memory is mainly used to store a block unit of image data and a small volume of data such as a parameter, it is preferable that the internal memory be implemented by, for example, a semiconductor memory having a relatively (for example, in comparison with the external memory 1312) small volume and a high response speed such as a static random access memory (SRAM).

The codec engine 1516 performs processes associated with encoding or decoding of the image data. The encoding/decoding scheme corresponding to the codec engine 1516 is arbitrary, and the number thereof may be one, or the number may be plural. For example, the codec engine 1516 has codec functions of a plurality of encoding/decoding schemes, and the encoding of the image data or the decoding of the encoded data may be performed by using one selected among them.

In the example illustrated in FIG. 56, the codec engine 1516 is configured to include, as functional blocks of the processes associated with the codec, for example, MPEG-2 Video 1541, AVC/H.264 1542, HEVC/H.265 1543, HEVC/H.265 (Scalable) 1544, HEVC/H.265 (Multi-view) 1545, and MPEG-DASH 1551.

The MPEG-2 Video 1541 is a functional block of encoding or decoding the image data in the MPEG-2 scheme. The AVC/H.264 1542 is a functional block of encoding or decoding the image data in the AVC scheme. The HEVC/H.265 1543 is a functional block of encoding or decoding the image data in the HEVC scheme. The HEVC/H.265 (Scalable) 1544 is a functional block of scalable-encoding or scalable-decoding the image data in the HEVC scheme. The HEVC/H.265 (Multi-view) 1545 is a functional block of multi-viewpoint-encoding or multi-viewpoint-decoding the image data in the HEVC scheme.

The MPEG-DASH 1551 is a functional block of transmitting or receiving the image data in the MPEG-DASH (MPEG-Dynamic Adaptive Streaming over HTTP) scheme. The MPEG-DASH is a technique of performing video streaming by using HTTP (HyperText Transfer Protocol) and one of characteristics thereof is to select appropriate encoded data among a plurality of encoded data of which prepared resolutions or the like are different in units of a segment and to transmit the selected encoded data. The MPEG-DASH 1551 performs generation of a stream, transmission control for the stream in accordance with the standard, and in the encoding/decoding of the image data, the above-described MPEG-2 Video 1541 or the HEVC/H.265 (Multi-view) 1545 are used.

The memory interface 1517 is an interface for the external memory 1312. Data supplied from the image process engine 1514 or the codec engine 1516 are supplied through the memory interface 1517 to the external memory 1312. In addition, data read out from the external memory 1312 are supplied through the memory interface to the video processor 1332 (the image process engine 1514 or the codec engine 1516).

The multiplexer/demultiplexer (MUX/DMUX) 1518 performs multiplexing or demultiplexing of various data associated with the image such as a bitstream of encoded data, image data, or a video signal. The multiplexing/demultiplexing method is arbitrary. For example, during multiplexing, multiplexer/demultiplexer (MUX/DMUX) 1518 may integrate a plurality of data into one and may also add predetermined header information or the like to the data. In addition, during demultiplexing, the multiplexer/demultiplexer (MUX/DMUX) 1518 may divide one data to plural data and may also add predetermined header information or the like to the divided data. Namely, the multiplexer/demultiplexer (MUX/DMUX) 1518 can convert a format of the data by the multiplexing/demultiplexing. For example, the multiplexer/demultiplexer (MUX/DMUX) 1518 may multiplex the bitstream to be converted into a transport stream which is a bitstream in a format for transmission or into data (file data) in a file format for recording. The inverse conversion can also be performed by the demultiplexing.

The network interface 1519 is an interface dedicated to, for example, the broadband modem 1333 or the connectivity 1321 (both being illustrated in FIG. 54. The video interface 1520 is an interface dedicated to, for example, the connectivity 1321 or the camera 1322 (both being illustrated in FIG. 54).

Next, an example of operations of the video processor 1332 will be described. For example, once the transport stream is received from the external network through the connectivity 1321, the broadband modem 1333 (both being illustrated in FIG. 54), or the like, the transport stream is supplied through the network interface 1519 to the multiplexer/demultiplexer (MUX/DMUX) 1518 to be demultiplexed, and the transport stream is decoded by the codec engine 1516. The image data obtained by the decoding of the codec engine 1516 are applied with a predetermined image process, for example, by the image process engine 1514; the image data undergo a predetermined conversion by the display engine 1513; the image data are supplied through the display interface 1512, for example, to the connectivity 1321 (FIG. 54) or the like; and the image is displayed on a monitor. In addition, for example, the image data obtained by the decoding of the codec engine 1516 are re-encoded by the codec engine 1516; the image data are multiplexed by the multiplexer/demultiplexer (MUX/DMUX) to be converted to a file data; the image data are output through the video interface 1520, for example, to the connectivity 1321 (FIG. 54) or the like and are recorded in various recording media.

In addition, for example, the file data of the encoded data where the image data are encoded, which are read out from a recording medium (not shown) by the connectivity 1321 (FIG. 54) or the like, are supplied through the video interface 1520 to the multiplexer/demultiplexer (MUX/DMUX) 1518 to be demultiplexed and are decoded by the codec engine 1516. The image data obtained by the decoding of the codec engine 1516 are applied with a predetermined image process by the image process engine 1514; the image data undergo a predetermined conversion by the display engine 1513; the image data are supplied through the display interface 1512, for example, to the connectivity 1321 (FIG. 54) or the like, and the image is displayed on a monitor. In addition, for example, the image data obtained by the decoding of the codec engine 1516 are re-encoded by the codec engine 1516; the image data are multiplexed by the multiplexer/demultiplexer (MUX/DMUX) to be converted into a transport stream; the image data are supplied through the network interface 1519, for example, to the connectivity 1321, the broadband modem (both being illustrated in FIG. 54) or the like and are transmitted to other apparatus (not shown).

In addition, transmission and reception of the image data or other data between the processing units within the video processor 1332 are performed, for example, by using the internal memory 1515 or the external memory 1312. In addition, the power management module 1313 controls power supply, for example, to the control unit 1511.

In the case where the present technique is applied to the video processor 1332 having the above-described configuration, the present technique according to the above-described embodiments may be applied to the codec engine 1516. Namely, for example, the codec engine 1516 may have functional blocks for implementing the image encoding device or the image decoding device according to the above-described embodiments. By doing so, the video processor 1332 can obtain the same effects as the effects described above with reference to FIGS. 1 to 36.

In addition, in the codec engine 1516, the present technique (namely, the functions of the image encoding device or the image decoding device according to the above-described embodiment) may be implemented by hardware such as a logic circuit, may be implemented by software such as an embedded program, or may be implemented by both of the hardware and the software.

Two examples of the configuration of the video processor 1332 are described above. However, the configuration of the video processor 1332 is arbitrary, and a configuration other than the above-described two examples may be employed. In addition, the video processor 1332 may be configured with one semiconductor chip. However, the video processor may be configured with a plurality of semiconductor chips. For example, a three-dimensional stacked LSI where multiple semiconductors are stacked may be employed. In addition, the video processor may be implemented by a plurality of LSIs.

<Example of Application to Apparatus>

The video set 1300 can be incorporated into various apparatuses which process image data. For example, the video set 1300 can be incorporated into the television apparatus 900 (FIG. 47), the mobile phone 920 (FIG. 48), the recording/reproducing apparatus 940 (FIG. 49), the imaging apparatus 960 (FIG. 50), or the like. By incorporating the video set 1300, the apparatus can obtain the same effects as the effects described above with reference to FIGS. 1 to 36.

In addition, the video set 1300 can be incorporated, for example, into terminal devices such as the personal computer 1004, the AV device 1005, the tablet device 1006, the mobile phone 1007 in the data transmission system 1000 FIG. 51, the broadcasting station 1101 and the terminal device 1102 in the data transmission system 1100 of FIG. 52, the imaging apparatus 1201 and the scalable encoded data storage device 1202 in the imaging system of FIG. 53, and the like. By incorporating the video set 1300, the apparatus can obtain the same effects as the effects described above with reference to FIGS. 1 to 36.

In addition, any portion of each configuration of the above-described video set 1300 which includes the video processor 1332 may be embodied as a configuration to which the present technique is applied. For example, only the video processor 1332 may be embodied as a video processor to which the present technique is applied. In addition, for example, as described above, the processors indicated by the broken line 1341, the video module 1311, or the like may be embodied as a processor or a module to which the present technique is applied. In addition, for example, a combination of the video module 1311, the external memory 1312, the power management module 1313, and the front end module 1314 may be implemented as the video unit 1361 to which the present technique is applied. Any of the above-described configurations can obtain the same effects as the effects described above with reference to FIGS. 1 to 36.

Namely, similarly to the case of the video set 1300, any configuration which includes the video processor 1332 can be incorporated into various apparatuses which process the image data. For example, the video processor 1332, the processors indicated by the broken line 1341, the video module 1311, or the video unit 1361 can be incorporated into the television apparatus 900 (FIG. 47), the mobile phone 920 (FIG. 48), the recording/reproducing apparatus 940 (FIG. 49), the imaging apparatus 960 (FIG. 50), the terminal devices such as the personal computer 1004, the AV device 1005, the tablet device 1006, the mobile phone 1007, and the like in the data transmission system 1000 of FIG. 51, the broadcasting station 1101 and the terminal device 1102 in the data transmission system 1100 of FIG. 52, the imaging apparatus 1201, the scalable encoded data storage device 1202, and the like in the imaging system 1200 of FIG. 53, and the like. In addition, similarly to the case of the video set 1300, by incorporating any of the configuration which the present technique is applied, the apparatuses can obtain the same effects as the effects described above with reference to FIGS. 1 to 36.

9. Seventh Embodiment

Example of Application to MPEG-Dash

In addition, the present technique can be applied to a content reproducing system or a wireless communication system of a Wi-Fi standard of, for example, HTTP streaming such as the later-described MPEG DASH, where appropriate data are selected and used in units of a segment among a plurality of encoded data of which prepared resolutions or the like are different.

<Overview of Content Reproducing System>

Firstly, the content reproducing system which can employ the present technique will be described in brief with reference to FIGS. 57 to 59.

Hereinafter, firstly, a basic configuration which is common to the embodiments will be described with reference to FIGS. 57 and 58.

Figure 57:
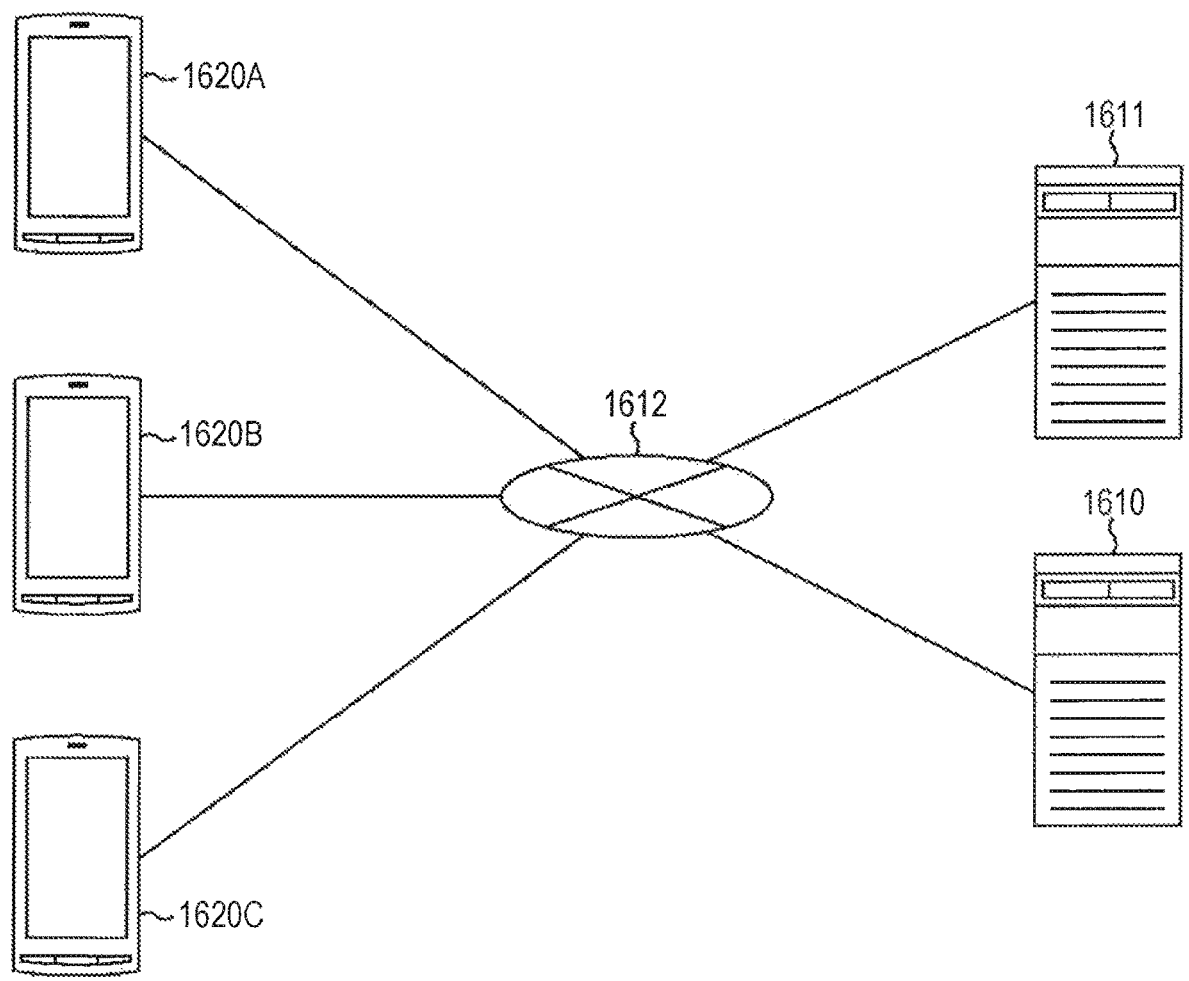
FIG. 57 is a diagram illustrating a configuration of a content reproducing system.

FIG. 57 is a diagram describing a configuration of the content reproducing system. As illustrated in FIG. 57, the content reproducing system is configured to include content servers 1610 and 1611, a network 1612, and a content reproducing apparatus 1620 (client apparatus).

The content servers 1610 and 1611 and the content reproducing apparatus 1620 are connected to each other via the network 1612. The network 1612 is a wired or wireless transmission line for the information that is transmitted from apparatuses connected to the network 1612.

For example, the network 1612 may include a public network such as the Internet, a telephone network, or a satellite communication network, various local area networks (LANs) and wide area networks (WANs) including an Ethernet (registered trade mark), or the like. In addition, the network 1612 may include a dedicated network such as IP-VPN (Internet Protocol-Virtual Private Network).

The content server 1610 encodes the content data to generate a data file including the encoded data and meta information of the encoded data and stores the data file. In addition, in the case where the content server 1610 generates a data file in an MP4 format, the encoded data corresponds to "mdat", and the meta information corresponds to "moov".

In addition, the content data may be music data such as music, lecture, and radio programs, video data such as movies, television programs, video programs, pictures, documents, painting, and charts, game, software, and the like.

Here, the content server 1610 is associated with the same content and generates a plurality of data files with different bit rates. In addition, with respect to the content reproducing request from the content reproducing apparatus 1620, the content server 1611 integrates the information of the parameter added to the URL in the content reproducing apparatus 1620 into the information of the URL of the content server 1610 and transmits the information to the content reproducing apparatus 1620. Hereinafter, the associated details will be described in detail with reference to FIG. 58.

Figure 58:
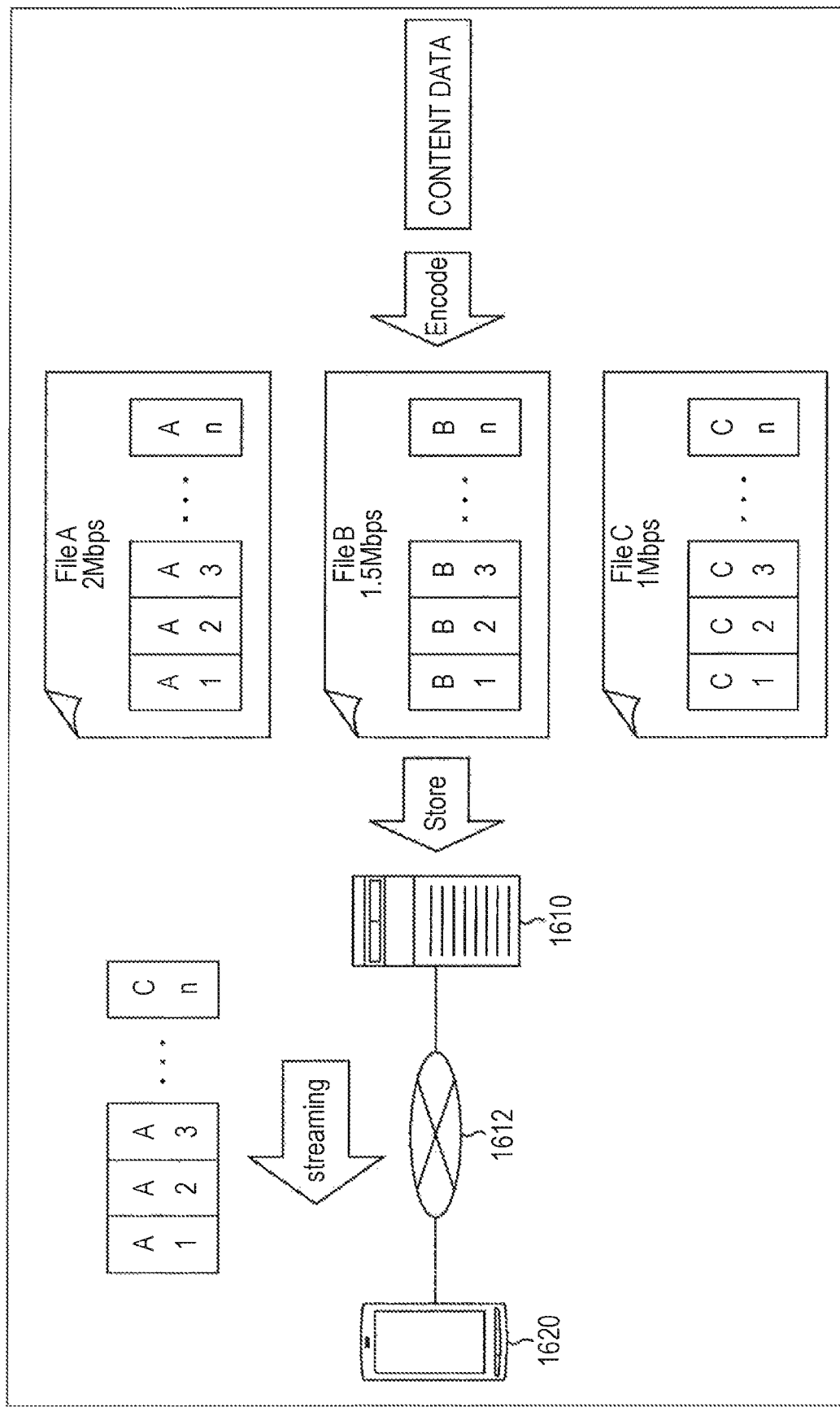
FIG. 58 is a diagram illustrating a flow of data in a content reproducing system.

FIG. 58 is a diagram describing a flow of data in the content reproducing system of FIG. 57. The content server 1610 encodes the same content data with different bit rates to generate, for example, the file A with 2 Mbps, the file B with 1.5 Mbps, and the file C with 1 Mbps as illustrated in FIG. 58. Relatively, the file A has a high bit rate; the file B has a standard bit rate; and the file C has a low bit rate.

In addition, as illustrated in FIG. 58, the encoded data of each file are divided into a plurality of segments. For example, the encoded data of the file A are divided into the segments denoted by "A1", "A2", "A3", . . . "An"; the encoded data of the file B are divided into the segments denoted by "B1", "B2", "B3", . . . "Bn"; and the encoded data of the file C are divided into the segments denoted by "C1", "C2", "C3", . . . "Cn".

In addition, each segment may be configured with a configuration sample from one or two or more video encoded data and audio encoded data which begin with a sync sample (for example, IDR picture in the video encoding of the AVC/H.264) of MP4 and can be independently reproduced. For example, in the case where video data with 30 frames per second are encoded in a GOP (Group of Picture) with a 15-frame fixed length, each segment may be 2-second video and audio encoded data corresponding to 4 GOPs or may be 10-second video and audio encoded data corresponding to 20 GOPs.

In addition, the reproducing ranges (ranges of time positions from the front end of the content) according to the segments with the same arrangement order in each file are the same. For example, the reproducing ranges of the segment "A2", the segment "B2", and the segment "C2" are the same, and in the case where each segment is 2-second encoded data, the reproducing ranges of the segment "A2", the segment "B2", and the segment "C2" are 2 seconds to 4 seconds of all the contents.

Once the content server 1610 generates the file A to the file C configured with a plurality of the segments, the content server stores the file A to the file C. Next, as illustrated in FIG. 58, the content server 1610 sequentially transmits the segments constituting different files to the content reproducing apparatus 1620, and the content reproducing apparatus 1620 streaming-reproduces the received segments.

Here, the content server 1610 according to the embodiment transmits a play list file (hereinafter, referred to as an MPD: Media Presentation Description) including the bit rate information and the access information of the encoded data to the content reproducing apparatus 1620, and the content reproducing apparatus 1620 selects bit rates among the plurality of the bit rates based on the MPD and request the content server 1610 to transmit the segments corresponding to the selected bit rates.

Although only the one content server 1610 is illustrated in FIG. 57, the present technique is not limited to the associated example.

Figure 59:
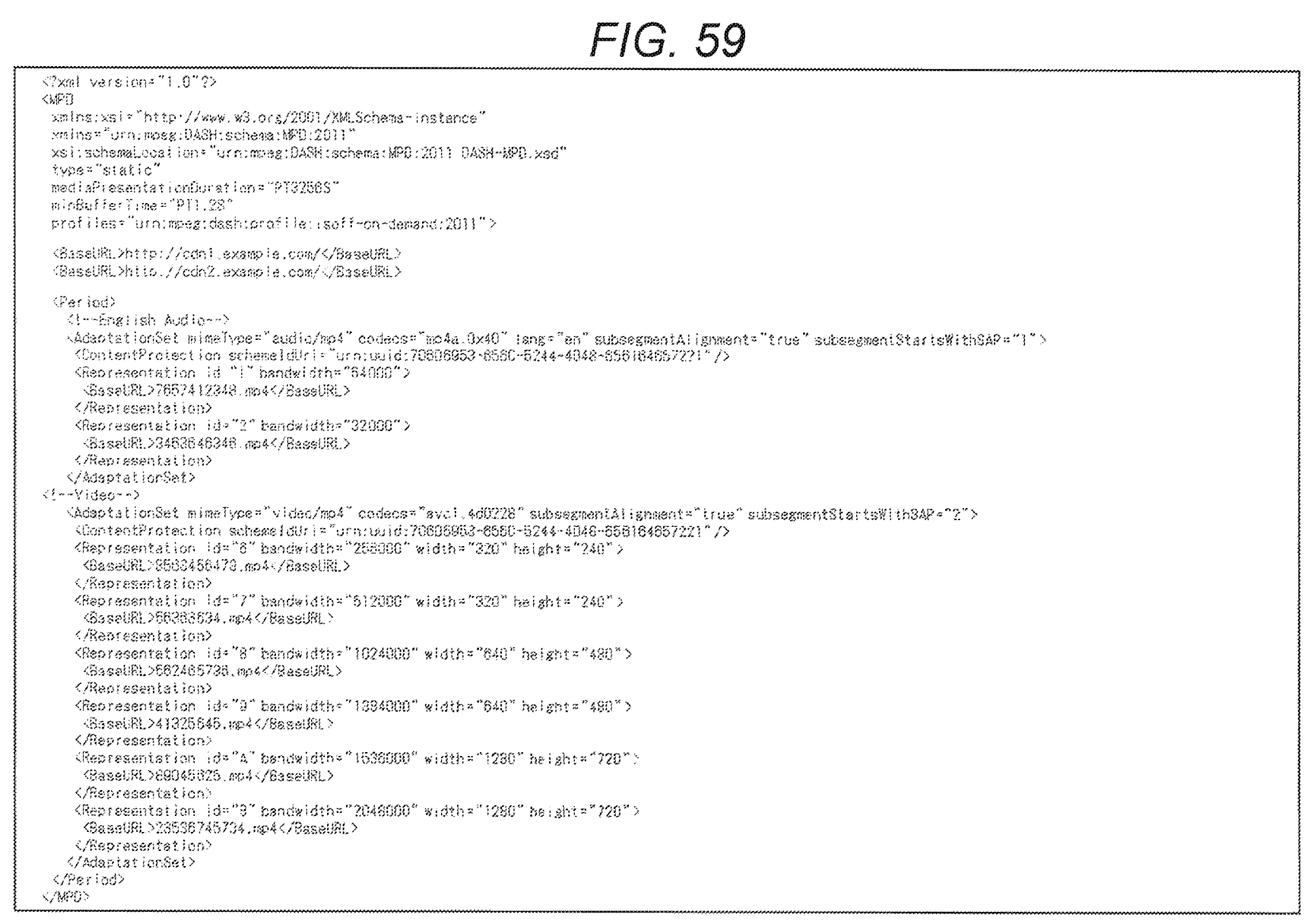

FIG. 59 is a diagram describing a specific example of the MPD. As illustrated in FIG. 59, the MPD includes access information on a plurality of the encoded data having different bit rates (BANDWIDTHS). For example, the MPD illustrated in FIG. 59 includes the access information on the encoded data representing that there exist the encoded data with 256 Kbps, 1.024 Mbps, 1384 Mbps, 1.536 Mbps, and 2.048 Mbps. The content reproducing apparatus 1620 can dynamically change the bit rate of the encoded data which are to be streaming-reproduced based on the associated MPD.

In addition, although a mobile terminal is illustrated in FIG. 57 as an example of the content reproducing apparatus 1620, the content reproducing apparatus 1620 is not limited to the example. For example, the content reproducing apparatus 1620 may be an information processing apparatus such as a personal computer (PC), a home video processing device (a DVD recorder, a video deck, or the like), a personal digital assistants (PDA), a home game machine, or a household electronic appliance. In addition, the content reproducing apparatus 1620 may be an information processing apparatus such as a mobile phone, a personal handyphone system (PHS), a portable music playback device, a portable video processing device, or a portable game device.

<Configuration of Content Server 1610>

The overview of the content reproducing system has been described above with reference to FIGS. 57 to 59. Subsequently, a configuration of the content server 1610 will be described with reference to FIG. 60.

Figure 60:
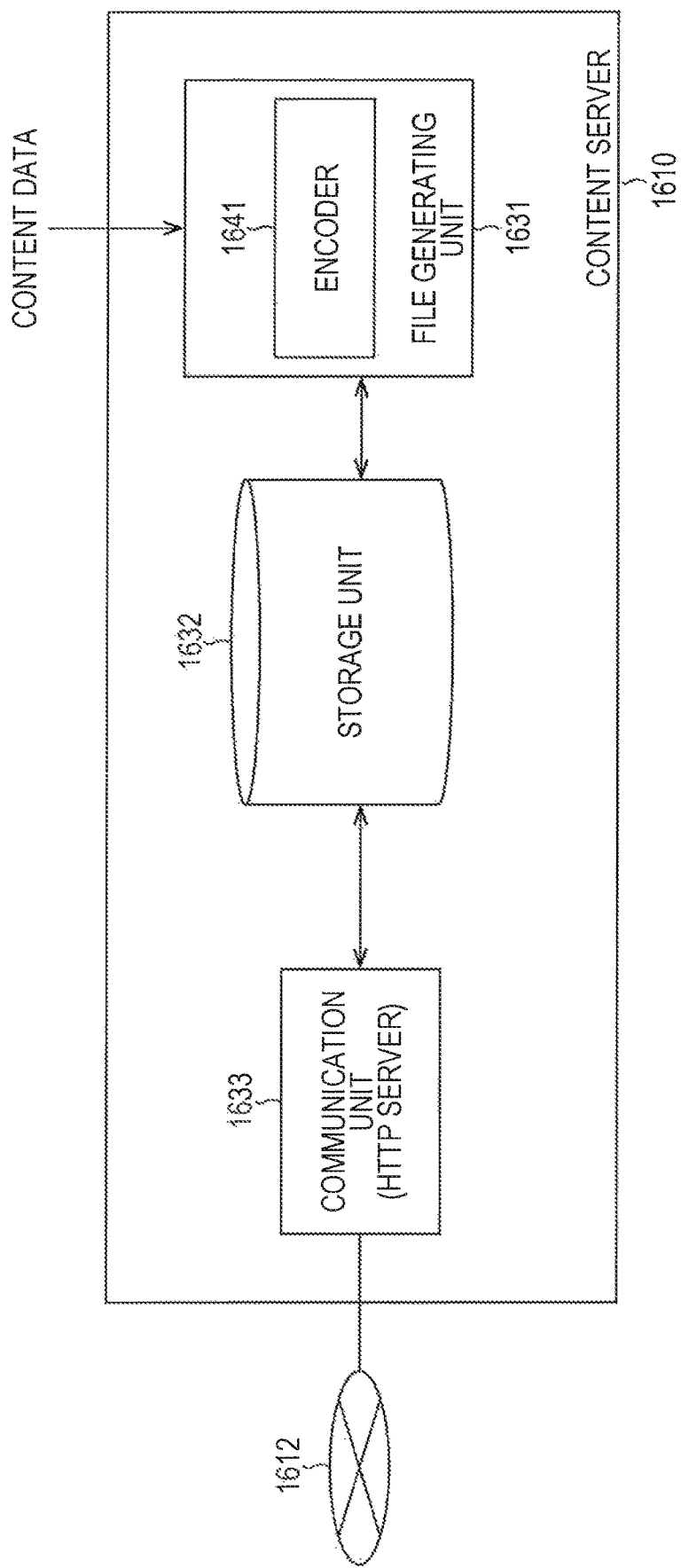
FIG. 60 is to functional block diagram illustrating a configuration of a content server of a content reproducing system.

FIG. 60 is a functional block diagram illustrating a configuration of the content server 1610. As illustrated in FIG. 60, the content server 1610 is configured to include a file generating unit 1631, a storage unit 1632, and a communication unit 1633.

The file generating unit 1631 is configured to include an encoder 1641 which encodes the content data and generates a plurality of the encoded data having different bit rates with the same content and the above-described MPD. For example, in the case where the file generating unit 1631 generates the encoded data with 256 Kbps, 1.024 Mbps, 1.384 Mbps, 1.536 Mbps, and 2.048 Mbps, the file generating unit generates the MPD illustrated in FIG. 59.

The storage unit 1632 stores a plurality of the encoded data having different bit rates and the MPD, which are generated by the file generating unit 1631. The storage unit 1632 may be a storage medium such as a non-volatile memory, a magnetic disk, an optical disk, and an MO (Magneto Optical) disk. The non-volatile memory includes, for example, an electrically erasable programmable read-only memory (EEPROM) and an erasable programmable ROM (EPROM). In addition, the magnetic disk includes a hard disk, a disc-type magnetic disk, and the like. In addition, the optical disk includes a compact disc (CD), a digital versatile disc recordable (DVD-R), a Blu-Ray disc (BD; registered trade mark), and the like.

The communication unit 1633 is an interface to the content reproducing apparatus 1620 and communicates with the content reproducing apparatus 1620 via the network 1612. More specifically, the communication unit 1633 has a function as an HTTP server which communicates with the content reproducing apparatus 1620 in accordance with HTTP. For example, the communication unit 1633 transmits the MPD to the content reproducing apparatus 1620, extracts the encoded data requested based on the MPD from the content reproducing apparatus 1620 in accordance with HTTP from the storage unit. 1632, and transmits the encoded data as an HTTP response to the content reproducing apparatus 1620.

<Configuration of Content Reproducing Apparatus 1620>

The configuration of the content server 1610 according to the embodiment has been described above. Subsequently, a configuration of the content reproducing apparatus 1620 will be described with reference to FIG. 61.

Figure 61:
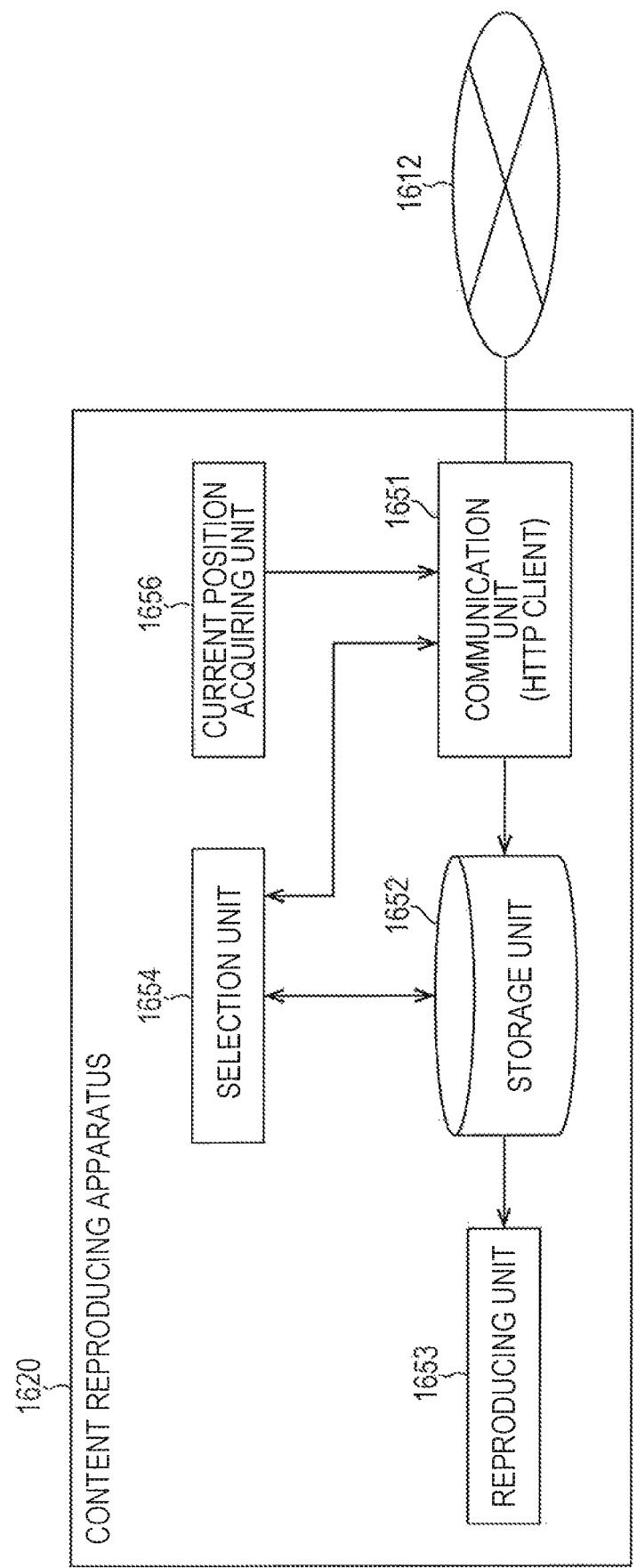
FIG. 61 is a functional block diagram illustrating a configuration of a content reproducing apparatus of a content reproducing system.

FIG. 61 is a functional block diagram illustrating a configuration of the content reproducing apparatus 1620. As illustrated in FIG. 61, the content reproducing apparatus 1620 is configured to include a communication unit 1651, a storage unit 1652, a reproducing unit 1653, a selection unit 1654, and a current position acquiring unit 1656.

The communication unit 1651 is an interface to the content server 1610 and requests data of the content server 1610 to acquire the data from the content server 1610. More specifically, the communication unit 1651 has a function as an HTTP client which communicates with the content reproducing apparatus 1620 in accordance with HTTP. For example, the communication unit 1651 can selectively acquire the MPD or the segments of the encoded data from the content server 1610 by using HTTP Range.

The storage unit 1652 stores various types of information on the content reproduction. For example, the segments acquired from the content sever 1610 by the communication unit 1651 are sequentially buffered. The segments of the encoded data buffered in the storage unit are sequentially supplied to the reproducing unit in a manner of FIFO (First In First Out).

In addition, the storage unit 1652 adds a parameter to the URL in the communication unit 1651 based on a command of adding the parameter to the URL of the content described in the MPD, which is requested from the content server 1611 described later and stores a definition for accessing the URL.

The reproducing unit 1653 sequentially reproduces the segments supplied from the storage unit 1652. More specifically, the reproducing unit 1653 performs segment decoding, DA conversion, rendering, and the like.

The selection unit 1654 sequentially selects whether the segment of the encoded data corresponding to any bit rate included in the MPD is acquired within the same content. For example, once the selection unit 1654 sequentially selects segments "A1", "B2", and "A3" according to the band of the network 1612, as illustrated in FIG. 58, the communication unit 1651 acquires the segments "A1", "B2", and "A3" from the content server 1610.

The current position acquiring unit 1656 acquires the current position of the content reproducing apparatus 1620. Therefore, for example, the current position acquiring unit may be configured with a module of acquiring the current position such as a GPS (Global Positioning System) receiver. In addition, the current position acquiring unit 1656 may acquire the current position of the content reproducing apparatus 1620 by using a wireless network.

<Configuration of Content Server 1611>

Figure 62:
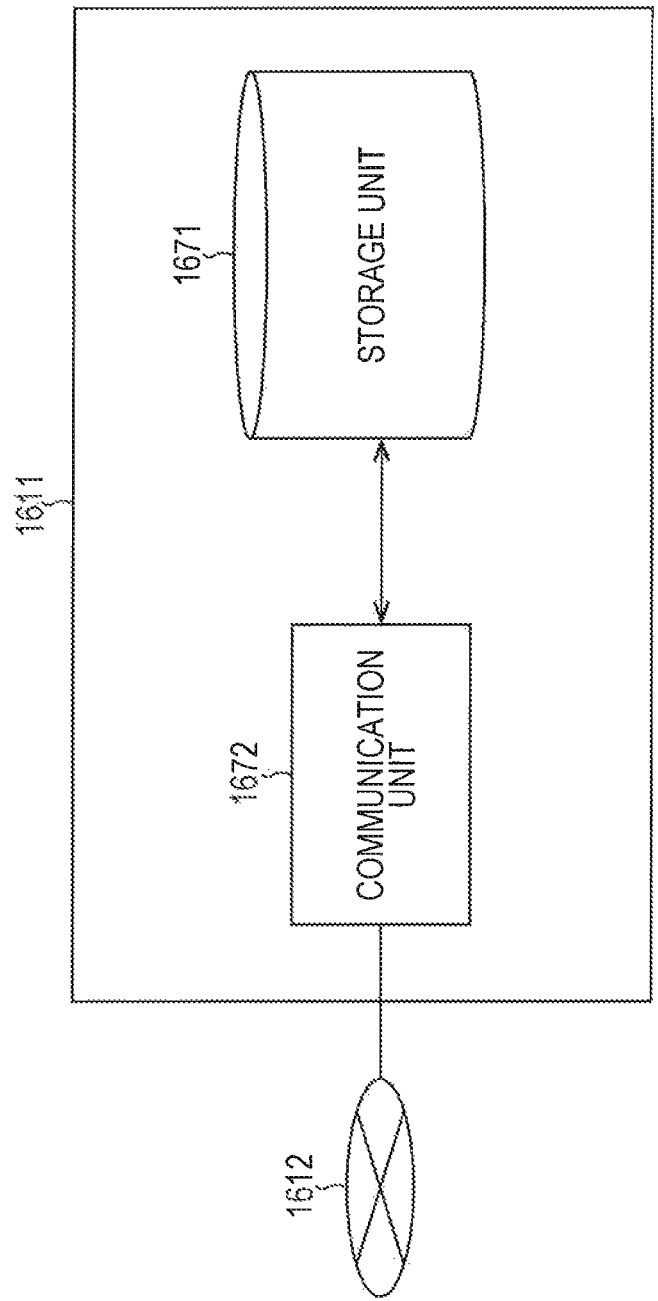
FIG. 62 is a functional block diagram illustrating a configuration of a content server of a content reproducing system.

FIG. 62 is a diagram describing a configuration example of the content server 1611. As illustrated in FIG. 62, the content server 1611 is configured to include a storage unit 1671 and a communication unit 1672.

The storage unit 1671 stores URL information in an MPD. The URL information of the MPD is transmitted from the content server 1611 to the content reproducing apparatus 1620 according to the request from the content reproducing apparatus 1620 which requests content reproducing. In addition, at the time of providing the URL information of the MPD to the content reproducing apparatus 1620, the storage unit 1671 stores definition information at the time of adding the parameter to the URL described in the MPD in the content reproducing apparatus 1620.

The communication unit 1672 is an interface to the content reproducing apparatus 1620 to communicate with the content reproducing apparatus 1620 via the network 1612. Namely, the communication unit 1672 receives a request for URL information of the MPD from the content reproducing apparatus 1620 which requests content reproducing and transmits the UEL information of the MPD to the content reproducing apparatus 1620. The URL of the MPD which is transmitted from the communication unit includes information for adding the parameter in the content reproducing apparatus 1620.

The parameter which is to be added to the URL of the MPD in the content reproducing apparatus 1620 can be set as definition information which is shared by the content server 1611 and the content reproducing apparatus in various manners. As an example, information of a current position of the content reproducing apparatus 1620, user ID of a user using the content reproducing apparatus 1620, a memory size of the content reproducing apparatus 1620, storage capacity of the content reproducing apparatus 1620, and the like can be added to the URL of the MPD in the content reproducing apparatus 1620.

In the content reproducing system having the above-described configuration, by applying the present technique described above with reference to FIGS. 1 to 36, it is possible to obtain the same effects as the effects described above with reference to FIGS. 1 to 36.

Namely, the encoder 1641 of the content server 1610 has a function of the image encoding device according to the above-described embodiments. In addition, the reproducing unit 1653 of the content reproducing apparatus 1620 has a function of the image decoding device according to the above-described embodiments. Therefore, it is possible to suppress an increase in storage capacity necessary for encoding/decoding.

In addition, in the content reproducing system, by transmitting/receiving the encoded data by the present technique, it is possible to suppress an increase in storage capacity necessary for encoding/decoding.

10. Eighth Embodiment

Example of Application of Wireless Communication System of Wi-Fi Standard

Basic operations of the wireless communication device in the wireless communication system which the present technique can be applied to will be described.

<Example of Basic Operations of Wireless Communication Device>

First, the wireless packet transmission/reception is performed until P2P (Peer to Peer) connection is established and a specific application is operated.

Next, the wireless packet transmission/reception is performed after the to-be-used specific application is designated before the connection to the second layer until the P2P connection is established and the specific application is operated. Next, after the connection to the second layer, the wireless packet transmission/reception of the case of starting up the specific application is performed.

<Communication Example at Time of Starting UP Operation of Specific Application>

Figure 63:
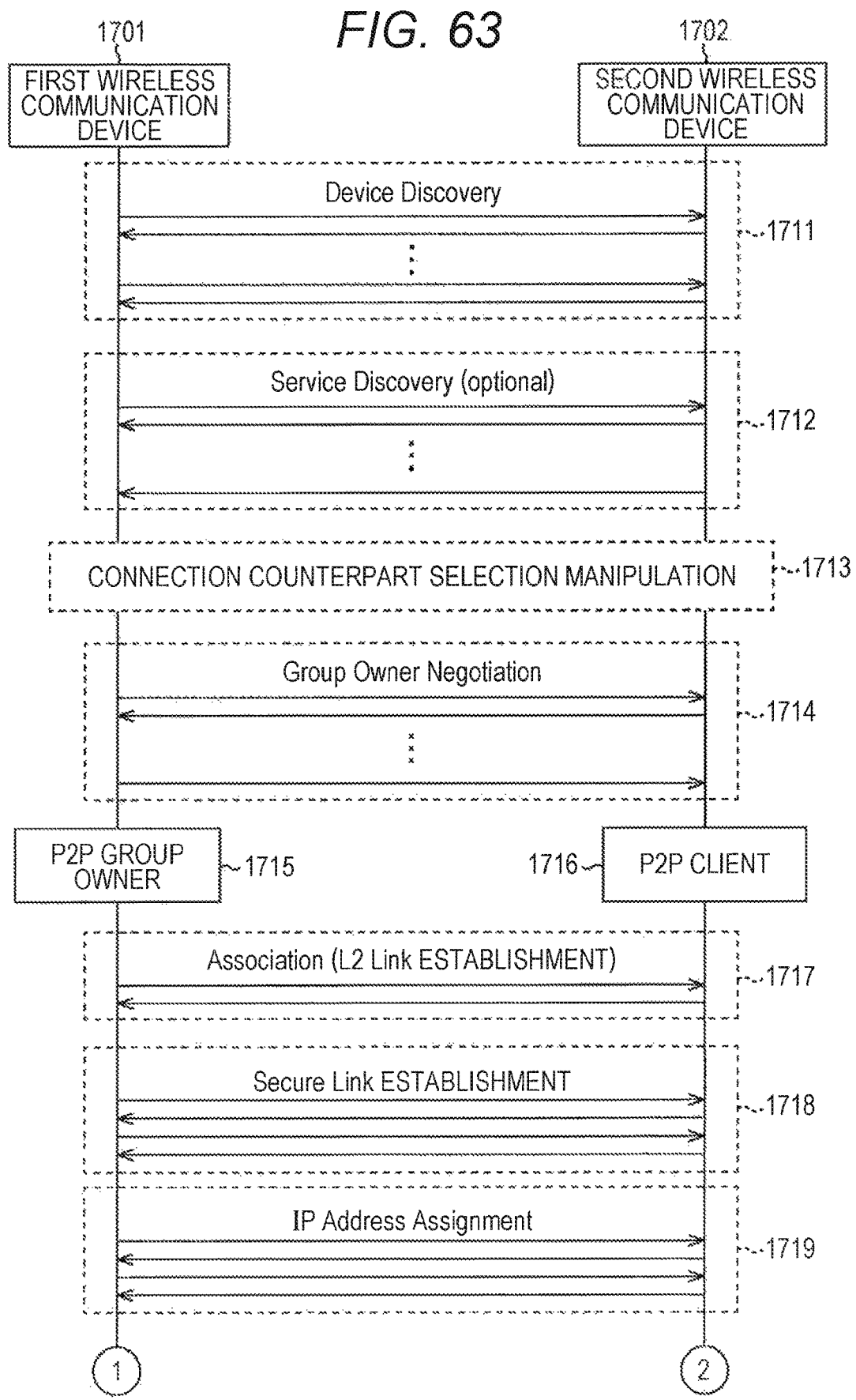
FIG. 63 is a sequence chart illustrating an example of a communication process of each apparatus in a wireless communication system.
Figure 64:
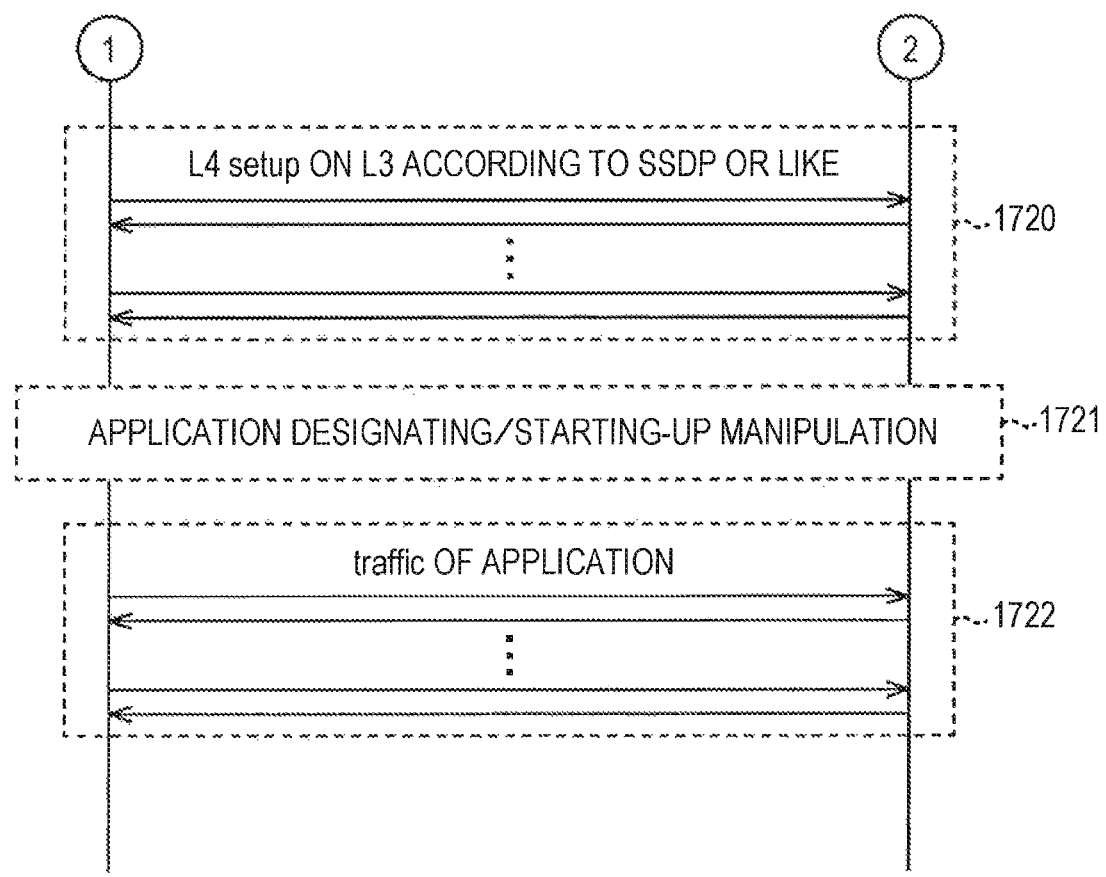
FIG. 64 is a sequence chart illustrating an example of a communication process of each apparatus in a wireless communication system.

FIGS. 63 and 64 illustrate an example of the wireless packet transmission/reception until the above-described P2P (Peer to Peer) connection is established and the specific application is operated, and illustrate a sequence chart illustrating an example of the communication process by each apparatus which is the basis of the wireless communication. More specifically, an example of sequence of establishment of direction connection leading to the connection of Wi-Fi Direct standard (sometimes, referred to as Wi-Fi P2P) which is standardized in Wi-Fi Alliance is illustrated.

Here, in the Wi-Fi Direct, a plurality of wireless communication devices detects each other (Device Discovery, Service Discovery). Next, once the connection devices are selected, the direct connection is established between the selected devices, by performing authentication with WPS (Wi-Fi Protected Setup). In addition, in the Wi-Fi Direct, a communication group is formed by determining which one of a group owner and a client a plurality of wireless communication devices serve as.

However, in the example of the communication process, some packet transmission/reception is omitted in illustration. For example, at the time of the first connection, as described above, the packet data exchange is needed to use the WPS, and the packet data exchange is also needed to exchange Authentication Pequest/Response or the like. However, in FIGS. 63 and 64, the packet data exchange is omitted in illustration, and the second connection and the following connections are illustrated.

In addition, although an example of the communication process between a first wireless communication device 1701 and a second wireless communication device 1702 is illustrated in FIGS. 63 and 64, the communication process between other wireless communication devices are the same.

Firstly, device discovery is performed between the first wireless communication device 1701 and the second wireless communication device 1702 (1711). For example, the first wireless communication device 1701 transmits Probe request (response request signal) and receives Probe response (response signal) to the Probe request from the second wireless communication device 1702. Therefore, the first wireless communication device 1701 and the second wireless communication device 1702 can discover each other. In addition, by the Device Discovery, device name or type (TV, PC, smart phone, or the like) of counterpart can be acquired.

Subsequently, Service Discovery is performed between the first wireless communication device 1701 and the second wireless communication device 1702 (1712). For example, the first wireless communication device 1701 transmits Service Discovery Query for querying a service corresponding to the second wireless communication device 1702 discovered by Device Discovery. Next, the first wireless communication device 1701 receives Service Discovery Response from the second wireless communication device 1702 to acquire the service according to the second wireless communication device 1702. Namely, by the Service Discovery, the service or the like that can be executed by the counterpart can be acquired. The service that can be executed by the counterpart is, for example, a service, a protocol (DLNA (Digital Living Network Alliance) DMR (Digital Media Renderer), or the like).

Subsequently, selection manipulation (connection counterpart selection manipulation) of the connection counterpart is performed by the user (1713). In some cases, the connection counterpart selection manipulation may occur in only one of the first wireless communication device 1701 and the second wireless communication device 1702. For example, a connection counterpart selection screen is displayed on a display unit of the first wireless communication device 1701, and in the connection counterpart selection screen, the second wireless communication device 1702 is selected as the connection counterpart by user's manipulation.

Once the connection counterpart selection manipulation is performed by the user (1713), Group Owner Negotiation is performed between the first wireless communication device 1701 and the second wireless communication device 1702 (1714). FIGS. 63 and 64 illustrate an example where, as a result of the Group Owner Negotiation, the first wireless communication device 1701 becomes a group owner 1715, and the second wireless communication device 1702 becomes a client 1716.

Subsequently, by performing the processes (1717 to 1720), direct connection is established between the first wireless communication device 1701 and the second wireless communication device 1702. Namely, Association (L2 (second layer) link establishment) (1717) and Secure link establishment (1718) are sequentially performed. In addition, IP Address Assignment (1719) and L4 setup (1720) on L3 by SSDP (Simple Service Discovery Protocol) or the like are sequentially performed. In addition, the L2 (layer 2) denotes a second layer (data link layer); the L3 (layer 3) denotes a third layer (network layer); and the L4 (layer 4) denotes a fourth layer (transport layer).

Subsequently, designating or starting-up manipulation (application designating/starting-up manipulation) of the specific application is performed by the user (1721). In some cases, the application designating/starting-up manipulation may occur in any one of the first wireless communication device 1701 and the second wireless communication device 1702. For example, an application designating/starting-up manipulation screen is displayed on the display unit of the first wireless communication device 1701, and a specific application is selected in the application designating/starting-up manipulation screen by user's manipulation.

Once the application designating/starting-up manipulation is performed by the user (1721), the specific application corresponding to the application designating/starting-up manipulation is executed between the first wireless communication device 1701 and the second wireless communication device 1702 (1722).

Here, it is assumed that connection between AP (Access Point) and STA (Station) is performed within a range of the specification (specification standardized by IEEE 802.11) earlier than the Wi-Fi Direct standard. In this case, before the connection in the second layer (before-association in IEEE 802.11 terminology), it was not possible to recognize in advance which device was to be connected.

On the other hand, as illustrated in FIGS. 63 and 64, in the Wi-Fi Direct, at the time of discovering a candidate of the connection counterpart in Device discovery or Service Discovery (option), the information of the connection counterpart can be acquired. The information on the connection counterpart is, for example, a type of a basic device, a corresponding specific application, or the like. Next, the user can be allowed to select a connection counterpart based on the information of the acquired connection counterpart.

As an extension of this structure, a wireless communication system can be implemented by designating a specific application before the connection to the second layer, selecting a connection counterpart, and automatically starting up the specific application after the section. An example of a sequence leading to the connection in the case is illustrated in FIG. 66. In addition, a configuration example of the frame format which is transmitted/received in the communication process is illustrated in FIG. 65.

<Configuration Example of Frame Format>

Figure 65:
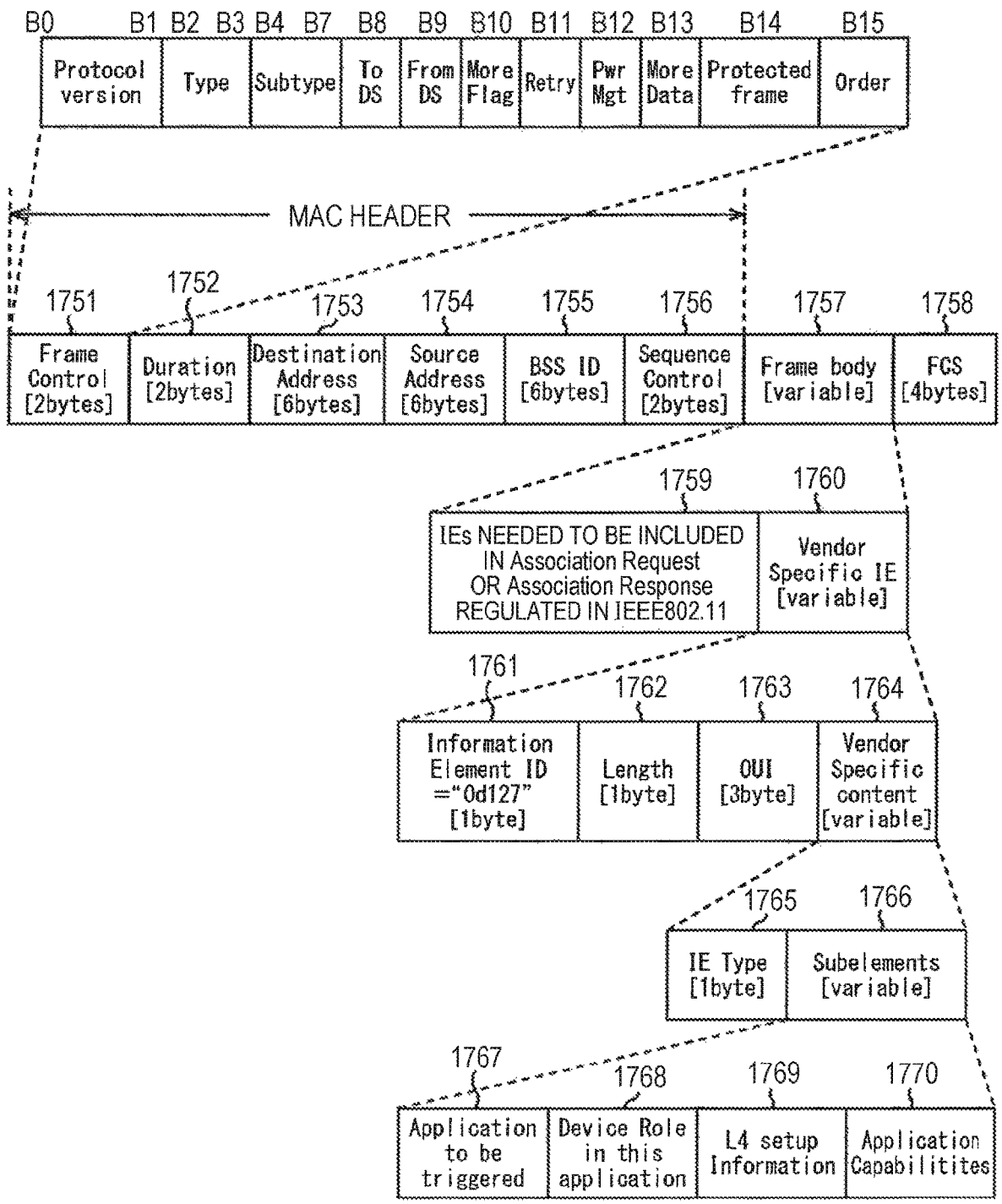
FIG. 65 is a schematic diagram illustrating a configuration example of a frame format transmitted/received in a communication process by each apparatus in a wireless communication system.

FIG. 65 is a schematic diagram illustrating a configuration example of a frame format transmitted/received in a communication process by each apparatus which is the basis of the present technique. Namely, FIG. 65 illustrates a configuration example of a MAC frame for establishing connection to the second layer. More specifically, the example is an example of a frame format of Association Request/Response (1787) for implementing the sequence illustrated in FIG. 66.

As illustrated in FIG. 65, a MAC frame is configured with Frame Control (1751) to FCS (1758), and amount them, the components from the Frame Control (1751) to the Sequence Control (1756) constitute a MAC header. In addition, at the time of transmitting Association Request, in Frame Control (1751), it is set that B3B2="0b00" and B7B6B5B4="0b0000". In addition, at the time of encapsulating Association Response, in Frame Control (1751), it is set that B3B2="0b00" and B7B6B5B4="0b0001". In addition, "0b00" represents "00" in the binary system; "0b0000" represents "0000" in the binary system; and "0b0001" represents "0001." in the binary system.

Here, a MAC frame (Frame body (1757)) illustrated in FIG. 63 is basically an Association Request/Response frame format disclosed in Sections 7.2.3.4 and 7.2.3.5 of IEEE 802.11-2007 specifications. However, the MAC frame is different in that the MAC frame includes, as well as Information Element (hereinafter, abbreviated with IE) (1759) defined in the IEEE 802.11 specifications, its own extended IE.

In addition, in order to represent that the IE is a vendor specific IE (1760), IE Type (Information Element ID (1761)) is set to 127 in decimal system. In this case, in accordance with Section 7.3.2.26 of IEEE 802.11-2007 specifications, Length field (1762) and OUI field (1763) follow, and a vendor specific content (1764) is disposed after that.

As a content of the vendor specific content (1764), firstly, a field (IE type (1765)) representing a type of the vendor specific IE is provided. Next, after that, a configuration where a plurality of subelements (1766) can be stored is considered.

It is considered that the content of the subelement (1766) includes a name (1767) of a specific application to be used or a function (1768) of a device at the time of operation of the specific application. In addition, it is considered that the content of the subelement includes information (information for setting up L4) (1769) of the specific application or port number or the like used for controlling thereof or information (capability information) (1770) on capability within the specific application. Here, the capability information is information for specifying correspondence to audio sending-out/reproducing, correspondence to video sending-out/reproducing, or the like, for example, in the case where the specific application to be designated is DLNA.

In the wireless communication system having the above-described configuration, by applying the present technique described above with reference to FIGS. 1 to 36, it is possible to obtain the same effects as the effects described above with reference to FIGS. 1 to 36. Namely, it is possible to suppress an increase in storage capacity necessary for encoding/decoding. In addition, in the above-described wireless communication system, by transmitting/receiving the encoded data by the present technique, it is possible to suppress an increase in storage capacity necessary for encoding/decoding.

In addition, in this specification, the example where various kinds of information are multiplexed with the encoded stream to be transmitted from the encoding side to the decoding side has been described. However, the method of transmitting these kinds of information is not limited to the above-described example. For example, these kinds of information may be transmitted or recorded as individual data which are correlated with the encoded stream without being multiplexed with the encoded bitstream. Here, the term "to correlate" denotes that an image (or a portion of the image such as a slice or a block) included in a bitstream and information corresponding to the image is linked with each other at the time of decoding. Namely, the information may be transmitted along a transmission line which is different from a transmission line for the image (or bitstream). In addition, the information may be recorded in a recording medium (or a different recording area of the same recording medium) which is different from a recording medium for the image (or bitstream). In addition, the information and the image (or bitstream) may be correlated with each other in an arbitrary unit, for example, plural frames, one frame, a portion of frame, or the like.

While exemplary embodiments disclosed with reference to the attached drawings are described above in detail, the disclosed technical scope is not limited to the example. It is obvious that various changes or modifications can be made within the scope of the technical spirit disclosed in the claims by the ordinarily skilled in the disclosed technical field, and it should be noted that these changes or modifications are included within the disclosed technical scope.

In addition, the present technique may take the following configurations.

(1) An image processing apparatus including a threshold value setting unit which sets a threshold value for identifying a feature of neighboring pixels of a current block in an intra prediction process in decoding of encoded data where image data are encoded according to a bit depth of the image data and a filtering processing unit which performs a filtering process on the neighboring pixels by using a filter according to the feature of the neighboring pixels identified by using the threshold value set by the threshold value setting unit.

(2) The image processing apparatus according to any of (1) and (3) to (8), wherein the threshold value setting unit bit-shifts the threshold value which is determined as an initial value in advance according to the bit depth.

(3) The image processing apparatus according to any of (1), (2), and (4) to (8), wherein the threshold value setting unit sets the threshold value to 8 in the case where the bit depth of the image data is 8 bits.

(4) The image processing apparatus according to any of (1) to (3) and (5) to (8), further including a determining unit which determines the bit depth of the image data, wherein the threshold value setting unit sets the threshold value according to the bit depth determined by the determining unit.

(5) The image processing apparatus according to any of (1) to (4) and (6) to (8), further including a receiving unit which receives the bit depth of the image data, wherein the threshold value setting unit sets the threshold value according to the bit depth received by the receiving unit.

(6) The image processing apparatus according to any of (1) to (5), (7), and (8), further including a receiving unit which receives the transmitted threshold value set according to the bit depth of the image data, wherein the filtering processing unit performs a filtering process on the neighboring pixels by using a filter according to the feature of the neighboring pixels identified by using the threshold value received by the receiving unit.

(7) The image processing apparatus according to any of (1) to (6), and (8), wherein the filtering processing unit performs a low pass filtering process on the neighboring pixels in the case where a value representing the feature of the neighboring pixels exceeds the threshold value set by the threshold value setting unit.

(8) The image processing apparatus according to any of (1) to (7), wherein the filtering processing unit performs a bi-linear filtering process on the neighboring pixels in the case where a value representing the feature of the neighboring pixels does not exceed the threshold value set by the threshold value setting unit.

(9) An image processing method including setting a threshold value for identifying a feature of neighboring pixels of a current block in an intra prediction process in decoding of encoded data where image data are encoded according to a bit depth of the image data and performing a filtering process on the neighboring pixels by using a filter according to the feature of the neighboring pixels identified by using the set threshold value.

REFERENCE SIGNS LIST

100 Image encoding device
121 Threshold value setting unit
122 Filtering processing unit
131 Bit depth determining unit
132 Threshold value bit shifting unit
133 Encoding unit
141 Mode/block size buffer
142 Neighboring pixel determining unit
143 Filter decision unit
144 Low pass filter unit
145 Bi-linear filter unit
151 Threshold value setting unit
300 Image decoding device
321 Threshold value setting unit
322 Filtering processing unit
331 Bit depth determining unit
332 Threshold value bit shifting unit
341 Mode/block size buffer
342 Neighboring pixel determining unit
343 Filter decision unit
344 Low pass filter unit
345 Bi-linear filter unit
351 Decoding unit
361 Decoding unit

The invention claimed is:

1. An image processing apparatus comprising:
a threshold value setting unit configured to set a threshold value, at a time of decoding encoded data of image data, and according to a bit depth of the image data determined based on a sequence parameter set (SPS) of the encoded data;
a filtering process unit configured to conditionally perform a bi-linear interpolation filtering, based on an intra smoothing enabled flag regulated in the SPS and only when a value calculated based on neighboring pixels of a current block in an intra prediction process in the decoding of the encoded data of image data is smaller than the threshold value, on the neighboring pixels to generate filtered neighboring pixels, wherein the calculated value represents a planarity of change of a characteristic of the neighboring pixels, and the bi-linear interpolation filtering is not performed on the neighboring pixels when the calculated value is not smaller than the threshold value;
an intra prediction unit configured to perform the intra prediction process on the current block, conditionally using the filtered neighboring pixels generated when the bi-linear interpolation filtering has been performed on the neighboring pixels based on the calculated value being smaller than the threshold value, to generate a prediction block corresponding to the current block; and
a decoding unit configured to decode the current block using the prediction block,
wherein the threshold value setting unit is configured to bit-shift the threshold value which is determined as an initial value in advance according to a bit depth of the image data,
wherein the threshold value setting unit is configured to set the threshold value to a predetermined value based on a respective value of the bit depth of the image data,
wherein the intra smoothing enabled flag represents whether or not to perform the bi-linear interpolation filtering on the neighboring pixels and perform the intra prediction process on the current block using the bi-linear interpolation filtered neighboring pixels, and
wherein the filtering process unit, the intra prediction unit, and the decoding unit are each implemented via at least one processor.

2. The image processing apparatus according to claim 1, further comprising a determining unit configured to determine the bit depth of the image data,
wherein the threshold value setting unit is configured to set the threshold value according to the bit depth determined by the determining unit, and
wherein the determining unit is implemented via at least one processor.

3. The image processing apparatus according to claim 1, further comprising a receiving unit configured to receive a bit depth of the image data,
wherein the threshold value setting unit is configured to set the threshold value according to the bit depth received by the receiving unit, and
wherein the receiving unit is implemented via at least one processor.

4. The image processing apparatus according to claim 1, further comprising a receiving unit configured to receive a transmitted bit depth of the image data according to which the threshold value setting unit sets the threshold value,
wherein the filtering process unit is configured to perform the filtering process on the neighboring pixels according to a feature of the neighboring pixels identified by using the threshold value, and
wherein the receiving unit is implemented via at least one processor.

5. The image processing apparatus according to claim 1, wherein the filtering process unit is configured to perform a low pass filter on the neighboring pixels if the value calculated based on the neighboring pixels exceeds the threshold value set by the threshold value setting unit.

6. The image processing apparatus according to claim 1, wherein the threshold value is variably set to different values associated with different bit depths.

7. The image processing apparatus according to claim 1, wherein the bit-shifted threshold value is obtained by bit-shifting the initial value by a difference in a number of bits between the bit depth of the image data and an initial bit depth associated with the initial value.

8. The image processing apparatus according to claim 1, wherein the threshold value setting unit is configured to set the threshold value to 8 in the case where the bit depth of the image data is 8 bits.

9. An image processing method comprising:
setting a threshold value, at a time of decoding encoded data of an image data, and according to a bit depth of the image data determined based on a sequence parameter set (SPS) of the encoded data;
conditionally performing a bi-linear interpolation filtering, based on an intra smoothing enabled flag regulated in the SPS and only when a value calculated based on neighboring pixels of a current block in an intra prediction process in the decoding of the encoded data of the image data is smaller than the threshold value, on the neighboring pixels to generate filtered neighboring pixels, wherein the calculated value represents a planarity of change of a characteristic of the neighboring pixels, and the bi-linear interpolation filtering is not performed on the neighboring pixels when the calculated value is not smaller than the threshold value;
performing the intra prediction process on the current block, conditionally using the filtered neighboring pixels generated when the bi-linear interpolation filtering has been performed on the neighboring pixels based on the calculated value being smaller than the threshold value, to generate a prediction block corresponding to the current block; and
decoding the current block using the prediction block, wherein the threshold value determined as an initial value is bit-shifted in advance according to a bit depth of the image data, the threshold value is set to a predetermined value based on a respective value of the bit depth of the image data, and the intra smoothing enabled flag represents whether or not to perform the bi-linear interpolation filtering on the neighboring pixels and perform the intra prediction process on the current block using the bi-linear interpolation filtered neighboring pixels.

10. The image processing method according to claim 9, wherein the threshold value is variably set to different values associated with different bit depths.

11. The image processing method according to claim 9, wherein the bit-shifted threshold value is obtained by bit-shifting the initial value by a difference in a number of bits between the bit depth of the image data and an initial bit depth associated with the initial value.

12. The image processing method according to claim 9, wherein the threshold value is set to 8 in the case where the bit depth of the image data is 8 bits.

* * * * *